(12) United States Patent
McDonnell et al.

(10) Patent No.: US 12,540,161 B2
(45) Date of Patent: Feb. 3, 2026

(54) LINKERS

(71) Applicant: BicycleTx Limited, Cambridge (GB)

(72) Inventors: Kevin McDonnell, Lexington, MA (US); Gemma Mudd, Cambridge (GB); Paul John Beswick, Cambridge (GB)

(73) Assignee: BicycleTx Limited, Cambridge (GB)

( * ) Notice: Subject to any disclaimer, the term of this patent is extended or adjusted under 35 U.S.C. 154(b) by 956 days.

(21) Appl. No.: 17/444,294

(22) Filed: Aug. 3, 2021

(65) Prior Publication Data

US 2022/0031858 A1  Feb. 3, 2022

Related U.S. Application Data

(60) Provisional application No. 63/060,344, filed on Aug. 3, 2020.

(51) Int. Cl.
- *C07K 5/062* (2006.01)
- *A61K 38/48* (2006.01)
- *A61K 47/65* (2017.01)

(52) U.S. Cl.
CPC .......... *C07K 5/06052* (2013.01); *A61K 38/48* (2013.01); *A61K 47/65* (2017.08)

(58) Field of Classification Search
CPC ............ C07K 5/06052; C07K 5/06017; C07K 5/06078; A61K 47/65
See application file for complete search history.

(56) References Cited

U.S. PATENT DOCUMENTS

| | | | |
|---|---|---|---|
| 2,642,514 A | 6/1953 | Herkenhoff |
| 4,650,750 A | 3/1987 | Giese |
| 4,709,016 A | 11/1987 | Giese |
| 5,360,819 A | 11/1994 | Giese |
| 5,516,931 A | 5/1996 | Giese et al. |
| 5,595,756 A | 1/1997 | Bally et al. |
| 5,602,273 A | 2/1997 | Giese et al. |
| 5,604,104 A | 2/1997 | Giese et al. |
| 5,610,020 A | 3/1997 | Giese et al. |
| 5,650,270 A | 7/1997 | Giese et al. |
| 6,326,144 B1 | 12/2001 | Bawendi et al. |
| 6,468,808 B1 | 10/2002 | Nie et al. |
| 6,552,065 B2 | 4/2003 | Remiszewski et al. |
| 7,151,047 B2 | 12/2006 | Chan et al. |
| 7,192,785 B2 | 3/2007 | Nie et al. |
| 7,390,799 B2 | 6/2008 | Bruncko et al. |
| 8,138,347 B2 | 3/2012 | Adams et al. |
| 8,680,022 B2 | 3/2014 | Gregory et al. |
| 8,685,890 B2 | 4/2014 | Winter et al. |
| 8,778,844 B2 | 7/2014 | Winter et al. |
| 8,906,682 B2 | 12/2014 | June et al. |
| 8,986,655 B2 | 3/2015 | Weiss et al. |
| 9,518,081 B2 | 12/2016 | Winter et al. |
| 9,644,201 B2 | 5/2017 | Winter et al. |
| 9,657,288 B2 | 5/2017 | Winter et al. |
| 9,670,482 B2 | 6/2017 | Winter et al. |
| 9,670,484 B2 | 6/2017 | Winter et al. |
| 9,670,521 B2 | 6/2017 | Grabstein et al. |
| 9,868,767 B2 | 1/2018 | Pei et al. |
| 9,932,367 B2 | 4/2018 | Stace et al. |
| 9,994,617 B2 | 6/2018 | Tite et al. |
| 10,118,947 B2 | 11/2018 | Teufel et al. |
| 10,294,274 B2 | 5/2019 | Teufel et al. |
| 10,441,663 B2 | 10/2019 | Bennett et al. |
| 10,532,106 B2 | 1/2020 | Teufel et al. |
| 10,624,968 B2 | 4/2020 | Bennett et al. |
| 10,626,147 B2 | 4/2020 | Pei et al. |
| 10,792,368 B1 | 10/2020 | Teufel et al. |
| 10,800,813 B2 | 10/2020 | Tite et al. |
| 10,857,196 B2 | 12/2020 | Beswick et al. |
| 10,870,679 B2 | 12/2020 | Teufel et al. |
| 10,875,894 B2 | 12/2020 | Chen et al. |
| 10,894,808 B2 | 1/2021 | Teufel et al. |
| 10,899,798 B2 | 1/2021 | Bennett et al. |
| 10,919,937 B2 | 2/2021 | Beswick et al. |
| 10,994,019 B2 | 5/2021 | Teufel et al. |
| 11,103,591 B2 | 8/2021 | Teufel et al. |
| 11,180,531 B2 | 11/2021 | Beswick et al. |
| 11,241,473 B2 | 2/2022 | Beswick et al. |

(Continued)

FOREIGN PATENT DOCUMENTS

| | | |
|---|---|---|
| CN | 101497878 A | 5/2009 |
| CN | 105307686 A | 2/2016 |

(Continued)

OTHER PUBLICATIONS

D B Glass, L J Lundquist, B M Katz, D A Walsh, Protein Kinase Inhibitor-(6-22)-amide Peptide Analogs with Standard and Non-standard Amino Acid Substitutions for Phenylalanine 10: Inhibition of cAMP-dependent Protein Kinase, Journal of Biological Chemistry, vol. 264, Issue 24, 1989, pp. 14579-14584.*
Chang, et al.. (2022). The Effects of Charged Amino Acid Side-Chain Length on Diagonal Cross-Strand Interactions between Carboxylate- and Ammonium-Containing Residues in a β-Hairpin. Molecules, 27(13), 4172. https://doi.org/10.3390/molecules27134172 (Year: 2013).*
Wei et al., Journal of Medicinal Chemistry 2018 61 (3), 989-1000 DOI: 10.1021/acs.jmedchem.7b01430 (Year: 2018).*
Anami, Y., Yamazaki, C.M., Xiong, W et al. Glutamic acid-valine-citrulline linkers ensure stability and efficacy of antibody-drug conjugates in mice. Nat Commun 9, 2512 (2018). https://doi.org/10.1038/s41467-018-04982-3 (Year: 2018).*

(Continued)

*Primary Examiner* — Jeanette M Lieb
*Assistant Examiner* — David Paul Bowles
(74) *Attorney, Agent, or Firm* — Wolf, Greenfield & Sacks, P.C.

(57) ABSTRACT

The invention relates to novel linkers which comprise two or three basic, acidic or hydrophobic natural or non-natural amino acids. The invention also relates to drug conjugates comprising said linkers, to pharmaceutical compositions comprising said drug conjugates and to the use of said drug conjugates in preventing, suppressing or treating cancer.

21 Claims, 10 Drawing Sheets

(56) References Cited

U.S. PATENT DOCUMENTS

| | | |
|---|---|---|
| 11,261,214 B2 | 3/2022 | Chen et al. |
| 11,306,123 B2 | 4/2022 | Mudd et al. |
| 11,312,749 B2 | 4/2022 | Mudd et al. |
| 11,332,500 B2 | 5/2022 | Mudd et al. |
| 11,396,530 B2 | 7/2022 | Beswick et al. |
| 11,414,488 B2 | 8/2022 | Bennett et al. |
| 11,433,137 B2 | 9/2022 | Bennett et al. |
| 11,453,702 B2 | 9/2022 | Beswick et al. |
| 11,453,703 B2 | 9/2022 | Keen et al. |
| 11,484,602 B2 | 11/2022 | Chen et al. |
| 11,542,304 B2 | 1/2023 | Chen et al. |
| 11,613,560 B2 | 3/2023 | Stephen et al. |
| 11,623,012 B2 | 4/2023 | Chen et al. |
| 11,672,868 B2 | 6/2023 | Teufel et al. |
| 11,696,956 B2 | 7/2023 | Chen et al. |
| 11,730,819 B2 | 8/2023 | Teufel et al. |
| 11,746,126 B2 | 9/2023 | Bennett et al. |
| 11,814,447 B2 | 11/2023 | Teufel et al. |
| 11,833,211 B2 | 12/2023 | Chen et al. |
| 11,912,792 B2 | 2/2024 | Beswick et al. |
| 11,946,041 B2 | 4/2024 | Chen et al. |
| 11,970,553 B2 | 4/2024 | Mudd et al. |
| 12,049,520 B2 | 7/2024 | Chen et al. |
| 2002/164788 A1 | 11/2002 | Ellis et al. |
| 2005/0169931 A1 | 8/2005 | Kinch et al. |
| 2009/0222937 A1 | 9/2009 | Arnould et al. |
| 2009/0304721 A1 | 12/2009 | Kinch et al. |
| 2012/0101253 A1 | 4/2012 | Heinis et al. |
| 2012/0172235 A1 | 7/2012 | Winter et al. |
| 2013/0064791 A1 | 3/2013 | Poelstra et al. |
| 2013/0072598 A1 | 3/2013 | Yang et al. |
| 2014/0163201 A1 | 6/2014 | Winter et al. |
| 2014/0249292 A1 | 9/2014 | Tite et al. |
| 2014/0256596 A1 | 9/2014 | Tite et al. |
| 2014/0274759 A1 | 9/2014 | Walker et al. |
| 2015/0038434 A1 | 2/2015 | Yang et al. |
| 2015/0087810 A1 | 3/2015 | Moore et al. |
| 2016/0031939 A1 | 2/2016 | Stace et al. |
| 2016/0046721 A1 | 2/2016 | Qian et al. |
| 2016/0122430 A1 | 5/2016 | Gish et al. |
| 2016/0256579 A1 | 9/2016 | Shalom |
| 2016/0326232 A1 | 11/2016 | Rosa et al. |
| 2017/0067045 A1 | 3/2017 | Winter et al. |
| 2017/0190743 A1 | 7/2017 | Pei et al. |
| 2017/0204150 A1 | 7/2017 | Liu et al. |
| 2017/0304342 A1 | 10/2017 | Cox et al. |
| 2017/0306032 A1 | 10/2017 | Gehlsen |
| 2017/0360952 A1 | 12/2017 | Schwartz et al. |
| 2018/0169254 A1 | 6/2018 | Bennett et al. |
| 2018/0200378 A1 | 7/2018 | Bennett et al. |
| 2018/0280525 A1 | 10/2018 | Teufel et al. |
| 2018/0311300 A1 | 11/2018 | Beswick et al. |
| 2018/0318451 A1 | 11/2018 | Skerra et al. |
| 2018/0362585 A1 | 12/2018 | Teufel et al. |
| 2018/0371020 A1 | 12/2018 | Bennett et al. |
| 2019/0134213 A1 | 5/2019 | Teufel et al. |
| 2019/0184025 A1 | 6/2019 | Chen et al. |
| 2019/0263866 A1 | 8/2019 | Chen et al. |
| 2019/0307836 A1 | 10/2019 | Keen et al. |
| 2019/0389906 A1 | 12/2019 | Beswick et al. |
| 2019/0389907 A1 | 12/2019 | Teufel et al. |
| 2020/0129630 A1 | 4/2020 | Koehler et al. |
| 2020/0131228 A1 | 4/2020 | Beswick et al. |
| 2020/0171161 A1 | 6/2020 | Teufel et al. |
| 2020/0190213 A1 | 6/2020 | Preyer et al. |
| 2020/0215199 A1 | 7/2020 | Bennett et al. |
| 2020/0255477 A1 | 8/2020 | Chen et al. |
| 2020/0283482 A1 | 9/2020 | Keen et al. |
| 2020/0289657 A1 | 9/2020 | Teufel et al. |
| 2020/0291096 A1 | 9/2020 | Keen et al. |
| 2020/0316209 A1 | 10/2020 | Teufel et al. |
| 2020/0338203 A1 | 10/2020 | Chen et al. |
| 2020/0354406 A1 | 11/2020 | Stephen et al. |
| 2020/0354456 A1 | 11/2020 | Bennett et al. |
| 2020/0407709 A1 | 12/2020 | Chen et al. |
| 2021/0040154 A1 | 2/2021 | Mudd et al. |
| 2021/0046145 A1 | 2/2021 | Beswick et al. |
| 2021/0069287 A1 | 3/2021 | Mudd et al. |
| 2021/0079045 A1 | 3/2021 | Bennett et al. |
| 2021/0101932 A1 | 4/2021 | Chen et al. |
| 2021/0101933 A1 | 4/2021 | Chen et al. |
| 2021/0101937 A1 | 4/2021 | Mudd et al. |
| 2021/0122785 A1 | 4/2021 | Teufel et al. |
| 2021/0122804 A1 | 4/2021 | Teufel et al. |
| 2021/0147484 A1 | 5/2021 | Beswick et al. |
| 2021/0147485 A1 | 5/2021 | Teufel et al. |
| 2021/0261620 A1 | 8/2021 | Teufel et al. |
| 2021/0269480 A1 | 9/2021 | Beswick et al. |
| 2021/0299210 A2 | 9/2021 | Keen et al. |
| 2022/0023432 A1 | 1/2022 | Teufel et al. |
| 2022/0024982 A1 | 1/2022 | Chen et al. |
| 2022/0054646 A1 | 2/2022 | Chen et al. |
| 2022/0064218 A1 | 3/2022 | Baldassarre et al. |
| 2022/0064221 A1 | 3/2022 | Lani et al. |
| 2022/0072140 A1 | 3/2022 | Stace et al. |
| 2022/0088118 A1 | 3/2022 | Baldassarre et al. |
| 2022/0088207 A1 | 3/2022 | Chen et al. |
| 2022/0089643 A1 | 3/2022 | Beswick et al. |
| 2022/0119488 A1 | 4/2022 | Lani et al. |
| 2022/0133732 A1 | 5/2022 | Baldassarre et al. |
| 2022/0133733 A1 | 5/2022 | Baldassarre et al. |
| 2022/0135614 A1 | 5/2022 | Teufel et al. |
| 2022/0184222 A1 | 6/2022 | Bennett et al. |
| 2022/0194983 A1 | 6/2022 | Teufel et al. |
| 2022/0213145 A1 | 7/2022 | Chen et al. |
| 2022/0227811 A1 | 7/2022 | Mudd et al. |
| 2022/0242911 A1 | 8/2022 | Mudd et al. |
| 2022/0257784 A1 | 8/2022 | Upadhyaya et al. |
| 2022/0275053 A1 | 9/2022 | Upadhyaya et al. |
| 2022/0281918 A1 | 9/2022 | Van Rietschoten et al. |
| 2022/0289792 A1 | 9/2022 | Chen et al. |
| 2022/0306689 A9 | 9/2022 | Chen et al. |
| 2022/0306694 A1 | 9/2022 | Mudd et al. |
| 2022/0362390 A1 | 11/2022 | Stace et al. |
| 2022/0387611 A1 | 12/2022 | Bennett et al. |
| 2023/0002596 A1 | 1/2023 | Zhang et al. |
| 2023/0008076 A1 | 1/2023 | Keen et al. |
| 2023/0025916 A1 | 1/2023 | Bennett et al. |
| 2023/0025971 A1 | 1/2023 | Bennett et al. |
| 2023/0086865 A1 | 3/2023 | Balmford et al. |
| 2023/0106511 A1 | 4/2023 | Balmford et al. |
| 2023/0129258 A1 | 4/2023 | Upadhyaya et al. |
| 2023/0144799 A1 | 5/2023 | Chen et al. |
| 2023/0165966 A1 | 6/2023 | Koehler et al. |
| 2023/0181749 A1 | 6/2023 | Dickson et al. |
| 2023/0220008 A1 | 7/2023 | Chen et al. |
| 2023/0233698 A1 | 7/2023 | Bennett et al. |
| 2023/0287047 A1 | 9/2023 | Beswick et al. |
| 2023/0340020 A1 | 10/2023 | Teufel et al. |
| 2024/0000957 A1 | 1/2024 | Chen et al. |
| 2024/0082410 A1 | 3/2024 | Teufel et al. |
| 2024/0108738 A1 | 4/2024 | Keen et al. |
| 2024/0158444 A1 | 5/2024 | Bennett et al. |
| 2024/0173422 A1 | 5/2024 | Beswick et al. |
| 2024/0189436 A1 | 6/2024 | Chen et al. |
| 2024/0197897 A1 | 6/2024 | Keen et al. |
| 2024/0240255 A1 | 7/2024 | Blakemore et al. |
| 2024/0325554 A1 | 10/2024 | Keen et al. |
| 2024/0336656 A1 | 10/2024 | Mudd et al. |
| 2024/0400616 A1 | 12/2024 | Beswick et al. |

FOREIGN PATENT DOCUMENTS

| | | |
|---|---|---|
| EP | 2393520 A1 | 12/2011 |
| EP | 2970954 A1 | 1/2016 |
| EP | 3192802 A1 | 7/2017 |
| FR | 2932189 A1 | 11/2009 |
| GB | 1239978 A | 7/1971 |
| JP | 2006514104 A | 4/2006 |
| JP | 2011513298 A | 4/2011 |
| JP | 2011522794 A | 4/2011 |
| WO | WO9708320 A1 | 6/1997 |
| WO | WO9819705 A1 | 5/1998 |
| WO | WO0128683 A1 | 4/2001 |

(56) References Cited

FOREIGN PATENT DOCUMENTS

| | | |
|---|---|---|
| WO | WO0142246 A2 | 6/2001 |
| WO | WO0363794 A2 | 8/2003 |
| WO | WO2004005348 A1 | 1/2004 |
| WO | WO2004019973 A1 | 3/2004 |
| WO | WO0288112 A1 | 8/2004 |
| WO | WO2004077062 A2 | 9/2004 |
| WO | WO2004089925 A1 | 10/2004 |
| WO | WO2004106328 A1 | 12/2004 |
| WO | WO2005007623 A2 | 1/2005 |
| WO | WO2005103083 A2 | 11/2005 |
| WO | WO2005113554 A2 | 12/2005 |
| WO | WO2006029879 A2 | 3/2006 |
| WO | WO2006078161 A1 | 7/2006 |
| WO | WO2006078846 A1 | 7/2006 |
| WO | WO2006101187 A1 | 9/2006 |
| WO | WO2006105021 A2 | 10/2006 |
| WO | WO2006122806 A2 | 11/2006 |
| WO | WO2007016176 A2 | 2/2007 |
| WO | WO2007044729 A2 | 4/2007 |
| WO | WO2007053452 A1 | 5/2007 |
| WO | WO2007070514 A1 | 6/2007 |
| WO | WO2007005874 A2 | 7/2007 |
| WO | WO2007084786 A1 | 7/2007 |
| WO | WO2007129161 A2 | 11/2007 |
| WO | WO2008033561 A2 | 3/2008 |
| WO | WO2008039218 A2 | 4/2008 |
| WO | WO2008134761 A2 | 6/2008 |
| WO | WO2008089627 A1 | 7/2008 |
| WO | WO2008109943 A1 | 9/2008 |
| WO | WO2008118802 A1 | 10/2008 |
| WO | WO2008132601 A1 | 11/2008 |
| WO | WO2008157490 A1 | 12/2008 |
| WO | WO2009009116 A2 | 1/2009 |
| WO | WO2009044273 A2 | 4/2009 |
| WO | WO2009073620 A2 | 6/2009 |
| WO | 2009097397 A2 | 8/2009 |
| WO | WO2009098450 A2 | 8/2009 |
| WO | WO2009114512 A1 | 9/2009 |
| WO | 2010017369 A2 | 2/2010 |
| WO | WO2010019570 A2 | 2/2010 |
| WO | WO2010077634 A1 | 7/2010 |
| WO | WO2010089115 A1 | 8/2010 |
| WO | WO2010089117 A1 | 12/2010 |
| WO | WO2011018227 A2 | 2/2011 |
| WO | WO2011028683 A1 | 3/2011 |
| WO | WO2011056652 A1 | 5/2011 |
| WO | WO2011070024 A1 | 6/2011 |
| WO | WO2011079015 A1 | 6/2011 |
| WO | WO2011090760 A1 | 7/2011 |
| WO | WO2011107553 A1 | 9/2011 |
| WO | WO2011109400 A2 | 9/2011 |
| WO | WO2011131407 A1 | 10/2011 |
| WO | WO2011140249 A2 | 11/2011 |
| WO | WO2012032433 A1 | 3/2012 |
| WO | WO2012057624 A1 | 5/2012 |
| WO | WO2012142237 A1 | 10/2012 |
| WO | WO2012145493 A1 | 10/2012 |
| WO | WO2013050615 A1 | 4/2013 |
| WO | WO2013050617 A1 | 4/2013 |
| WO | WO2013079174 A1 | 6/2013 |
| WO | WO2013087699 A1 | 6/2013 |
| WO | WO2013119716 A1 | 8/2013 |
| WO | WO2013132044 A1 | 9/2013 |
| WO | WO2013050616 A1 | 11/2013 |
| WO | WO2013169264 A1 | 11/2013 |
| WO | WO2014008218 A1 | 1/2014 |
| WO | WO2014036357 A1 | 3/2014 |
| WO | WO2014044872 A1 | 3/2014 |
| WO | WO2014063012 A1 | 4/2014 |
| WO | WO2014142237 A1 | 9/2014 |
| WO | WO2014164693 A2 | 10/2014 |
| WO | WO2014167122 A1 | 10/2014 |
| WO | WO2014190257 A2 | 11/2014 |
| WO | 2015013330 A2 | 1/2015 |
| WO | WO2015116904 A1 | 6/2015 |
| WO | WO2015171938 A1 | 11/2015 |
| WO | WO2015179691 A2 | 11/2015 |
| WO | WO2016046574 A1 | 3/2016 |
| WO | WO2016067035 A1 | 5/2016 |
| WO | WO2016050361 A1 | 7/2016 |
| WO | WO2016171242 A1 | 10/2016 |
| WO | WO2016171272 A1 | 10/2016 |
| WO | WO2016174103 A1 | 11/2016 |
| WO | WO2017046658 A1 | 3/2017 |
| WO | WO2017102906 A1 | 6/2017 |
| WO | WO2017161069 A1 | 9/2017 |
| WO | WO2017173408 A1 | 10/2017 |
| WO | WO2017182672 A1 | 10/2017 |
| WO | WO2017191460 A1 | 11/2017 |
| WO | WO2017205738 A1 | 11/2017 |
| WO | WO2018096365 A1 | 5/2018 |
| WO | WO2018115203 A1 | 6/2018 |
| WO | WO2018115204 A1 | 6/2018 |
| WO | WO2018222987 A1 | 6/2018 |
| WO | WO2018127699 A1 | 7/2018 |
| WO | WO2018156740 A1 | 8/2018 |
| WO | WO2018197509 A1 | 11/2018 |
| WO | WO2018197893 A1 | 11/2018 |
| WO | WO2019002842 A1 | 1/2019 |
| WO | WO2019025811 A1 | 2/2019 |
| WO | WO2019034866 A1 | 2/2019 |
| WO | WO2019034868 A1 | 2/2019 |
| WO | WO2019084060 A1 | 2/2019 |
| WO | WO2019094395 A2 | 5/2019 |
| WO | WO2019122860 A1 | 6/2019 |
| WO | WO2019122861 A1 | 6/2019 |
| WO | WO2019122863 A1 | 6/2019 |
| WO | WO2019162682 A1 | 8/2019 |
| WO | WO2019193328 A1 | 10/2019 |
| WO | WO2019136442 A1 | 11/2019 |
| WO | WO2019226617 A1 | 11/2019 |
| WO | WO2019243313 A1 | 12/2019 |
| WO | WO2019243329 A1 | 12/2019 |
| WO | WO2019243353 A1 | 12/2019 |
| WO | WO2019243455 A1 | 12/2019 |
| WO | WO2019243832 A1 | 12/2019 |
| WO | WO2019243833 A1 | 12/2019 |
| WO | WO2020084305 A1 | 4/2020 |
| WO | WO2020089627 A1 | 5/2020 |
| WO | WO2020120980 A1 | 6/2020 |
| WO | WO2020120981 A1 | 6/2020 |
| WO | WO2020120983 A1 | 6/2020 |
| WO | WO2020120984 A1 | 6/2020 |
| WO | WO2020128526 A1 | 6/2020 |
| WO | WO2020128527 A1 | 6/2020 |
| WO | WO2020148525 A1 | 7/2020 |
| WO | WO2020148526 A1 | 7/2020 |
| WO | WO2020148527 A1 | 7/2020 |
| WO | WO2020148528 A1 | 7/2020 |
| WO | WO2020148529 A1 | 7/2020 |
| WO | WO2020148530 A1 | 7/2020 |
| WO | WO2020165600 A1 | 8/2020 |
| WO | WO2020178574 A1 | 9/2020 |
| WO | WO2020201753 A1 | 10/2020 |
| WO | WO2020225577 A1 | 11/2020 |
| WO | WO2020229803 A1 | 11/2020 |
| WO | WO2021019243 A1 | 2/2021 |
| WO | WO2021019244 A1 | 2/2021 |
| WO | WO2021019245 A1 | 2/2021 |
| WO | WO2021019246 A1 | 2/2021 |
| WO | WO2021028686 A1 | 2/2021 |
| WO | WO2021171028 A1 | 2/2021 |
| WO | WO2021171029 A1 | 2/2021 |
| WO | WO2021038232 A1 | 4/2021 |
| WO | WO2021064428 A1 | 4/2021 |
| WO | WO2021074622 A1 | 4/2021 |
| WO | WO2021074647 A1 | 4/2021 |
| WO | WO2021105694 A1 | 6/2021 |
| WO | WO2021148974 A1 | 7/2021 |
| WO | WO2021234391 A1 | 11/2021 |
| WO | WO2021250418 A1 | 12/2021 |
| WO | WO2022038158 A1 | 2/2022 |
| WO | WO2022148969 A1 | 7/2022 |
| WO | WO2022148974 A2 | 7/2022 |

(56) References Cited

FOREIGN PATENT DOCUMENTS

| | | |
|---|---|---|
| WO | WO2022148975 A1 | 7/2022 |
| WO | WO2022148979 A1 | 7/2022 |
| WO | WO2022029420 A1 | 10/2022 |
| WO | WO2023089308 A1 | 5/2023 |
| WO | WO2023031623 A2 | 9/2023 |

OTHER PUBLICATIONS

D B Glass, L J Lundquist, B M Katz, D A Walsh, Protein Kinase Inhibitor-(6-22)-amide Peptide Analogs with Standard and Nonstandard Amino Acid Substitutions for Phenylalanine 10: Inhibition of cAMP-dependent Protein Kinase, Journal of Biological Chemistry, vol. 264, Issue 24, 1989, pp. 14579-14584, (Year: 1989).*

Chang, et al.. (2022). The Effects of Charged Amino Acid Side-Chain Length on Diagonal Cross-Strand Interactions between Carboxylate- and Ammonium-Containing Residues in a β-Hairpin. Molecules, 27(13), 4172. https://doi.org/10.3390/molecules27134172 (Year: 2013) (Year: 2013).*

Uhlich et al. Remote control of bipyridine-metal coordination within a peptidedendrimer, Chem. Commun., 2009, 6237-6239 Department of Chemistry and Biochemistry, University of Berne, Freiestrasse 3, CH-3012 Berne, Switzerland https://doi.org/10.1039/B912291E (Year: 2009).*

Wei et al., Journal of Medicinal Chemistry 2018 61 (3), 989-1000 DOI: 10.1021/acs.jmedchem.7b01430 (Year: 2018) (Year: 2018).*

Anonymous, "Bicycle Therapeutics 2023 R&D Day Deck", https://investors.bicycletherapeutics.com/static-files/46599fde-67dc-40a8-9dcb-10ed8444f31e, Dec. 14, 2023, 155 pages.

Anonymous, "Bicycle Therapeutics BT8009 Regulatory Update", https://investors.bicycletherapeutics.com/static-files/265210c3-233f-4dd8-af32-d34592398d85, Sep. 11, 2023, 23 pages.

Bader et al., "Abstract 3088: Breaking from the paradigm of antibody-drug conjugates: Evaluation of clinical pharmacokinetics and safety of Bicycle Toxin Conjugates® (BTCs)", American Society of Clinical Oncology Annual Meeting, May 31-Jun. 4, 2024, 1 page.

Baldini et al., "Abstract 498: BT8009-100: A Phase I/II Study of Novel Bicyclic Peptide and MMAE Conjugate BT8009 in Patients (pts) with Advanced Malignancies Associated with Nectin-4 Expression, Including Urothelial Cancer (UC)", ASCO Genitourinary (GU) Cancers Symposium Conference, Feb. 17, 2023, 1 page.

Banerji et al., "A Cancer Research UK phase I/IIa trial of BT1718 (a first in class Bicycle Toxin Conjugate) given intravenously in patients with advanced solid tumours", ASCO, Jun. 5, 2018, 1 page.

Banerji et al., "A Cancer Research UK phase I/IIa trial of BT1718 (a first in class Bicycle Toxin Conjugate) given intravenously in patients with advanced solid tumours", NCRI, Oct. 1, 2018, 1 page.

Battula et al., "Abstract 4613: A novel fully synthetic dual targeted EphA2/CD137 Bicycle® peptide induces tumor localized CD137 agonism", American Association of Cancer Research, Jun. 22, 2020, 1 page.

Battula et al., "Abstract P794: A novel fully synthetic dual targeted EphA2/4-1BB Bicycle® peptide induces tumor localized 4-1BB agonism", SITC, Nov. 9, 2019, 1 page.

Bendell et al., "TPS3655: BT5528-100 Phase I/II Study; Safety, Pharmacokinetics & Preliminary Clinical Activity of BT5528 in Patients with Advanced Malignancies Associated with EphA2 Expression", ASCO, May 29, 2020, 1 page.

Bennett et al., "Abstract 1167/2: Development of BT1718, a novel Bicycle Drug Conjugate for the treatment of lung cancer", American Association of Cancer Research, Apr. 1, 2017, 1 page.

Bennett et al., "Abstract 164: BT5528, an EphA2-targeting Bicycle Toxin Conjugate (BTC): profound efficacy without bleeding and coagulation abnormalities in animal models", EORTC, Nov. 13, 2018, 1 page.

Bennett et al., "Abstract 5854: BT5528, a Bicycle Toxin Conjugate (BTC) targeting EphA2 has potent antitumour activity without bleeding or coagulation abnormalities in animal models", American Association of Cancer Research, Apr. 14, 2018, 1 page.

Bennett et al., "Abstract 5855: Bicycle Toxin Conjugates (BTCs) targeting EphA2 for the treatment of solid tumours: Discovery and selection of BT5528", American Association of Cancer Research, Apr. 14, 2018, 1 page.

Bennett et al., "Abstract C066: BT5528, a Bicycle Toxin Conjugate targeting EphA2: mechanism of action and clinical translation", AACR-NCI-EORTC, Oct. 29, 2019, 1 page.

Bennett, "Abstract 4481: BT5528, an EphA2-targeting Bicycle® Toxin Conjugate (BTC): Profound efficacy without bleeding and coagulation abnormalities in animal models", AACR Annual Meeting, Apr. 4, 2019, 11 pages.

Bennett, "Bicycle Conjugates to Target Solid Tumors", Next Generation Conjugates Summit, Feb. 27, 2023, 23 pages.

Bennett, "BT5528: A Bicycle Toxin Conjugate Targeting EphA2 for the Treatment of Solid Tumours", 9th Annual World ADC Conference, Mar. 6, 2019, 13 pages.

Bournakas et al., "PBP inhibitors discovered using a modified phage display platform (Bicycles)", ESCMID, Oct. 11, 2022, 1 page.

Brandish, "Bicycle Therapeutics: Precision-guided immune agonism for the treatment of cancer", Immuno UK meeting, Sep. 30, 2022, 25 pages.

Campbell et al., "Poster 1197: A multi tumor survey of Nectin-4 expression to guide BT8009 indication selection", American Association of Cancer Research, Apr. 12, 2021, 1 page.

Campbell et al., "Poster 5300: A survey of EphA2 expression by immunohistochemistry (IHC) in tumor tissue microarrays (TMAs) to support BT5528 indication selection", American Association of Cancer Research, Jun. 22, 2020, 1 page.

Carabateas et al., "Strong Analgesics, Some 1-Substituted 4-Phenyl-4-Propionoxypiperidines", Journal of Medicinal and Pharmaceutical Chemistry, Sep. 1962, 5:913-919.

CAS No. 18226-42-1, "1,3,5-Tris(bromomethyl)benzene", Chemical Book, Retrieved from: https://www.chemicalbook.com/ProductChemicalPropertiesCB0500171_EN.htm, 2023, 2 pages.

Chen et al., "Abstract A8: Novel Multimers of Bicyclic Peptides Cluster and Activate CD137 (4-1BB): A Costimulatory T -Cell Checkpoint Receptor", PEGS, Nov. 12, 2018, 1 page.

Cohen et al., "Abstract 2: Quantitation of CD137 and Nectin-4 expression across multiple tumor types to support indication selection for BT7480, a Bicycle tumor-targeted immune cell agonist™(Bicycle TICA™)", SITC, Nov. 12, 2021, 1 page.

Cohen et al., "Abstract 5555: Development of a CD137 receptor occupancy assay to support the phase I/II study of BT7480, a Bicycle® tumor-targeted immune cell agonist (Bicycle TICA™)", American Association of Cancer Research, Apr. 8, 2022, 1 page.

Cohen et al., "Abstract A65: Development of a CD137 receptor occupancy assay to support the phase I/II study of BT7480, a Bicycle tumor-targeted immune cell agonist® (Bicycle TICA®)", AACR-BC-EORTC, Oct. 26, 2022, 1 page.

Cohen, "Translating preclinical findings into clinical biomarker assays to support the Phase I/II study of BT7480, a Bicycle tumor-targeted immune cell agonist®", World Clinical Biomarkers & CDx Summit, Sep. 28, 2022, 21 pages.

Cohen, "Turning preclinical findings into clinic-ready biomarker assays to support BT7480 development", Markets and Markets Biomarker and Companion Diagnostics Conference, Feb. 15, 2023, 21 pages.

Cook et al., "Abstract 5764: Pharmacokinetic (PK) assessment of BT1718 : A phase 1/2a study of BT1718, a first in class bicycle toxin conjugate (BTC), in patients with advanced solid tumours", EMSO, Sep. 28, 2019, 1 page.

Cooke, "Bicycles as precision guided therapeutics", UK Symposium: Advancing Drug Discovery for Oncology, Mar. 13, 2023, 15 pages.

Drumm et al., "Genetic Variation and Clinical Heterogeneity in Cystic Fibrosis", Annu. Rev. Pathol. Mech. Dis., 2012, 7:267-282.

Dufort et al., "Abstract 1340: Modulation of the natural killer cell immune response to tumor with a synthetic tumor-immune cell agonist, NK-TICA®", American Association for Cancer Research Annual Meeting, Apr. 8, 2024, 1 page.

(56) References Cited

OTHER PUBLICATIONS

Dufort et al., "Abstract 15699: Generation of a Bicycle NK-TICA™, a novel NK cell engaging molecule designed to induce targeted tumor cytotoxicity", SITC, Nov. 12, 2022, 1 page.

Dufort et al., Abstract 1806: Modulation of the natural killer (NK) cell immune response to tumor with novel synthetic tumor-immune cell agonist, NK-TICA™, American Association for Cancer Research Annual Meeting, Apr. 17, 2023, 1 page.

Dufort et al., "Abstract 4233: Generation of a Bicycle NK-TICA™, a novel NK cell engaging molecule designed to induce targeted tumor cytotoxicity", American Association for Cancer Research, Apr. 8, 2022, 1 page.

Dufort, "Bicycles: Bispecific, Precision-guided NK Cell Activators for the Treatment of Solid Tumors", Innate Killer Summit, Mar. 29, 2023, 23 pages.

Eder et al., "Bicyclic Peptides as a New Modality for Imaging and Targeting of Proteins Overexpressed by Tumors", Cancer Res., Feb. 15, 2019, 79(4):841-852.

Evans et al., "Abstract CT253: Phase 1/2 study of the safety, pharmacokinetics, and preliminary clinical activity of BT7480 in patients with Nectin-4 associated advanced malignancies", American Association for Cancer Research Annual Meeting, Apr. 18, 2023, 1 page.

Frigerio, "Expanding the Potential of ADCs: Bicyclic Peptide (Bicycle®) Toxin Conjugates May Offer Advancements Over Traditional ADCs", World ADC, Mar. 20, 2023, 28 pages.

Frigerio, "Targeting Tumors with Bicycle Conjugates", PEGS Boston, May 17, 2023, 31 pages.

Gelb et al., "Abstract A047: MT1-MMP Immunohistochemistry (IHC) analysis of tumor microarrays (TMAs) using a novel scoring system guides patient selection for BT1718 expansion cohorts", AACR-NCI-EORTC, Oct. 27, 2019, 1 page.

GenBank Accession No. CZR33441.1, "uncharacterized protein FPRO_01747 [Fusarium proliferatum ET1]", National Center for Biotechnology Information, Retrieved from: https://www.ncbi.nlm.nih.gov/protein/1111492376, Dec. 6, 2016, 1 page.

Harrison et al., "Abstract 5144: BT1718, a novel bicyclic peptide-maytansinoid conjugate targeting MT1-MMP for the treatment of solid tumours: Design of bicyclic peptide and linker selection", AACR Annual meeting, Apr. 1, 2017, 1 page.

Harrison et al., "Discovery and development of BT1718, a novel bicyclic peptidemaytansinoid conjugate targeting MT1-MMP for the treatment of solid tumours: In vitro and in vivo activities", PEGS, Apr. 30, 2017, 1 page.

Hu et al., "Lessons Learned from Molecular Scaffold Analysis", Journal of Chemical Information and Modeling, 2011, 51(8):1742-1753.

Hurov et al., "Abstract 1340: BT7455, a fully synthetic Bicycle tumor-targeted immune cell agonist®, leads to potent EphA2-dependent CD137 agonism and robust anti-tumor efficacy", SITC, Nov. 10, 2022, 1 page.

Hurov et al., "Abstract 3257: Activation of 4-1BB using multivalent and tumour targeted bicyclic peptides", American Association of Cancer Research, Apr. 2, 2019, 1 page.

Hurov et al., "Abstract 3257: Activation of CD137 using multivalent and tumor targeted Bicyclic peptides", Cancer Res, Jul. 1, 2019, 79(13_Supplement):3257, 3 pages.

Hurov et al., "Abstract 700: EphA2/CD137 Bicycle® tumor-targeted immune cell agonists (TICAs™) induce tumor regressions, immunogenic memory, and reprogramming of the tumor immune microenvironment", SITC, Nov. 9, 2020, 1 page.

Hurov et al., "Abstract P398: Activation of the T cell costimulatory protein CD137 using multivalent bicyclic peptides", SITC, Nov. 6, 2018, 1 page.

Hurov et al., "Abstract P782: A novel fully synthetic dual targeted Nectin-4/4-1BB Bicycle® peptide induces tumor localized 4-1BB agonism", SITC, Nov. 9, 2019, 1 page.

Hurov et al., "BT7480, a novel fully synthetic Bicycle tumor-targeted immune cell agonist™M (Bicycle TICA™) induces tumor localized CD137 agonism", Journal for Immuno Therapy of Cancer, 2021, 9(11):e002883, pp. 1-13.

Hurov et al., "Poster 1728: Nectin-4-dependent immune cell stimulation and anti-tumor efficacy by BT7480, a Nectin-4/CD137 Bicycle® tumor-targeted immune cell agonist (TICA™)", American Association of Cancer Research, Apr. 12, 2021, 1 page.

Hurov, "BT7480, a novel and fully synthetic Bicycle tumor-targeted immune cell agonist®", Festival of Biologics, Nov. 4, 2022, 23 pages.

Kanakia et al., "Development of CD137 (4-1BB) receptor occupancy assay using fluorescently labeled Bicycles®", AACR Tumor Immunology & Immunotherapy, Oct. 19, 2020, 1 page.

Keen, "A novel fully synthetic dual targeted Nectin-4/4-1BB Bicycle® peptide induces tumor localized 4-1BB agonism", SITC, Nov. 6-10, 2019, 19 pages.

Keen, "BT5528, an EphA2-targeting Bicycle® Toxin Conjugate", World ADC congress, Oct. 11, 2019, 24 pages.

Keen, "BT7480, a novel Nectin-4 dependent agonist of the immune cell costimulatory receptor CD137", AACR Annual Meeting, Apr. 10-15 and May 17-21, 2021, 23 pages.

Kristensson et al., "Novel Bicyclic Peptide Multimers Activate T Cell Costimulatory Protein CD137", ELRIG Drug Discovery, Oct. 9, 2018, 1 page.

Kristensson et al., "Novel Bicyclic Peptide Multimers Activate T Cell Costimulatory Protein CD137", Promega Biologics, Jul. 18, 2018, 1 page.

Kumara et al., "*Fusarium proliferatum*, an endophytic fungus from *Dysoxylum binectariferum Hook*.f, produces rohitukine, a chromane alkaloid possessing anti-cancer activity", Antonie van Leeuwenhoek, 2012, 101(2):323-329.

Lahdenranta et al., "Abstract 1356: Transcriptional profiling of Bicycle® tumor-targeted CD137 agonist-treated mouse tumors revealed an early and rapid activation of myeloid cells followed by infiltration of cytotoxic T cells into the tumor", SITC, Nov. 10, 2022, 1 page.

Lahdenranta et al., "Abstract 5301: Tumor-targeted activation of CD137 using Bicycle® molecules: New insights into mechanism of action and discovery of BT7455, a clinical candidate for the treatment of EphA2-expressing cancers", American Association for Cancer Research Annual Meeting, Apr. 9, 2024, 1 page.

Lahdenranta et al., "Abstract A067: BT7480, a synthetic Bicycle tumor-targeted immune cell agonist® (Bicycle TICA®), induces reprogramming of the tumor immune microenvironment through tumor localized CD137 agonism", CICON, Sep. 29, 2022, 1 page.

Lahdenranta et al., "Poster 1319: Rapid accumulation of cytotoxic payload in tumor tissue drives BT5528 activity in tumor models", American Association of Cancer Research, Apr. 12, 2021, 1 page.

Lahdenranta et al., "Poster 1724: Microinjection of Nectin-4/CD137 tumor-targeted immune cell agonist (TICA™) activates the local tumor microenvironment", American Association of Cancer Research, Apr. 12, 2021, 1 page.

Lahdenranta et al., "Poster 706: BT7480, a fully synthetic tumor-targeted immune cell agonist (TICA™) induces tumor localized CD137 agonism and modulation of tumor immune microenvironment", SITC, Nov. 9, 2020, 1 page.

Loriot et al., "Abstract TPS4619: A phase 2/3 study of Bicycle® Toxin Conjugate zelenectide pevedotin (BT8009) targeting Nectin-4 in patients with locally advanced or metastatic urothelial cancer (la/mUC) (Duravelo-2)", American Society of Clinical Oncology Annual Meeting, May 31-Jun. 4, 2024, 1 page.

Ludbrook, "Bicycle Toxin Conjugates to Target Solid Tumors", 3rd ADC Target Selection Summit, Dec. 6, 2023, 20 pages.

Luus et al., "Abstract 1832: EphA2-dependent CD137 agonism and anti-tumor efficacy by BT7455, a Bicycle tumor-targeted immune cell agonist®", American Association for Cancer Research Annual Meeting, Apr. 17, 2023, 1 page.

McDonnell, "Bicycles for precision guided delivery", Boulder Peptide Symposium, Nov. 9, 2022, 29 pages.

McKean et al., "A Combined Phase I/II Study of BT8009 a Novel Bicycle® Toxin Conjugate with MMAE in Patients with Advanced Malignancies with Nectin-4", ASCO, Jun. 4, 2021, 1 page.

(56) References Cited

OTHER PUBLICATIONS

McKean et al., "BT8009-100 Phase I/II Study of Novel Bicyclic Peptide and MMAE Conjugate BT8009 in Patients with Advanced Malignancies Associated with Nectin-4 Expression", American Association for Cancer Research, Apr. 8-13, 2022, 17 pages.

McKean et al., "BT8009-100 Phase I/II Study of the Safety, Pharmacokinetics, & Preliminary Clinical Activity of BT8009 in Patients with Nectin-4 Expressing Advanced Malignancies", ESMO, Sep. 17, 2020, 1 page.

McKean, "A first in class phase I/II study of the novel bicyclic peptide and MMAE conjugate, BT5528, in patients with advanced malignancies associated with EphA2 expression", AACR-NCI-EORTC, Oct. 7-10, 2021, 19 pages.

Mistry et al., "Abstract 15523: Establishing the preclinical/translational PK/PD relationship for BT7480, a Nectin4/CD137 Bicycle tumor-targeted immune cell agonist™ (Bicycle TICA™)", SITC, Nov. 12, 2021, 1 page.

Mistry et al., "Synthesis of Bicycle® Peptides using Gold-mediated Cysteine Arylation", European Peptide Synthesis Conference, Mar. 7, 2023, 1 page.

Mudd et al., "Bicyclic Peptides for Positron Emission Tomography (PET) Imaging of MT1-MMP Expressing tumours", PEGS, Apr. 30, 2017, 1 page.

Mudd et al., "Discovery of BT8009: A Nectin-4 Targeting Bicycle Toxin Conjugate for the Treatment of Cancer", Journal of Medicinal Chemistry, 2022, 65(21): 14261-14970.

Mudd et al., "Gold-Mediated Multiple Cysteine Arylation for the Construction of Highly Constrained Bicycle Peptides", Bioconjugate Chemistry, 2022, 33(8):1441-1445.

Mudd et al., "Potent anti-tumor activity of a Lead-212 labelled MT1-MMP targeting Bicycle Radionuclide Conjugate™", TIDES USA—Oligonucleotide, May 8, 2023, 1 page.

Newman et al., "Anti-Infectives Drug Discovery at Bicycle Therapeutics", ESCMID, Oct. 11, 2022, 1 page.

Newman, "Characterisation of novel, noncovalent cyclic peptide (Bicycles®) inhibitors of PBP3s from important Gram-negative pathogens", ESCMID, Oct. 11, 2022, 18 pages.

Ngo et al., "Abstract 333: Activity of the erythropoietin-producing hepatocellular A2 receptor (EphA2) targeting Bicycle® Toxin Conjugate (BTC™) BCY6033 in EGFR inhibitor resistant non-small cell lung cancer (NSCLC) patient derived xenografts", American Association for Cancer Research, Apr. 8, 2022, 1 page.

Nguyen, "Pancreatic Cancer", Merck Manual, Retrieved from: https://www.merckmanuals.com/home/digestive-disorders/tumors-of-the-digestive-system/pancreatic-cancer?query=pancreatic%20cancer, Mar. 2021, 4 pages.

Papadopoulos et al., "Abstract TPS2689: A Combined Phase I/II Study of a Novel Bicycle Tumor-targeted Immune Cell Agonist® BT7480 in Patients with Nectin-4 Associated Advanced Malignancies", ASCO, Jun. 6, 2022, 1 page.

Park et al., "Abstract 3756: Small Synthetic, Multivalent Bicyclic Peptides That Activate T Cell Costimulatory Protein CD137", American Association of Cancer Research, Apr. 14, 2018, 1 page.

Park et al., "Abstract 3756: Small Synthetic, Multivalent Bicyclic Peptides That Activate T Cell Costimulatory Protein CD137", Cancer Res., Jul. 1, 2018, 78(13_Supplement):3756, 2 pages.

Park et al., "Abstract 3756: Small Synthetic, Multivalent Bicyclic Peptides That Activate T Cell Costimulatory Protein CD137", ELRIG Drug Discovery, Oct. 9, 2018, 1 page.

Repash et al., "BT7480, a novel fully synthetic tumor-targeted immune cell agonist (TICA™) induces tumor localized CD137 agonism", AACR Tumor Immunology & Immunotherapy, Oct. 19, 2020, 10 pages.

Rezvaya et al., "Abstract 1207: NKp46 engaging Bicycle NK-TICA® drives tumor targeted cytotoxicity", SITC, Nov. 10, 2022, 1 page.

Rhodes et al., "Bicyclic Peptides as Next-Generation Therapeutics", Chemistry—A European Journal, 2017, 23(52):12690-12703.

Rietschoten et al., "Abstract 268: Small Synthetic, Multivalent Bicyclic Peptides That Activate T Cell Costimulatory Protein CD137", 35th European Peptide Symposium, Aug. 1, 2018, 1 page.

Rigby et al., "Abstract 4479: BT8009: A bicyclic peptide toxin conjugate targeting Nectin-4 (PVRL4) displays efficacy in preclinical tumor models", Cancer Res, 2019, 79(13_Supplement):4479, 3 pages.

Rigby et al., "Abstract C061: BT8009, a Bicycle® Toxin Conjugate targeting Nectin-4, shows target selectivity, and efficacy in preclinical large and small tumor models", AACR-NCI-EORTC, Oct. 29, 2019, 1 page.

Rigby et al., "BT8009; A Nectin-4 Targeting Bicycle® Toxin Conjugate for Treatment of Solid Tumors", Molecular Cancer Therapeutics, 2022, 21(12):1-27.

Rigby, "Abstract 4479: BT8009: A bicyclic peptide toxin conjugate targeting Nectin-4 (PVRL4) displays efficacy in preclinical tumour models", AACR Annual Meeting, Apr. 2, 2019, 10 pages.

Santos et al., "Abstract 35472: Characterization of Nectin-4 protein expression in non-small cell lung cancer patients", AACR-BC-EORTC, Oct. 13, 2023, 1 page.

Shah et al., "Abstract A28: Establishment of an ex vivo tissue culture platform as a preclinical model to assess the mechanism of action of Bicycle® tumor-targeted immune cell agonists in NSCLC", AACR-BC-EORTC, Oct. 26, 2022, 1 page.

Singh et al., "Protein Engineering Approaches in the Post-Genomic Era", Current Protein and Peptide Science, 2017, 18(4):1-11.

Skynner et al., "BT1718, a novel Bicycle Drug Conjugate® shows potent anti-tumor activity in diverse cell-derived and patient-derived tumor xenograft models", PEGS, Apr. 30, 2017, 1 page.

Stanczuk et al., "Abstract 1388: Utility of humanized animal models for in vivo evaluation of NK-TICA®, novel Bicycle® tumor-targeted immune cell agonist® (Bicycle TICA®) designed to engage NK cells", SITC, Nov. 10, 2022, 1 page.

Stanczuk et al., "Abstract 1826: Development of in vivo models for evaluation of NK-TICA™, novel Bicycle® tumortargeted immune cell agonist® designed to engage NK cells", American Association for Cancer Research Annual Meeting, Apr. 17, 2023, 1 page.

Su, "Key DMPK Attributes of BT7480, a Bicycle Tumor-targeted Immune Cell Agonist™ Targeting Nectin-4 and Agonizing CD137", NEDMDG symposium, May 31, 2023, 20 pages.

Teufel et al., "Abstract 4920: Bicyclic Peptides for Positron Emission Tomography (PET) Imaging of MT1-MMP Expressing Tumors", American Association of Cancer Research, Apr. 1, 2017, 1 page.

Tiberghien, "Highlighting the Potential of Bicycle Conjugates to Target Solid Tumours", World ADC, Mar. 20, 2023, 24 pages.

Uhlenbroich et al., "Abstract 0000: NKp46 engaging Bicycle NK-TICA™ drives tumor targeted cytotoxicity", PEGS Boston, May 17, 2023, 1 page.

Uhlenbroich, "Bicycles—a modality for Tumor-Targeted Immune Cell Agonism", Antibody Engineering & Therapeutics, Jun. 12, 2023, 23 pages.

Upadhyaya et al., "Abstract 888: An integrative approach to optimize a synthetic EphA2-dependent CD137 agonist: Balancing potency, physicochemical properties, and pharmacokinetics to achieve robust anti-tumor activity", SITC, Nov. 12, 2021, 1 page.

Upadhyaya et al., "Anticancer immunity induced by a synthetic tumor-targeted CD137 agonist", 2021, 9(1):e001762, pp. 1-10.

Upadhyaya et al., "Discovery and Optimization of a Synthetic Class of Nectin-4-CD137 Agonists for Immuno-oncology", Molecular Cancer Therapeutics, 2022, 65:9858-9872.

Upadhyaya, "Activation of CD137 Using Multivalent and Tumour Targeted Bicyclic Peptides", Peptide Congress, Retrieved from: https://www.bicycletherapeutics.com/wp-content/uploads/PU_2019-Peptide-Congress_publication.pdf, Apr. 2019, 25 pages.

Valko et al., "Application of biomimetic HPLC to estimate lipophilicity, protein and phospholipid binding of potential peptide therapeutics", ADMET and DMPK, 2018, 6(2):162-175.

Wagstaff et al., "An Assay for Periplasm Entry Advances the Development of Chimeric Peptide Antibiotics", ACS Infectious Diseases, 2020, 6(9):2355-2361.

Wallack et al., "Abstract P05: Investigating soluble Nectin-4 and EphA2 as cancer biomarkers in plasma", Bio-IT World, May 23, 2023, 1 page.

(56) References Cited

OTHER PUBLICATIONS

Walsh et al., "Abstract 5807: Bicycle Toxin Conjugates® for the treatment of solid tumors", American Association for Cancer Research Annual Meeting, Apr. 9, 2024, 1 page.
Wang et al., "Comprehensive Surfaceome Profiling to Identify and Validate Novel Cell-Surface Targets in Osteosarcoma", Molecular Cancer Therapeutics, Jun. 2022, 21(6):903-913.
Wang et al., "Integrative surfaceome profiling identifies immunotherapeutic targets in osteosarcoma and preclinical testing of BT1769, an MT1-MMP-targeted Bicycle® toxin conjugate, in osteosarcoma by the Pediatric Preclinical Testing Consortium (PPTC)", AACR Annual Meeting, Apr. 10-15 and May 17-21, 2021, 15 pages.
Xu et al., "The application of PK/PD modelling in the clinical development of BT5528 a novel toxin delivery platform", ACoP, Oct. 30-Nov. 2, 2022, 21 pages.
Zhang et al., "Characterization and application of three novel monoclonal antibodies against human 4-1BB: distinct epitopes of human 4-1BB on lung tumor cells and immune cells", Tissue Antigens, 2007, 70(6):470-479.
Zhang et al., "Propagated Perturbations from a Peripheral Mutation Show Interactions Supporting WW Domain Thermostability", Structure, Nov. 6, 2018, 26(11):1474-1485.
U.S. Appl. No. 18/424,386, Mudd et al., filed Jan. 26, 2024.
U.S. Appl. No. 18/427,414, Beswick et al., filed Jan. 30, 2024.
U.S. Appl. No. 18/742,691, Chen, filed Jun. 13, 2024.
"Bicycle Therapeutics Investor Presentation", Retrieved from: https://investors.bicycletherapeutics.com/static-files/f456c054-95c8-4e19-a62a-fcf5feb0650b, Aug. 2024, 61 pages.
Hadjicharalambous et al., "Investigating Penetration and Antimicrobial Activity of Vector Bicycle Conjugates", ACS Infectious Diseases, Jun. 12, 2024, 10(7):2381-2389.
Zapun et al., "Penicillin-binding proteins and Beta-lactam resistance", FEMS Microbiology Reviews, 2008, 32 (2):361-385.
U.S. Appl. No. 18/906,616, Beswick et al., filed Oct. 4, 2024.
Anonymous, "UPI000011DEEB," retrieved from the internet: URL:https://www.uniprot.org/uniparc/UPI000011DEEB, 2014, 2 pages.
Hacker et al., "Highly Constrained Bicyclic Scaffolds for the Discovery of Protease-Stable Peptides via mRNA Display", ACS Chem. Biol., 2017, 12(3):795-804.
Ho et al., "Expression of CD137 on Hodgkin and Reed-Sternberg cells inhibits T-cell activation by eliminating CD137 ligand expression," Cancer Res., Jan. 15, 2013, 73(2):652-661.
Lowe, Derek, "Not alphafold's fault," blog—In the pipeline, 2022, 6 pages.
Lowe, Derek, "The good sides and bad sides of polar compounds," blog—In the pipeline, 2017, 15 pages.
Micoine et al., "A general strategy for ligation of organic and biological molecules to dawson and keggin polyoxotungstates", Org Chem. Lett., 2007, 9(20):3981-3984.
Palma et al., "CD137 and CD137 ligand constitutively coexpressed on human T and B leukemia cells signal proliferation and survival," Int J Cancer., Jan. 20, 2004, 108(3):390-398.
Rajendran et al., "CD137 signaling in Hodgkin and Reed-Sternberg cell lines induces IL-13 secretion, immune deviation and enhanced growth," Oncoimmunology, 2016, 5(6):e1160188, 7 pages.
Solomons, "Organic Chemistry", 4th ed, 1988, p902 (3 pages).
Thornber, "Isosterism and molecular modification in drug design", Chem. Soc. Rev, 1979, 8(4):563-580.
Yampolsky et al., "The exchangeability of amino acids in proteins", Genetics, 2005, 170(4):1459-1472.
Adams et al., "Big Opportunities for Small Molecules in Immuno-oncology," Nature Reviews, 2015, 14:603-622.
Adams, "Molecular control of arterial-venous blood vessel identity," Journal of Anatomy, 2003, 202(1):105-112.
Adley et al., "Expression of membrane type 1 matrix metalloproteinase (MMP-14) in epithelial ovarian cancer: high level expression in clear cell carcinoma", Gynecologic oncology, 112(2):319-324.

Akanuma et al., "MicroRNA-133a regulates the mRNAs of two invadopodia-related proteins, FSCN1 and MMP14, in esophageal cancer," Br J Cancer. Jan. 7, 2014;110(1), 189-98.
Angelini et al., "Bicyclic peptide inhibitor reveals large contact interface with a protease target." ACS chemical biology 7, No. 5 (2012): 817-821.
Annunziata et al., "Phase 1, open-label study of MEDI-547 in patients with relapsed or refractorysolid tumors," Invest New Drugs, Feb. 2013, 31(1):77-84.
Anonymous, "Bicycle Conjugates", URL: https://web.archive.org/web/20210104063050/https://www.bicycletherapeutics.com/programs, 2021, 4 pages.
Anonymous, "Bicycle Therapeutics to Present New Translational Research for BT5528 and Preclinical Data for Tumor-targeted Immune Cell Agonists at the AACR Virtual Annual Meeting II," May 15, 2020; 2 pages. URL: https://www.businesswire.com/news/home/20200515005111/en/Bicycle-Therapeutics-to-Present-New-Translational-Research-for-BT5528-and-Preelinical-Data-for-Tumor-targeted-Immune-Cell-Aaonists-at-the-AACR-Virtual-Annual-Meeting-II.
Anonymous, "Constrained Peptides Unconstrained Thinking Forward-Looking Statements", URL: https://investors.bicycletherapeutics.com/static-files/5f7f462f-2417-439d-b829-d723b3fd65f7, Aug. 2019, 26 pages.
Anthony et al., "Recapitulation of IVIG anti-inflammatory activity with a recombinant IgG Fc", Science Apr. 18, 2008;320(5874):373-376.
Arkadash et al., "Development of High Affinity and High Specificity Inhibitors of Matrix Metalloproteinase 14 through Computational Design and Directed Evolution" J. Biol. Chem. 2017, 292(8), 3481-3495.
Arnon et al., "The mechanisms controlling the recognition of tumor- and virus-infected cells by NKp46", Blood, Jan. 15, 2004;103(2):664-672.
Arnould et al., "Trastuzumab-based treatment of HER2-positive breast cancer: an antibody-dependent cellular cytotoxicity mechanism?", Br J Cancer, 2006, 94(2):259-267.
Askoxylakis et al., "A New Peptide Ligand for Targeting Human Carbonic Anhydrase IX, Identified through the Phage Display Technology", PLoS ONE, Dec. 2010, 5(12):10 pages.
Augoff et al., "Upregulated expression and activation of membrane-associated proteases in esophageal squamous cell carcinoma." Oncology reports, 2014, 31(6):2820-2826.
Ausiello et al., "Functional topography of discrete domains of human CD38," Tissue Antigens, Dec. 2000, 56(6):539-547.
Baek et al. "Effects of Histidine and Sucrose on the Biophysical Properties of a Monoclonal Antibody," Pharmaceutical Antibody, 2017, 34(3):629-639.
Banerji et al., "A Cancer research UK Phase I/IIA Trail of BT1718 (a first in class Bicycle Drug Conjugate) Given Intravenously in Patients with Advanced Solid Tumours," Journal of Clinical Oncology, Jan. 2018, 36(15):PS2610. (1 Page).
Banerji et al., "Preliminary pharmacokinetic assessment of BT1718: A phase I/IIa trial of BT1718 (a first in class Bicycle Toxin Conjugate) in patients with advanced solid tumours." In european journal of cancer, 2018, 103:E65-e65.
Barbas III et al., "Semisynthetic combinatorial antibody libraries: a chemical solution to the diversity problem," Proceedings of the National Academy of Sciences of the United States of America, May 1992, 89(10):4457-4461.
Barbolina et al., Microenvironmental regulation of membrane type 1 matrix metalloproteinase activity in ovarian carcinoma cells via collagen-induced EGR1 expression. Journal of Biological Chemistry, 2007, 282(7):4924-4931.
Bardia et al., "Efficacy and safety of anti-trop-2 antibody drug conjugate sacituzumab govitecan (IMMU-132) in heavily pretreated patients with metastatic triple-negative breast cancer." Journal of Clinical Oncology, 2017, 35(19):2141.
Bech et al., "Chemical Strategies for Half-Life Extension of Biopharmaceuticals: Lipidation and Its Alternatives," ACS Medicinal Chemistry Letters, Jun. 2018, 9(7):577-580.
Bennett et al., "Abstract 4481: BT5528, an EphA2-targeting Bicycle Toxin Conjugate (BTC): Profound efficacy without bleeding and

(56) References Cited

OTHER PUBLICATIONS coagulation abnormalities in animal models", Cancer Research, 2019, 79(13 suppl):4481. 2 pages.
Bennett et al., "Abstract 5854: BT5528, a Bicycle Toxin Conjugate targeting EphA2 has potent anti-tumor activity without bleeding or coagulation abnormalities in preclinical models." Cancer Res., 2018, 78(13 suppl):5854.
Bennett et al., "Abstract 5855: Bicycle Drug Conjugates Targeting EphA2 for the Treatment of Solid Tumors: Discovery and Selection of BT5528", Cancer Research, 2018, 78(13 suppl):5855. 2 pages.
Bennett et al., "Development of BT1718, a Bicycle Drug Conjugate® (BDC) targeting MT1-MMP for treatment of solid tumours," European Journal of Cancer, Nov. 2016, 69(1):S21.
Bennett et al., "MMAE Delivery Using the Bicycle Toxin Conjugate BT5528," Mol Cancer Ther., Jul. 2020, 19(7):1385-1394.
Bennett et al., "The Mechanism of Action of BT1718, a Novel Small-Molecule Drug Conjugate for the Treatment of Solid Tumors Expressing MT1-MMP," AACR-NCI-EOrTC International Conference: Molecular Taroets and Cancer Therapeutics, Jan. 2018, 26-30.
Bennett, "BT1718, a Bicycle Drug Conjugate (BTC): Profound Efficacy Without Bleeding and Coagulation Abnormalities in Animal Models," AACR Annual Meeting 2019, 4481, 2 pages.
Ben-Shmuel et al., "Unleashing Natural Killer Cells in the Tumor Microenvironment—The Next Generation of Immunotherapy?", Front Immunol., 2020, 11:275.
Berenson, "Multiple Myeloma," Merck Manual, Retrieved from: https://www.merckmanuals.com/home/blood-disorders/plasma-cell-disorders/multiplemyeloma?query=multiple%20myeloma, Oct. 2022.
Berge et al., "Pharmaceutical Salts," Journal of Pharmaceutical Sciences, Jan. 1977, 66(1):1-19.
Berkel et al. "Binding of (5 S)-penicilloic acid to penicillin binding protein 3." ACS chemical biology 8, No. 10 (2013): 2112-2116.
Bernhagen et al., "Design, synthesis and characterization of different bicyclic peptides with enhanced binding and selectivity for various integrins", Retrieved form: https://ec.europa.eu/research/participants/documents/downloadPublic?documentIds=080166e5acfd6757&appId=PPGMS, Oct. 14, 2016, XP55622035:1-6.
Beswick, Paul, "Bicycles—An entirely new class of therapeutics," accessed on https://www.bicycletherapeutics.com/wp-content/uploads/RSC-02-May-2019.pdf, 2019, 21 pages.
Bicycle Therapeutics, "Bicycle Therapeutics and Cancer Research UK Announce Initiation of First Clinical Study of a Bicyclic Peptide (Bicycle®)," Press Release, Feb. 13, 2018, https://investors.bicycletherapeutics.com/node/6651/pdf.
Bicycle Therapeutics, "Bicycle Therapeutics to Present New BT1718 Data in the "New Drugs on the Horizon" Session at the 2018 American Association for Cancer Research Meeting," Press Release. Apr. 3, 2018.
Bicycle Therapeutics, "Bicycle Therapeutics to Present on BT5528, a Bicycle Toxin Conjugate Targeting EphA2 for the Treatment of Solid Tumours, at World ADC 2019," Business Wire Release. Mar. 5, 2019.
BicycleTx Limited, "Study BT5528-100 in Patients with Advanced Solid Tumors Associated with EphA2 Expression," ClinicalTrials. gov Identifier NCT04180371. First Posted Nov. 27, 2019; Accessed Dec. 30, 2022: https://clinicaltrials.gov/ct2/show/NCT04180371.
Bilsky, Mark H., "Gliomas", Merck Manual (https://www.merckmanuals.com/professional/neurologic-disorders/intracranial-and-spinal-tumors/gliomas), May 2023, 8 pages.
Binda et al., "The EphA2 receptor drives self-renewal and tumorigenicity in stem-like tumor-propagating cells from human glioblastomas," Cancer Cell, Dec. 11, 2012, 22(6):765-780.
Biron et al., "Improving oral bioavailability of peptides by multiple N-methylation: somatostatin analogues," Angewandte Chemie International Edition, 2008, 47(14):2595-2599.
Blank et al., "Absence of Programmed Death Receptor 1 Alters Thymic Development and Enhances Generation of CD4/CD8 Double-Negative TCR-Transgenic T Cells" in Journal of Immunology, Nov. 2003, 171(19):4574-4581.

Bogaerts et al., "Individual patient data analysis to assess modifications to the RECIST criteria." European journal of cancer, 2009, 45(2):248-260.
Bolland et al., "Spontaneous autoimmune disease in Fc(gamma)RIIB-deficient mice results from strain-specific epistasis", Immunity, Aug. 2000, 13(2):277-285.
Booth et al., "Crowd control in the crypt," Nat Med., Dec. 2002, 8(12):1360-1361.
Borghaei et al., "Nivolumab versus docetaxel in advanced non squamous non-small-cell lung cancer." New England Journal of Medicine, 2015, 373(17):1627-1639.
Borrelli et al., "Cell Penetrating Peptides as Molecular Carriers for Anti-Cancer Agents," Molecules, Feb. 2018, 23(2):295. (28 pages).
Boruchov et al., "Activating and inhibitory IgG Fc receptors on human DCs mediate opposing functions", The Journal of Clinical Investigation, 2005, 115(10):2914-2923.
Bouchard et al., "Antibody-drug conjugates—a new wave of cancer drugs." Bioorganic & medicinal chemistry letters, 2014, 24(23):5357-5363.
Brahmer et al., "Nivolumab versus docetaxel in advanced squamous-cell non-small-cell lung cancer." New England Journal of Medicine, 2015, 373(2):123-135.
Brannan et al., "EphA2 in the early pathogenesis and progression of non-small cell lung cancer," Cancer Prev Res (Phila)., Dec. 2009, 2(12):1039-1049.
Brantley-Sieders et al., "Eph receptor tyrosine kinases in tumor and tumor microenvironment", Current Pharmaceutical Design, 2004, 10(27):3431-3442.
Brantley-Sieders et al., "Eph/Ephrin Profiling in Human Breast Cancer Reveals Significant Associations between Expression Level and Clinical Outcome", PLOS ONE, 2011, 6(9):e24426.
Brantley-Sieders et al., "Impaired tumor microenvironment in EphA2-deficient mice inhibits tumor angiogenesis and metastatic progression," FASEB J., Nov. 2005, 19(13):1884-1886.
Bristol-Myers Squibb, "An Investigational Immuno-Therapy Study to Investigate the Safety and Effectiveness of Nivolumab, and Nivolumab Combination Therapy in Virus-Associated Tumors—Full Text View—Clinicaltrials." Gov. [(accessed on Jan. 30, 2021)] (2018).
Brown et al., "Blockade of programmed death-1 ligands on dendritic cells enhances T cell activation and cytokine production", Journal of Immunology, Feb. 2003, 170(3):1257-1266.
Cabanillas et al., "Phase I study of maytansine using a 3-day schedule," Cancer Treat Rep., Mar. 1978, 62(3):425-428.
Cancer Research UK, "Soft tissue sarcomas," Retrieved from: http://aboutcancer.cancerresearchuk.org/about-cancer/soft-tissue-sarcoma, Sep. 2022.
Cancer Research UK, "Triple Negative Breast Cancer," Retrieved from: https://www.cancerresearchuk.org/about-cancer/breast-cancer/stages-types-grades/types/triplenegative-breast-cancer#, Sep. 2022, 6 pages.
Cancer Research UK, "Types of lung cancer," Retrieved form: https://www.cancerresearchuk.org/about-cancer/lung-cancer/stages-types- grades/types#, Sep. 2022.
Cancer Research UK, "Your mouth and cancer drugs," Retrieved form: https://www.cancerresearchuk.org/about-cancer/cancer-in-general/treatment/cancer-drugs/sideeffects/your-mouth, Sep. 2022, 5 pages.
Caratelli et al., "FCγ Chimeric Receptor-Engineered T Cells: Methodology, Advantages, Limitations, and Clinical Relevance", Frontiers in Immunology, Apr. 27, 2017, :8:457, 8 pages.
Center for Pancreatic and Biliary Diseases, "Bile Duct Cancer," University of Southern California, Department of Surgery. Retrieved from https://web.archive.org/web/20171207023733/http://www.surgery.usc.edu:80/divisions/tumor/PancreasDiseases/web%20pages/BILIARY%20SYSTEM/cholangiocarcinoma.html.
Centers for Disease Control and Prevention, "What Can I Do to Reduce My Risk of Ovarian Cancer?", Division of Cancer Prevention and Control, Aug. 31, 2022, 1 page.
Chabner et al., "Initial clinical trials of maytansine, an antitumor plant alkaloid." Cancer Treat Rep., 1978, 62(3):429-433.

(56) References Cited

OTHER PUBLICATIONS

Chahinian et al., "Phase I study of weekly maytansine given by iv bolus or 24-hour infusion," Cancer Treat Rep., Nov. 1979, 63(11-12),1953-1960.

Challita-Eid et al., "Enfortumab Vedotin Antibody-Drug Conjugate Targeting Nectin-4 Is a Highly Potent Therapeutic Agent in Multiple Preclinical Cancer Models", Cancer Research, 2016, 76(10):3003-3013.

Chan and Nie, "Quantum dot bioconjugates for ultrasensitive nonisotopic detection," Science, Sep. 25, 1998; 281(5385):2016-2018.

Chandrasekar, "Bladder Cancer," Merck Manual; Retrieved form: https://www.merckmanuals.com/professional/genitourinary-disorders/genitourinary-cancers/bladder-cancer, Sep. 2022.

Chandrasekar, "Prostate Cancer," Merck Manual. Retrieved from: https://www.merckmanuals.com/professional/genitourinary-disorders/genitourinary-cancers/prostate-cancer, Sep. 2022.

Chang et al., "Five different anti-prostate-specific membrane antigen (PSMA). Antibodies confirm PSMA expression in tumor-associated neo vasculature," Cancer Res., Jul. 1, 1999, 59(13):3192-3198.

Chang et al., "Subtiligase: A Tool for Semisynthesis of Proteins", Proc Natl Acad Sci, 1994, 91(26):12544-12548.

Chemnitz et al., "RNA fingerprints provide direct evidence for the inhibitory role of TGFβ and PD-1 on CD4+ T cells in Hodgkin lymphoma", Blood, 2007, 110(9):3226-3233.

Chen and Harrison, "Cell-Penetrating Peptides in Drug Development: Enabling Intracellular Targets," Biochemical Society Transactions, 2007, 35(4):821-825.

Chen et al., "Association of FCGR3A and FCGR3B copy number variations with systemic lupus erythematosus and rheumatoid arthritis in Taiwanese patients", Arthritis & Rheumatology, 2014, 66(11):3113-3121.

Chen et al., "Peptide ligands stabilized by small molecules," Angewandte Chemie International Edition, Feb. 3, 2014, 53(6):1602-1606.

Chen et al., "Structurally diverse cyclisation linkers impose different backbone conformations in bicyclic peptides," Chembiochem., May 7, 2012, 13(7):1032-1038.

Chen et al., "The Bicycle Platform: an Efficient Technology to Generate High Affinity, High Selectivity Molecules (Bicycles®) with Unique Drug Like Properties that are Amenable to Conjugation," URL: https://www.bicycletherapeutics.com/wp-content/uploads/16_PEGS-Bicycle-30-04-2017-poster.pdf, Apr. 26, 2017, 1 page.

Cheng et al., "Memorial Sloan Kettering-Integrated Mutation Profiling of Actionable Cancer Targets (MSK-Impact): A Hybridization Capture-Based Next-Generation Sequencing Clinical Assay for Solid Tumor Molecular Oncology", J Molecular Diagnostics, 2015, 17(3):251-264.

Cheng et al., "Blockade of EphA receptor tyrosine kinase activation inhibits vascular endothelial cell growth factor-induced angiogenesis," Mol Cancer Res., Nov. 2002, 1(1):2-11.

Cherney et al., "Macrocyclic Amino Carboxylates as Selective MMP-8 Inhibitors," Journal of Medicinal Chemistry, May 1998, 41(11):1749-1751.

Chiche et al., "Hypoxia-inducible carbonic anhydrase IX and XII promote tumor cell growth by counteracting acidosis through the regulation of the intracellular pH," Cancer Res., Jan. 1, 2009, 69(1):358-368.

Chinnery et al., "Viral antigen mediated NKp46 activation of NK cells results in tumor rejection via NK-DC crosstalk", Oncoimmunology, 2012, 1(6):874-883.

Christina Chun, "What are the most curable cancers?", Medical news Today (https://www.medicalnewstoday.com/articles/322700 Accessed May 8, 2020), 2020, 8 pages.

Chung et al., "Bicycle synthesis through peptide macrocyclization using aziridine aldehydes followed by late stage disulfide bond installation." MedChemComm, 2023, 4(7):1124-1128.

Clarkson et al., "Treatment of refractory immune thrombocytopeniaurpura with an anti-Fc gamma-receptor antibody", The New England Journal of Medicine, 1986, 314(19):1236-1239.

Claus et al., "Tumor-targeted 4-1BB agonists for combination with T cell bispecific antibodies as off-the-shelf therapy", Sci Transl Med., Jun. 2019, 11(496):eaav5989. (12 Pages).

ClinicalTrials.gov, identifier NCT02426892, "Nivolumab and HPV-16 Vaccination in Patients with HPV-16 Positive Incurable Solid Tumors," https://clinicaltrials.gov/ct2/show/study/NCT02426892, 8 pages.

Clynes et al., "Inhibitory Fc receptors modulate in vivo cytotoxicity against tumor targets", Nature Medicine, Apr. 2000, 6(4):443-446.

Committee for Medicinal Products for Human Use (CHMP), "Assessment Report: Kadcyla; International non-proprietary name: Trastuzumab emtansine; Procedure No. EMEA/H/C/002389/0000," European Medicines Agency. Sep. 19, 2013; EMA/749228/2013.

Connolly et al., "Complexities of TGF-β Targeted Cancer Therapy", Int'l J. Biological Sciences, 2012, 8(7):964-978.

Cook et al., "Pharmacokinetic (PK) Assessment of BT1718: A Phase 1/2a Study of BT1718, a First in Class Bicycle Toxin Conjugate (BTC), in Patients (PTS) with Advanced Solid Tumours," Annals of Oncology 2019; vol. 30, Jan. 2019, p. v174.

Cortes et al., "Phase II study of the halichondrin B analog eribulin mesylate in patients with locally advanced or metastatic breast cancer previously treated with an anthracycline, a taxane, and capecitabine." Journal of Clinical Oncology, 2010, 28(25):3922-3928.

Costello et al., "Defective expression and function of natural killer cell-triggering receptors in patients with acute myeloid leukemia", Blood, 2002, 99(10):3661-3667.

Crameri et al., "Construction and evolution of antibody-phage libraries by DNA shuffling," Nature Medicine, Jan. 1996, 2(1):100-102.

Cui, J. Jean., "A New Challenging and Promising Era of Tyrosine Kinase Inhibitors", ACS Med Chem Lett., 2014, 5(4): 272-274.

Curiel et al., "Blockade of B7-H1 improves myeloid dendritic cell-mediated antitumor immunity", In Nature medicine, 2003, 9(5):562-567.

Dagher et al., "c-Kit and CD38 are expressed by long-term reconstituting hematopoietic cells present in the murine yolk sac," Biol Blood Marrow Transplant, 1998, 4(2):69-74.

Davies et al., "Antibody VH Domains as Small Recognition Units," Bio/Technology, May 13, 1995, 13(5):475-479.

Davis et al., "Natural killer cells unleashed: Checkpoint receptor blockade and BiKE/TriKE utilization in NK-mediated anti-tumor immunotherapy", Semin Immunol., 2017, 31:64-75.

Dawson et al., "Synthesis of proteins by native chemical ligation," Science, Nov. 1994, 266(5186):776-779.

De Kruif et al., "Selection and Application of Human Single Chain Fv Antibody Fragments from a Semi-synthetic Phage Antibody Display Library with Designed CDR3 Regions," Journal of Molecular Biology, Apr. 1995, 248(1):97-105.

De la Pena et al., "Expression of the matrix metalloproteases 2, 14, 24, and 25 and tissue inhibitor 3 as potential molecular markers in advanced human gastric cancer." Disease markers 2014 (2014).

Deaglio et al., "CD38 is a signaling molecule in B-cell chronic lymphocytic leukemia cells," Blood, Sep. 15, 2003, 102(6):2146-2155.

Debre et al., "Infusion of Fc gamma fragments for treatment of children with acute immune thrombocytopeniarpura", Lancet, 1993, 342(8877):945-949.

Deonarain et al., "Small-Format Drug Conjugates: A Viable Alternative to ADCs for Solid Tumours?", Antibodies (Basel), 2018, 7(2):16.

Derossi et al., "The third helix of the Antennapedia homeodomain translocates through biological membranes," Journal if Biological Chemistry, Apr. 1994, 269(14):10444-10450.

Deyle et al., "Phage Selection of Cyclic Peptides for Application in Research and Drug Development," Accounts of Chemical Research, 2017, 50(8):1866-1874.

Dharmadhikari, et al., "CD137 and CD137L signals are main drivers of type 1, cell-mediated immune responses." Oncoimmunology, 2016, 5(4):e1113367.

Di, "Strategic Approaches to Optimizing Peptide ADME Properties," AAPS J., Jan. 2015, 17(1):134-143.

(56) References Cited

OTHER PUBLICATIONS

Diamantis and Banerji, "Antibody-drug conjugates—an emerging class of cancer treatment." British journal of cancer, 2016, 114(4):362-367.

Diaz-Perlas et al., "Branched BBB-shuttle peptides: chemoselective modification of proteins to enhance blood-brain barrier transport," Chemical Science, Sep. 2018, 9(44):8409-8415.

Dong, et al. "Tumor-associated B7-H1 promotes T-cell apoptosis: a potential mechanism of immune evasion", Nature Medicine, 2002, 8(8):793-800.

Dorfman et al., "Programmed death-1 (PD-1) is a marker of germinal center-associated T cells and angioimmunoblastic T-cell lymphoma." The American journal of surgical pathology, Jul. 2006, 30(7):802-810.

Driggers et al., "The exploration of macrocycles for drug discovery—an underexploited structural class," Nature Reviews Drug Discovery, Jul. 2008, 7(7):608-624.

Dubois et al., "New ways to image and target tumour hypoxia and its molecular responses," Radiotherapy and Oncology, Sep. 2015, 116(3):352-357.

Dufort et al., "789: Generation of a Bicycle NK-TICA(TM), a novel NK cell engaging molecule to enhance targeted tumor cytotoxicity", Nov. 10, 2021, 9(Suppl 2):A824-A824. URL: https://jitc.bmj.com/contenl/jitc/9/Suppl_2/A824.full.pdf.

Dunne et al., "EphA2 Expression Is a Key Driver of Migration and Invasion and a Poor Prognostic Marker in Colorectal Cancer," Clin Cancer Res., Jan. 1, 2016, 22(1):230-242.

Duong and Rodan, "The role of integrins in osteoclast function," J Bone Miner Metab., 1999, 17(1):1-6.

Eagan et al., "Early clinical study of an intermittent schedule for maytansine (NSC-153858): brief communication." Journal of the National Cancer Institute, 1978, 60(1):93-96.

Eder et al., "A phage display derived stabilised bicyclic peptide targeting MMP-14 shows high imaging contrast in small animal PET imaging." In European Journal of Nuclear Medicine and Molecular Imaging, 42:S140-S141.

Eisenhauer et al., "New response evaluation criteria in solid tumours: revised RECIST guideline (version 1.1)." European journal of cancer, 2009, 45(2):228-247.

Ellenrieder et al., "Role of MT-MMPs and MMP-2 in pancreatic cancer progression." International Journal of Cancer, 2000, 85(1):14-20.

Elson-Schwab et al., "Guanidinylated neomycin delivers large, bioactive cargo into cells through a heparan sulfate-dependent pathway." Journal of Biological Chemistry, 2007, 282(18):13585-13591.

Fauriat et al., "Deficient expression of NCR in NK cells from acute myeloid leukemia: Evolution during leukemia treatment and impact of leukemia cells in NCRdull phenotype induction", Blood, 2007, 109(1):323-330.

Fehrenbacher et al., "Atezolizumab versus docetaxel for patients with previously treated non-small-cell lung cancer (POPLAR): a multicentre, open-label, phase 2 randomised controlled trial." The Lancet, 2016, 387(10030):1837-1846.

Felices et al., "Generation of BiKEs and TriKEs to Improve NK Cell-Mediated Targeting of Tumor Cells", Methods Mol Biol., 2016, 1441:333-346.

Felices et al., "Novel CD19-targeted TriKE restores NK cell function and proliferative capacity in CLL", Blood Adv., 2019, 3(6):897-907.

Fiacco et al., "N-Methyl Scanning Mutagenesis Generates Protease-Resistant G Protein Ligands with Improved Affinity and Selectivity," ChemBioChem, Sep. 2008, 9(14):2200-2203.

Figure 3.8 of "Immunobiology: The Immune System in Health and Disease," Garland Science, 2001.

Flaherty et al., "Nonclinical evaluation of GMA161—an antihuman CD16 (FcγRIII) monoclonal antibody for treatment of autoimmune disorders in CD16 transgenic mice", Toxicological Sciences, 2012, 125(1):299-309.

Forsberg, et al., "CD137 plays both pathogenic and protective roles in type 1 diabetes development in NOD mice." The Journal of Immunology, 2017, 198(10):3857-3868.

Francis et al., "Bone and Soft Tissue Sarcomas: UK Incidence and Survival: 1996-2010," National Cancer Intelligence Network, Nov. 2013, v2.0.

Fumet et al. "Phase Ib/II trial evaluating the safety, tolerability and immunological activity of durvalumab (MEDI4736) (anti-PD-L1) plus tremelimumab (anti-CTLA-4) combined with FOLFOX in patients with metastatic colorectal cancer." ESMO open, 2018, 3(4):e000375.

Funaro et al., "Human CD38 is associated to distinct molecules which mediate transmembrane signaling in different lineages." European journal of immunology, Oct. 1993, 23(10):2407-2411.

Funaro et al., "Involvement of the multilineage CD38 molecule in a unique pathway of cell activation and proliferation," J Immunol., Oct. 1990, 145(8):2390-2396.

Galsky et al., "Phase I trial of the prostate-specific membrane antigen-directed immunoconjugate MLN2704 in patients with progressive metastatic castration-resistant prostate cancer." Journal of clinical oncology, 2008, 26(13):2147-2154.

Gandhi et al., "MP69-11 Carbonic Anhydrase IX Assay: A Paradigm Shift in Diagnosis of Malignant Cystic Renal Lesions," J Urol., May 18, 2015, 193(4S):e870-e871.

Garcia-Iglesias et al., "Low NKp30, NKp46 and NKG2D expression and reduced cytotoxic activity on NK cells in cervical cancer and precursor lesions", BMC Cancer, Jun. 16, 2009, 9:186, 8 pages.

Gauthier et al., "Multifunctional Natural Killer Cell Engagers Targeting NKp46 Trigger Protective Tumor Immunity", Cell, 2019, 177(7):1701-1713.

Gelb et al., "Abstract 391: Molecular-based enrichment strategy for Nectin-4 targeted Bicycle toxin conjugate BT8009," Cancer Res., Jul. 1, 2021, 81(13 suppl):391 (poster).

Gelb et al., "Abstract A047: MT1-MMP Immunohistochemistry (IHC) analysis of tumor microarrays (TMAs) using a novel scoring system guides patient selection for BT1718 expansion cohorts," In Molecular Cancer Therapeutics, 2019, 18(12_Suppl):A047.

Gen path diagnostics, "Solid Tumors", Accessed on https://genpathdiagnostics.com/patients/oncology/solid-tumors/, Jun. 30, 2023, 4 pages.

Gentilucci et al., "Chemical Modifications Designed to Improve Peptide Stability: Incorporation of Non-Natural Amino Acids, Pseudo-Peptide Bonds, and Cyclization," Current Pharmaceutical Design, 2010, 16(28):3185-3203.

Gfeller et al., "Current tools for predicting cancer-specific T cell immunity," Oncoimmunology, 2016, 5(7):e1177691.

Gleason et al., "CD16xCD33 bispecific killer cell engager (BiKE) activates NK cells against primary MDS and MDSC CD33+ targets", Blood, 2014, 123(19):3016-3026.

Gokel et al., "Crown Ethers: Sensors for Ions and Molecular Scaffolds for Materials and Biological Models," Chem. Rev., 2004, 104(5):2723-2750.

Gradishar et al., "Significantly longer progression-free survival with nab-paclitaxel compared with docetaxel as first-line therapy for metastatic breast cancer." J Clin Oncol., 2009, 27(22):3611-3619.

Gresh, "Neuroblastoma," Merck Manual., Retrieved form: https://www.msdmanuals.com/en-in/professional/pediatrics/pediatric-cancers/neuroblastoma, Sep. 2022, 4 pages.

Griffiths et al., "Isolation of high affinity human antibodies directly from large synthetic repertoires," EMBO Journal, Jul. 1994, 13(14):3245-3260.

Grisold et al., "Peripheral neuropathies from chemotherapeutics and targeted agents: diagnosis, treatment, and prevention." Neuro-oncology, 2012, 14(suppl_4):iv45-iv54.

Gu et al., "The influence of the penetrating peptide iRGD on the effect of paclitaxel-loaded MT1-AF7p-conjugated nanoparticles on glioma cells." Biomaterials, 2013, 34(21):5138-5148.

Guo et al., "Prognostic significance of combinations of RNA-dependent protein kinase and EphA2 biomarkers for NSCLC," J Thorac Oncol., Mar. 2013, 8(3):301-308.

Gupta et al., "Intracellular delivery of large molecules and small particles by cell-penetrating proteins and peptides," Advanced Drug Delivery Reviews, Feb. 2005, 57(4):637-651.

(56) References Cited

OTHER PUBLICATIONS

Hamanishi et al. "Programmed cell death 1 ligand 1 and tumor-infiltrating CD8+ T lymphocytes are prognostic factors of human ovarian cancer", Proc. Natl. Acad. Sci. USA, 2007, 104(9):3360-3365.
Han et al., "Altered NKp30, NKp46, NKG2D, and DNAM-1 Expression on Circulating NK Cells Is Associated with Tumor Progression in Human Gastric Cancer", Journal of Immunology Research, Sep. 3, 2018, 2018:6248590, 10 pages.
Hanna et al., "Randomized phase III trial of pemetrexed versus docetaxel in patients with non-small-cell lung cancer previously treated with chemotherapy." Journal of clinical oncology, 2004, 22(9):1589-1597.
Harrison et al., "Abstract 5144: BT1718, a novel bicyclic peptide-maytansinoid conjugate targeting MT1-MMP for the treatment of solid tumors: Design of bicyclic peptide and linker selection," Cancer Res., 2017, 77(13 suppl):5144.
Hart, et al., "De novo identification of lipid II binding lipopeptides with antibacterial activity against vancomycin-resistant bacteria." Chemical Science, 2017, 8(12):7991-7997.
Hart, et al., "Cell binding and internalization by filamentous phage displaying a cyclic Arg-Gly-Aspcontaining peptide", J. Biol. Chem., 1994, 269:12468-12474.
Hasmim et al., "Critical Role of Tumor Microenvironment in Shaping NK Cell Functions: Implication of Hypoxic Stress", Frontiers in Immunology, Sep. 23, 2015, 6:482, 9 pages.
He et al., "Matrix metalloproteinase-14 is a negative prognostic marker for patients with gastric cancer." Digestive diseases and sciences, 2013, 58:1264-1270.
Heinis et al., "Phage-encoded combinatorial chemical libraries based on bicyclic peptides," Nature Chemical Biology, Jul. 2009, 5(7):502-507.
Helft et al., "A phase I study of cantuzumab mertansine administered as a single intravenous infusion once weekly in patients with advanced solid tumors." Clinical cancer research, 2004, 10(13):4363-4368.
Henriques et al., "Functional characterization of peripheral blood dendritic cells and monocytes in systemic lupus erythematosus", Rheumatology International, Apr. 2012, 32(4):863-869.
Herbst et al., "Pembrolizumab versus docetaxel for previously treated, PD-L 1-positive, advanced non-small-cell lung cancer (KEYNOTE-010): a randomised controlled tria", Lancet, Apr. 2016, 387(10027):1540-1550.
Hershman, "Thyroid Cancers," Merck Manual, Retrieved from: https://www.merckmanuals.com/professional/endocrine-and-metabolic-disorders/thyroid-disorders/thyroid-cancers, Sep. 2020.
Hess et al., "Backbone Cyclic Peptidomimetic Melanocortin-4 Receptor Agonist as a Novel Orally Administrated Drug Lead for Treating Obesity," Journal of Medicinal Chemistry, Jan. 26, 2008, 51(4):1026-1034.
Hess et al., "Molecular Regulation of Tumor Cell Vasculogenic Mimicry by Tyrosine Phosphorylation: Role of Epithelial Cell Kinase (Eck/EphA2", Cancer Research, 2001, 61(8):3250-3255.
Hikari et al., "Tags for labeling protein N-termini with subtiligase for proteomics", Bioorganic & Medicinal Chemistry Letters, Nov. 2008, 18 (22):6000-6003.
Hill et al: "Constraining Cyclic Peptides to Mimic Protein Structure Motifs", Angewandte Chemie International Edition, Nov. 24, 2014, 53(48):13020-13041.
Hinner et al., "Tumor-Localized Costimulatory T-Cell Engagement by the 4-1BB/HER2 Bispecific Antibody-Anticalin Fusion PRS-343", Clinical Cancer Research, Oct. 2019, 23(19):5878-5889.
Hirano et al. "Blockade of B7-H1 and PD-1 by monoclonal antibodies potentiates cancer therapeutic immunity," Cancer Research, 2005, 65(3):1089-1096.
Hoogenboom et al., "By-passing immunisation. Human antibodies from synthetic repertoires of germline VH gene segments rearranged in vitro," Journal of Molecular Biology, Sep. 1992, 227(2):381-388.
Hoshino et al., "Mapping of the catalytic and epitopic sites of human CD38/NAD+ glycohydrolase to a functional domain in the carboxyl terminus," J Immunol., Jan. 15, 1997, 158(2):741-747.
Hsu et al., "Efficacy of plasmin-treated intravenous gamma-globulin for therapy of Kawasaki syndrome", The Pediatric Infectious Disease Journal, Jun. 1993, 12(6):509-512.
Hu-Lieskovan and Ribas, "New Combination Strategies Using Programmed Cell Death 1/Programmed Cell Death Ligand 1 Checkpoint Inhibitors as a Backbone," Cancer J., Jan./Feb. 2017, 23(1):10-22.
Hurov et al., "BT7480, a novel fully synthetic tumor-targeted immune cell agonist (TICA™) induces tumor localized CD137 agonism", Retrieved from the Internet: URL: https://www.bicycletherapeutics.com/wp-content/uploads/2020-06-16-BT7480-AACR-2020-poster-P5552_Final_CD137-in-title-002.pdf, Jun. 20, 2020, 1 page.
Ide et al., "A novel method for artificial lipid-bilayer formation," Biosensors and Bioelectronics, 2005, 21(4):672-677.
Inman et al., "PD-L1 (B7-H1) expression by urothelial carcinoma of the bladder and BCG-induced granulomata: associations with localized stage progression", Cancer, 2007, 109(8):1499-1505.
Ip et al., "Atypical localization of membrane type 1-matrix metalloproteinase in the nucleus is associated with aggressive features of hepatocellular carcinoma." Molecular Carcinogenesis: Published in cooperation with the University of Texas MD Anderson Cancer Center, 2007, 46(3):225-230.
Izawa et al., "$H_2O_2$ production within tumor microenvironment inversely correlated with infiltration of CD56(dim) NK cells in gastric and esophageal cancer: possible mechanisms of NK cell dysfunction", Cancer Immunology, Immunotherapy, 2011, 60(12):1801-1810.
Jackson and Stover, "Using the lessons learned from the clinic to improve the preclinical development of antibody drug conjugates." Pharmaceutical research, 2015, 32(11):3458-3469.
Jackson et al., "A human antibody-drug conjugate targeting EphA2 inhibits tumor growth in vivo", Cancer Research, Nov. 15, 2008, 68(22):9367-9374.
Jespers et al., "Selection of optical biosensors from chemisynthetic antibody libraries," Protein Engineering, Design and Selection, Oct. 2004, 17(10):709-713.
Jin et al., "αVβ3 Integrin-Targeted Radionuclide Therapy with 64Cu-cyclam-RAFT-c(-RGDfK-)4," Mol Cancer Ther., Sep. 2016, 15(9):2076-2085.
Johnson et al., "Melanoma-specific MHC-II expression represents a tumour-autonomous phenotype and predicts response to anti-PD-1/PD-L1 therapy", Nature Communications, Jan. 29, 2016, 7:10582(10 pages).
Johnson et al., "Relationships between drug activity in NCI preclinical in vitro and in vivo models and early clinical trials," British Journal of Cancer, 2001, 84(10):1424-1431.
Jones et al., "Randomized phase III study of docetaxel compared with paclitaxel in metastatic breast cancer." Journal of Clinical Oncology, 2005, 23(24):5542-5551.
Jones et al., "Targeting membrane proteins for antibody discovery using phage display," Scientific Reports, May 18, 2016, 6(1):1-11.
Kamat et al., "The clinical relevance of stromal matrix metalloproteinase expression in ovarian cancer." Clinical Cancer Research, 2006, 12(6):1707-1714.
Kamijo et al., "Aberrant CD137 ligand expression induced by GATA6 overexpression promotes tumor progression in cutaneous T-cell lymphoma." Blood, The Journal of the American Society of Hematology, 2018, 132(18):1922-1935.
Kanazawa et al., "Non-obese-diabetic mice: immune mechanisms of pancreatic β-cell destruction," Diabetologia, 1984, 27:113-115.
Kang et al., "A randomized, open-label, multicenter, adaptive phase 2/3 study of trastuzumab emtansine (T-DM1) versus a taxane (TAX) in patients (pts) with previously treated HER2-positive locally advanced or metastatic gastric/gastroesophageal junction adenocarcinoma (LA/MGC/GEJC)." (2016): 5-5.
Kang, et al., "Anti-CD137 suppresses tumor growth by blocking reverse signaling by CD137 ligand." Cancer research, 2017, 77(21):5989-6000.

(56) References Cited

OTHER PUBLICATIONS

Keith, "Lung Carcinoma," Merck Manual, Retrieved on: https://www.merckmanuals.com/professional/pulmonary-disorders/tumors-of-the-lungs/lung-carcinoma, Sep. 2021, 18 pages.
Kell, Douglas B., "The Transporter-Mediated Cellular Uptake and Efflux of Pharmaceutical Drugs and Biotechnology Projects: How and Why Phospholipid Bilayer Transport is Negligible in Real Biomembranes," Molecules, 2021, 26(5629):40 pages.
Kellog et al., "Disulfide-linked antibody-maytansinoid conjugates: Optimization of in vivo activity by varying the steric hindrance at carbon atoms adjacent to the disulfide linkage." Bioconjugate chemistry, 2011, 22(4):717-727.
Kemp and McNamara, "Conformationally restricted cyclic nonapeptides derived from L-cysteine and LL-3-amino-2-piperidone-6-carboxylic acid (LL-Acp), a potent.beta.-turn-inducing dipeptide analog." J. Org. Chem., 1985, 50(26):5834-5838.
Kerkela et al., "Differential patterns of stromelysin-2 (MMP-10) and MT1-MMP (MMP-14) expression in epithelial skin cancers." British journal of cancer, 2001, 84(5):659-669.
Kessenbrock et al., "Matrix metalloproteinases: regulators of the tumor microenvironment." Cell, 2010, 141(1):52-67.
Khan et al., "Engineering Lipid Bilayer Membranes for Protein Studies," International Journal of Molecular Sciences, Nov. 2013, 14(11):21561-21597.
Kikuchi et al., "Immunohistochemical detection of membrane-type-1-matrix metalloproteinase in colorectal carcinoma." British journal of cancer, 2000, 83(2):215-218.
Kim et al., "Synergistic signals for natural cytotoxicity are required to overcome inhibition by c-Cbl ubiquitin ligase", Immunity, Feb. 26, 2010, 32(2):175-186.
Kim, et al., "Reverse signaling through the costimulatory ligand CD137L in epithelial cells is essential for natural killer cell-mediated acute tissue inflammation." Proceedings of the National Academy of Sciences, 2012, 109(1): E13-E22.
Kinch et al., "Predictive Value of the EphA2 Receptor Tyrosine Kinase in Lung Cancer Recurrence and Survival", Clin Cancer Res., 2003, 9(2):613-618.
Kitanaka et al., "CD38 ligation in human B cell progenitors triggers tyrosine phosphorylation of CD19 and association of CD19 with lyn and phosphatidylinositol 3-kinase," J Immunol., 1997, 159(1):184-192.
Kitanaka et al., "CD38-mediated signaling events in murine pro-B cells expressing human CD38 with or without its cytoplasmic domain," J Immunol., Feb. 15, 1999, 162(4): 1952-1958.
Kleinau et al., "Induction and suppression of collagen-induced arthritis is dependent on distinct fcgamma receptors", J Exp Med., May 2000, 191(9):1611-1616.
Knight et al., "Three genes for lupus nephritis in NZB x NZW mice," Journal of Experimental Medicine, Jun. 1978, 147(6):1653-1660.
Konishi et al., "B7-H1 Expression on Non-Small Cell Lung Cancer Cells and Its Relationship with Tumor-Infiltrating Lymphocytes and Their PD-1 Expression", Clin Cancer Res., 2004, 10(15):5094-5100.
Konopleva et al., "Ligation of cell surface CD38 protein with agonistic monoclonal antibody induces a cell growth signal in myeloid leukemia cells," J Immunol., Nov. 1, 1998, 161(9):4702-4708.
Koo et al., "Reduction of the CD16-CD56bright NK Cell Subset Precedes NK Cell Dysfunction in Prostate Cancer", PLoS One, 2013, 8(11):e78049, 8 pages.
Kreidieh et al., "Overview, prevention and management of chemotherapy extravasation." World journal of clinical oncology, 2016, 7(1):87.
Krishnamoorthy et al., "Breaking the Permeability Barrier of *Escherichia coli* by Controlled Hyperporination of the Outer Membrane." Antimicrob Agents Chemother, 2016, 60(12):7372-7381.
Krop et al., "Trastuzumab emtansine versus treatment of physician's choice for pretreated HER2-positive advanced breast cancer (TH3RESA): a randomised, open-label, phase 3 trial." The Lancet Oncology, 2014, 15(7):689-699.
Kumagai et al., "Ligation of CD38 suppresses human B lymphopoiesis," J Exp Med., Mar. 1, 1995, 181(3):1101-1110.
Kylväjä, et al., "Penicillin binding protein 3 of *Staphylococcus aureus* NCTC 8325-4 binds and activates human plasminogen." BMC research notes, 2016, 9:1-10.
Landolt et al., "Clear cell renal cell carcinoma is linked to epithelial-to-mesenchymal transition and to fibrosis." Physiological reports, 2017, 5(11):e13305.
Lani et al., "Identification of high affinity, highly selective bicyclic peptides (Bicycles®) to transmembrane proteins using phage display screening on whole cells," Abstract, PEGS Summit, Boston, Massachusetts, May 2017, 1 page.
Lanman et al., "Analytical and Clinical Validation of a Digital Sequencing Panel for Quantitative, Highly Accurate Evaluation of Cell-Free Circulating Tumor Dna", PLoS One, 2015, 10(10):e0140712.
Lau, et al., "A penicillin-binding protein that can promote advanced-generation cephalosporin resistance and genome adaptation in the opportunistic pathogen Pseudomonas aeruginosa." International journal of antimicrobial agents, 55(3):105896.
Laudanski et al., "Increased serum level of membrane type 1-matrix metalloproteinase (MT1-MMP/MMP-14) in patients with breast cancer." Folia histochemica et cytobiologica, 2010, 48(1):101-103.
Lea and Simeonov, "Fluorescence polarization assays in small molecule screening," Expert Opinion in Drug Discovery, Jan. 2011, 6(1):17-32.
Lee and Aarhus, "ADP-ribosyl cyclase: an enzyme that cyclizes NAD+ into a calcium-mobilizing metabolite," Cell Regul., Mar. 1991, 2(3):203-209.
Lee et al., "ADP-ribosyl cyclase and CD38. Multi-functional enzymes in Ca+2 signaling," Adv Exp Med Biol., 1997, 419:411-419.
Lee et al., "Structural determination of a cyclic metabolite of NAD+ with intracellular Ca2+-mobilizing activity," J Biol Chem., Jan. 25, 1989, 264(3):1608-1615.
Leighton, "Pharmacology Review: Kadcyla (ado-trastuzumab emtansine)," In Center for Drug Evaluation and Research Application No. 1254270riol sOOO., Feb. 2020.
Levi et al., "Characterization of tumor infiltrating Natural Killer cell subset", Oncotarget, May 30, 2015, 6(15):13835-13843.
Levine et al. "Methionine residues as endogenous antioxidants in proteins", PNAS, 1996, 93(26):15036-15040.
Li et al., "Fluorescent Mu selective opioid ligands from a mixture based cyclic peptide library." ACS combinatorial science, 2012, 14(12):673-679.
Li et al., "Targeting the Fc receptor in autoimmune disease", Expert Opinion on Therapeutic Targets, 2014, 18(3):335-350.
Li et al., "The overexpression membrane type 1 matrix metalloproteinase is associated with the progression and prognosis in breast cancer." American Journal of Translational Research, 2015, 7(1):120.
Li et al., "Up-regulation of EphA2 and down-regulation of EphrinA1 are associated with the aggressive phenotype and poor prognosis of malignant glioma", Tomor Biology, 2010, 31(5):477-488.
Li, et al., "A novel strategy for in vitro selection of peptide-drug conjugates." Chemistry & biology, 2003, 10(3):233-239.
Li, et al., "Increasing the antimicrobial activity of nisin-based lantibiotics against Gram-negative pathogens." Applied and environmental microbiology, 2018, 84(12):e00052-18.
Lian at al., Screening Bicyclic Peptide Libraries for Protein-Protein Interaction Inhibitors: Discovery of Journal of the American Chemical Society, Aug. 14, 2013, 135(32):11990-11995.
Lian et al., "Cell-Permeable Bicyclic Peptide Inhibitors against Intracellular Proteins", Journal of the American Chemical Society, Jul. 2014, 136(28):9830-9833.
Lin et al., "EphA2 overexpression is associated with angiogenesis in ovarian cancer," Cancer, Jan. 15, 2007, 109(2):332-340.
Linch et al., "OX40 Agonists and Combination Immunotherapy: Putting the Pedal to the Metal," Frontiers in Oncology, Feb. 16, 2015, 5(34): 1-14.

(56) References Cited

OTHER PUBLICATIONS

Linde et al., "Structure-Activity Relationship and Metabolic Stability Studies of Backbone Cyclization and N-Methylation of Melanocortin Peptides," Biopolymers, 2008, 90(5):671-682.

Lindstrom et al., "Myasthenia gravis," Advances in Immunology, Dec. 1988, 42:233-284.

Liu et al., "Abstract 3642: Tumor-antigen expression-dependent activation of the CD137 costimulatory pathway by bispecific DART proteins," American Association for Cancer Research, Jul. 2017, 77(supp 13):1-4.

Liu et al., "Plasma cells from multiple myeloma patients express B7-H1 (PD-L1) and increase expression after stimulation with IFN-{gamma} and TLR ligands via a MyD88-, TRAF6-, and MEK-dependent pathway", Blood, 2007, 110(1):296-304.

Loktev et al., "Multicyclic Peptides as Scaffolds for the Development of Tumor Targeting Agents," Current Medicinal Chemistry, 2017, 24(999):2141-2155.

Lopus, Manu. "Antibody-DM1 conjugates as cancer therapeutics." Cancer letters, 2011, 307(2):113-118.

Lovering et al. "Escape from flatland: increasing saturation as an approach to improving clinical success." Journal of medicinal chemistry, 2009, 52(21):6752-6756.

Lovering, "Escape from Flatland 2: complexity and promiscuity," Meducinal Chemistry Communication, Dec. 2012, 4(3):515-519.

Lund et al., "CD38 signaling in B lymphocytes is controlled by its ectodomain but occurs independently of enzymatically generated ADP-ribose or cyclic ADP-ribose," J Immunol., Mar. 1, 1999, 162(5):2693-2702.

M.D. Anderson Cancer Center, "Nivolumab and HPV-16 Vaccination in Patients With HPV-16 Positive Incurable Solid Tumors," In ClinicalTrials.gov Identifier NCT02426892. Retrieved form https://clinicaltrials.gov/ct2/show/study/NCT02426892, 2015.

MacFarlane 4th et al., "NK cell dysfunction in chronic lymphocytic leukemia is associated with loss of the mature cells expressing inhibitory killer cell Ig-like receptors", Oncoimmunology, May 19, 2017, 6(7):e1330235.

Macheboeuf et al., "Penicillin binding proteins: key players in bacterial cell cycle and drug resistance processes", FEMS Microbiol Rev., 2006, 30(5):673-691.

Mallone et al., "Signaling through CD38 induces NK cell activation," Int Immunol., Apr. 1, 2001, 13(4): 397-409.

Mamessier et al., "Human breast tumor cells induce self-tolerance mechanisms to avoid NKG2D-mediated and DNAM-mediated NK cell recognition", Cancer Res., 2011, 71(21):6621-6632.

Manches et al., "In vitro mechanisms of action of rituximab on primary non-Hodgkin lymphomas", Blood, 2003, 101(3):949-954.

Mark, "Renal Cell Carcinoma," Merck Manual, Retrieved form: https://www.merckmanuals.com/home/kidney-and-urinary-tract-disorders/cancers-of- the-kidney-and-genitourinary-tract/kidney-cancer, Sep. 2021.

Marks et al., "By-passing immunization. Human antibodies from V-gene libraries displayed on phage," Journal of Molecular Biology, Dec. 1991, 222(3):581-597.

Marme, "VEGFs, angiopoietins, Ephrins and their receptors: putative targets for tumor therapy?" Ann Hematol., 2002, 81(Suppl 2):S66.

Maron et al., "H-2K mutation controls immune response phenotype of autoimmune thyroiditis. Critical expression of mutant gene product in both thymus and thyroid glands," Journal of Experimental Medicine, Oct. 1980, 152(4):1115-1120.

McFarlin et al., "Experimental Allergic Encephalomyelitis in the Rat: Response to Encephalitogenic Proteins and Peptides," Science, Feb. 1973, 179(4072):478-480.

Merck Manual (https://www.merckanuals.com/home/blood-disorders/plasma-celldisorders/multiple-myeloma?query=pancreaticu ltiple%20myeloma accessed Apr. 9, 2021).

Merritt et al., "Analysis of EphA2 expression and mutant p53 in ovarian carcinoma," Cancer Biol Ther., Oct. 2006, 5(10):1357-1360.

Michel, et al., "Expression of soluble CD137 correlates with activation-induced cell death of lymphocytes." Cytokine, 2000, 12(6):742-746.

Milowsky et al., Phase 1/2 multiple ascending dose trial of the prostate-specific membrane antigen-targeted antibody drug conjugate MLN2704 in metastatic castration-resistant prostate cancer. In Urologic Oncology: Seminars and Original Investigations, 2016, 34(12):530-e15.

Mitra et al., "Structure—Activity Relationship Analysis of Peptides Targeting the EphA2 Receptor," Biochemistry, 2010, 49(31):6687-6695.

Mittler, et al., "Anti-CD137 antibodies in the treatment of autoimmune disease and cancer." Immunologic research, 2004, 29:197-208.

Miyoshi and Takai, "Nectin and nectin-like molecules: biology and pathology," Am J Nephrol., 2007, 27(6):590-604.

Mohammad et al., Prognostic value of membrane type 1 and 2 matrix metalloproteinase expression and gelatinase A activity in bladder cancer. The International journal of biological markers, 2010, 25(2):69-74.

Moore et al., "A novel bispecific antibody format enables simultaneous bivalent and monovalent co-engagement of distinct target antigens", Mabs, 2011, 3(6):546-557.

Moraes et al., "Immune checkpoint inhibitors (anti PD-1 or anti PD-L1) versus. Chemotherapy for second- or third-line treatment of metastatic non-small cell lung cancer," Cochrane Database Syst Rev., 2017, 2017(4):CD012644.

Moretta et al., "Surface NK receptors and their ligands on tumor cells", Seminars in Immunology, 2006, 18(3):151-158.

Morgan et al., "FcgammaRIIIA-158V and rheumatoid arthritis: a confirmation study", Rheumatology (Oxford), 2003, 42(4):528-533.

Morra et al., "CD38 is functionally dependent on the TCR/CD3 complex in human T cells," FASEB J., May 1998, 12(7):581-592.

Morrison, "Chemical Strategies for Bicyclic Peptide Formation," Univ. of Leeds, Sep. 2015, pp. 1-60.

Mudali et al., "Patterns of EphA2 protein expression in primary and metastatic pancreatic carcinoma and correlation with genetic status", Clinical & Experimental Metastasis, 2006, 23(7-8):357-365.

Mudd et al., "Identification and Optimization of EphA2-Selective Bicycles for the Delivery of Cytotoxic Payloads," J Med Chem., 2020, 63(8):4107-4116.

Mugera and Ward, "Acute toxicity of maytansine in F344 rats." Cancer Treatment Reports, 1977, 61(7):1333-1338.

Mulder et al., "Scaffold Optimization in Discontinuous Epitope Containing Protein Mimics of gp120 Using Smart Libraries," Org. Biomol. Chem., 2013, 11:2676-2684.

Mullis et al., "Specific synthesis of DNA in vitro via a polymerase-catalyzed chain reaction," Methods in Enzymology, Jan. 1987, 155:335-350.

Muta et al., "A 13-amino-acid motif in the cytoplasmic domain of Fc gamma RIIB modulates B-cell receptor signalling", Nature, Mar. 3, 1994, 368(6466):70-73.

Nabbe et al., "Coordinate expression of activating Fc gamma receptors I and III and inhibiting Fc gamma receptor type II in the determination of joint inflammation and cartilage destruction during immune complex-mediated arthritis", Arthritis & Rheumatology, Jan. 2003, 48(1):255-265.

Nair et al., "Mimicry of Native Peptide Antigens by the Corresponding Retro-Inverso Analogs is Dependent on Their Intrinsic Structure and Interaction Propensities," The Journal of Immunology, 2003, 170(3):1362-1373.

Nakamoto and Bergemann, "Diverse roles for the Eph family of receptor tyrosine kinases in carcinogenesis," Microsc Res Tech., Oct. 2002, 59(1):58-67.

Nakamura et al., "EPHA2/EFNA1 expression in human gastric cancer", Cancer Science, Jan. 2005, 96(1):42-47.

Nakamura et al., "Involvement of alpha(v)beta3 integrins in osteoclast function," J Bone Miner Metab., 2007, 25(6):337-344.

Nakanishi et al., "Overexpression of B7-H1 (PD-L1) significantly associates with tumor grade and postoperative prognosis in human urothelial cancers" Cancer Immunology, Immunotherapy, 2007, 56:1173-1182.

(56) References Cited

OTHER PUBLICATIONS

Nam et. al., "The therapeutic potential of 4-1BB (CD137) in cancer", Current cancer drug targets, 2005, 5(5):357-363.
Nan et al., "Dual function glutamate-related ligands: discovery of a novel, potent inhibitor of glutamate carboxypeptidase II possessing mGluR3 agonist activity," J Med Chem., Mar. 9, 2000, 43(5):772-774.
National cancer institute, "Cancer prevention overview", (https://www.cancer.gov/about-cancer/causes-prevention/patient-prevention-overview-pdq accessed May 8, 2020), 2020, 12 pages.
National Cancer Institute, "What is Cancer", (https://www.cancer.gov/about-cancer/understanding/what-is-cancer, accessed Apr. 9, 2021), 10 pages.
National Cancer Institute, Understanding Cancer and Related Topics, (https://www.cancer.gov/about-cancer/understanding/what-is-cancer, accessed Apr. 9, 2021).
Nayyar et al., "Overcoming Resistance to Natural Killer Cell Based Immunotherapies for Solid Tumors", Feb. 11, 2019;9:51, 28 pages.
Neri and Supuran, "Interfering with pH regulation in tumours as a therapeutic strategy," Nature Review Drug Discovery, Sep. 2011, 10(10):767-777.
Nestor et al., "The Medicinal Chemistry of Peptides," Curr. Medicinal Chem, 2009, 16(33): 4399-4418.
Nguyen, "Colorectal Cancer," Merck Manual, Retrieved from https://www.merckmanuals.com/professional/gastrointestinal-disorders/tumors-of-the-gastrointestinal-tract/colorectal-cancer, 2021.
Nguyen, "Pancreatic Cancer", Merck Manual (https://merckmanuals.com/professional/gastrointestinal-disorders/tumors-of-the-gastrointestinal-tract/pancreatic-cancer?query=adenocarcinomas), Sep. 2022, 4 pages.
NIH National Human Genome Research Institute, "Animal Model," Genome.gov., Jan. 4, 2022.
Nishiwada et al., "Nectin-4 expression contributes to tumor proliferation, angiogenesis and patient prognosis in human pancreatic cancer," Journal of Experimental & Clinical Cancer Research, 2015, 34(1):30. (9 pages.).
Nissim et al., "Antibody fragments from a 'single pot' phage display library as immunochemical reagents," EMBO Journal, Feb. 1994, 13(3):692-698.
Nomi et al., "Clinical Significance and Therapeutic Potential of the Programmed Death-1 Ligand/Programmed Death-1 Pathway in Human Pancreatic Cancer", Clin Cancer Res., 2007, 13(7): 2151-2157.
Oehlke et al., "Cellular uptake of an alpha-helical amphipathic model peptide with the potential to deliver polar compounds into the cell interior non-endocytically," Biochimica et Biophysica Acta, Nov. 1998, 1414(1-2):127-139.
Okazaki et al., "A Rheostat for Immune Responses: The Unique Properties of PD-1 and Their Advantages for Clinical Application," Nat. Immunol., 2013, 14(12):1212-1218.
Okuyama et al., "Small-molecule mimics of an a-helix for efficient transport of proteins into cells," Nature Methods, Feb. 2007, 4(2):153-159.
Oliver et al., "Mouse CD38 is down-regulated on germinal center B cells and mature plasma cells," J Immunol., Feb. 1997, 158(3):1108-1115.
Ortiz et al., "Elucidating the interplay between IgG-Fc valency and FcγR activation for the design of immune complex inhibitors", Science Translational Medicine, Nov. 2016, 8(365):365ra158.
Pahwa et al., "Monitoring and inhibiting MT1-MMP during cancer initiation and progression." Cancers, 2014, 6(1):416-435.
Partida-Sanchez et al., "Cyclic ADP-ribose production by CD38 regulates intracellular calcium release, extracellular calcium influx and chemotaxis in neutrophils and is required for bacterial clearance in vivo," Nat Med., Nov. 2001, 7(11):1209-1216.
Partida-Sanchez et al., "Regulation of dendritic cell trafficking by the ADP-ribosyl cyclase CD38: impact on the development of humoral immunity," Immunity, Mar. 2004, 20(3):279-291.

Pasero et al., "Highly effective NK cells are associated with good prognosis in patients with metastatic prostate cancer", Oncotarget 6(16), Jun. 10, 2015, 14360-14373.
Pavlidou et al., "Nanodiscs Allow Phage Display Selection for Ligands to Non-Linear Epitopes on Membrane Proteins," PLoS One, Article No. e72272, Sep. 2013, 8(9):8 pages.
Pavlova et al., "A role for PVRL4-driven cell-cell interactions in tumorigenesis," Elife., Apr. 30, 2013, 2:e00358, 24 pages.
Pearson et al., "High-Level Clonal FGFR Amplification and Response to FGFR Inhibition in a Translational Clinical Trial", Cancer Discovery, 2016, 6(8):838-851.
Peng et al., Combined features based on MT1-MMP expression, CD11b+ immunocytes density and LNR predict clinical outcomes of gastric cancer. Journal of translational medicine, 2013, 11(1):1-11.
Phichith, et al., "Novel peptide inhibiting both TEM-1 β-lactamase and penicillin-binding proteins." The FEBS Journal, 2010, 277(23):4965-4972.
Pickens et al., "Practical Considerations, Challenges and Limitations of Bioconjugation via Azide-Alkyne Cycloaddition," Bioconjugate Chem., 2018, 29:686-701.
Pietraszek et al., "Lumican: a new inhibitor of matrix metalloproteinase-14 activity," FEBS Lett., Nov. 28, 2014, 588(23):4319-4324.
Pivot et al., "Pooled analyses of eribulin in metastatic breast cancer patients with at least one prior chemotherapy." Annals of Oncology, 2016, 27(8):1525-1531.
Platonova et al., "Profound coordinated alterations of intratumoral NK cell phenotype and function in lung carcinoma", Cancer Res., 2011, 71(16):5412-5422.
Polakis, "Antibody Drug Conjugates for Cancer Therapy," Pharmacol Rev., Jan. 2016, 68(1):3-19.
Poliakov et al., "Diverse roles of eph receptors and ephrins in the regulation of cell migration and tissue assembly", Developmental Cell, Oct. 2004;7(4):465-480.
Poon et al., Preclinical safety profile of trastuzumab emtansine (T-DM1): mechanism of action of its cytotoxic component retained with improved tolerability. Toxicology and applied pharmacology, 2013, 273(2):298-313.
Poreba, "Protease-activated prodrugs: strategies, challenges, and future directions." The FEBS Journal, 2020, 287(10):1936-1969.
Pricop et al., "Differential modulation of stimulatory and inhibitory Fc gamma receptors on human monocytes by Th1 and Th2 cytokines", Journal of Immunology, 2001, 166(1):531-537.
Purdie and Benoiton, "Piperazinedione formation from esters of dipeptides containing glycine, alanine, and sarcosine: the kinetics in aqueous solution." Journal of the Chemical Society, Perkin Transactions 2, 1973, 14: 1845-1852.
Qi et al., "Serial determination of glomerular filtration rate in conscious mice using FITC-inulin clearance," American Journal of Physiology—Renal Physiology, Mar. 2004, 286(3):F590-F596.
Ramirez et al., "Defining causative factors contributing in the activation of hedgehog signaling in diffuse large B-cell lymphoma," Leuk Res., Oct. 2012, 36(10):1267-1273.
Randall et al., "Expression of murine CD38 defines a population of long-term reconstituting hematopoietic stem cells," Blood, May 15, 1996, 87(10):4057-4067.
Rataj et al., "High-affinity CD16-polymorphism and Fc-engineered antibodies enable activity of CD 16-chimeric antigen receptor-modified T cells for cancer therapy", British Journal of Cancer, 2019, 120(1):79-87.
Ravetch et al., "IgG Fc receptors", Annual Review of Immunology, 2001:19:275-290.
Reagan-Shaw et al., "Dose translation from animal to human studies revisited," FASEB J., Mar. 2008, 22(3):659-661.
Reinertsen et al., "B-Lymphocyte Alloantigens Associated with Systemic Lupus Erythematosus," The New England Journal of Medicine, Sep. 7, 1978, 299(10):515-518.
Remacle et al., "Membrane type I-matrix metalloproteinase (MT1-MMP) is internalised by two different pathways and is recycled to the cell surface." Journal of cell science, 2003, 116(19):3905-3916.
Remacle et al., "Novel MT1-MMP small-molecule inhibitors based on insights into hemopexin domain function in tumor growth," Cancer Res., May 1, 2012, 72(9):2339-2349.

(56) References Cited

OTHER PUBLICATIONS

Rhodes and Pei, "Bicyclic Peptides as Next-Generation Therapeutics," Chemistry, Sep. 18, 2017, 23(52):12690-12703.
Ridderstad and Tarlinton, "Kinetics of establishing the memory B cell population as revealed by CD38 expression," J Immunol., May 15, 1998, 160(10):4688-4695.
Riddle et al., "Tumor cell surface display of immunoglobulin heavy chain Fc by gene transfer as a means to mimic antibody therapy", Human Gene Therapy, 2005, 16(7):830-844.
Robert Gale, "Cancer treatment principles", Merck Manual consumer version (https://www.merckmanuals.com/home/cancer/prevention-and-treatment-of-cancer/cancer-treatment-principles?query=Cancer%20treatment Accessed May 8, 2020), Jul. 2018, 2 pages.
Robert Gale, "Overview of Cancer therapy", Merck Manual consumer version (https://www.merckmanuals.com/professional/hematology-and-oncology/principles-of-cancer-therapy/overview-of-cancer-therapy?query=Cancer Accessed May 8, 2020), Jul. 2018, 3 pages.
Robinson et al., "Integrative Clinical Genomics of Advanced Prostate Cancer", Cell, 2015, 161(5):1215-1228.
Rocca et al., "Phenotypic and Functional Dysregulated Blood NK Cells in Colorectal Cancer Patients Can Be Activated by Cetuximab Plus IL-2 or IL-15", Frontiers in Immunology, 2016, 7:413.
Rodan and Rodan, "Integrin function in osteoclasts," J Endocrinol., Sep. 1997, 154(Suppl):S47-S56.
Rodon et al., "Cantuzumab mertansine in a three-times a week schedule: a phase and pharmacokinetic study." Cancer chemotherapy and pharmacology, 2008, 62(5):911-919.
Ross and Christiano, "Nothing but skin and bone," J Clin Invest., May 2006, 116(5):1140-1149.
Ross et al., "Bispecific T Cell Enager (BiTE) Antibody Constructs Can Mediate Bystander Tumor Cell Killing", PLoS ONE, Aug. 24, 2017, 12(8):1-24.
Rostovtsev et al., "A Stepwise Huisgen Cycloaddition Process: Copper(I)-Catalyzed Regioselective "Ligation" of Azides and Terminal Alkynes," Angewandte Chemie, Jul. 2002, 41(14):2596-2599.
Roth et al., "Docetaxel, cisplatin, and fluorouracil; docetaxel and cisplatin; and epirubicin, cisplatin, and fluorouracil as systemic treatment for advanced gastric carcinoma: a randomized phase II trial of the Swiss Group for Clinical Cancer Research", J Clin Oncol. Aug. 1, 2007, 25(22):3217-3023.
Rothwell et al., "Utility of ctDNA to support patient selection for early phase clinical trials: the TARGET study", Nature Medicine, 2019, 25(5):738-743.
Rudgers et al., "Binding properties of a peptide derived from beta-lactamase inhibitory protein." Antimicrob Agents Chemother., 2001, 45(12):3279-3286.
Salmon et al., "Human receptors for immunoglobulin G: key elements in the pathogenesis of rheumatic disease", Arthritis & Rheumatology, 2001, 44(4):739-750.
Satoh et al., "Experimental allergic encephalomyelitis mediated by murine encephalitogenic T cell lines specific for myelin proteolipid apoprotein," Journal of Immunology, Jan. 1987, 138(1):179-184.
Sausville and Burger, "Contributions of Human Tumor Xenografts to Anticancer Drug Development," Cancer Res., 2006, 66(7):3351-3354.
Scagliotti et al., "Phase III study comparing cisplatin plus gemcitabine with cisplatin plus pemetrexed in chemotherapy-naive patients with advanced-stage non-small-cell lung cancer." Journal of clinical oncology, 2008, 26(21):3543-3551.
Schiller et al., "Comparison of four chemotherapy regimens for advanced non-small-cell lung cancer." New England Journal of Medicine, 2002, 346(2):92-98.
Schreiber et al., "Rapid, electrostatically assisted association of proteins," Nature Structural & Molecular Biology, May 1996, 3:427-431.
Schulke et al., "The homodimer of prostate-specific membrane antigen is a functional target for cancer therapy," Proc Natl Acad Sci U SA., Oct. 28, 2003, 100(22):12590-12595.
Seely and Frazier, "Regulatory Forum Opinion Piece *: Dispelling Confusing Pathology Terminology: Recognition and Interpretation of Selected Rodent Renal Tubule Lesions," Toxicol Pathol., 2015, 43(4):457-463.
Segal et al., "Results from an Integrated Safety Analysis of Urelumab, an Agonist Anti-CD137 Monoclonal Antibody", clinical Cancer research, 2017, 23(8):1929-1936.
Seiki et al., "Membrane-type 1 matrix metalloproteinase: a key enzyme for tumor invasion." Cancer letters, 2003, 194(1):1-11.
Sepiashvili et al., "Potentially novel candidate biomarkers for head and neck squamous cell carcinoma identified using an integrated cell line-based discovery strategy." Molecular & Cellular Proteomics, 2012, 11(11):1404-1415.
Shaabani et al., "A patent review on PD-1/PD-L 1 antagonists: small molecules, peptides, and macrocycles (2015-2018)," Expert Opinion on Therapeutic Patents, 2018, 28(9):665-678.
Shah et al., "Phase I study of IMGN901, a CD56-targeting antibody-drug conjugate, in patients with CD56-positive solid tumors." Investigational new drugs, 2016, 34:290-299.
Shah, "Update on metastatic gastric and esophageal cancers." Journal of clinical oncology 33, No. 16 (2015): 1760-1769.
Shao et al., "Copy number variation is highly correlated with differential gene expression: a pan-cancer study," BMC Medical Genetics, Nov. 9, 2019, 20(1):175.
Shao et al., "CD137 ligand, a member of the tumor necrosis factor family, regulates immune responses via reverse signal transduction." Journal of leukocyte biology, 2011, 89(1):21-29.
Sharma et al., "Plasmacytoid dendritic cells from mouse tumor-draining lymph nodes directly activate mature Tregs via indoleamine 2, 3-dioxygenase", The Journal of clinical investigation, 2007, 117(9):2570-2582.
Shen et al., "Non-clinical disposition and metabolism of DM1, a Component of Trastuzumab Emtansine (T-DM1), in Sprague Dawley Rats." Drug Metabolism Letters, 2015, 9(2):119-131.
Shen, et.al., "Evaluation of phage display discovered peptides as ligands for prostate-specific membrane antigen (PSMA)." PLoS One, 2013, 8(7):e68339.
Shi et al., "One-Bead-Two-Compound Thioether Bridged Macrocyclic (gamma)-AApeptide Screening Library Against EphA2," J Med Chem., Nov. 22, 2017, 60(22):9290-9298.
Shimauchi et al., "Augmented expression of programmed death-1 in both neoplastic and non-neoplastic CD4+ T-cells in adult T-cell leukemia/lymphoma", International journal of cancer, 2007, 121(12):2585-2590.
Sibaud et al., "Pigmentary disorders induced by anticancer agents. Part I: chemotherapy." In Annales de dermatologie et de venereologie, 2013, 140(3):183-196.
Siddharth et al., "Nectin-4 is a breast cancer stem cell marker that induces WNT/β-Catenin signaling via Pi3k/Akt axis," International Journal of Biochemistry and Cell Biology, 2017, 89:85-94.
Silver, "Multi-targeting by monotherapeutic antibacterials." Nat Rev Drug Discov., 2007, 6(1):41-55.
Smeenk et al., "Reconstructing the Discontinuous and Conformational β1/β3-Loop Binding Site on hFSH/hCG by Using Highly Constrained Multicyclic Peptides." ChemBioChem, 2015, 16(1):91-99.
Soderstrom, et al., "CD137: A checkpoint regulator involved in atherosclerosis." Atherosclerosis, 2018, 272:66-72.
Sordo-Bahamonde et al., "Mechanisms of Resistance to NK Cell Immunotherapy", Cancers (Basel). Apr. 7, 2020, 12(4):893.
Sounni et al."MT1-MMP expression promotes tumor growth and angiogenesis through an up-regulation of vascular endothelial growth factor expression" FASEB J., 2002, 16(6):555-564.
Sporn et at, "Chemoprevention of cancer." Carcinogenesis, 2000, 21(3):525-530.
Stathis et al., "A Phase I Study of IMGN529, an Antibody-Drug Conjugate (ADC) Targeting CD37, in Adult Patients with Relapsed or Refractory B-Cell Non-Hodgkin's Lymphoma (NHL)," Blood, 2014, 124(21):1760.
Steck et al., "Inside-out red cell membrane vesicles: preparation and purification," Science, Apr. 10, 1970, 168(3928):255-257.
Stein et al., "Eph receptors discriminate specific ligand oligomers to determine alternative signaling complexes, attachment, and assembly responses", Genes Development, 1998, 12(5):667-678.

(56) References Cited

OTHER PUBLICATIONS

Stevenson et al., "Preliminary studies for an immunotherapeutic approach to the treatment of human myeloma using chimeric anti-CD38 antibody," Blood, Mar. 1, 1991, 77(5):1071-1079.
Stojanovic et al., "Natural killer cells and solid tumors", Journal of Innate Immunity, 2011, 3(4):355-364.
Stringaris et al., "Leukemia-induced phenotypic and functional defects in natural killer cells predict failure to achieve remission in acute myeloid leukemia", Haematologica, May 2014, 99(5):836-847.
Strome et al., "B7-H1 blockade augments adoptive T-cell immunotherapy for squamous cell carcinoma", Cancer Res., 2003, 63(19):6501-6505.
Stuart et al., "Collagen Autoimmune Arthritis," Annual Review of Immunology, 1984, 2:199-218.
Sun et al., "Carbohydrate and protein immobilization onto solid surfaces by sequential Diels-Alder and azide-alkyne cycloadditions," Bioconjugate Chemistry, Jan.-Feb. 2006, 17(1):52-57.
Sun et al., "NK cell receptor imbalance and NK cell dysfunction in HBV infection and hepatocellular carcinoma", Cellular & Molecular Immunology, May 2015, 12(3):292-302.
Suojanen et al., "A novel and selective membrane type-1 matrix metalloproteinase (MT1-MMP) inhibitor reduces cancer cell motility and tumor growth," Cancer Biology & Therapy, Dec. 2009, 8(24):2362-2370.
Supuran, "Carbonic anhydrases: novel therapeutic applications for inhibitors and activators," Nature Reviews Drug Discovery, Feb. 2008, 7(2): 168-181.
Tandon et al., "Emerging strategies for EphA2 receptor targeting for cancer therapeutics" Expert Opinion on Therapeutic Targets, 2011, 15(1):31-51.
Tarazona et al., "Current progress in NK cell biology and NK cell-based cancer immunotherapy", Cancer Immunol Immunother, 2020, 69(5):879-899.
Tasch et al., "A unique folate hydrolase, prostate-specific membrane antigen (PSMA): a target for immunotherapy?", Crit Rev Immunol., 2001, 21(1-3):249-261.
Teitelbaum, "Osteoclasts, integrins, and osteoporosis," J Bone Miner Metab., Oct. 2000, 18(6):344-349.
Teitelbaum, "Osteoporosis and Integrins," The Journal of Clinical Endocrinology & Metabolism, Apr. 2005, 90(4):2466-2468.
Teti et al., "The Role of the AlphaVbeta3 Integrin in the Development of Osteolytic Bone Metastases: A Pharmacological Target for Alternative Therapy?", Calcified Tissue International, Oct. 2002, 71(4):293-299.
Tetu et al., "The influence of MMP-14, TIMP-2 and MMP-2 expression on breast cancer prognosis." Breast Cancer Research, 2006, 8(3):1-9.
Teufel et al., "Backbone-driven collapse in unfolded protein chains," J Mol Biol., Jun. 3, 2011, 409(2):250-262.
Thake et al., "Toxicity of Maytansine (NSC 153858) in dogs and monkeys." PB-US National Technical Information Service (1975), Feb. 1975, 244628.
Thevenard et al., "The YSNSG cyclopeptide derived from tumstatin inhibits tumor angiogenesis by down-regulating endothelial cell migration." International journal of cancer, 2010, 126(5):1055-1066.
Thompson et al., "Costimulatory B7-H1 in renal cell carcinoma patients: Indicator of tumor aggressiveness and potential therapeutic target", Proceedings of the National Academy of Sciences, 2004, 101(49): 17174-17179.
Timmerman et al., "Rapid and Quantitative Cyclization of Multiple Peptide Loops onto Synthetic Scaffolds for Structural Mimicry of Protein Surfaces," ChemBioChem, 2005, 6(5):821-824.
Todisco et al., "CD38 ligation inhibits normal and leukemic myelopoiesis," Blood, Jan. 2000, 95(2):535-542.
Tolcher et al., "Cantuzumab mertansine, a maytansinoid immunoconjugate directed to the CanAg antigen: a phase I, pharmacokinetic, and biologic correlative study." Journal of clinical oncology, 2003, 21(2):211-222.

Toogood, "Small Molecule Immuno-oncology Therapeutic Agents," Bioorganic & Medicinal Chemistry Letters, 2018, 28(3):319-329.
Touati et al., "Phage Selection of Bicyclic Peptide Ligands and Development of a New Peptide Cyclisation Method", Theses No. 5536, Oct. 2012, 117 pages.
Trouche et al., "Small multivalent architectures mimicking homotrimers of the TNF superfamily member CD40L: delineating the relationship between structure and effector function." Journal of the American Chemical Society, 2007, 129(44):13480-13492.
Trudel et al., "Membrane-type-1 matrix metalloproteinase, matrix metalloproteinase 2, and tissue inhibitor of matrix proteinase 2 in prostate cancer: identification of patients with poor prognosis by immunohistochemistry." Human pathology, 2008, 39(5):731-739.
Tugyi et aL, "Partial D-amino acid substitution: Improved enzymatic stability and preserved Ab recognition of a MUC2 epitope peptide," Proceedings of the National Academy of Sciences U.S.A., Jan. 2005, 102(2):413-418.
Tutt et al., "Abstract S3-01: the TNT trial: a randomized phase III trial of carboplatin (C) compared with docetaxel (D) for patients with metastatic or recurrent locally advanced triple negative or BRCA1/2 breast cancer (CRUK/07/012)." Cancer Research, May 2015, 75(9_Suppl):S3-01.
Uckun, "Regulation of human B-cell ontogeny," Blood, Nov. 1990, 76(10):1908-1923.
Ulasov et al., "Inhibition of MMP 14 potentiates the therapeutic effect of temozolomide and radiation in gliomas." Cancer medicine, 2013, 2(4):457-467.
Ün, Sanya. Charakterisierung von Peptiden für die Bindung essentieller Penicillin-bindender Proteine und die Variationen der Linkerlänge einzelkettiger TetR Varianten. Friedrich-Alexander-Universitaet Erlangen-Nuernberg (Germany), 2010. 139 pages.
Upadhyaya, "Activation of CD137 using multivalent and tumor targeted Bicyclic peptides." Cancer Research, Jul. 2019, 79(13 Suppl):3257-3257.
Van Eden et al., "Cloning of the mycobacterial epitope recognized by T lymphocytes in adjuvant arthritis," Nature, Jan. 14, 1988, 331(6152):171-173.
Van Glabbeke et al., "Progression-free rate as the principal endpoint for phase II trials in soft-tissue sarcomas." European Journal of Cancer, 2002, 38(4):543-549.
Vandenbroucke and Libert, "Is there new hope for therapeutic matrix metalloproteinase inhibition?." Nature reviews Drug discovery, 2014, 13(12):904-927.
Walker-Daniels et al., "Overexpression of the EphA2 tyrosine kinase in prostate cancer", Prostate, 1999, 41(4):275-280.
Wallbrecher et al., "Exploration of the design principles of a cell-penetrating bicylic peptide scaffold," Bioconjug Chem., May 21, 2014, 25(5):955-964.
Wang et al., "Co-expression of MMP-14 and MMP-19 predicts poor survival in human glioma." Clinical and Translational Oncology, 2013, 15:139-145.
Wang et al., "MMP-14 overexpression correlates with poor prognosis in non-small cell lung cancer." Tumor Biology, 2014, 35:9815-9821.
Wang et al., "Probing for Integrin $\alpha v \beta 3$ Binding of RGD Peptides Using Fluorescence Polarization," Bioconjugate Chem., May-Jun. 2005, 16(3):729-734.
Wang, "An exact mathematical expression for describing competitive binding of two different ligands to a protein molecule." FEBS letters, 1995, 360(2):111-114.
Watanabe et al., "NK cell dysfunction with down-regulated CD16 and up-regulated CD56 molecules in patients with esophageal squamous cell carcinoma", Diseases of the Esophagus, 2010, 23(8):675-681.
Waterhouse et al., "Safety profile of nivolumab administered as 30-min infusion: analysis of data from CheckMate 153," Cancer Chemother Pharmacol., Apr. 2018, 81(4):679-686.
Watts, "TNF/TNFR family members in costimulation of T cell responses", Annu. Rev, Immunol., Apr. 2005, 23:23-68.
Weber, J. "Immune Checkpoint Proteins: A New Therapeutic Paradigm for Cancer-Preclinical Background: CTLA-4 and PD-1 Blockade", Seminars in Oncology, Oct. 2010, 37(5):430-439.

(56) References Cited

OTHER PUBLICATIONS

Wei et al., "Discovery of Peptidomimetic Antibody-Drug Conjugate Linkers with Enhanced Protease Specificity," J. Med. Chem., 2018, 61(3):989-1000.
Wind et al., "Measuring carbonic anhydrase IX as a hypoxia biomarker: differences in concentrations in serum and plasma using a commercial enzyme-linked immunosorbent assay due to influences of metal ions," Annals of Clinical Biochemistry, Mar. 2011, 48(2):112-120.
Winter et al., "Making antibodies by phage display technology," Annual Review of Immunology, 1994, 12:433-455.
Wu et aL, "Structures of the CXCR4 chemokine GPCR with small-molecule and cyclic peptide antagonists," Science, Nov. 2010, 330(6007):1066-1071.
Wu et al., "A novel polymorphism of FcgammaRIIIa (CD16) alters receptor function and predisposes to autoimmune disease", The Journal of Clinical Investigation, 1997, 100(5):1059-1070.
Wu et al., "Design and Characterization of Novel EphA2 Agonists for Targeted Delivery of Chemotherapy to Cancer Cells," Chem. Biol., 2015, 22(7):876-887.
Wu et al., "Natural killer cells in cancer biology and therapy", Molecular Cancer, Aug. 6, 2020, 19(1):120, 26 pages.
Wu et al., "Immunohistochemical localization of programmed death-1 ligand-1 (PD-L1) in gastric carcinoma and its clinical significance" Acta histochemica, 2006, 108(1):19-24.
Wykosky et al., "EphA2 as a novel molecular marker and target in glioblastoma multiforme", Molecular Cancer Research, Oct. 2005, 3(10):541-551.
Xiong et al., "Crystal structure of the extracellular segment of integrin αVβ3 in complex with an Arg-Gly-Asp Ligand", Science, Apr. 2002, 296(5565):151-155.
Yang et al., "Overexpression of EphA2, MMP-9, and MVD-CD34 in hepatocellular carcinoma: Implications for tumor progression and prognosis," Hepatol Res., 2009, 39(12):1169-1177.
Yardley et al., "EMERGE: a randomized phase II study of the antibody-drug conjugate glembatumumab vedotin in advanced glycoprotein NMB-expressing breast cancer." Journal of clinical oncology: official journal of the American Society of Clinical Oncology, 2015, 33(14):1609.
Yoon et al., "An efficient strategy for cell-based antibody library selection using an integrated vector system," BMC Biotechnology, 2012, 12(62):10 pages.
Yoshihara et al., "Tags for labeling protein N-termini with subtiligase for proteomics," Bioorganic & Medicinal Chemistry Letters, Nov. 2008, 18(22):6000-6003.
Yu and Taylor, "A new strategy applied to the synthesis of an α-helical bicyclic peptide constrained by two overlapping i, i+ 7 side-chain bridges of novel design." Tetrahedron letters, 1996, 37(11):1731-1734.
Yuan et al., "Neuropilin-1 and the development progress of the same as a therapeutic target for malignant tumors," Tumor, 2016, 36:358-364.
Yuan et al., "Over-expression of EphA2 and EphrinA-1 in human gastric adenocarcinoma and its prognostic value for postoperative patients," Dig Dis Sci., Nov. 2009, 54(11):2410-2417.
Zarrabi et al., "Inhibition of matrix metalloproteinase 14 (MMP-14)-mediated cancer cell migration." Journal of Biological Chemistry, 2011, 286(38):33167-33177.
Zelinski et al., "EphA2 Overexpression Causes Tumorigenesis of Mammary Epithelial Cells," Cancer research, Mar. 2001, 61(5):2301-2306.
Zervosen et al., "Development of New Drugs for an Old Target-The Penicillin Binding Proteins." Molecules. 2012:17 (11);12478-12505.
Zhang et al., "A new anti-HER2 antibody that enhances the anti-tumor efficacy of trastuzumab and pertuzumab with a distinct mechanism of action", Mol Immunol., 2020, 119:48-58.
Zhang et al., "FCGR2A and FCGR3A Polymorphisms Associated with Clinical Outcome of Epidermal Growth Factor Receptor-Expressing Metastatic Colorectal Cancer Patients Treated With Single-Agent Cetuximab", Journal of Clinical Oncology, 2007, 25(24):3712-3718.
Zhao et al., "Structural basis of specificity of a peptidyl urokinase inhibitor, upain-1," Journal of Structural Biology, Oct. 2007, 160(1):1-10.
Zhou et al., "Significance of semaphorin-3A and MMP-14 protein expression in non-small cell lung cancer", Oncology letters, 2014, 7(5):1395-1400.
Zhu et al., "High-affinity peptide against MT1-MMP for in vivo tumor imaging." Journal of controlled release, 2011, 150(3):248-255.
Zhuang et al., "Elevation of receptor tyrosine kinase EphA2 mediates resistance to trastuzumab therapy," Cancer Res., Jan. 1, 2010, 70(1):299-308.
Zilber et al., "CD38 expressed on human monocytes: a coaccessory molecule in the superantigeninduced proliferation," Proc Natl Acad Sci US A., Mar. 14, 2000, 97(6):2840-2845.
Zou et al., "PD-L1 (B7-H1) and PD-1 Pathway Blockade for Cancer Therapy: Mechanisms, Response Biomarkers and Combinations," Sci. Transl. Med., 2016, 8(328):328rv4., 1-14.
Zubiaur et al., "CD38 Ligation Results in Activation of the Raf-1/Mitogen-Activated Protein Kinase and the CD3-zeta/zeta-Associated Protein-70 Signaling Pathways in Jurkat T Lymphocytes," J Immunol., Jul. 1, 1997, 159(1):193-205.
Zugazagoitia et al., "Current Challenges in Cancer Treatment," Clinical Therapies, 2016, 38(7):1551-1566.
Zupo et al., "CD38 signaling by agonistic monoclonal antibody prevents apoptosis of human germinal center B cells," Eur J Immunol., May 1994, 24(5):1218-1222.
PCT International Preliminary Report on Patentability received for PCT/EP2017/083953, dated Jul. 4, 2019, 7 pages.
PCT International Preliminary Report on Patentability received for PCT/EP2017/083954, dated Jul. 4, 2019, 7 pages.
PCT International Preliminary Report on Patentability received for PCT/EP2019/066010, dated Dec. 30, 2020, 9 pages.
PCT International Preliminary Report on Patentability received for PCT/EP2019/066066, dated Dec. 30, 2020, 8 pages.
PCT International Preliminary Report on Patentability received for PCT/EP2019/066273, dated Dec. 30, 2020, 8 pages.
PCT International Preliminary Report on Patentability received for PCT/EP2021/072866, dated Mar. 2, 2023, 13 pages.
PCT International Preliminary Report on Patentability received for PCT/GB2015/053247, dated May 11, 2017, 8 pages.
PCT International Preliminary Report on Patentability received for PCT/GB2018/050017, dated Jul. 18, 2019, 8 pages.
PCT International Preliminary Report on Patentability received for PCT/GB2018/052222, dated Feb. 13, 2020, 7 pages.
PCT International Preliminary Report on Patentability received for PCT/GB2019/050485, dated Sep. 3, 2020, 8 pages.
PCT International Preliminary Report on Patentability received for PCT/GB2019/053537, dated Jun. 24, 2021, 7 pages.
PCT International Preliminary Report on Patentability received for PCT/GB2019/053679, dated Jul. 1, 2021, 7 pages.
PCT International Preliminary Report on Patentability received for PCT/GB2019/053680, dated Jul. 1, 2021, 7 pages.
PCT International Preliminary Report on Patentability received for PCT/GB2020/050069, dated Jul. 29, 2021, 8 pages.
PCT International Preliminary Report on Patentability received for PCT/GB2020/050070, dated Jul. 29, 2021, 11 pages.
PCT International Preliminary Report on Patentability received for PCT/GB2020/050071, dated Jul. 29, 2021, 7 pages.
PCT International Preliminary Report on Patentability received for PCT/GB2020/050072, dated Jul. 29, 2021, 11 pages.
PCT International Preliminary Report on Patentability received for PCT/GB2020/050073, dated Jul. 29, 2021, 8 pages.
PCT International Preliminary Report on Patentability received for PCT/GB2020/050074, dated Jul. 29, 2021, 14 pages.
PCT International Preliminary Report on Patentability received for PCT/GB2020/052058, dated Mar. 10, 2022, 8 pages.
PCT International Preliminary Report on Patentability received for PCT/GB2020/052590, dated Apr. 28, 2022, 7 pages.

(56) References Cited

OTHER PUBLICATIONS

PCT International Preliminary Report on Patentability received for PCT/GB2021/050490, dated Sep. 9, 2022, 9 pages.
PCT International Preliminary Report on Patentability received for PCT/GB2021/050491, dated Sep. 9, 2022, 10 pages.
PCT International Preliminary Report on Patentability received for PCT/GB2022/050043, dated Jul. 20, 2023, 13 pages.
PCT International Preliminary Report on Patentability received for PCT/EP2018/060498, dated Nov. 7, 2019. 8 Pages.
PCT International Preliminary Report on Patentability received for PCT/EP2019/065993, dated Dec. 30, 2020, 7 pages.
PCT International Preliminary Report on Patentability received for PCT/GB2017/053560, dated Jun. 6, 2019, 7 pages.
PCT International Preliminary Report on Patentability received for PCT/GB2018/051779, dated Jan. 9, 2020, 6 pages.
PCT International Preliminary Report on Patentability received for PCT/GB2018/053676, dated Jul. 2, 2020, 7 pages.
PCT International Preliminary Report on Patentability received for PCT/GB2018/053678, dated Jul. 2, 2020, 9 pages.
PCT International Preliminary Report on Patentability received for PCT/GB2019/051740, dated Dec. 30, 2020, 8 pages.
PCT International Preliminary Report on Patentability received for PCT/GB2019/051741, dated Dec. 30, 2020, 7 pages.
PCT International Preliminary Report on Patentability received for PCT/GB2019/053020, dated May 6, 2021, 12 pages.
PCT International Preliminary Report on Patentability received for PCT/GB2019/053080, dated May 14, 2021, 16 pages.
PCT International Preliminary Report on Patentability received for PCT/GB2019/053536, dated Jun. 24, 2021, 07 pages.
PCT International Preliminary Report on Patentability received for PCT/GB2019/053539, dated Jun. 24, 2021, 7 pages.
PCT International Preliminary Report on Patentability received for PCT/GB2019/053540, dated Jun. 24, 2021, 8 pages.
PCT International Preliminary Report on Patentability received for PCT/GB2020/050505, dated Sep. 16, 2021, 7 pages.
PCT International Preliminary Report on Patentability received for PCT/GB2020/050874, dated Oct. 14, 2021, 11 pages.
PCT International Preliminary Report on Patentability received for PCT/GB2020/051140, dated Nov. 25, 2021, 8 pages.
PCT International Preliminary Report on Patentability received for PCT/GB2020/051144, dated Nov. 18, 2021, 9 pages.
PCT International Preliminary Report on Patentability received for PCT/GB2020/051827, dated Feb. 10, 2022, 8 pages.
PCT International Preliminary Report on Patentability received for PCT/GB2020/051829, dated Feb. 10, 2022, 8 pages.
PCT International Preliminary Report on Patentability received for PCT/GB2020/051831, dated Feb. 10, 2022, 10 pages.
PCT International Preliminary Report on Patentability received for PCT/GB2020/051923, dated Feb. 24, 2022, 9 pages.
PCT International Preliminary Report on Patentability received for PCT/GB2020/052445, dated Apr. 14, 2022, 26 pages.
PCT International Preliminary Report on Patentability received for PCT/GB2020/052619, dated Apr. 28, 2022, 9 pages.
PCT International Preliminary Report on Patentability received for PCT/GB2020/053026, dated Jun. 9, 2022, 8 pages.
PCT International Preliminary Report on Patentability received for PCT/GB2021/051220, dated Dec. 1, 2022, 7 pages.
PCT International Preliminary Report on Patentability received for PCT/GB2021/051451, dated Dec. 22, 2022, 09 pages.
PCT International Preliminary Report on Patentability received for PCT/GB2021/052001, dated Feb. 16, 2023, 13 pages.
PCT International Preliminary Report on Patentability received for PCT/GB2022/050044, dated Jul. 20, 2023, 13 pages.
PCT International Preliminary Report on Patentability received for PCT/GB2022/050055, dated Jul. 20, 2023, 17 pages.
PCT International Preliminary Report on Patentability received for PCT/GB2017/051250, dated Nov. 15, 2018, 7 pages.
PCT International Preliminary Report on Patentability received for PCT/GB2018/051118, dated Nov. 7, 2019, 11 pages.
PCT International Search Report and Written Opinion received for PCT/EP2017/083953, dated May 9, 2018, 9 pages.
PCT International Search Report and Written Opinion received for PCT/EP2017/083954, dated May 4, 2018, 9 pages.
PCT International Search Report and Written Opinion received for PCT/EP2018/060498, dated Jul. 5, 2018, 13 pages.
PCT International Search Report and Written Opinion received for PCT/EP2019/065993, dated Sep. 24, 2019, 11 pages.
PCT International Search Report and Written Opinion received for PCT/EP2019/066010, dated Sep. 30, 2019, 12 pages.
PCT International Search Report and Written Opinion received for PCT/EP2019/066066, dated Oct. 1, 2019, 11 pages.
PCT International Search Report and Written Opinion received for PCT/EP2019/066273, dated Sep. 27, 2019, 11 pages.
PCT International Search Report and Written Opinion received for PCT/EP2021/072866, dated Dec. 21, 2021, 21 pages.
PCT International Search Report and Written Opinion received for PCT/GB2015/053247, dated Jan. 27, 2016, 12 pages.
PCT International Search Report and Written Opinion received for PCT/GB2017/051250, dated Aug. 4, 2017, 10 pages.
PCT International Search Report and Written Opinion received for PCT/GB2017/053560, dated Jul. 2, 2018, 9 pages.
PCT International Search Report and Written Opinion received for PCT/GB2018/050017, dated Mar. 23, 2018, 12 pages.
PCT International Search Report and Written Opinion received for PCT/GB2018/051118, dated Aug. 3, 2018, 20 pages.
PCT International Search Report and Written Opinion received for PCT/GB2018/051779, dated Sep. 3, 2018, 10 pages.
PCT International Search Report and Written Opinion received for PCT/GB2018/053676, dated Mar. 21, 2019, 12 pages.
PCT International Search Report and Written Opinion received for PCT/GB2018/053678, dated Mar. 20, 2019, 12 pages.
PCT International Search Report and Written Opinion received for PCT/GB2019/050485, dated Jun. 4, 2019, 12 Pages.
PCT International Search Report and Written Opinion received for PCT/GB2019/050951, dated Jul. 4, 2019, 11 pages.
PCT International Search Report and Written Opinion received for PCT/GB2019/051740, dated Aug. 29, 2019, 11 pages.
PCT International Search Report and Written Opinion received for PCT/GB2019/051741, dated Aug. 5, 2019, 10 pages.
PCT International Search Report and Written Opinion received for PCT/GB2019/053020, dated Jun. 23, 2020, 19 pages.
PCT International Search Report and Written Opinion received for PCT/GB2019/053080, dated Feb. 7, 2020, 19 pages.
PCT International Search Report and Written Opinion received for PCT/GB2019/053536, dated Mar. 11, 2020, 11 pages.
PCT International Search Report and Written Opinion received for PCT/GB2019/053537, dated Mar. 11, 2020, 10 pages.
PCT International Search Report and Written Opinion received for PCT/GB2019/053539, dated Mar. 11, 2020, 8 pages.
PCT International Search Report and Written Opinion received for PCT/GB2019/053540, dated Mar. 11, 2020, 10 pages.
PCT International Search Report and Written Opinion received for PCT/GB2019/053679, dated Mar. 11, 2020, 12 pages.
PCT International Search Report and Written Opinion received for PCT/GB2019/053680, dated Mar. 11, 2020, 11 pages.
PCT International Search Report and Written Opinion received for PCT/GB2020/050069, dated Apr. 15, 2020, 10 pages.
PCT International Search Report and Written Opinion received for PCT/GB2020/050070, dated Jun. 23, 2020, 16 pages.
PCT International Search Report and Written Opinion received for PCT/GB2020/050071, dated May 12, 2020, 10 pages.
PCT International Search Report and Written Opinion received for PCT/GB2020/050072, dated Jun. 30, 2020, 16 pages.
PCT International Search Report and Written Opinion received for PCT/GB2020/050073, dated Apr. 7, 2020, 11 pages.
PCT International Search Report and Written Opinion received for PCT/GB2020/050074, dated Jun. 23, 2020, 21 pages.
PCT International Search Report and Written Opinion received for PCT/GB2020/050505, dated Apr. 28, 2020, 9 pages.
PCT International Search Report and Written Opinion received for PCT/GB2020/050874, dated Jun. 17, 2020, 15 pages.

(56) References Cited

OTHER PUBLICATIONS

PCT International Search Report and Written Opinion received for PCT/GB2020/051140, dated Aug. 20, 2020, 10 pages.
PCT International Search Report and Written Opinion received for PCT/GB2020/051144, dated Aug. 18, 2020, 12 pages.
PCT International Search Report and Written Opinion received for PCT/GB2020/051827, dated Nov. 3, 2020, 11 pages.
PCT International Search Report and Written Opinion received for PCT/GB2020/051829, dated Oct. 30, 2020, 11 pages.
PCT International Search Report and Written Opinion received for PCT/GB2020/051831, dated Nov. 4, 2020, 13 pages.
PCT International Search Report and Written Opinion received for PCT/GB2020/051923, dated Nov. 17, 2020, 12 pages.
PCT International Search Report and Written Opinion received for PCT/GB2020/052058, dated Nov. 12, 2020, 11 pages.
PCT International Search Report and Written Opinion received for PCT/GB2020/052445, dated Mar. 4, 2021, 34 pages.
PCT International Search Report and Written Opinion received for PCT/GB2020/052590, dated Jan. 28, 2021, 9 pages.
PCT International Search Report and Written Opinion received for PCT/GB2020/052619, dated Jan. 28, 2021, 12 pages.
PCT International Search Report and Written Opinion received for PCT/GB2020/053026, dated Mar. 23, 2021, 11 pages.
PCT International Search Report and Written Opinion received for PCT/GB2021/050490, dated May 19, 2021, 12 pages.
PCT International Search Report and Written Opinion received for PCT/GB2021/050491, dated May 14, 2021, 14 pages.
PCT International Search Report and Written Opinion received for PCT/GB2021/051220, dated Aug. 27, 2021, 12 pages.
PCT International Search Report and Written Opinion received for PCT/GB2021/051451, dated Sep. 22, 2021, 14 pages.
PCT International Search Report and Written Opinion received for PCT/GB2021/052001, dated Nov. 12, 2021, 11 pages.
PCT International Search Report and Written Opinion received for PCT/GB2022/050043, dated Nov. 17, 2022, 18 pages.
PCT International Search Report and Written Opinion received for PCT/GB2022/050044, dated Jun. 28, 2022, 19 pages.
PCT International Search Report and Written Opinion received for PCT/GB2022/050055, dated Apr. 19, 2022, 21 pages.
PCT International Search Report and Written Opinion received for PCT/GB2022/052249, dated Mar. 28, 2023, 14 pages.
PCT International Search Report and Written Opinion received for PCT/GB2022/052903, dated Mar. 13, 2023, 12 pages.
PCT International Search Report and Written Opinion received for PCT/GB2018/052222, dated Oct. 11, 2018, 9 pages.
U.S. Appl. No. 17/769,668, filed Apr. 15, 2022.
U.S. Appl. No. 18/021,748, filed Feb. 16, 2023.
U.S. Appl. No. 18/271,360, filed Jul. 7, 2023.
U.S. Appl. No. 18/271,593, filed Jul. 10, 2023.
U.S. Appl. No. 18/313,983, filed May 8, 2023.
U.S. Appl. No. 18/345,506, filed Jun. 30, 2023.

* cited by examiner

LINKERS

CROSS-REFERENCE TO RELATED APPLICATIONS

This application claims the benefit of U.S. Provisional Application No. 63/060,344, filed on Aug. 3, 2020, the entire contents of which are incorporated herein by reference.

FIELD OF THE INVENTION

The invention relates to novel linkers which comprise two or three basic, acidic or hydrophobic natural or non-natural amino acids. The invention also relates to drug conjugates comprising said linkers, to pharmaceutical compositions comprising said drug conjugates and to the use of said drug conjugates in preventing, suppressing or treating cancer.

BACKGROUND OF THE INVENTION

Cancer treating complexes containing a conjugate of a binding agent (i.e. peptides, antibodies etc.) and a cytotoxic agent have been evaluated for a number of years. The concept involves the binding agent being configured to bind to a target, typically an epitope upon a cancer cell and the presence of the cytotoxic agent is intended to act as a payload to destroy the cancer cell. However, synthesis of these drug conjugates will typically involve the incorporation of a linker between the binding agent and the cytotoxic agent and following administration to a subject this linker is often subjected to premature cleavage, i.e. by other proteases recognising the linker sequence. Such cleavage results in the release of the cytotoxic agent prior to binding to the cancer target and increases the risk of undesirable side effects.

This problem has been attempted to be addressed by a number of research groups. For example, WO 98/19705 describes the presence of a branched peptide linker which contains two or more amino acid moieties that provide an enzyme cleavage site. US 2017/360952 describes a linker having an azide containing non-natural amino acid between a cell-binding agent and a cytotoxic agent. US 2016/046721 describe antibody-drug conjugates comprising a Val-Cit linker. US 2015/087810 describes conjugates of antibodies and toxins with a linker containing from 1 to 20 amino acids.

Thus, there is a need to provide alternative linkers which allow for selective cleavage of the cytotoxic agent at, or close to, the site of binding to the target and result in increased stability of the resultant conjugate.

SUMMARY OF THE INVENTION

According to a first aspect of the invention, there is provided a linker comprising a -P1-P2-P3- moiety, wherein:
P1 represents a basic non-natural amino acid or a derivative thereof;
P2 represents a hydrophobic amino acid or a hydrophobic non-natural amino acid; and
P3 is either absent or represents an acidic amino acid or an acidic non-natural amino acid, such that when P1 represents Cit and P2 represents Val, then P3 must represent an acidic non-natural amino acid.

According to a further aspect of the invention, there is provided a drug conjugate comprising a binding agent which binds to a target and a cytotoxic agent, wherein said binding agent is joined to said cytotoxic agent via a linker as described herein.

According to a further aspect of the invention, there is provided a pharmaceutical composition comprising the drug conjugate as described herein in combination with one or more pharmaceutically acceptable excipients.

According to a further aspect of the invention, there is provided the drug conjugate as described herein for use in preventing, suppressing or treating cancer.

DETAILED DESCRIPTION OF THE INVENTION

Linkers

Figure 1:
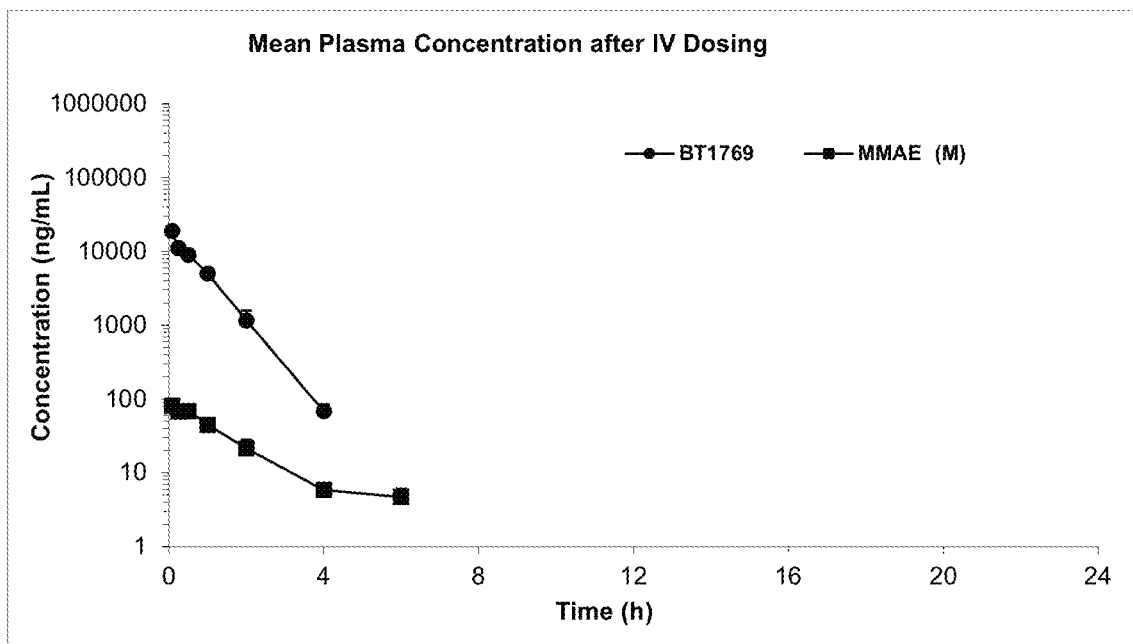
FIG. 1: Pharmacokinetic analysis of BCY7761 in mouse plasma.
Figure 2:
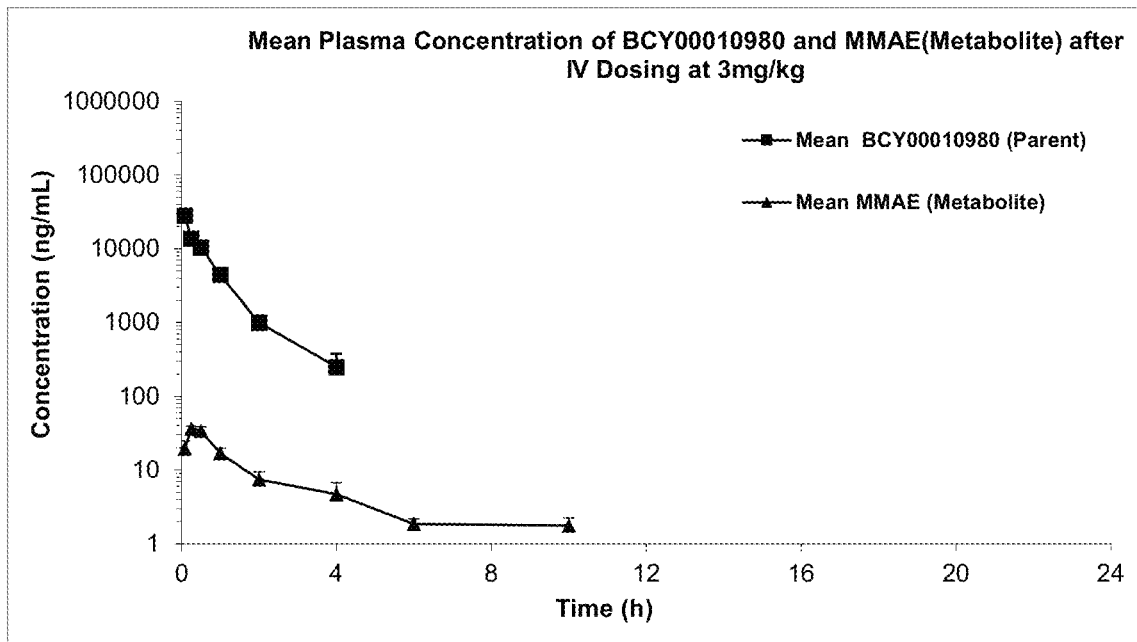
FIG. 2: Pharmacokinetic analysis of BCY10980 in mouse plasma.
Figure 3:
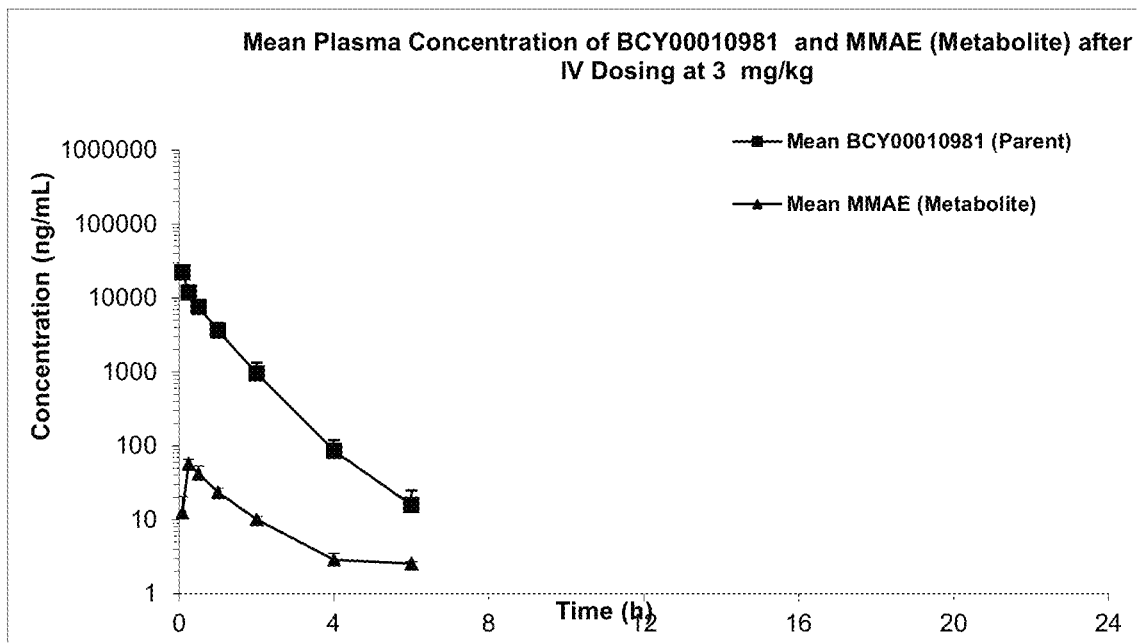
FIG. 3: Pharmacokinetic analysis of BCY10981 in mouse plasma.
Figure 4:
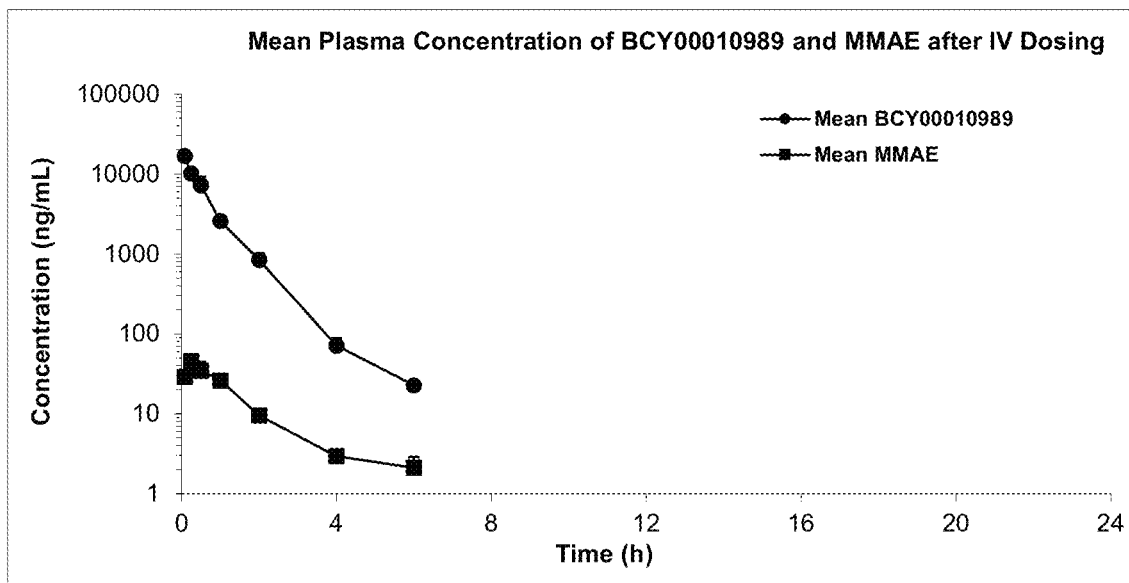
FIG. 4: Pharmacokinetic analysis of BCY10989 in mouse plasma.
Figure 5:
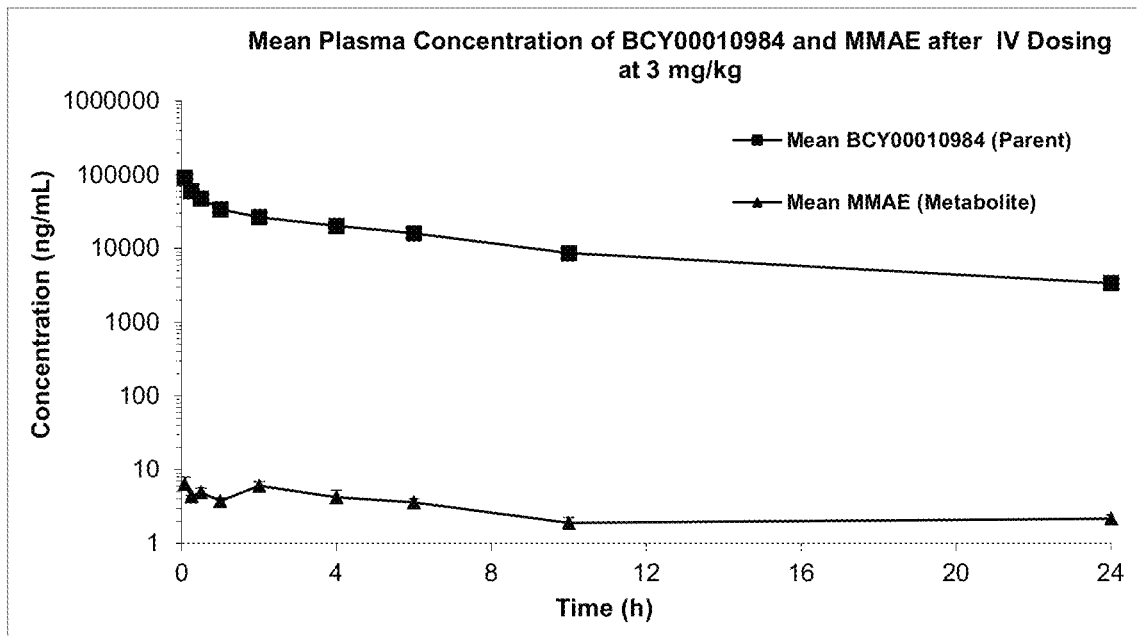
FIG. 5: Pharmacokinetic analysis of BCY10984 in mouse plasma.
Figure 6:
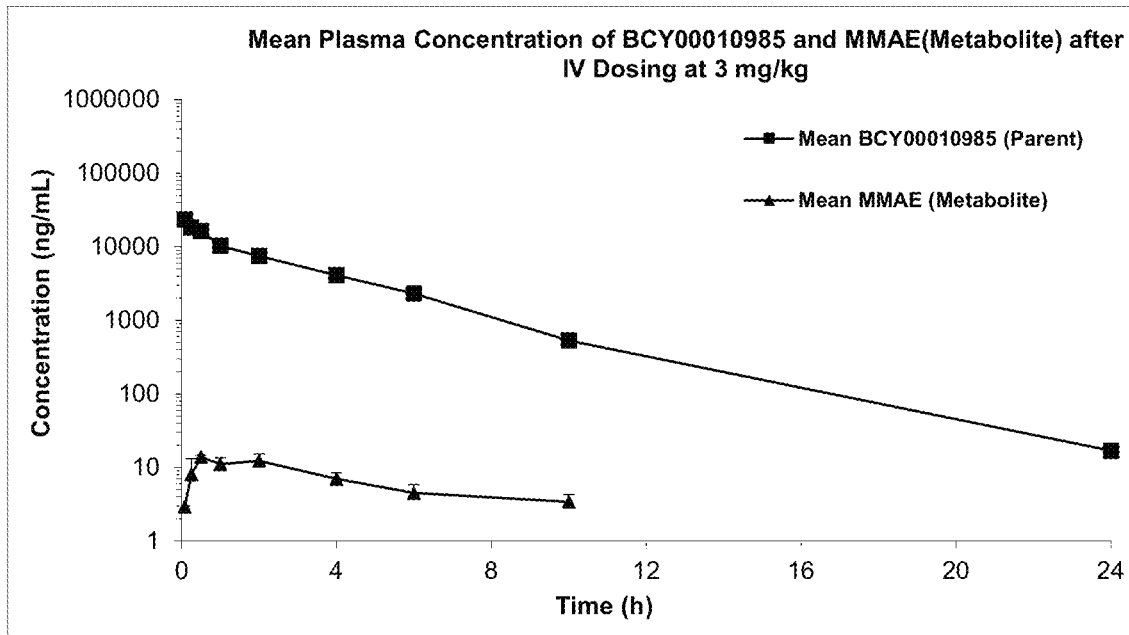
FIG. 6: Pharmacokinetic analysis of BCY10985 in mouse plasma.

According to a first aspect of the invention, there is provided a linker comprising a -P1-P2-P3- moiety, wherein:
P1 represents a basic non-natural amino acid or a derivative thereof;
P2 represents a hydrophobic amino acid or a hydrophobic non-natural amino acid; and
P3 is either absent or represents an acidic amino acid or an acidic non-natural amino acid, such that when P1 represents Cit and P2 represents Val, then P3 must represent an acidic non-natural amino acid.

Thus, the invention relates to linker molecules containing 2 or 3 amino acids which require the presence of at least one non-natural amino acid and either a -basic-hydrophobic- motif or a -basic-hydrophobic-acidic- motif.

The linker molecules of the invention provide the advantage of increased plasma stability as evidenced with the extended half-lives demonstrated in Example 1 when compared with the Cit-Val control linker. In addition, the linker molecules of the invention provide the ability to tailor the CatB cleavage rate to a required level depending upon the requirements (see Example 2). Furthermore, the linker molecules of the invention provide the ability to modulate the plasma protein binding ability of a bicyclic peptide toxin conjugate as evidenced in Example 3. Furthermore, the linker molecules of the invention demonstrated extended half-life and lower relative levels of free toxin in plasma as evidenced by the pharmacokinetic studies in mouse and rat shown in Example 4. Furthermore, one example linker molecule of the invention (BCY10984) demonstrated higher efficacy in tumour volume reduction compared with the Cit-Val reference bicyclic peptide toxin conjugate (BTC) (see FIGS. 9 and 10 and Example 5). Furthermore, higher levels of toxin are observed in the tumour with one example linker molecule of the invention (BCY10984) compared with the Cit-Val reference bicyclic peptide toxin conjugate (BTC) (see FIGS. 11 to 15 and Example 5).

References herein to "basic non-natural amino acid or a derivative thereof" refer to any amino acid other than the standard, natural 20 amino acids which have a basic character. Within the scope of the term "basic" are non-natural amino acids which contain basic side chains at neutral pH. Such basic non-natural amino acids are typically polar and positively charged at pH values below their pKa's, and are very hydrophilic.

In one embodiment, P1 represents a basic non-natural amino acid selected from: 2-amino-4-guanidinobutanoic acid (Agb); 2-amino-4-(3-methylguanidino)butanoic acid (Agb(Me)); 2,4-diaminobutanoic acid (Dab); 2,3-diaminopropanoic acid (Dap); 2-amino-3-guanidinopropanoic acid (Dap(CNNH$_2$)); and citrulline (Cit). In a further embodiment, P1 represents citrulline (Cit).

References herein to the term "hydrophobic amino acid or a hydrophobic non-natural amino acid" include any amino acid, including both the standard, natural 20 amino acids and any non-natural amino acids which have a hydrophobic character. Within the scope of the term "hydrophobic" are both natural amino acids and non-natural amino acids which contain hydrophobic side chains, i.e. those which do not like to reside in an aqueous (i.e. water) environment.

In one embodiment, P2 represents a hydrophobic amino acid selected from Ala, Gly, Ile, Leu, Met, Phe, Pro, Trp and Val or a hydrophobic non-natural amino acid selected from cyclobutyl, diphenylalanine (Dpa), 1-naphthylalanine (1Nal), 2-Naphthylalanine (2Nal) and methyltryptophan (Trp(Me)), such as a hydrophobic amino acid selected from Val or a non-natural amino acid selected from cyclobutyl, Dpa, 1Nal and 2Nal. In a further embodiment, P2 represents 1-naphthylalanine (1 Nal).

References herein to the term "acidic amino acid or an acidic non-natural amino acid" include any amino acid, including both the standard, natural 20 amino acids and any non-natural amino acids which have an acidic character. Within the scope of the term "acidic" are both natural amino acids and non-natural amino acids which contain acidic side chains at neutral pH. Typically, their side chains have carboxylic acid groups whose pKa's are low enough to lose protons, becoming negatively charged in the process.

In one embodiment, P3 is absent, In an alternative embodiment, P3 represents an acidic amino acid selected from Asp and Glu. In a further embodiment, P3 represents Glu.

In one embodiment, the -P1-P2-P3- moiety represents:

| P1 | P2 | P3 | Compound Numbers containing said linkers |
| --- | --- | --- | --- |
| Agb | Val | Absent | BCY9423 |
| Agb(Me) | Val | Absent | BCY9477 |
| Dab | Val | Absent | BCY9474, BCY10989 |
| Dap | Val | Absent | BCY10298 |
| Dap(CNNH$_2$) | Val | Absent | BCY10300 |
| Agb | Val | Glu | BCY9695, BCY10983 |
| Cit | 1Nal | Glu | BCY10984 |
| Dab | cBu | Glu | BCY10988 |
| Dab | Dpa | Glu | BCY10987 |
| Dab | 1Nal | Glu | BCY10985 |
| Dab | 2Nal | Glu | BCY10986 |
| Dab | Val | Glu | BCY10122, BCY10981 |
| Dap | Val | Glu | BCY10297, BCY10982 |
| Dap (CNNH$_2$) | Val | Glu | BCY10299 |

In a further embodiment, the -P1-P2-P3- moiety represents: Cit-1Nal-Glu (BCY10984).

Drug Conjugates

According to a further aspect of the invention, there is provided a drug conjugate comprising a binding agent which binds to a target and a cytotoxic agent, wherein said binding agent is joined to said cytotoxic agent via a linker as defined herein.

In one embodiment, said binding agent is a peptide, such as an antibody or bicyclic peptide, in particular a bicyclic peptide.

Bicyclic Peptides

It will be apparent to the skilled person that peptides and antibodies are recognised terms in the art, however, references herein to bicyclic peptides (or Bicycles) are intended to refer to a peptide sequence which have two loops via cyclisation at three reactive amino acid groups (i.e. cysteine residues). These bicyclic peptides were identified in 2009 by phage display-based combinatorial approaches to generate and screen large libraries of bicyclic peptides to targets of interest (Heinis et al. (2009), Nat Chem Biol 5 (7), 502-7 and WO 2009/098450). Desirably, the bicyclic peptide will be configured to bind to an anti-cancer target. Suitable examples of cancer cell binding bicyclic peptides include those described in WO 2016/067035 (MT1-MMP binding bicyclic peptides), WO 2017/191460 (MT1-MMP binding bicyclic peptides), WO 2019/025811 (CD137 binding bicyclic peptides), PCT/GB2018/053675 (EphA2 binding bicyclic peptides), PCT/GB2018/053676 (EphA2 binding bicyclic peptides), PCT/GB2018/053678 (EphA2 binding bicyclic peptides), PCT/GB2019/050485 (CD137 binding bicyclic peptides), PCT/GB2019/051740 (Nectin-4 binding bicyclic peptides) and PCT/GB2019/051741 (Nectin-4 binding bicyclic peptides) the bicyclic peptides disclosed in said documents being incorporated herein by reference.

A bicyclic peptide, as referred to herein, refers to a peptide covalently bound to a molecular scaffold. Typically, such peptides comprise two or more reactive groups (i.e. cysteine residues) which are capable of forming covalent bonds to the scaffold, and a sequence subtended between said reactive groups which is referred to as the loop sequence, since it forms a loop when the peptide is bound to the scaffold. In the present case, the peptides comprise at least three cysteine residues and form at least two loops on the scaffold.

Molecular Scaffolds

In one embodiment, the bicyclic peptide is covalently bound to a non-aromatic molecular scaffold. References herein to the term "non-aromatic molecular scaffold" refer to any molecular scaffold as defined herein which does not contain an aromatic (i.e. unsaturated) carbocyclic or heterocyclic ring system.

Suitable examples of non-aromatic molecular scaffolds are described in Heinis et al (2014) *Angewandte Chemie, International Edition* 53 (6) 1602-1606.

As noted in the foregoing documents, the molecular scaffold may be a small molecule, such as a small organic molecule.

In one embodiment the molecular scaffold may be a macromolecule. In one embodiment the molecular scaffold is a macromolecule composed of amino acids, nucleotides or carbohydrates.

In one embodiment the molecular scaffold comprises reactive groups that are capable of reacting with functional group(s) of the polypeptide to form covalent bonds.

The molecular scaffold may comprise chemical groups which form the linkage with a peptide, such as amines, thiols, alcohols, ketones, aldehydes, nitriles, carboxylic acids, esters, alkenes, alkynes, azides, anhydrides, succinimides, maleimides, alkyl halides and acyl halides.

An example of an αβ unsaturated carbonyl containing compound is 1,1',1''-(1,3,5-triazinane-1,3,5-triyl)triprop-2-en-1-one (TATA) (Angewandte Chemie, International Edition (2014), 53 (6), 1602-1606).

In an alternative embodiment, the bicyclic peptide is covalently bound to an aromatic molecular scaffold. References herein to the term "aromatic molecular scaffold" refer to any molecular scaffold as defined herein which contains an aromatic carbocyclic or heterocyclic ring system.

It will be appreciated that the aromatic molecular scaffold may comprise an aromatic moiety. Examples of suitable aromatic moieties within the aromatic scaffold include biphenylene, terphenylene, naphthalene or anthracene.

It will also be appreciated that the aromatic molecular scaffold may comprise a heteroaromatic moiety. Examples of suitable heteroaromatic moieties within the aromatic scaffold include pyridine, pyrimidine, pyrrole, furan and thiophene.

It will also be appreciated that the aromatic molecular scaffold may comprise a halomethylarene moiety, such as a bis(bromomethyl)benzene, a tris(bromomethyl)benzene, a tetra(bromomethyl)benzene or derivatives thereof.

Non-limiting examples of aromatic molecular scaffolds include: bis-, tris-, or tetra(halomethyl)benzene; bis-, tris-, or tetra(halomethyl)pyridine; bis-, tris-, or tetra(halomethyl)pyridazine; bis-, tris-, or tetra(halomethyl)pyrimidine; bis-, tris-, or tetra(halomethyl)pyrazine; bis-, tris-, or tetra(halomethyl)-1,2,3-triazine; bis-, tris-, or tetra-halomethyl)-1,2,4-triazine; bis-, tris-, or tetra(halomethyl)pyrrole, -furan, -thiophene; bis-, tris-, or tetra(halomethyl)imidazole, -oxazole, -thiazol; bis-, tris-, or tetra(halomethyl)-3H-pyrazole, -isooxazole, -isothiazol; bis-, tris-, or tetra(halomethyl)biphenylene; bis-, tris-, or tetra(halomethyl)terphenylene; 1,8-bis(halomethyl)naphthalene; bis-, tris-, or tetra(halomethyl) anthracene; and bis-, tris-, or tetra(2-halomethylphenyl) methane.

More specific examples of aromatic molecular scaffolds include: 1,2-bis(halomethyl)benzene; 3,4-bis(halomethyl) pyridine; 3,4-bis(halomethyl)pyridazine; 4,5-bis(halomethyl)pyrimidine; 4,5-bis(halomethyl)pyrazine; 4,5-bis(halomethyl)-1,2,3-triazine; 5,6-bis(halomethyl)-1,2,4-triazine; 3,4-bis(halomethyl)pyrrole, -furan, -thiophene and other regioisomers; 4,5-bis(halomethyl)imidazole, -oxazole, -thiazol; 4,5-bis(halomethyl)-3H-pyrazole, -isooxazole, -isothiazol; 2,2'-bis(halomethyl)biphenylene; 2,2''-bis(halomethyl) terphenylene; 1,8-bis(halomethyl)naphthalene; 1,10-bis (halomethyl)anthracene; bis(2-halomethylphenyl)methane; 1,2,3-tris(halomethyl)benzene; 2,3,4-tris(halomethyl)pyridine; 2,3,4-tris(halomethyl)pyridazine; 3,4,5-tris(halomethyl)pyrimidine; 4,5,6-tris(halomethyl)-1,2,3-triazine; 2,3,4-tris(halomethyl)pyrrole, -furan, -thiophene; 2,4,5-bis (halomethyl)imidazole, -oxazole, -thiazol; 3,4,5-bis (halomethyl)-1H-pyrazole, -isooxazole, -isothiazol; 2,4,2'-tris(halomethyl)biphenylene; 2,3',2''-tris(halomethyl) terphenylene; 1,3,8-tris(halomethyl)naphthalene; 1,3,10-tris (halomethyl)anthracene; bis(2-halomethylphenyl)methane; 1,2,4,5-tetra(halomethyl)benzene; 1,2,4,5-tetra(halomethyl) pyridine; 2,4,5,6-tetra(halomethyl)pyrimidine; 2,3,4,5-tetra (halomethyl)pyrrole, -furan, -thiophene; 2,2',6,6'-tetra(halomethyl)biphenyl; 2,2'',6,6''-tetra(halomethyl) terphenylene; 2,3,5,6-tetra(halomethyl)naphthalene and 2,3,7,8-tetra(halomethyl)anthracene; and bis(2,4-bis(halomethyl)phenyl)methane.

In one embodiment, the molecular scaffold may comprise or may consist of tris(bromomethyl)benzene, especially 1,3,5-tris(bromomethyl)benzene ('TBMB'), or a derivative thereof.

In one embodiment, the molecular scaffold is 2,4,6-tris (bromomethyl)mesitylene. This molecule is similar to 1,3, 5-tris(bromomethyl)benzene but contains three additional methyl groups attached to the benzene ring. This has the advantage that the additional methyl groups may form further contacts with the polypeptide and hence add additional structural constraint.

The molecular scaffold of the invention contains chemical groups that allow functional groups of the polypeptide of the encoded library of the invention to form covalent links with the molecular scaffold. Said chemical groups are selected from a wide range of functionalities including amines, thiols, alcohols, ketones, aldehydes, nitriles, carboxylic acids, esters, alkenes, alkynes, anhydrides, succinimides, maleimides, azides, alkyl halides and acyl halides.

Scaffold reactive groups that could be used on the molecular scaffold to react with thiol groups of cysteines are alkyl halides (or also named halogenoalkanes or haloalkanes).

Examples include bromomethylbenzene (the scaffold reactive group exemplified by TBMB) or iodoacetamide. Other scaffold reactive groups that are used to selectively couple compounds to cysteines in proteins are maleimides, αβ-unsaturated carbonyl containing compounds and α-halomethylcarbonyl containing compounds. Examples of maleimides which may be used as molecular scaffolds in the invention include: tris-(2-maleimidoethyl)amine, tris-(2-maleimidoethyl)benzene, tris-(maleimido)benzene. An example of an α-halomethylcarbonyl containing compound is N,N',N''-(benzene-1,3,5-triyl)tris(2-bromoacetamide). Selenocysteine is also a natural amino acid which has a similar reactivity to cysteine and can be used for the same reactions. Thus, wherever cysteine is mentioned, it is typically acceptable to substitute selenocysteine unless the context suggests otherwise.

Synthesis

The bicyclic peptides may be manufactured synthetically by standard techniques followed by reaction with a molecular scaffold in vitro. When this is performed, standard chemistry may be used. This enables the rapid large scale preparation of soluble material for further downstream experiments or validation. Such methods could be accomplished using conventional chemistry such as that disclosed in Timmerman et al (supra).

Thus, the invention also relates to manufacture of polypeptides selected as set out herein, wherein the manufacture comprises optional further steps as explained below. In one embodiment, these steps are carried out on the end product polypeptide made by chemical synthesis.

Peptides can also be extended, to incorporate for example another loop and therefore introduce multiple specificities.

To extend the peptide, it may simply be extended chemically at its N-terminus or C-terminus or within the loops using orthogonally protected lysines (and analogues) using standard solid phase or solution phase chemistry. Standard (bio)conjugation techniques may be used to introduce an activated or activatable N- or C-terminus. Alternatively additions may be made by fragment condensation or native chemical ligation e.g. as described in (Dawson et al. 1994. Synthesis of Proteins by Native Chemical Ligation. Science 266:776-779), or by enzymes, for example using subtiligase as described in (Chang et al. Proc Natl Acad Sci USA. 1994 Dec. 20; 91 (26):12544-8 or in Hikari et al Bioorganic & Medicinal Chemistry Letters Volume 18, Issue 22, 15 Nov. 2008, Pages 6000-6003).

Alternatively, the peptides may be extended or modified by further conjugation through disulphide bonds. This has the additional advantage of allowing the first and second peptide to dissociate from each other once within the reducing environment of the cell. In this case, the molecular scaffold (e.g. TATA) could be added during the chemical synthesis of the first peptide so as to react with the three cysteine groups; a further cysteine or thiol could then be appended to the N or C-terminus of the first peptide, so that this cysteine or thiol only reacted with a free cysteine or thiol of the second peptide, forming a disulfide-linked bicyclic peptide-peptide conjugate.

Similar techniques apply equally to the synthesis/coupling of two bicyclic and bispecific macrocycles, potentially creating a tetraspecific molecule.

Furthermore, addition of other functional groups or effector groups may be accomplished in the same manner, using appropriate chemistry, coupling at the N- or C-termini or via side chains. In one embodiment, the coupling is conducted in such a manner that it does not block the activity of either entity.

Cytotoxic Agents

Examples of suitable "cytotoxic agents" include: alkylating agents such as cisplatin and carboplatin, as well as oxaliplatin, mechlorethamine, cyclophosphamide, chlorambucil, ifosfamide; Anti-metabolites including purine analogs azathioprine and mercaptopurine or pyrimidine analogs; plant alkaloids and terpenoids including vinca alkaloids such as Vincristine, Vinblastine, Vinorelbine and Vindesine; Podophyllotoxin and its derivatives etoposide and teniposide; Taxanes, including paclitaxel, originally known as Taxol; topoisomerase inhibitors including camptothecins: irinotecan and topotecan, and type II inhibitors including amsacrine, etoposide, etoposide phosphate, and teniposide. Further agents can include antitumour antibiotics which include the immunosuppressant dactinomycin (which is used in kidney transplantations), doxorubicin, epirubicin, bleomycin, calicheamycins, and others.

In one embodiment, said cytotoxic agent is selected from maytansinoids (such as DM1) or monomethyl auristatins (such as MMAE).

DM1 is a cytotoxic agent which is a thiol-containing derivative of maytansine and has the following structure:

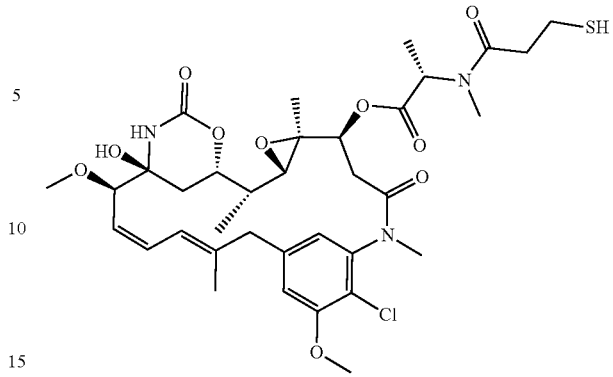

Monomethyl auristatin E (MMAE) is a synthetic antineoplastic agent and has the following structure:

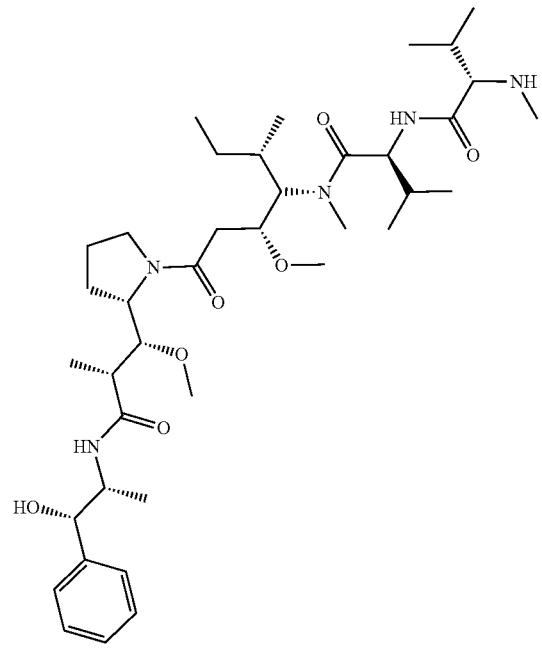

In a further embodiment, said cytotoxic agent is MMAE.

Pharmaceutical Compositions

According to a further aspect of the invention, there is provided a pharmaceutical composition comprising the drug conjugate as described herein in combination with one or more pharmaceutically acceptable excipients.

Generally, the drug conjugates will be utilised in purified form together with pharmacologically appropriate excipients or carriers. Typically, these excipients or carriers include aqueous or alcoholic/aqueous solutions, emulsions or suspensions, including saline and/or buffered media. Parenteral vehicles include sodium chloride solution, Ringers dextrose, dextrose and sodium chloride and lactated Ringers. Suitable physiologically-acceptable adjuvants, if necessary to keep a polypeptide complex in suspension, may be chosen from thickeners such as carboxymethylcellulose, polyvinylpyrrolidone, gelatin and alginates.

Intravenous vehicles include fluid and nutrient replenishers and electrolyte replenishers, such as those based on Ringer's dextrose. Preservatives and other additives, such as antimicrobials, antioxidants, chelating agents and inert gases, may also be present (Mack (1982) Remington's Pharmaceutical Sciences, 16th Edition).

The drug conjugates of the present invention may be used as separately administered compositions or in conjunction with other agents. These can include antibodies, antibody fragments and various immunotherapeutic drugs, such as cyclosporine, methotrexate, adriamycin or cisplatinum and immunotoxins. Pharmaceutical compositions can include "cocktails" of various cytotoxic or other agents in conjunction with the drug conjugates of the present invention, or even combinations of selected drug conjugates according to the present invention having different specificities, such as polypeptides selected using different target ligands, whether or not they are pooled prior to administration.

The route of administration of pharmaceutical compositions according to the invention may be any of those commonly known to those of ordinary skill in the art. For therapy, the drug conjugates of the invention can be administered to any patient in accordance with standard techniques. The administration can be by any appropriate mode, including parenterally, intravenously, intramuscularly, intraperitoneally, transdermally, via the pulmonary route, or also, appropriately, by direct infusion with a catheter. Preferably, the pharmaceutical compositions according to the invention will be administered by inhalation. The dosage and frequency of administration will depend on the age, sex and condition of the patient, concurrent administration of other drugs, counterindications and other parameters to be taken into account by the clinician.

The drug conjugates of this invention can be lyophilised for storage and reconstituted in a suitable carrier prior to use. This technique has been shown to be effective and art-known lyophilisation and reconstitution techniques can be employed. It will be appreciated by those skilled in the art that lyophilisation and reconstitution can lead to varying degrees of activity loss and that levels may have to be adjusted upward to compensate.

The compositions containing the present drug conjugates or a cocktail thereof can be administered for prophylactic and/or therapeutic treatments. In certain therapeutic applications, an adequate amount to accomplish at least partial inhibition, suppression, modulation, killing, or some other measurable parameter, of a population of selected cells is defined as a "therapeutically-effective dose". Amounts needed to achieve this dosage will depend upon the severity of the disease and the general state of the patient's own immune system, but generally range from 0.005 to 5.0 mg of selected drug conjugate per kilogram of body weight, with doses of 0.05 to 2.0 mg/kg/dose being more commonly used. For prophylactic applications, compositions containing the present drug conjugates or cocktails thereof may also be administered in similar or slightly lower dosages.

A composition containing a drug conjugate according to the present invention may be utilised in prophylactic and therapeutic settings to aid in the alteration, inactivation, killing or removal of a select target cell population in a mammal. In addition, the drug conjugates described herein may be used extracorporeally or in vitro selectively to kill, deplete or otherwise effectively remove a target cell population from a heterogeneous collection of cells. Blood from a mammal may be combined extracorporeally with the drug conjugates whereby the undesired cells are killed or otherwise removed from the blood for return to the mammal in accordance with standard techniques.

Therapeutic Uses

According to a further aspect of the invention, there is provided the drug conjugate as described herein for use in preventing, suppressing or treating cancer.

Examples of cancers (and their benign counterparts) which may be treated (or inhibited) include, but are not limited to tumours of epithelial origin (adenomas and carcinomas of various types including adenocarcinomas, squamous carcinomas, transitional cell carcinomas and other carcinomas) such as carcinomas of the bladder and urinary tract, breast, gastrointestinal tract (including the esophagus, stomach (gastric), small intestine, colon, rectum and anus), liver (hepatocellular carcinoma), gall bladder and biliary system, exocrine pancreas, kidney, lung (for example adenocarcinomas, small cell lung carcinomas, non-small cell lung carcinomas, bronchioalveolar carcinomas and mesotheliomas), head and neck (for example cancers of the tongue, buccal cavity, larynx, pharynx, nasopharynx, tonsil, salivary glands, nasal cavity and paranasal sinuses), ovary, fallopian tubes, peritoneum, vagina, vulva, penis, cervix, myometrium, endometrium, thyroid (for example thyroid follicular carcinoma), adrenal, prostate, skin and adnexae (for example melanoma, basal cell carcinoma, squamous cell carcinoma, keratoacanthoma, dysplastic naevus); haematological malignancies (i.e. leukemias, lymphomas) and pre-malignant haematological disorders and disorders of borderline malignancy including haematological malignancies and related conditions of lymphoid lineage (for example acute lymphocytic leukemia [ALL], chronic lymphocytic leukemia [CLL], B-cell lymphomas such as diffuse large B-cell lymphoma [DLBCL], follicular lymphoma, Burkitt's lymphoma, mantle cell lymphoma, T-cell lymphomas and leukaemias, natural killer [NK] cell lymphomas, Hodgkin's lymphomas, hairy cell leukaemia, monoclonal gammopathy of uncertain significance, plasmacytoma, multiple myeloma, and post-transplant lymphoproliferative disorders), and haematological malignancies and related conditions of myeloid lineage (for example acute myelogenousleukemia [AML], chronic myelogenousleukemia [CML], chronic myelomonocyticleukemia [CMML], hypereosinophilic syndrome, myeloproliferative disorders such as polycythaemia vera, essential thrombocythaemia and primary myelofibrosis, myeloproliferative syndrome, myelodysplastic syndrome, and promyelocyticleukemia); tumours of mesenchymal origin, for example sarcomas of soft tissue, bone or cartilage such as osteosarcomas, fibrosarcomas, chondrosarcomas, rhabdomyosarcomas, leiomyosarcomas, liposarcomas, angiosarcomas, Kaposi's sarcoma, Ewing's sarcoma, synovial sarcomas, epithelioid sarcomas, gastrointestinal stromal tumours, benign and malignant histiocytomas, and dermatofibrosarcomaprotuberans; tumours of the central or peripheral nervous system (for example astrocytomas, gliomas and glioblastomas, meningiomas, ependymomas, pineal tumours and schwannomas); endocrine tumours (for example pituitary tumours, adrenal tumours, islet cell tumours, parathyroid tumours, carcinoid tumours and medullary carcinoma of the thyroid); ocular and adnexal tumours (for example retinoblastoma); germ cell and trophoblastic tumours (for example teratomas, seminomas, dysgerminomas, hydatidiform moles and choriocarcinomas); and paediatric and embryonal tumours (for example medulloblastoma, neuroblastoma, Wilms tumour, and primitive neuroectodermal tumours); or syndromes, congenital or otherwise, which leave the patient susceptible to malignancy (for example Xeroderma Pigmentosum).

In a further embodiment, the cancer is selected from a hematopoietic malignancy such as selected from: non-Hodgkin's lymphoma (NHL), Burkitt's lymphoma (BL), multiple myeloma (MM), B chronic lymphocytic leukemia (B-CLL), B and T acute lymphocytic leukemia (ALL), T cell lymphoma (TCL), acute myeloid leukemia (AML), hairy cell leukemia (HCL), Hodgkin's Lymphoma (HL), and chronic myeloid leukemia (CML).

References herein to the term "prevention" involves administration of the protective composition prior to the induction of the disease. "Suppression" refers to administration of the composition after an inductive event, but prior to the clinical appearance of the disease. "Treatment" involves administration of the protective composition after disease symptoms become manifest.

Animal model systems which can be used to screen the effectiveness of the drug conjugates in protecting against or treating the disease are available. The use of animal model systems is facilitated by the present invention, which allows the development of drug conjugates which can cross react with human and animal targets, to allow the use of animal models.

The invention is further described below with reference to the following examples.

EXAMPLES

Materials and Methods

Peptide Synthesis

Peptide synthesis was based on Fmoc chemistry, using a Symphony peptide synthesiser manufactured by Peptide Instruments and a Syro II synthesiser by MultiSynTech. Standard Fmoc-amino acids were employed (Sigma, Merck), with appropriate side chain protecting groups: where applicable standard coupling conditions were used in each case, followed by deprotection using standard methodology. Peptides were purified using HPLC and following isolation they were modified with 1,3,5-tris(bromomethyl) benzene (TBMB, Sigma). For this, linear peptide was diluted with $H_2O$ up to ~35 mL, ~500 µL of 100 mM TBMB in acetonitrile was added, and the reaction was initiated with 5 mL of 1 M $NH_4HCO_3$ in $H_2O$. The reaction was allowed to proceed for ~30-60 min at RT, and lyophilised once the reaction had completed (judged by MALDI). Following lyophilisation, the modified peptide was purified as above, while replacing the Luna C8 with a Gemini C18 column (Phenomenex), and changing the acid to 0.1% trifluoroacetic acid. Pure fractions containing the correct TMB-modified material were pooled, lyophilised and kept at −20° C. for storage.

All amino acids, unless noted otherwise, were used in the L-configurations.

In some cases peptides are converted to activated disulfides prior to coupling with the free thiol group of a toxin using the following method; a solution of 4-methyl(succinimidyl 4-(2-pyridylthio)pentanoate) (100 mM) in dry DMSO (1.25 mol equiv) was added to a solution of peptide (20 mM) in dry DMSO (1 mol equiv). The reaction was well mixed and DIPEA (20 mol equiv) was added. The reaction was monitored by LC/MS until complete.

Bicycle Conjugate Synthesis

General Method

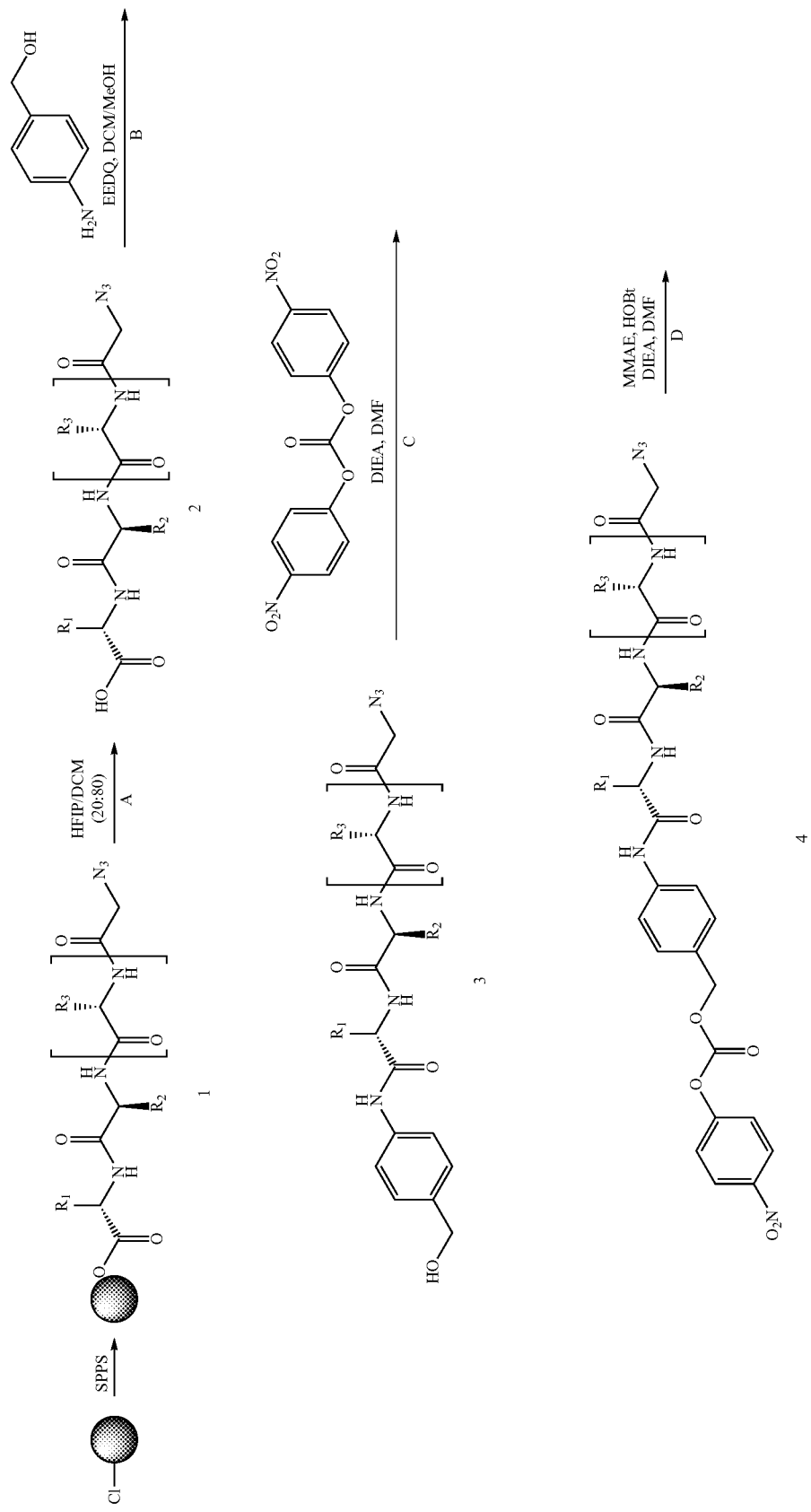

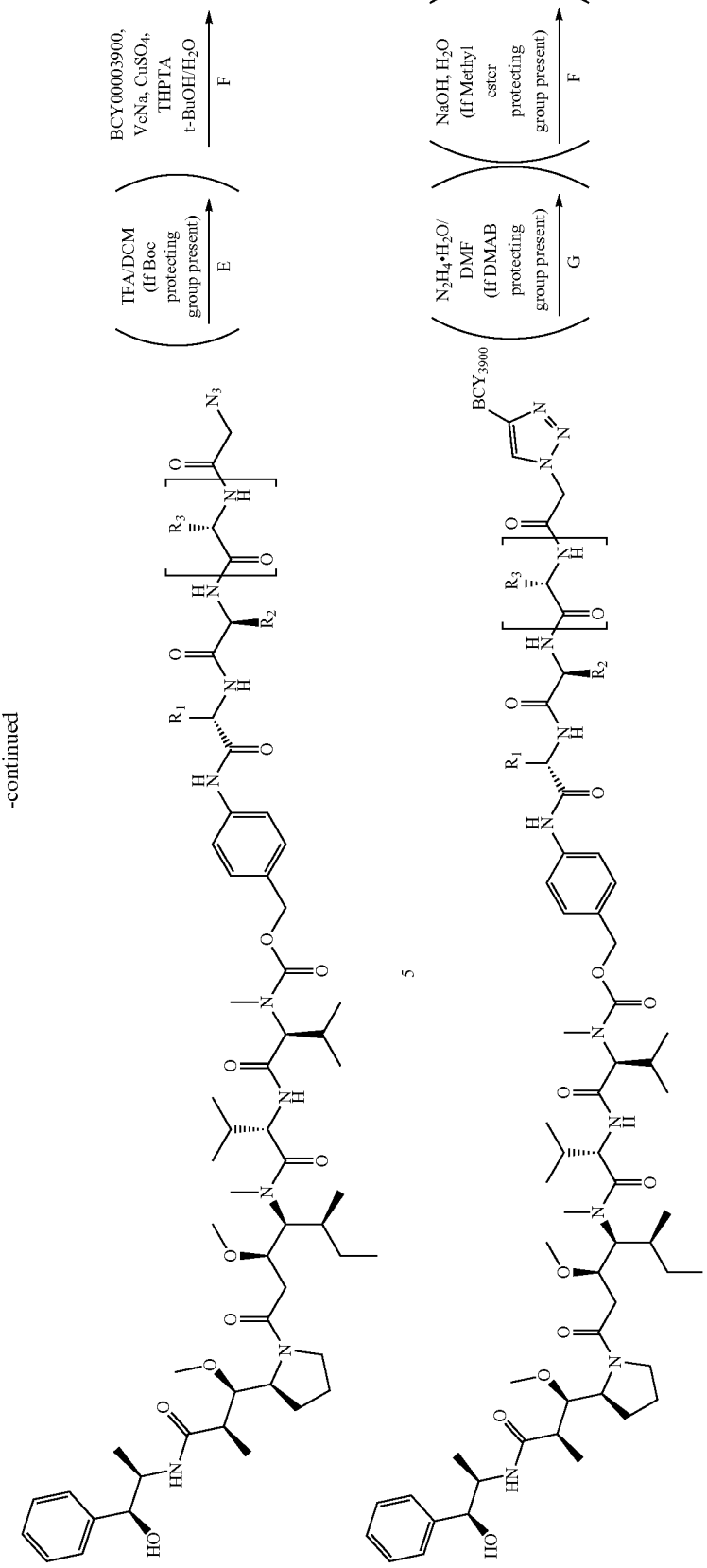
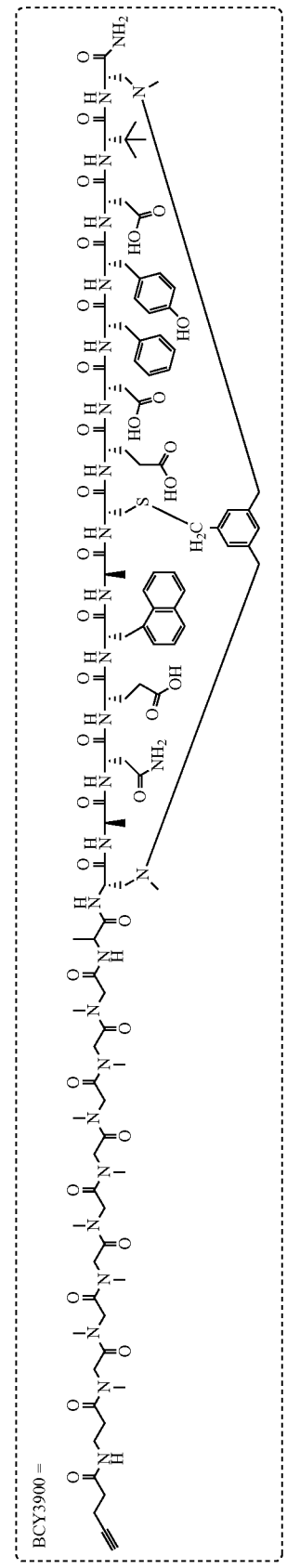

Step (a): Solid Phase Synthesis of Peptidic Linker Compound

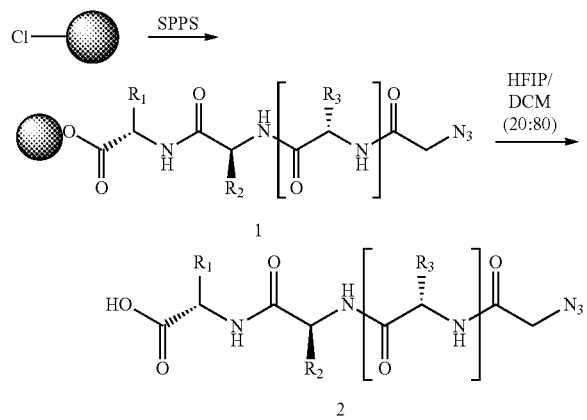

Peptides were synthesized on Chlorotrityl resin (2 mmol) using standard Fmoc chemistry. The first amino acid was loaded onto the resin by incubation with a mixture of Fmoc-AA-OH (1 eq) and DIEA (4 eq) in DMF for 2 hours. The resin was drained and washed, then treated with MeOH for 30 min. The rest of the sequence was built up using standard SPPS methods with Fmoc-AA-OH (or acidic capping group e.g. azidoacetic acid) (3 eq), HBTU (2.85 eq) and DIEA (6 eq). Coupling reactions were carried out for 1 hour. Fmoc deprotection was performed using 20% piperidine/DMF for 30 min. The peptides were cleaved from the resin by incubating with using HFIP/DCM (20:80) for 30 min. The crude peptide was dried and directly used in next step without purification.

Step (b): Addition of (4-aminophenyl)methanol to Peptidic Linker Compound

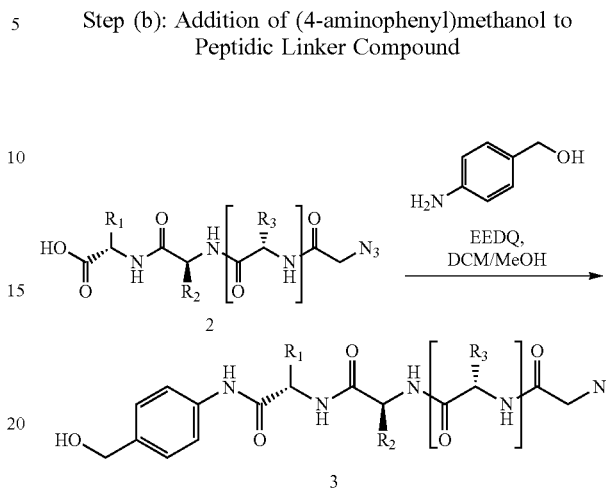

To a solution of Compound 2 (1.0 eq) in MeOH (100 mg/mL) was added a solution of EEDQ (2.0 eq.) and (4-aminophenyl)methanol (2.0 eq) in DCM. The mixture was stirred at 35° C. for 16 hr. Once complete, the reaction mixture was concentrated under reduced pressure and the residue purified by preparative HPLC.

Step (c): Reaction of Bis(2,4-dinitrophenyl)carbonate with Peptidic Linker-(4-aminophenyl)methanol To a solution of Compound 3 (1.0 eq.) in DMF (50 mg/mL) was added DIEA (5.0 eq.) and bis(4-nitrophenyl) carbonate (4.0 eq.) and the mixture stirred at 25° C. for 1 hr (or until compound 3 was consumed). The reaction mixture was directly purified by preparative HPLC.

Step (d): MMAE Conjugation to Peptidic Linker Compounds

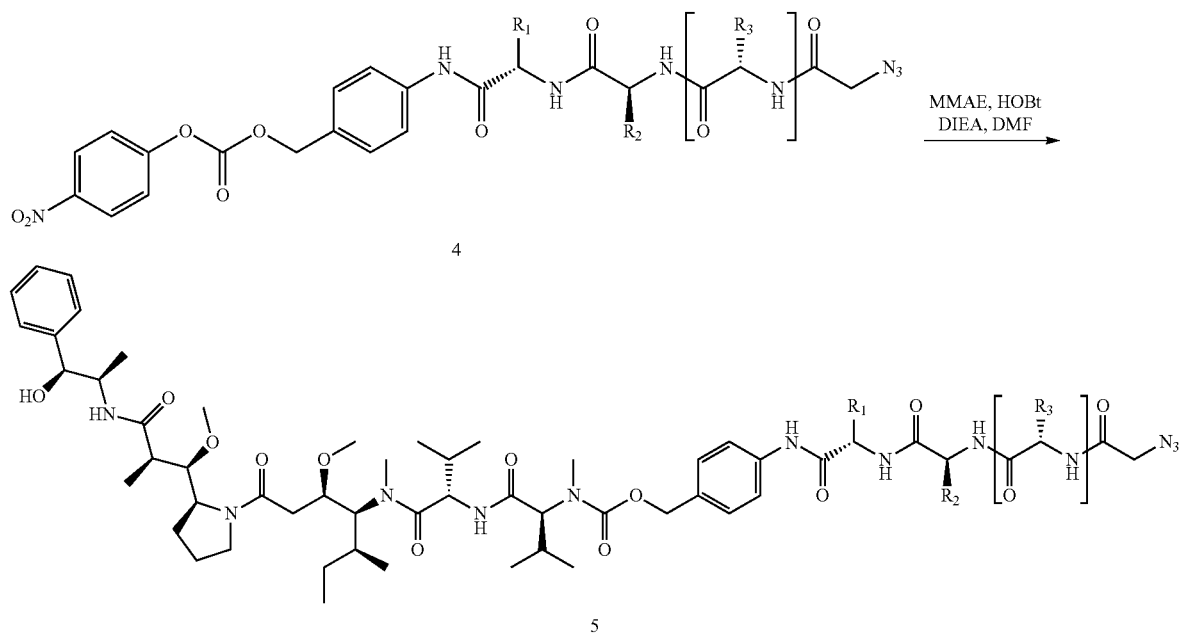

To a solution of Compound 4 (1.5 eq) in DMF (10 mg/mL) was added HOBt (1.5 eq), DIEA (5.0 eq) and MMAE (1.0 eq). The mixture was stirred at 40° C. for 16 hr, until compound 4 was fully consumed. The reaction mixture was directly purified by preparative HPLC.

Step (e): Removal of Boc Protecting Group

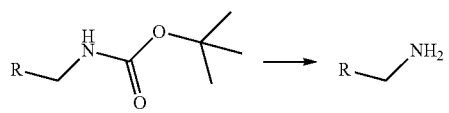

(for Linkers Synthesised Using Amino Acids with Boc Protected Side Chains).

Boc-protected amine containing linker (1.0 eq) was added to a mixture of 10% TFA/DCM (30 mg/mL). The mixture was stirred at 0° C. for 1 hr, then concentrated under reduced pressure to remove DCM. The crude product was directly used in the next step without purification.

Step (f): Copper Catalysed Cycloaddition of Azide Functionalised Toxin-linkers to Alkyne Functionalised Bicycles

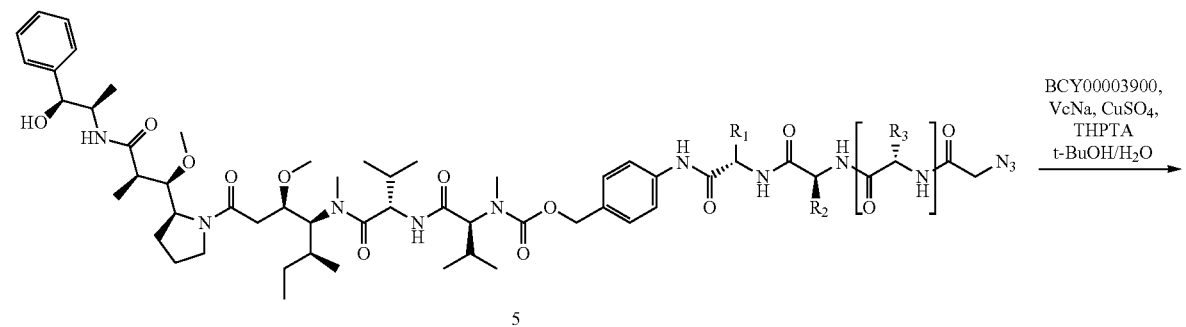

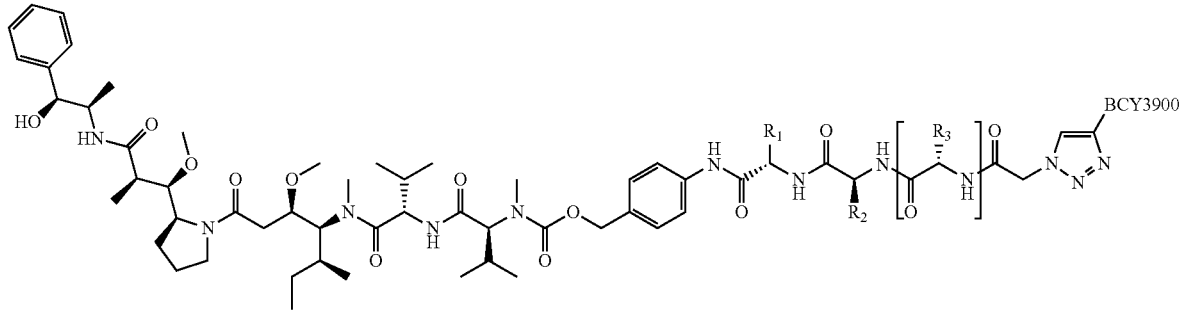

To a solution of Compound 5 (1.0 eq) in t-BuOH/H₂O (1:1, 6.5 mg/mL) was added CuSO₄ (0.4 M, 2.0 eq), THPTA (1.0 eq), BCY3900 (0.9 eq), VcNa (2.0 eq). The mixture was adjusted to pH~7 then stirred at 40° C. for 2 hr (or until consumption of compound 5). The reaction mixture was concentrated under reduced pressure to remove t-BuOH. If DMAB or Methyl ester protecting group is present in the compound then deprotection was performed on the crude material (general method F or G). Otherwise, the crude residue was purified using preparative HPLC to give the final conjugate.

Step (g): Removal of DMAB Protecting Group

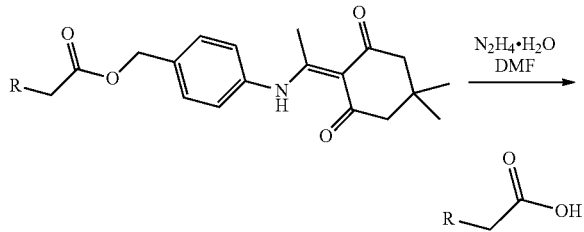

(For Linkers Synthesised Using Amino Acids with DMAB Protected Side Chains).

To a solution of DMAB protected linker compound (1.0 eq) in DMF (36 mg/mL) was added N₂H₄—H₂O (75 eq). The mixture was stirred at 25° C. for 0.5 hr then the reaction mixture was directly purified by preparative HPLC to give the final conjugate.

Step (h): Removal of Methyl Ester Protecting Group

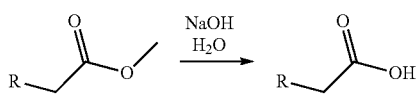

(For Linkers Synthesised Using Amino Acids with Methyl Ester Protected Side Chains).

To a solution of methyl ester protected linker compound (1.0 eq) in H₂O (100 mg/mL) was added NaOH (20.0 eq). The mixture was stirred at 25° C. for 2 hr. The reaction mixture was directly purified by preparative HPLC to give the final conjugate.

The above mentioned General Method was used to prepare the following Bicycle Conjugates:

| | | Protected amino acids used |
|---|---|---|
| BCY10989 | MMAE-PAB-(Dab-Val)-BCY3900 | Fmoc-Dab(Boc)-OH |
| BCY10980 | MMAE-PAB-(Cit-Val-Glu)-BCY3900 | Fmoc-Glu(DMAB)-OH |
| BCY10982 | MMAE-PAB-(Dap-Val-Glu)-BCY3900 | Fmoc-Dap(Boc)-OH, Fmoc-Glu(OMe)-OH |
| BCY10983 | MMAE-PAB-(Agp-Val-Glu)-BCY3900 | Fmoc-Dap(Boc)-OH Fmoc-Glu(OMe)-OH |
| BCY10984 | MMAE-PAB-(Cit-1Nal-Glu)-BCY3900 | Fmoc-Glu(OMe)-OH |
| BCY10981 | MMAE-PAB-(Dab-Val-Glu)-BCY3900 | Fmoc-Dab(Boc)-OH Fmoc-Glu(OMe)-OH |
| BCY10985 | MMAE-PAB-(Dab-1Nal-Glu)-BCY3900 | Fmoc-Dab(Boc)-OH Fmoc-Glu(OMe)-OH |
| BCY10986 | MMAE-PAB-(Dab-2Nal-Glu)-BCY3900 | Fmoc-Dab(Boc)-OH Fmoc-Glu(DMAB)-OH |
| BCY10987 | MMAE-PAB-(Dab-Dpa-Glu)-BCY3900 | Fmoc-Dab(Boc)-OH |
| BCY10988 | MMAE-PAB-(Dab-cBu-Glu)-BCY3900 | Fmoc-Dab(Boc)-OH Fmoc-Glu(DMAB)-OH |

BCY10989—(Dab-Val)

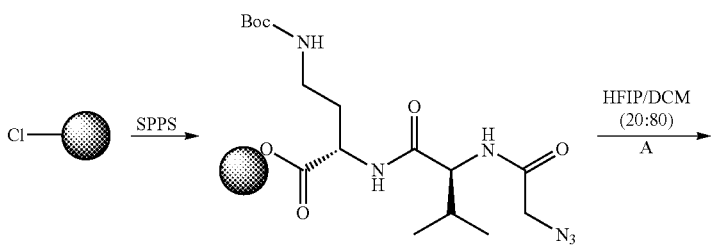

-continued
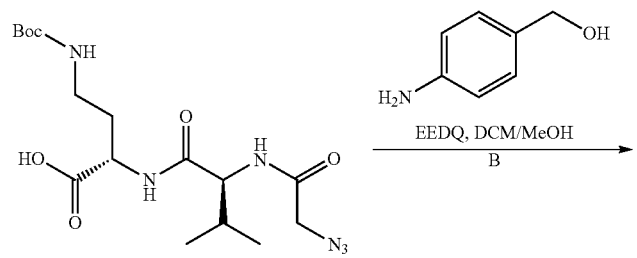
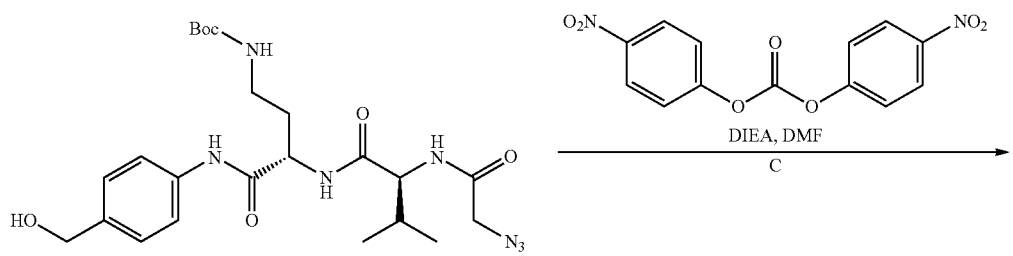
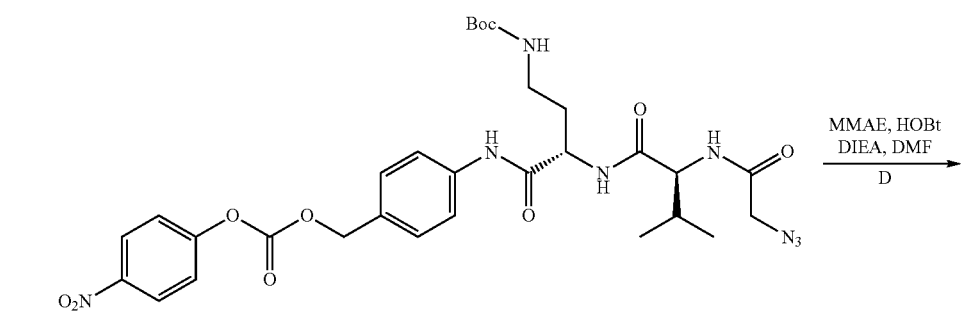
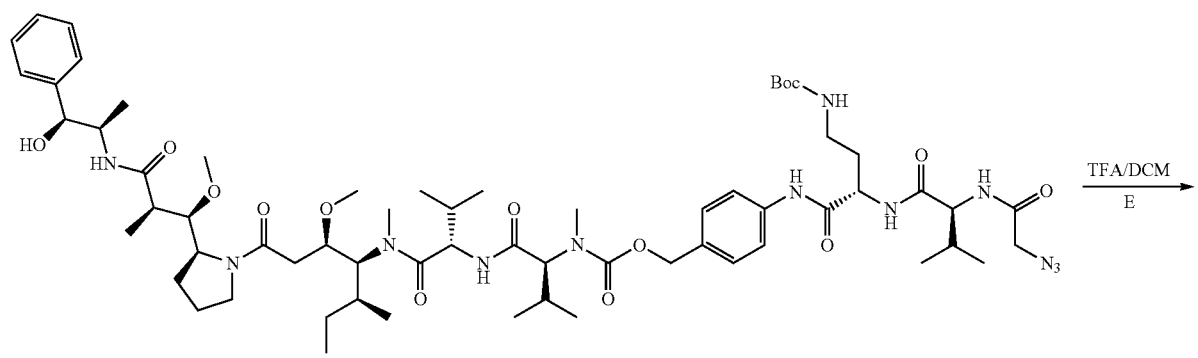
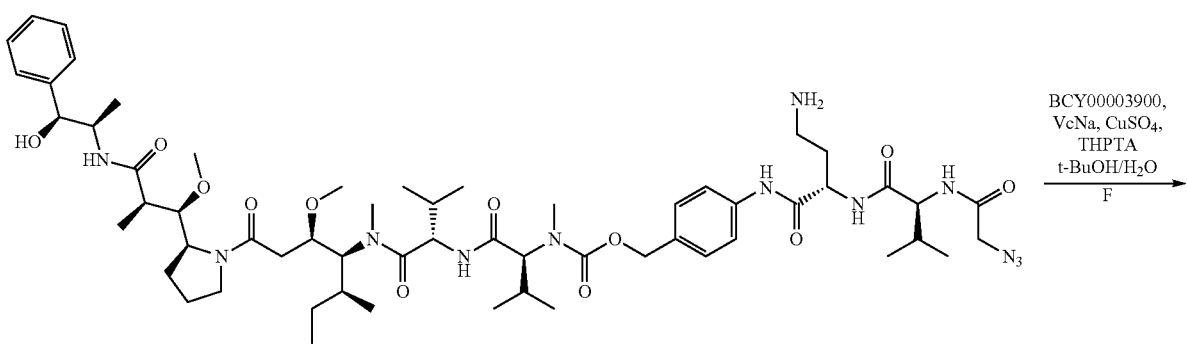

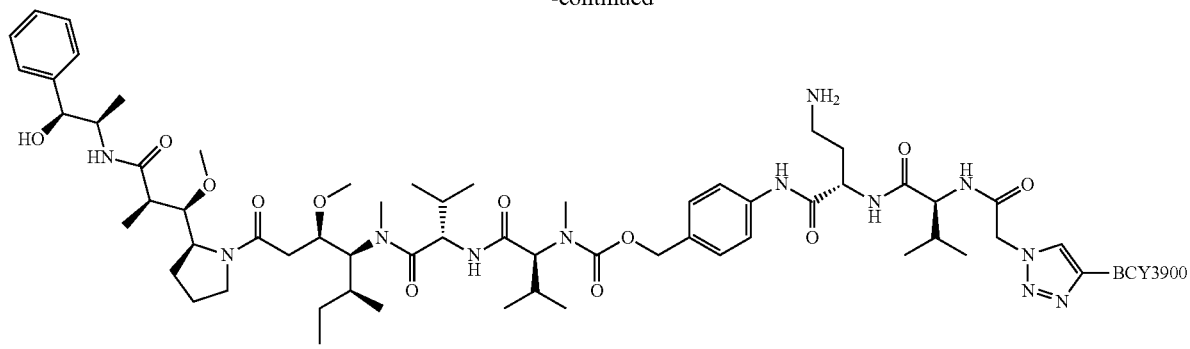
General methods were followed to yield BCY10989. Expected MW=3882.4, observed m/z: 1294 [M+3H]$^{3+}$, 971 [M+4H]$^{4+}$.
BCY10988—(Dab-cBu-Glu)
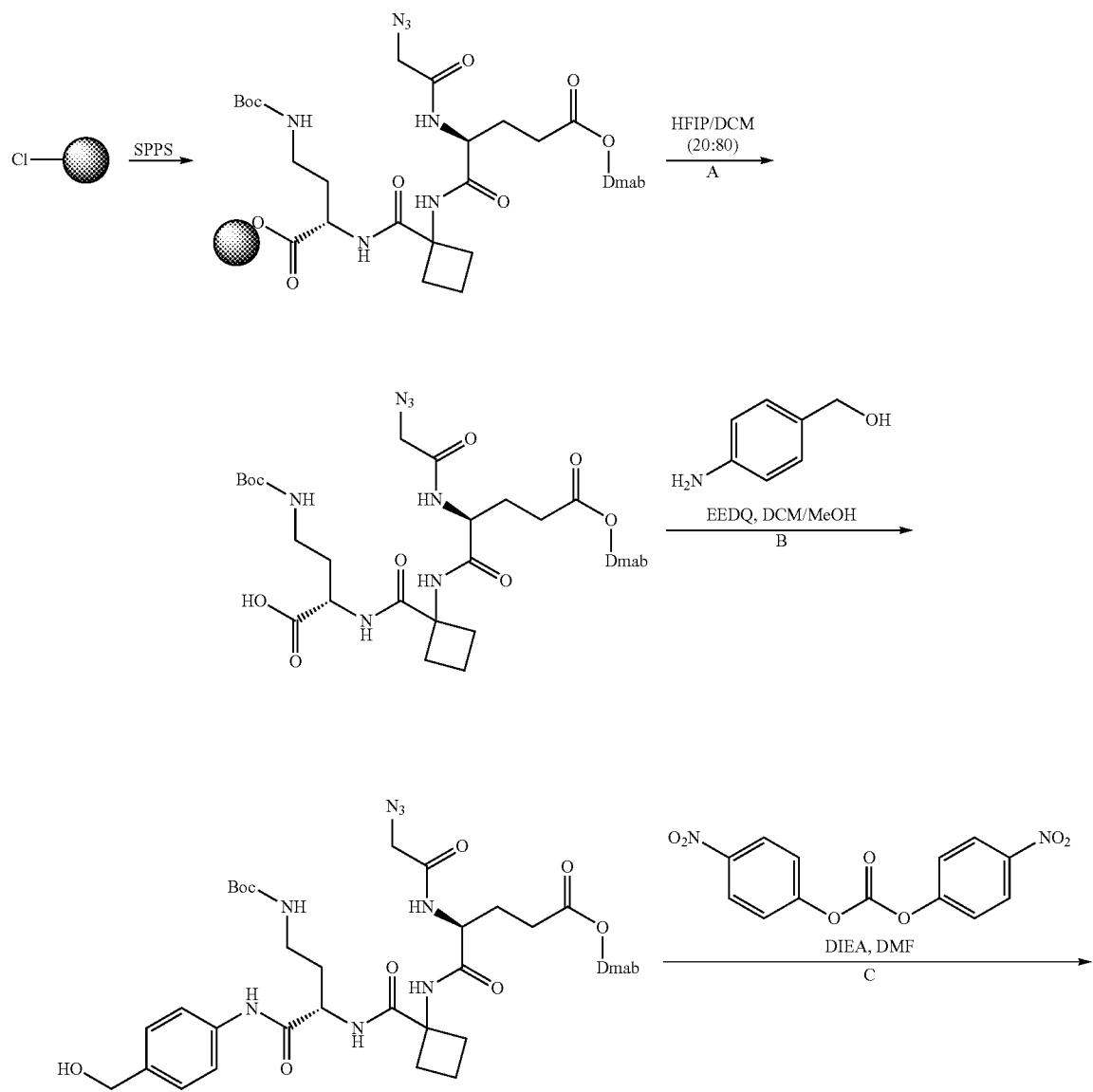

-continued
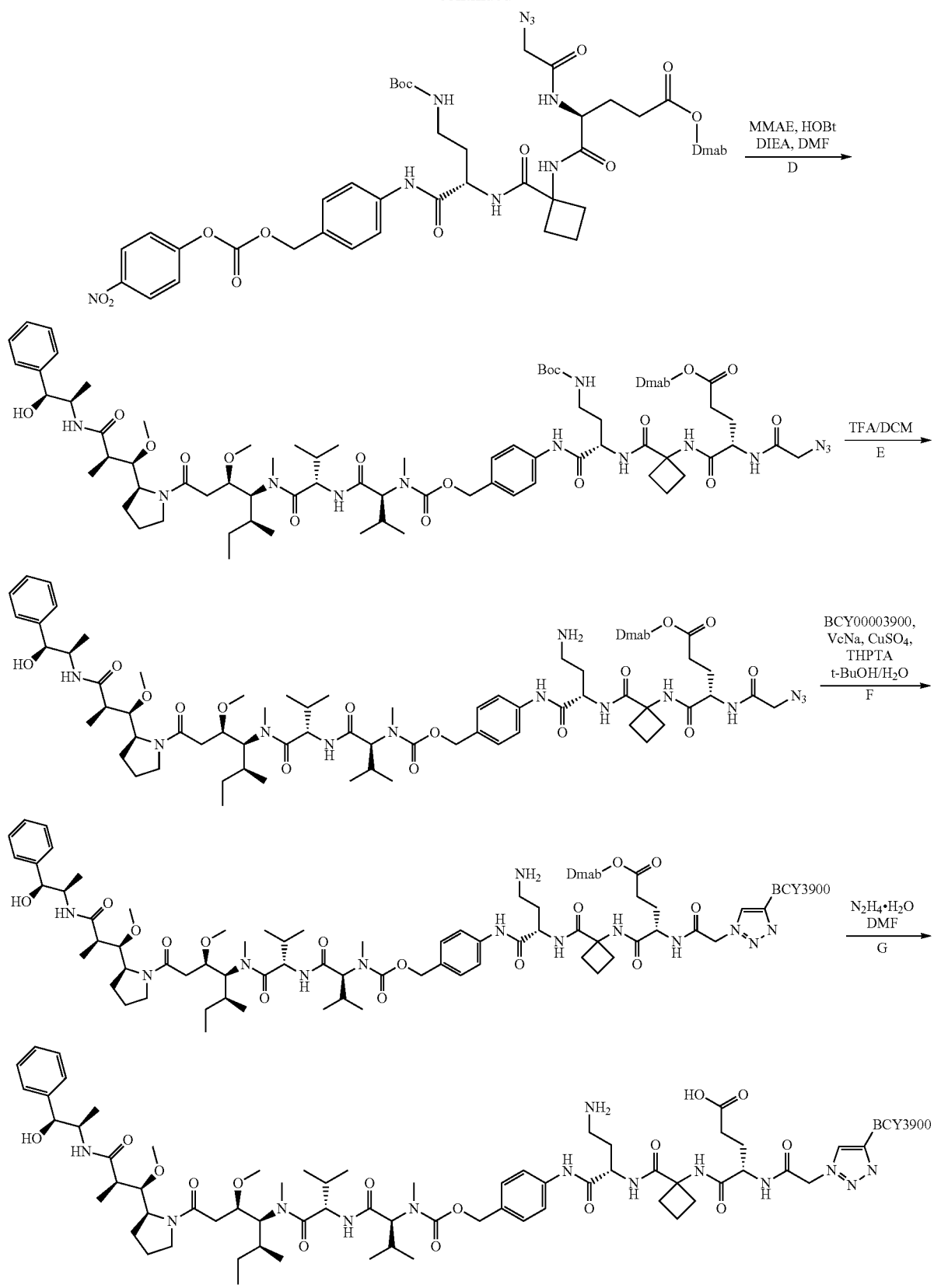

General methods were followed to yield BCY10988. Expected MW=4009.5, observed m/z: 1337 [M+3H]$^{3+}$, 1003 [M+4H]$^{4+}$.
BCY10986 (Dab-2Nal-Glu)
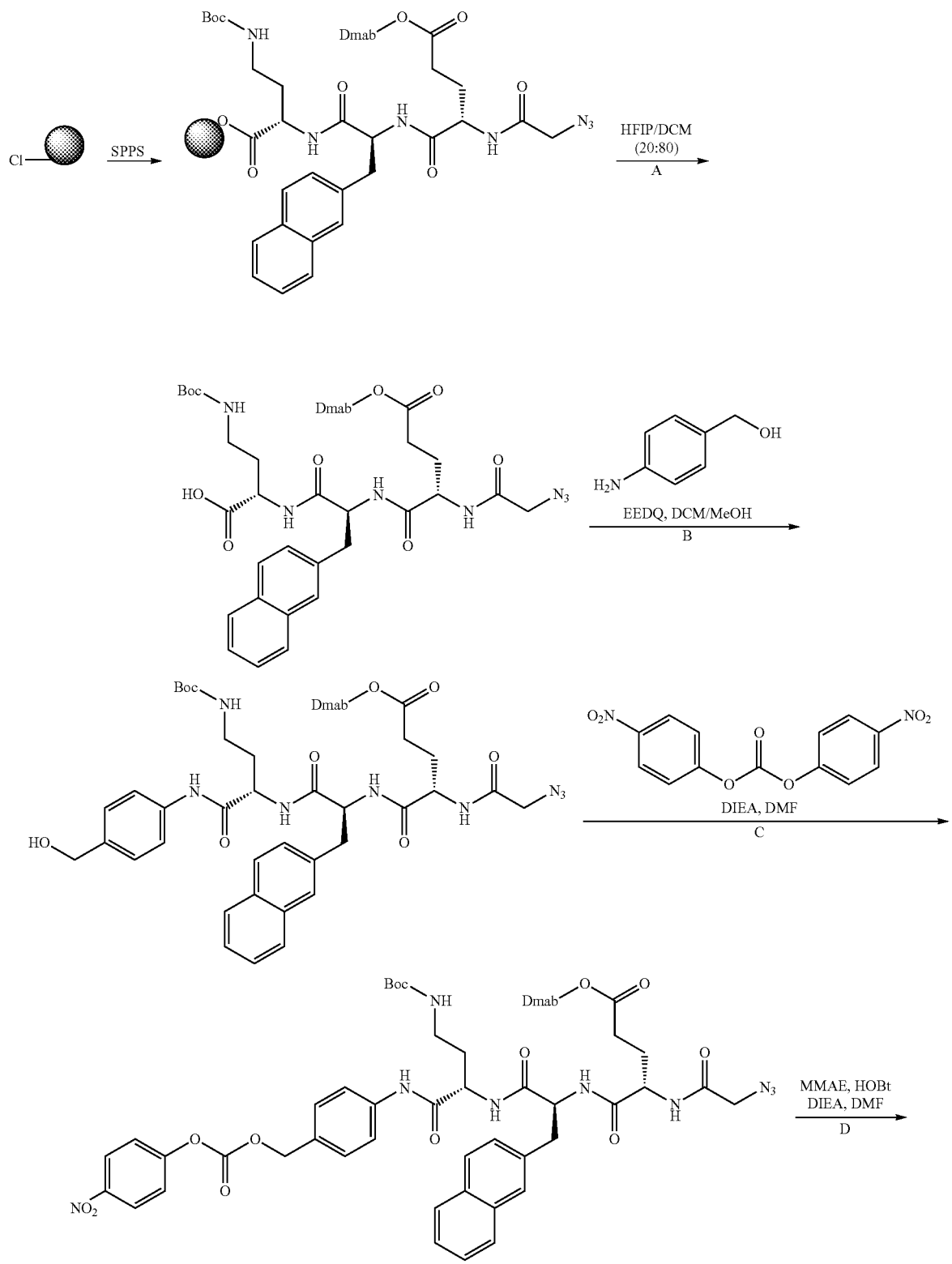

-continued
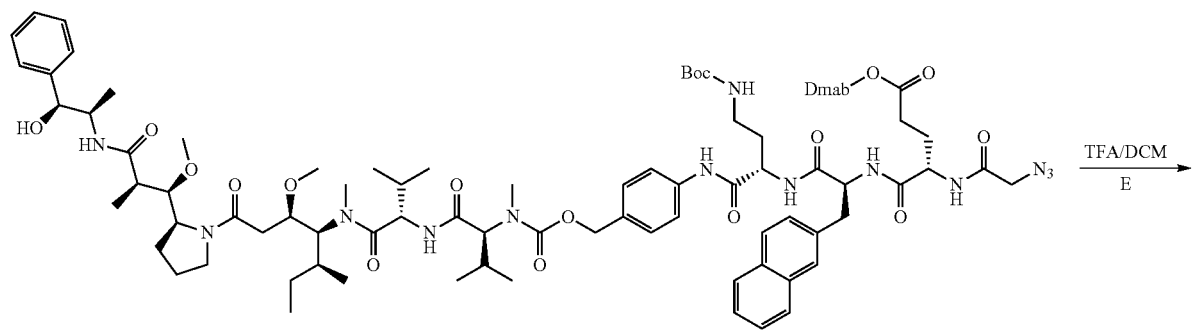
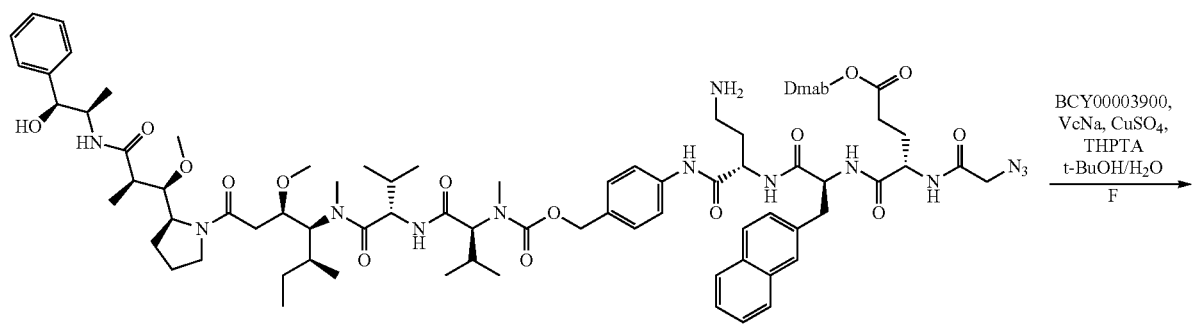
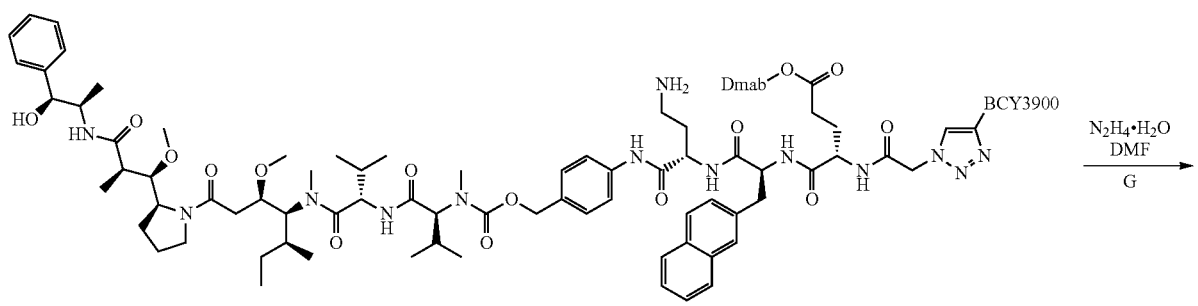
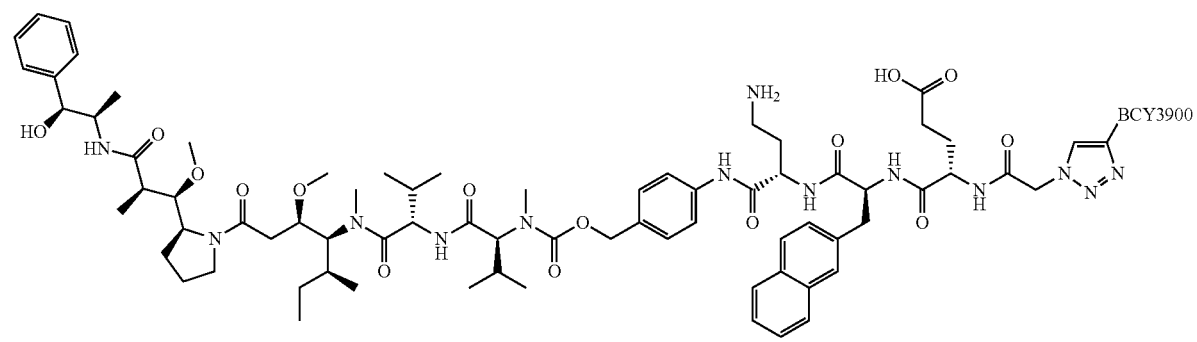

General methods were followed to yield BCY10986. Expected MW=4109.6, observed m/z: 1370 [M+3H]$^{3+}$, 1028 [M+4H]$^{4+}$.
BCY10987—(Dab-DPA-Glu)
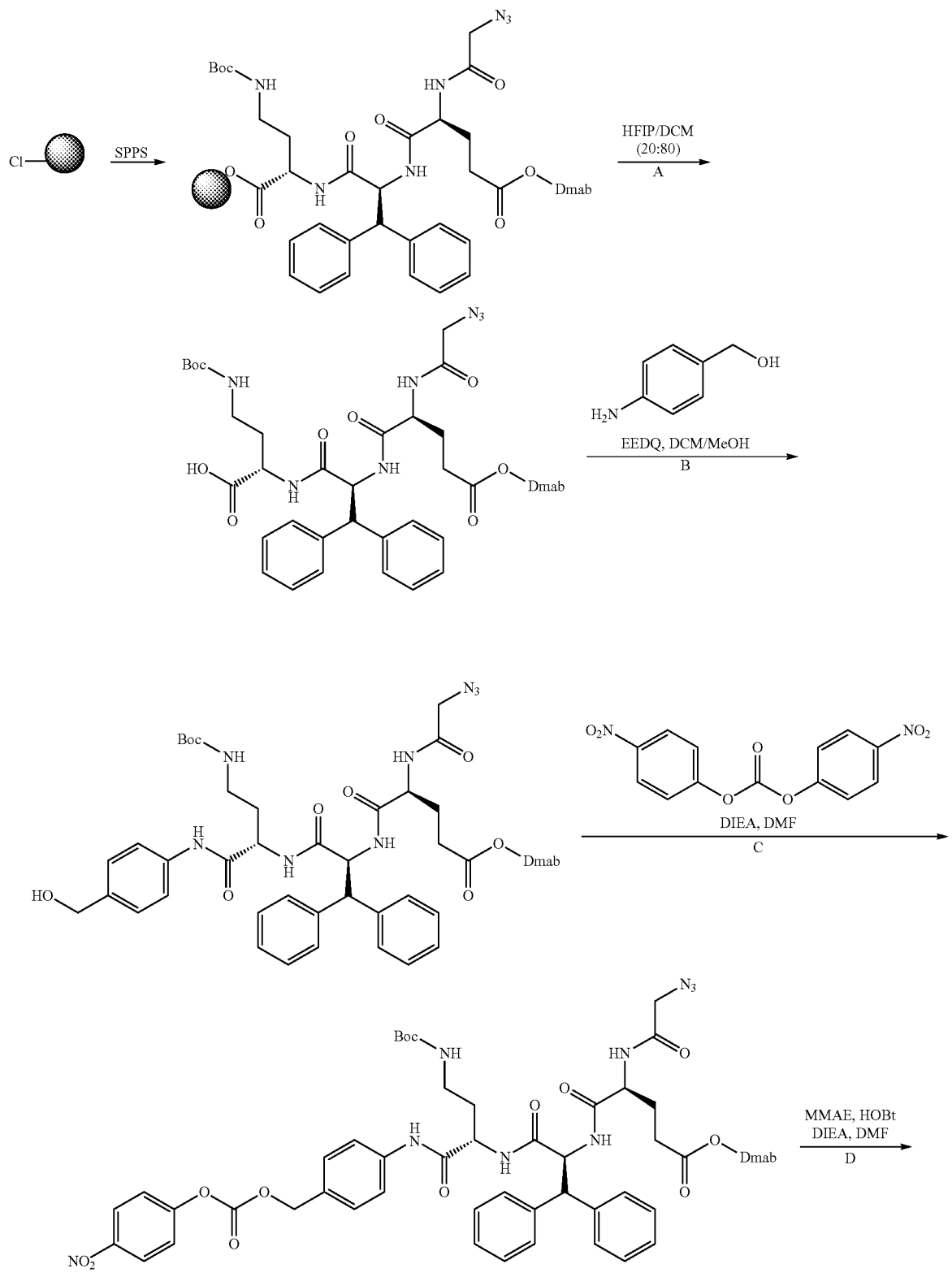

-continued
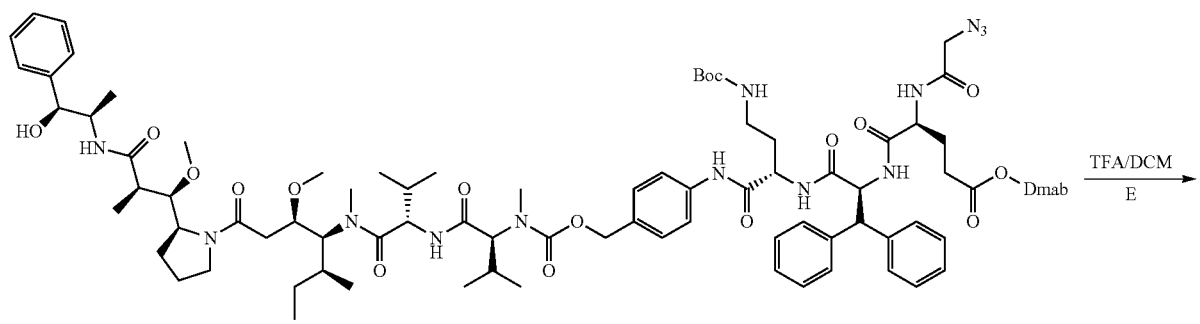
TFA/DCM
E
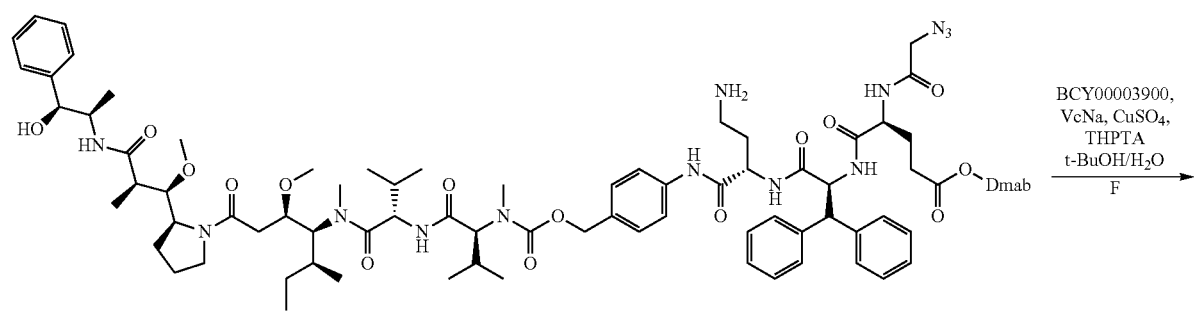
BCY00003900,
VcNa, CuSO₄,
THPTA
t-BuOH/H₂O
F
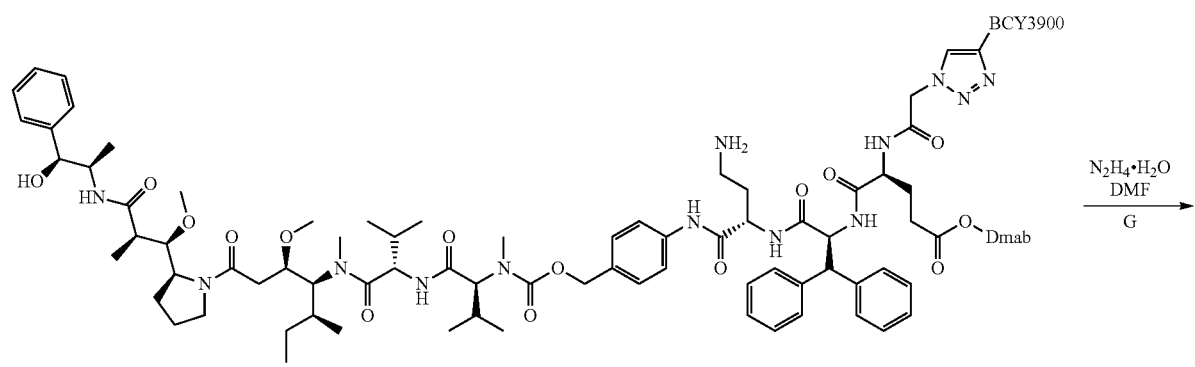
N₂H₄•H₂O
DMF
G
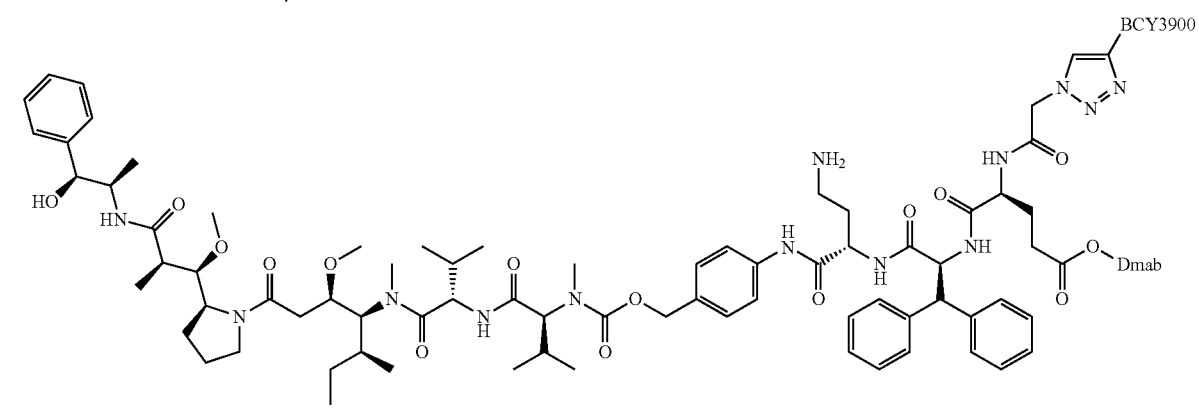

General methods were followed to yield BCY10987. Expected MW=4135.7, observed m/z: 1379 [M+3H]$^{3+}$, 1034 [M+4H]$^{4+}$.
BCY10983—(Agp-Val-Glu)
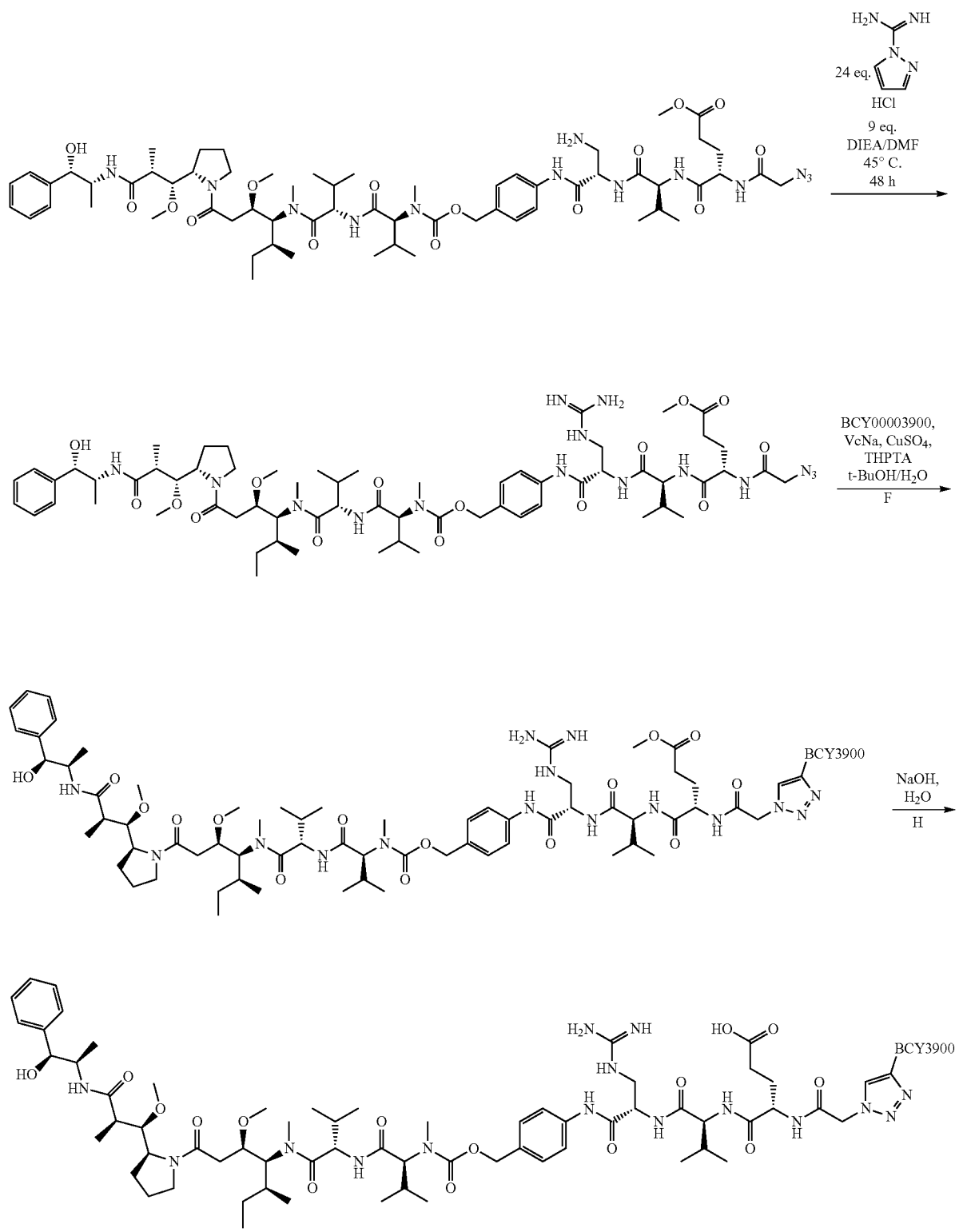

MMAE-PAB-Dap-Val-Glu(OMe)-AcAz intermediate was prepared as described in the synthesis of BCY10982. The side chain amine of Dap was then converted to the corresponding guanidine. MMAE-PAB-Dap-Val-Glu(OMe)-AcAz (1 eq) was stirred in DMF and to this was added DIEA (9 eq) and 1H-Pyrazole-1-carboxamidine hydrochloride (24 eq). The mixture was stirred at 45° C. for 24 hours then the mixture diluted and purified by preparative HPLC. The remaining synthetic steps were carried out using general methods to yield BCY10983. Expected MW=4039.5, observed m/z: 1346 $[M+3H]^{3+}$, 1010 $[M+4H]^{4+}$.

BCY10980—(Cit-Val-Glu)

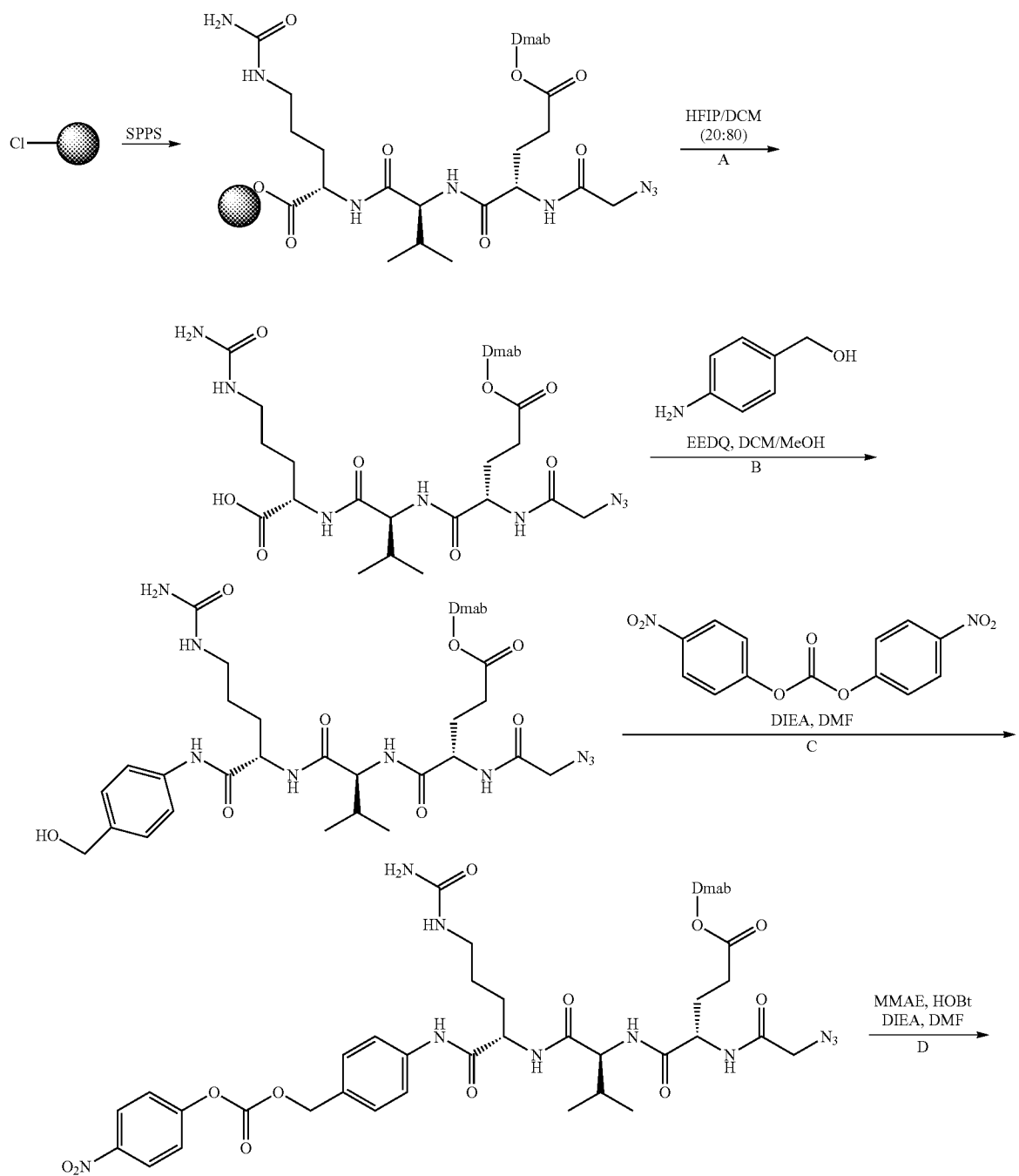

-continued
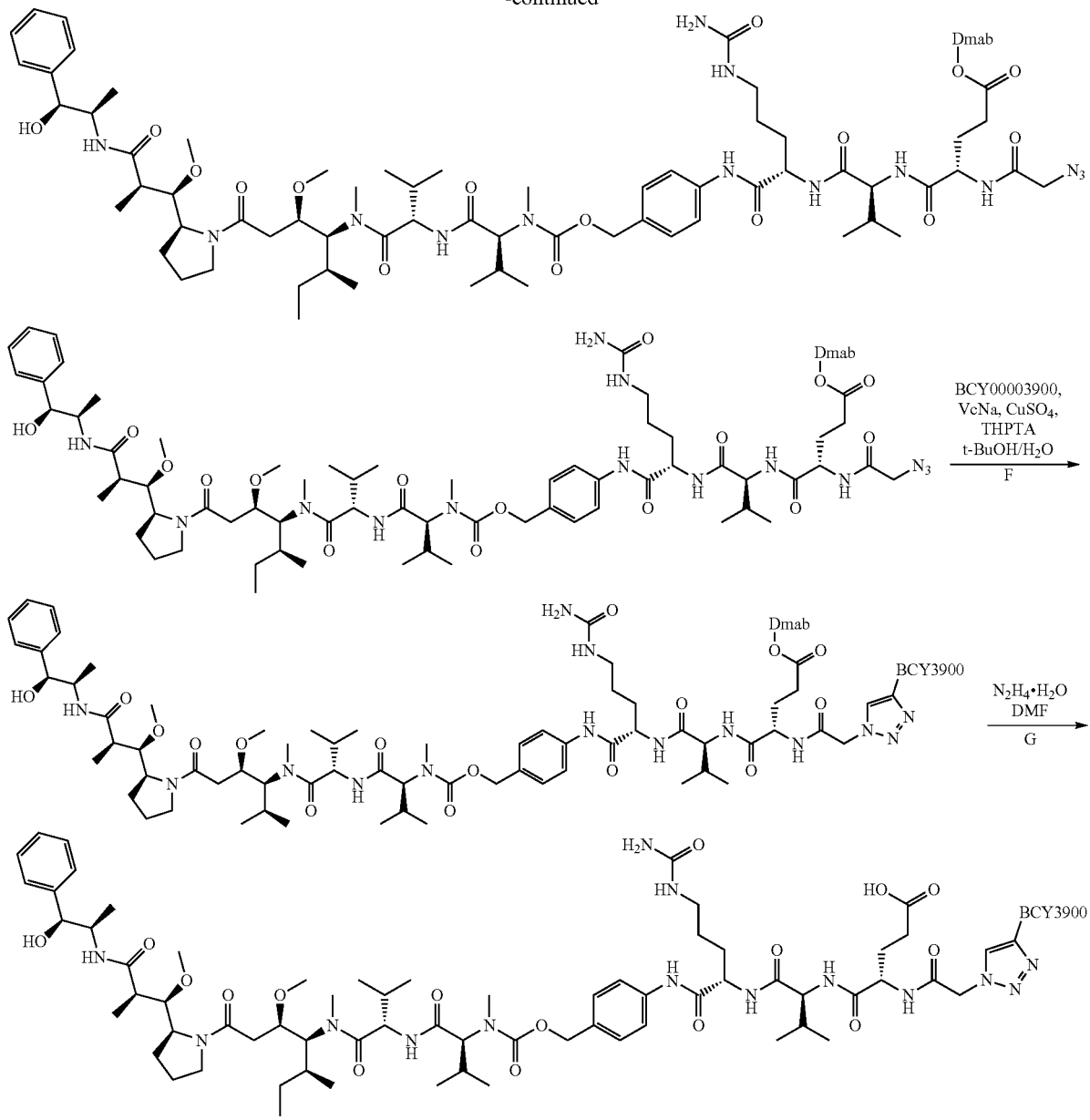
General methods were followed to yield BCY10980.
Expected MW=4068.6, observed m/z: 1356 [M+3H]$^{3+}$, 1017 [M+4H]$^{4+}$.
BCY10981—(Dab-Val-Glu)
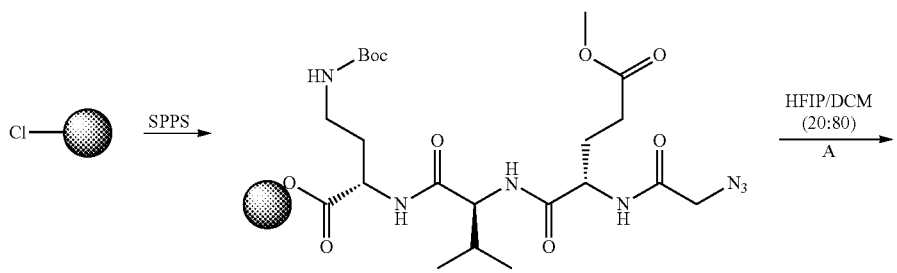

-continued
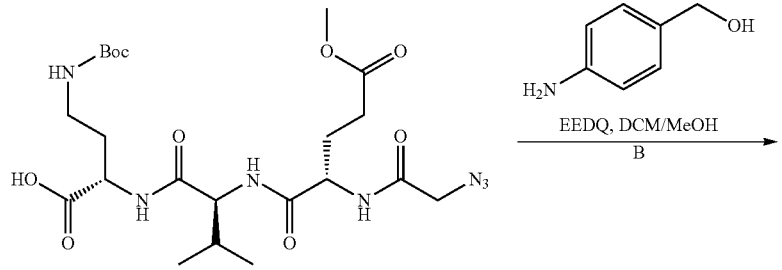
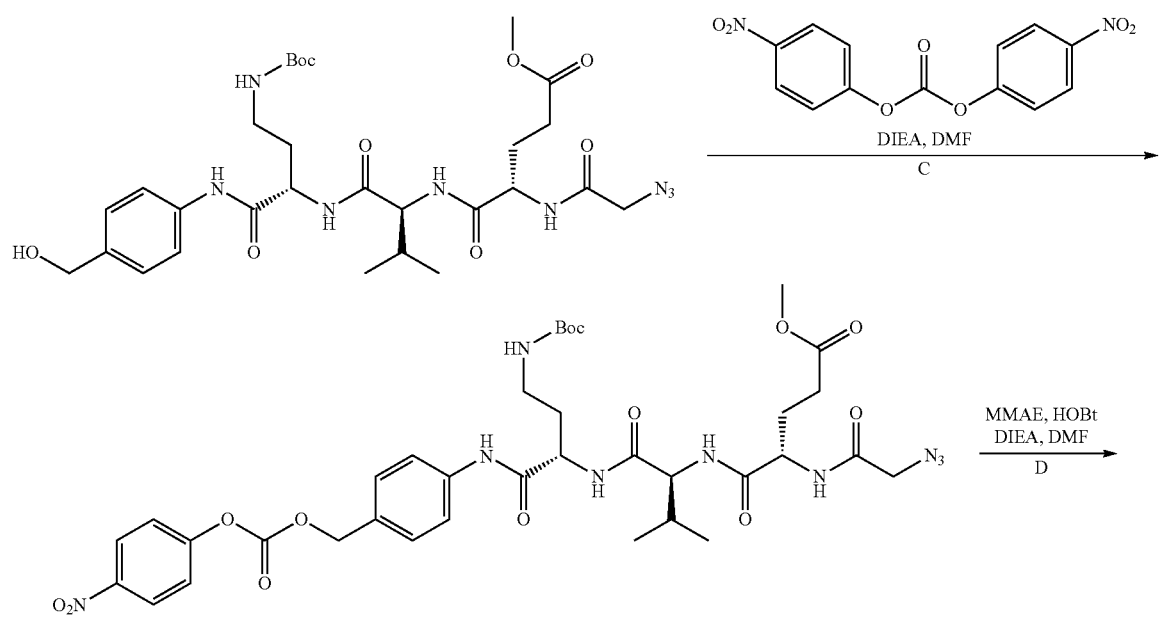
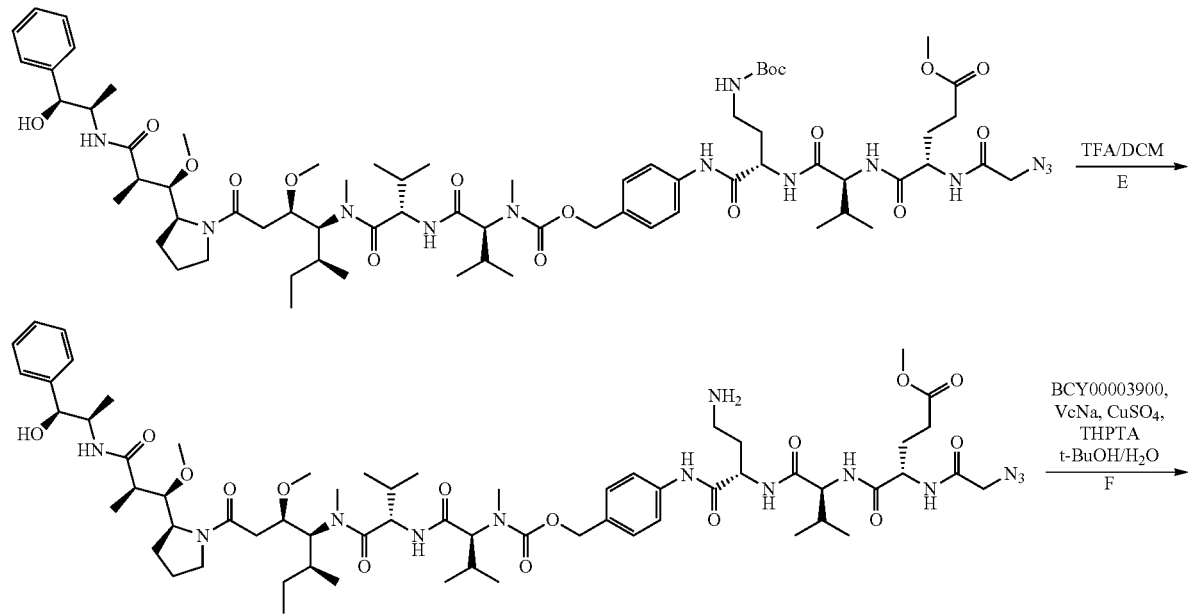

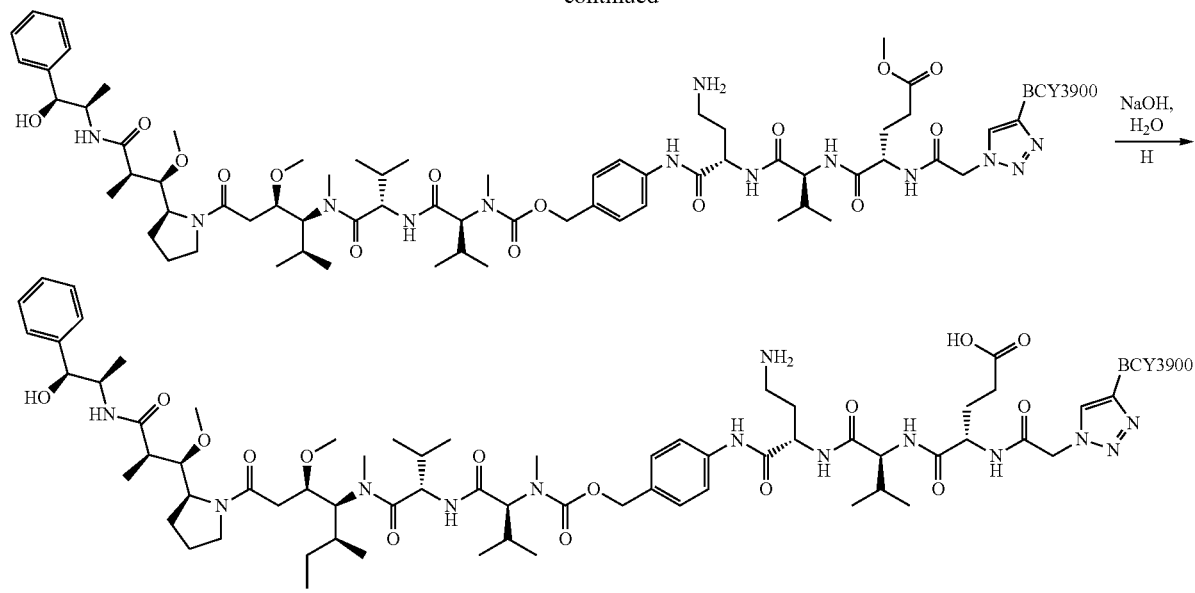
General methods were followed to yield BCY10981. Expected MW=4011.5, observed m/z: 1338 [M+3H]$^{3+}$, 1003 [M+4H]$^{4+}$.
BCY10982—(Dao-Val-Glu)
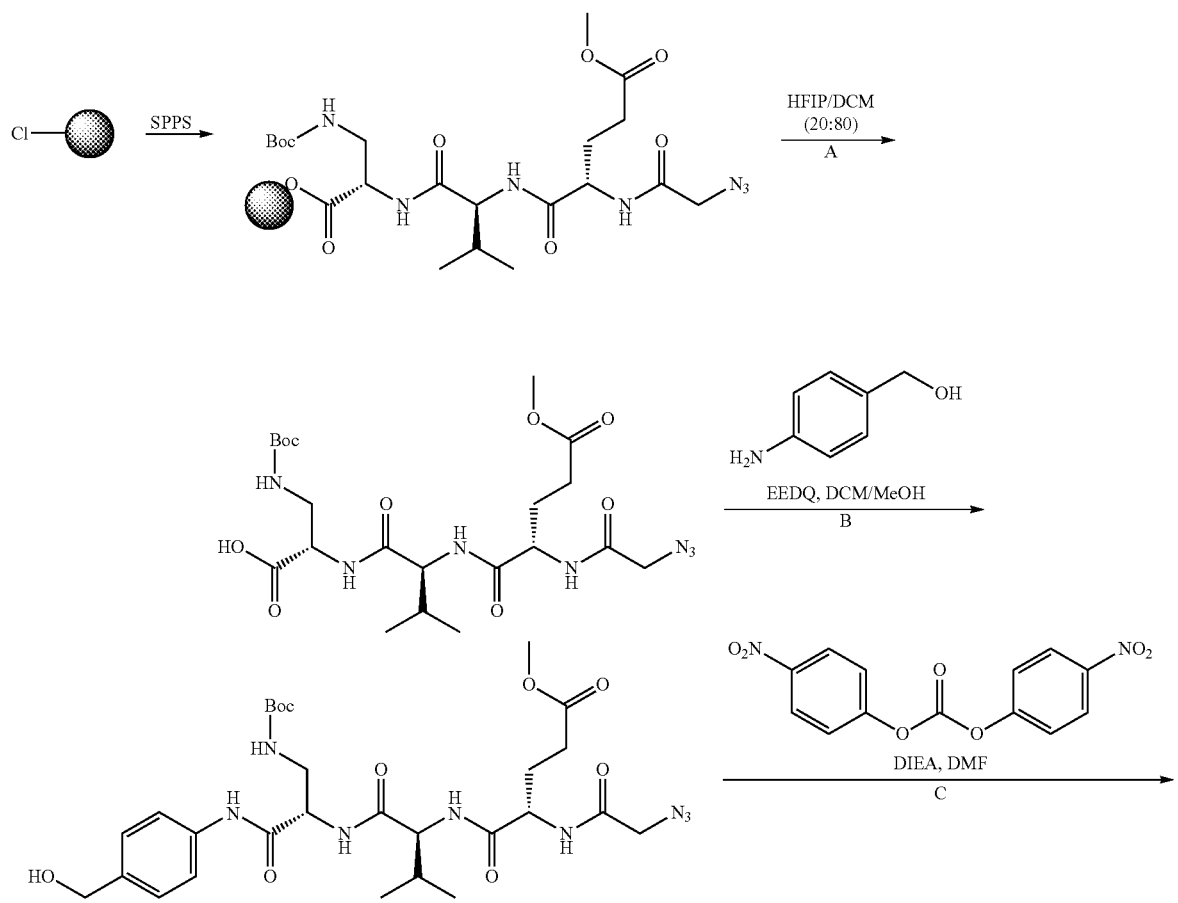

-continued
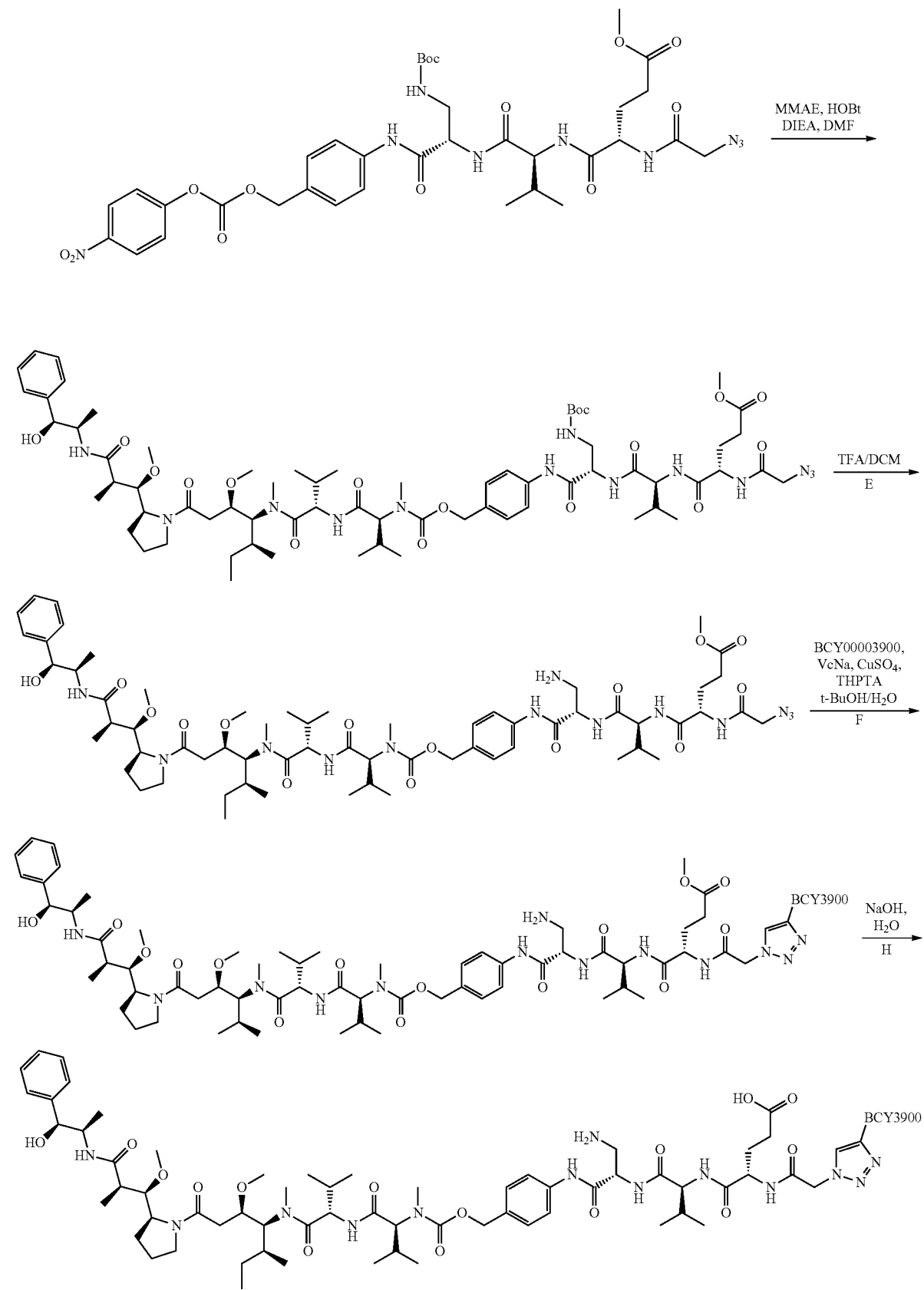

General methods were followed to yield BCY10982. Expected MW=3997.5, observed m/z: 1333 [M+3H]$^{3+}$, 1000 [M+4H]$^{4+}$.
BCY10984—(Cit-1Nal-Glu)
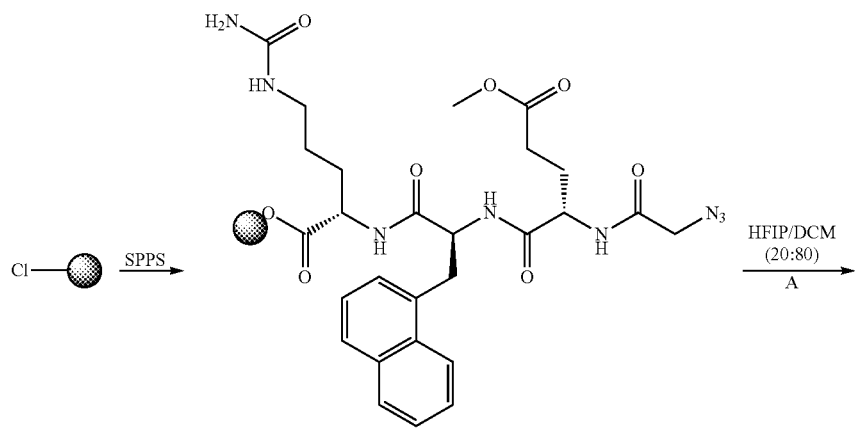
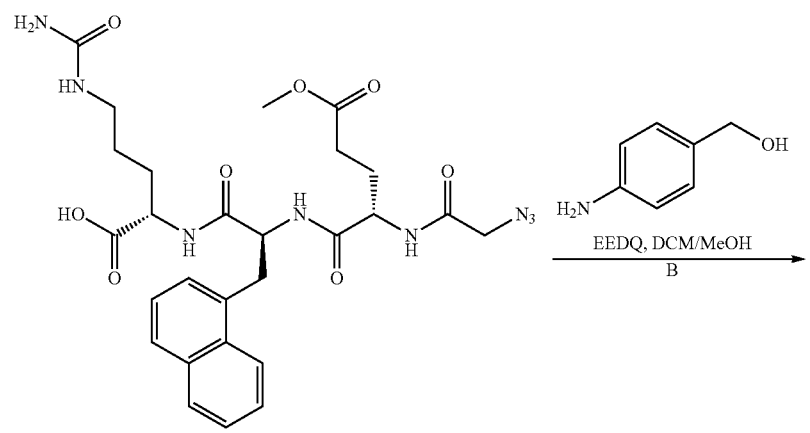
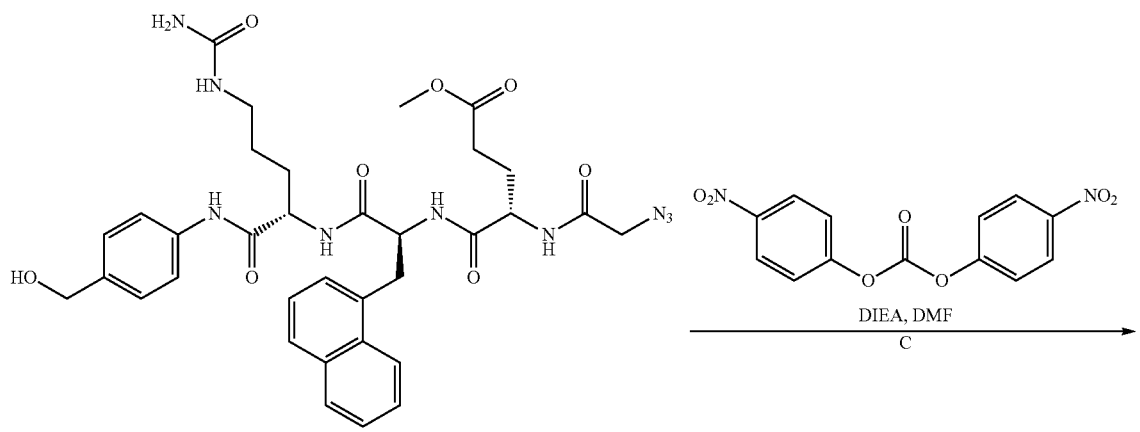

-continued
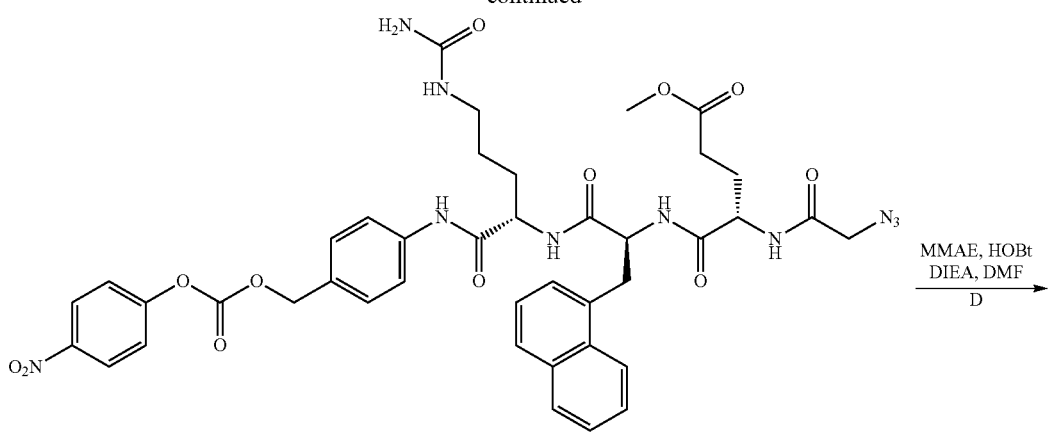
MMAE, HOBt
DIEA, DMF
D
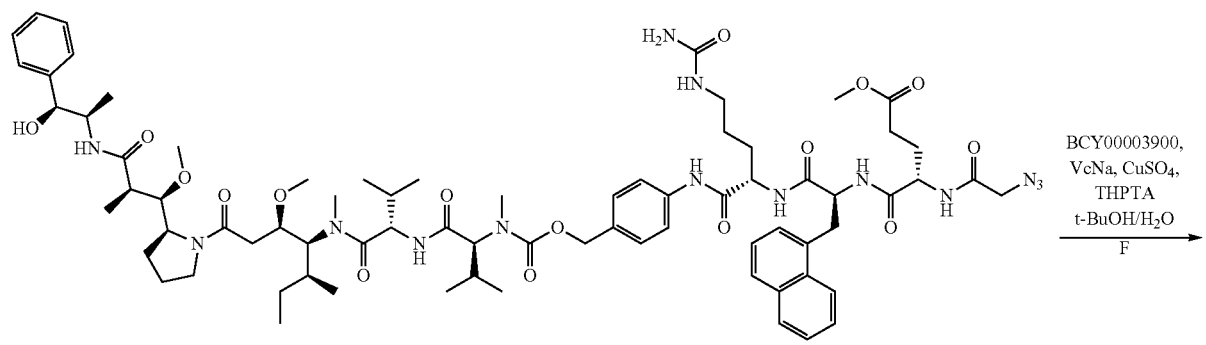
BCY00003900,
VcNa, CuSO$_4$,
THPTA
t-BuOH/H$_2$O
F
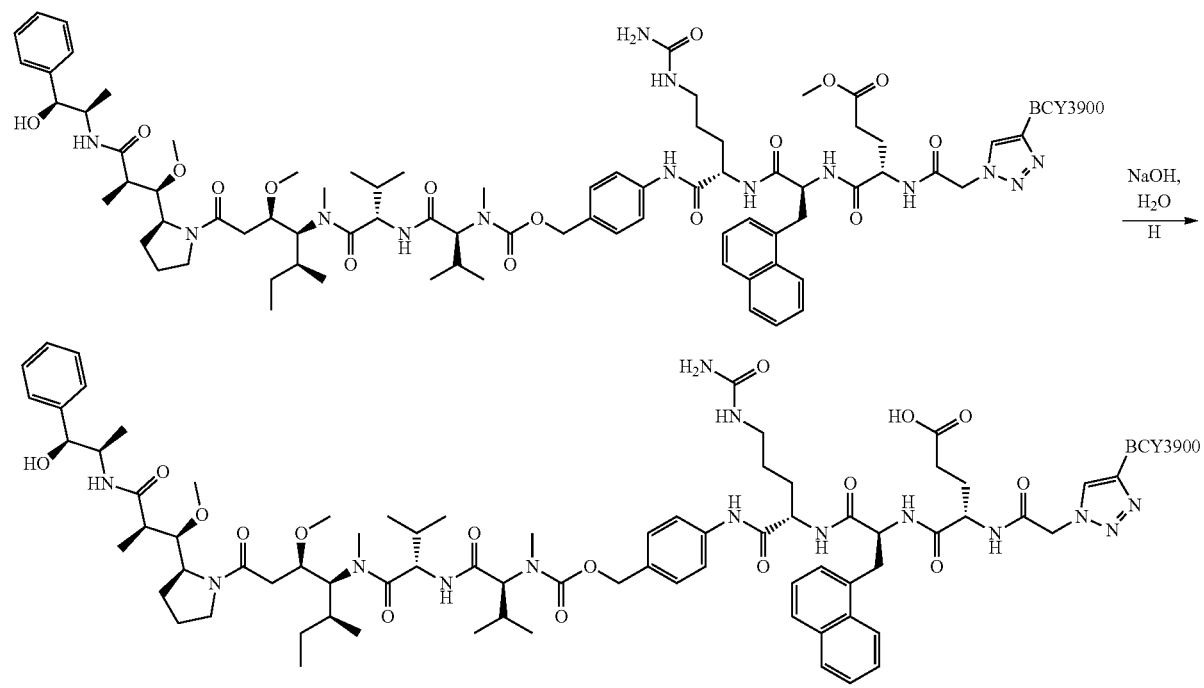
NaOH,
H$_2$O
H General methods were followed to yield BCY10984. Expected MW=4166.7, observed m/z: 1388 [M+3H]$^{3+}$, 1042 [M+4H]$^{4+}$.
BCY10985—(Dab-1Nal-Glu)
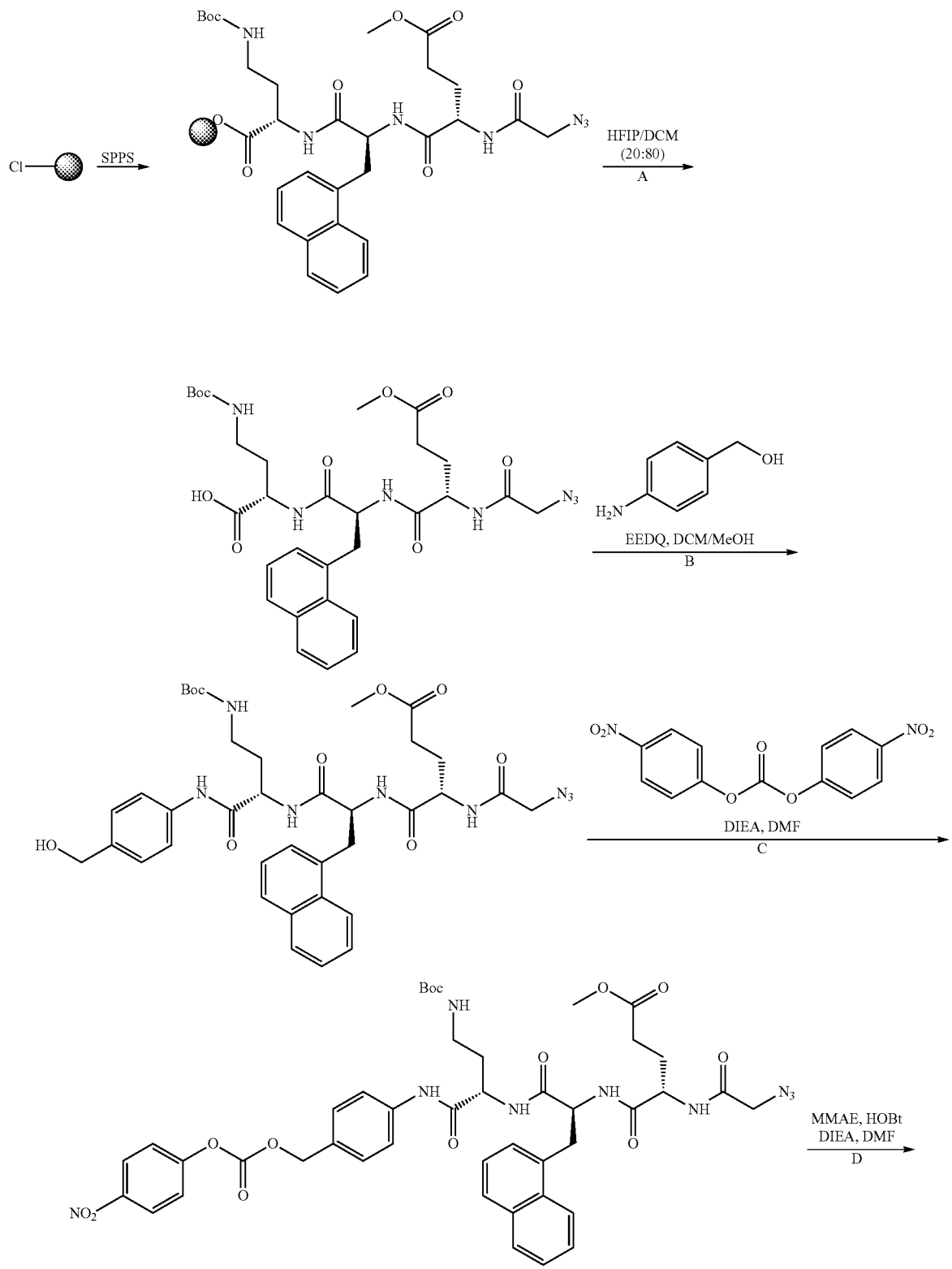

-continued
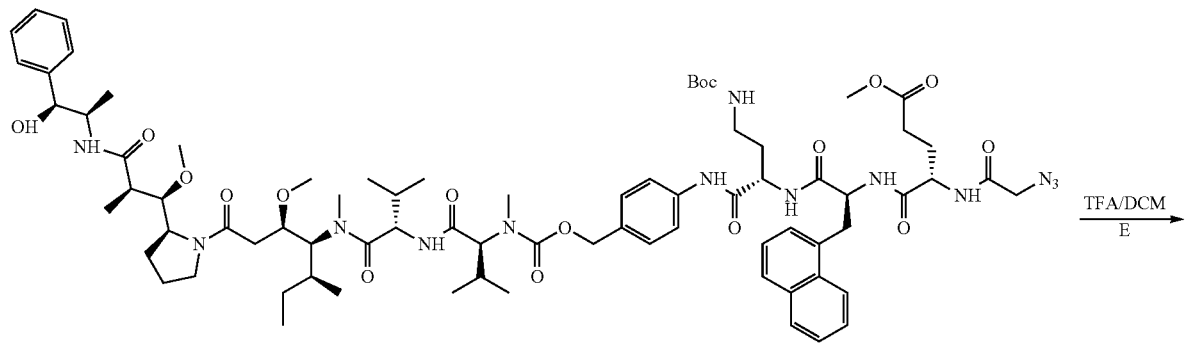
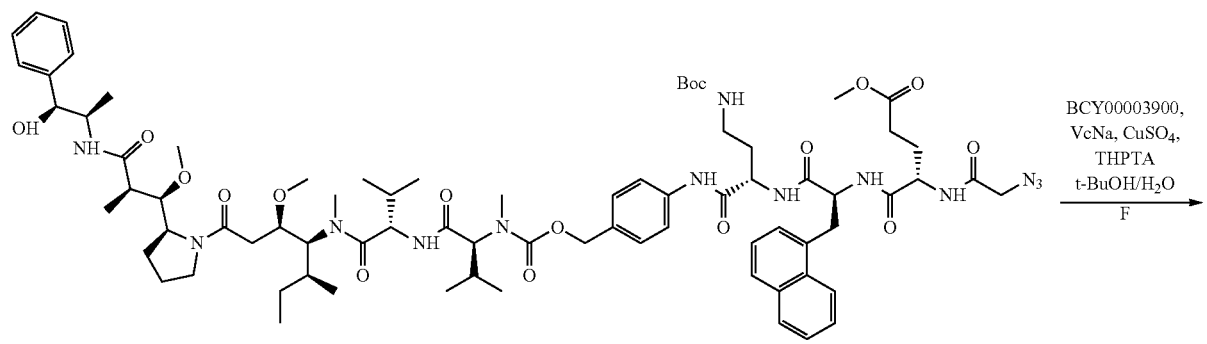
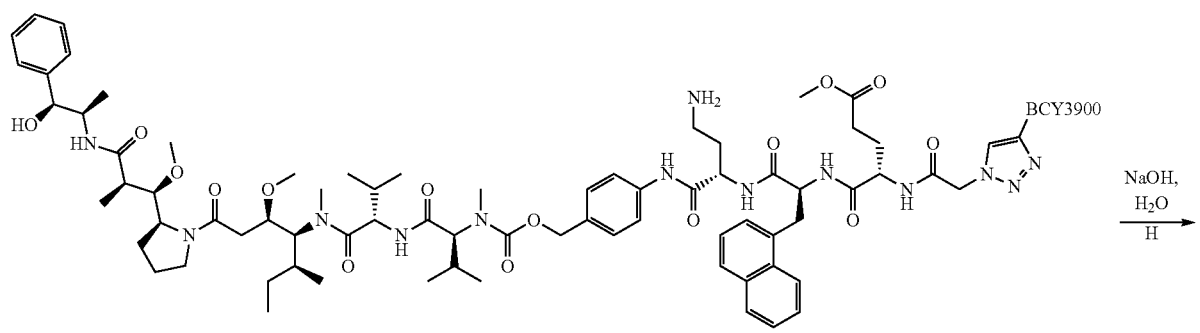
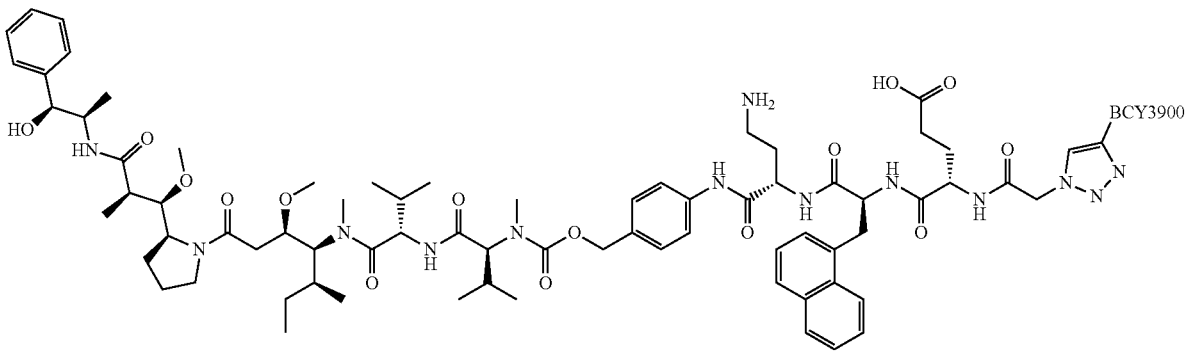

General methods were followed to yield BCY10985. Expected MW=4109.6, observed m/z: 1370 [M+3H]$^{3+}$, 1028 [M+4H]$^{4+}$.

BCY10298—(Dap-Val)

Preparation of Compound 1

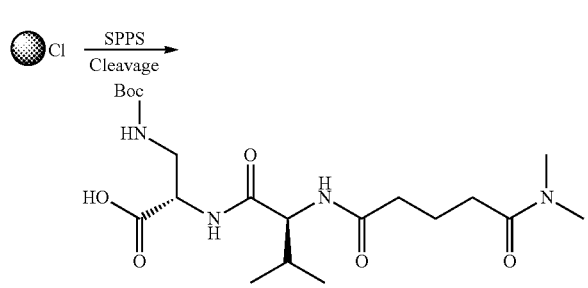

DCM was added to a vessel containing CTC Resin (5 mmol, 4.50 g, 1.10 mmol/g), then Fmoc-Dap(Boc)-OH (2.13 g, 5 mmol, 1.0 eq) was added with N$_2$ bubbling. DIEA (4.0 eq) was added dropwise and the resin mixed for 2 hr. MeOH (4.5 mL) was added and the resin again mixed for 30 min. The resin was then drained and washed with DMF 5 times.

Fmoc groups were removed by adding 20% piperidine/DMF and leaving to react for 30 min, then the resin was drained and washed with DMF 5 times.

To couple subsequent amino acids, Fmoc-amino acid solution in DMF was added to the resin and mixed for 30 seconds, then activating agent and base were added. The coupling was left to react for 1 hr with continuous N$_2$ bubbling. Rounds of coupling and Fmoc deprotection were repeated with the following amino acids

| # | Materials | Coupling reagents/base |
|---|---|---|
| 1 | Fmoc-Dap(Boc)-OH (1.0 eq) | DIEA (4.0 eq) |
| 2 | Fmoc-Val-OH (3.0 eq) | HBTU (2.85 eq) and DIEA (6.0 eq) |
| 3 | Glutaric Anhydride (3.0 eq) | DIEA (6.0 eq) |
| 4 | Dimethylamine•HCl(3.0 eq) | HBTU (2.85 eq) and DIEA (6.0 eq) |

After the final coupling, the resin was washed with MeOH 3 times, and then dried under vacuum. Cleavage from the resin was performed by the addition of 20% HFIP/80% DCM to the flask containing the side chain protected peptide at room temperature. The cleavage was then repeated (1 hr each) with continuous N$_2$ bubbling. The resin was filtered and the filtrate collected, then concentrated to remove the solvent. The crude peptide was lyophilized to give compound 1 (1.64 g, 94.1% purity, 73.7% yield). Expected MW=444.53, observed m/z: 445.12 [M+H]$^+$.

Preparation of Compound 2

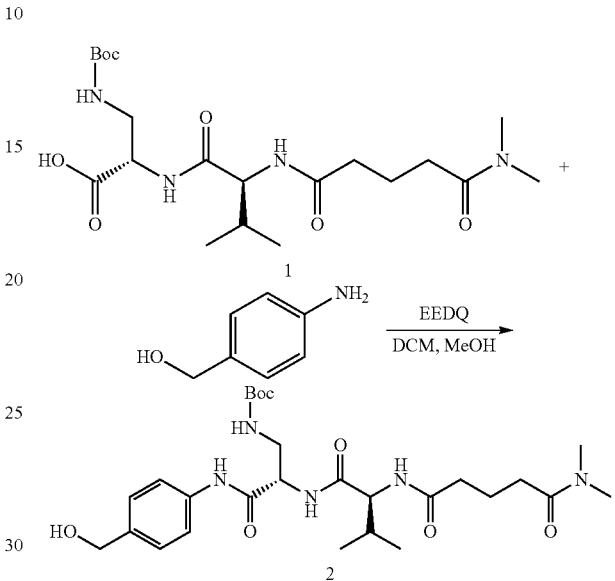

To a solution of compound 1 (800 mg, 1.80 mmol, 1.0 eq) in DCM (16.0 mL) and MeOH (8.00 mL) was added (4-aminophenyl)methanol (266 mg, 2.16 mmol, 1.2 eq) and EEDQ (890 mg, 3.60 mmol, 2.0 eq) in the dark. The mixture was stirred at 25° C. for 16 hr. TLC (DCM:MeOH=10:1, R$_f$=0.46) indicated compound 1 was consumed completely. LC-MS showed compound 1 was consumed completely and one main peak with desired m/z was detected. The reaction mixture was concentrated under reduced pressure to give a residue. The residue was purified by flash silica gel chromatography (ISCO®; 40 g SepaFlash® Silica Flash Column, Eluent of 0~20% MeOH/DCM@60 mL/min) to give compound 2 (550 mg, 1.00 mmol, 55.6% yield) as a pale brown solid. Expected MW=549.66, observed m/z: 450.04 [(M-Boc)+H]$^+$ and 550.08 [M+H]$^+$.

Preparation of Compound 3

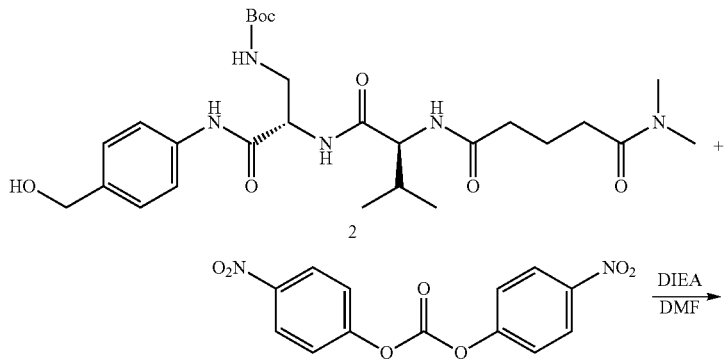

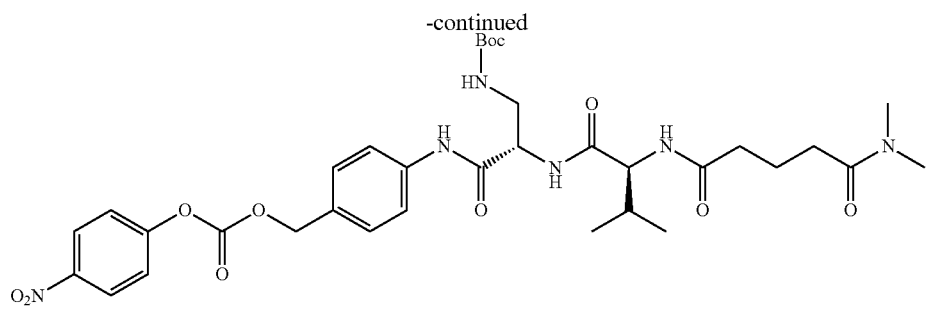

3

To a solution of compound 2 (550 mg, 1.00 mmol, 1.0 eq) in DMF (7.00 mL) was added bis(4-nitrophenyl) carbonate (913 mg, 3.00 mmol, 3.0 eq) and DIEA (517 mg, 4.00 mmol, 697 μL, 4.0 eq) under $N_2$ atmosphere. The mixture was stirred at 25° C. for 2 hr. LC-MS showed compound 2 was consumed completely and one main peak with desired m/z was detected. The reaction mixture was purified by preparative HPLC (neutral condition) to give compound 3 (560 mg, 783 μmol, 78.30% yield) as a pale yellow solid. Expected MW=714.76, observed m/z: 614.96 [(M-Boc)+H]$^+$ and 715.01 [M+H]$^+$.

Preparation of Compound 4

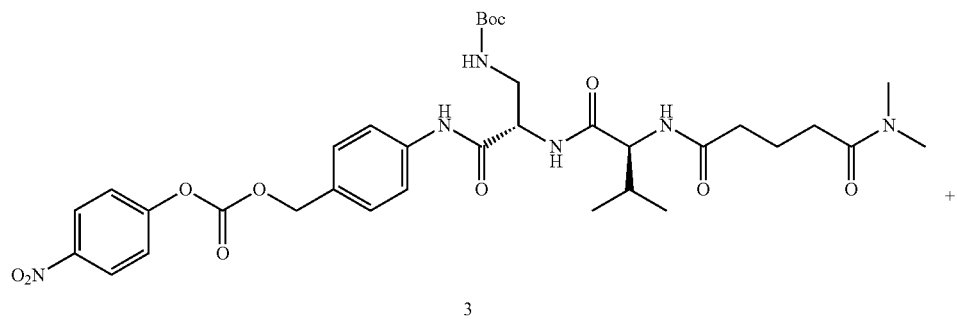

3

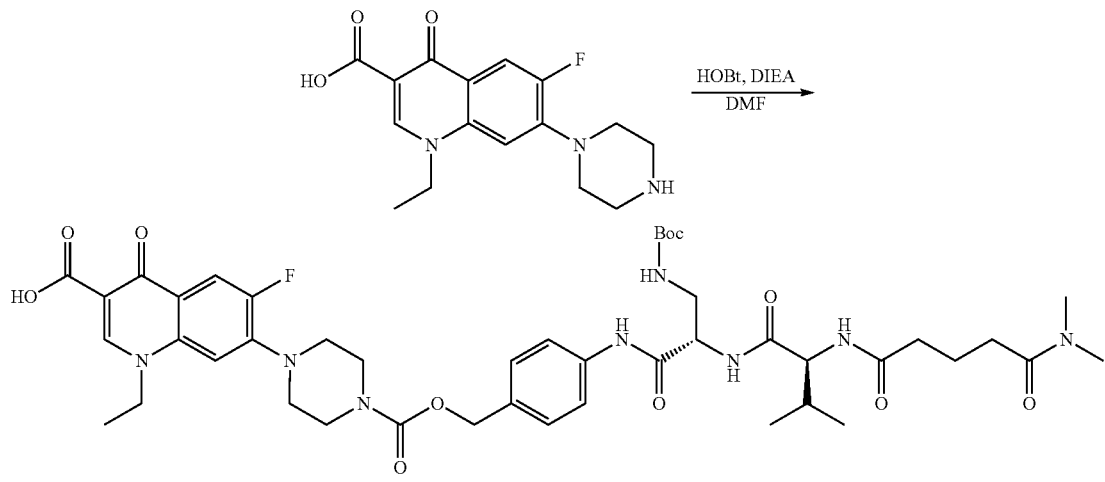

4

To a solution of compound 3 (550 mg, 769 μmol, 1.0 eq) in DMF (6.00 mL) was added DIEA (398 mg, 3.08 mmol, 536 μL, 4.0 eq) and stirred for 10 min under N₂ atmosphere. Then 1-ethyl-6-fluoro-4-oxo-7-piperazin-1-yl-quinoline-3-carboxylic acid (491 mg, 1.54 mmol, 2.0 eq) and HOBt (208 mg, 1.54 mmol, 2.0 eq) were added to the mixture. The mixture was stirred at 25° C. for 2 hr. LC-MS showed compound 3 was consumed completely and one main peak with desired m/z was detected. The reaction mixture was washed by addition H₂O (250 mL) at 25° C., filtered and concentrated under reduced pressure to give crude product compound 4 (580 mg, crude) as yellow solid, which was used into the next step without further purification. Expected MW=894.98, observed m/z: 398.04 [(M-Boc)/2+H]⁺, 895.06 [M+H]⁺.

Preparation of BCY10298

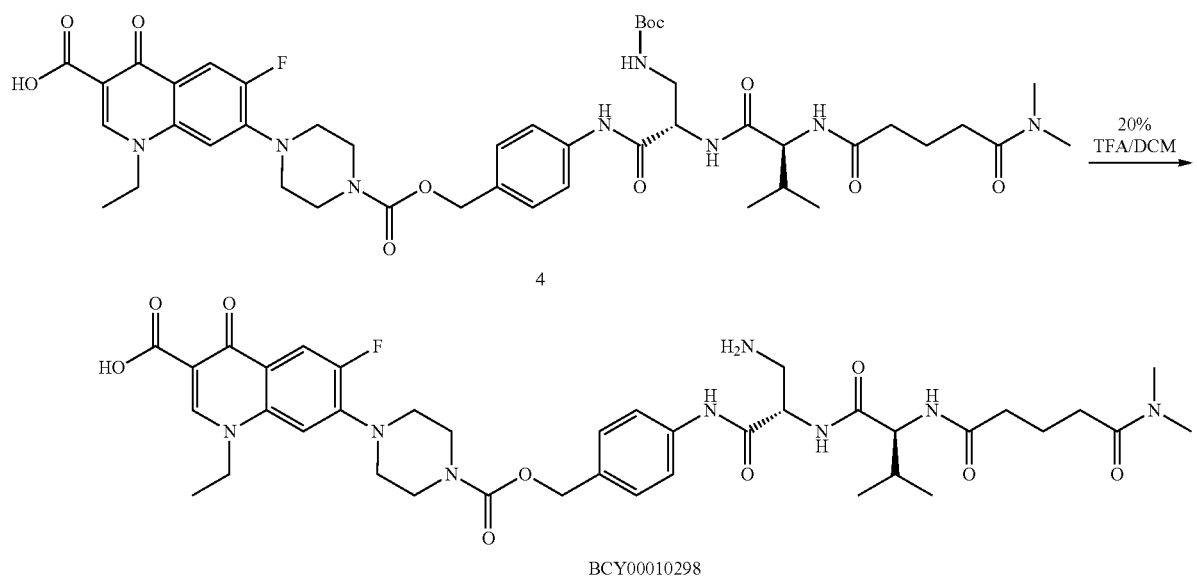

To a solution of compound 4 (250 mg, 279 μmol, 1.0 eq) in DCM (2.40 mL) was added TFA (924 mg, 8.10 mmol, 0.60 mL, 29.0 eq). The mixture was stirred at 25° C. for 2 hr. LC-MS showed compound 4 was consumed completely and one main peak with desired m/z was detected. The reaction mixture was concentrated under reduced pressure to give a residue. The residue was purified by preparative HPLC (A: 0.075% TFA in H₂O, B: ACN) to give BCY10298 (160 mg, 194 μmol, 69.6% yield) as a white solid. Expected MW=794.87, observed m/z: 398.06 [M/2+H]⁺, 795.02 [M+H]⁺.

BCY10300—(Dap(CNNH₂)-Val)

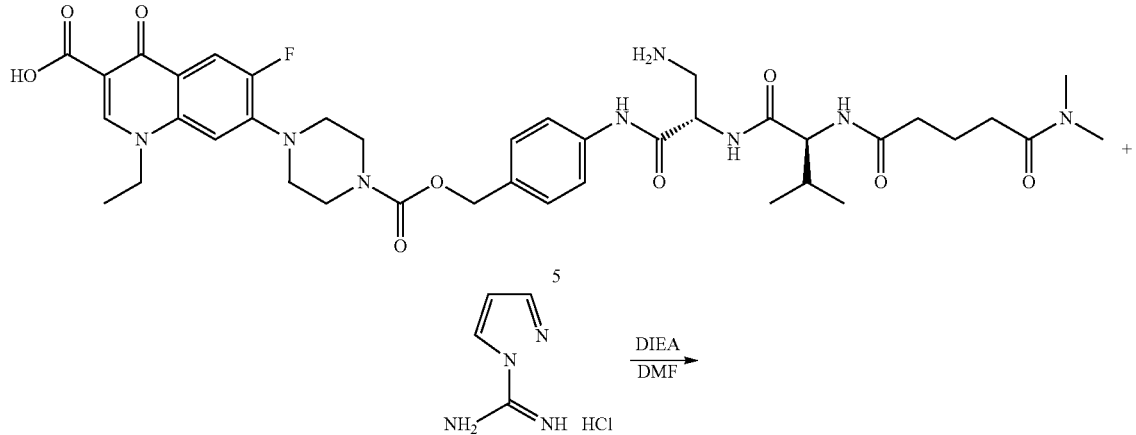

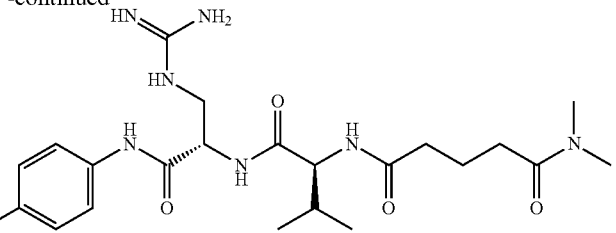

BCY00010300

To a solution of BCY10298 (85.0 mg, 107 μmol, 1.0 eq) in DMF (1.00 mL) was added chloro(pyrazole-1-carboximidoyl)ammonium (15.6 mg, 107 μmol, 1.0 eq) and DIEA (41.5 mg, 321 μmol, 60.0 μL, 3.0 eq) under N$_2$ atmosphere. The mixture was stirred at 25° C. for 16 hr. LC-MS showed compound 5 was consumed completely and one main peak with desired m/z was detected. The reaction mixture was purified by preparative HPLC (A: 0.075% TFA in H$_2$O, B: ACN) to give BCY10300 (39.3 mg, 46.2 μmol, 43.1% yield, 98.3% purity) as a white solid. Expected MW=836.91, observed m/z: 419.11 [M/2+H]$^+$ and 836.95 [M+H]$^+$.

BCY9474—(Dab-Val)

Preparation of Compound 2

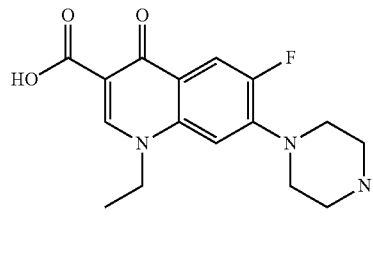

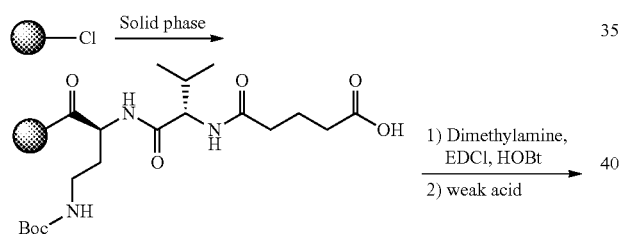

DCM was added to a vessel containing CTC Resin (10 mmol, 9.10 g, 1.10 mmol/g), then Fmoc-Dab(Boc)-OH (4.40 g, 10 mmol, 1.0 eq) was added with N$_2$ bubbling. DIEA (4.0 eq) was added dropwise and the resin mixed for 2 hr. MeOH (9.1 mL) was added and the resin again mixed for 30 min. The resin was then drained and washed with DMF 5 times.

Fmoc groups were removed by adding 20% piperidine/DMF and leaving to react for 30 min, then the resin was drained and washed with DMF 5 times.

To couple subsequent amino acids, Fmoc-amino acid solution in DMF was added to the resin and mixed for 30 seconds, then activating agent and base were added. The coupling was left to react for 1 hr with continuous N$_2$ bubbling. Rounds of coupling and Fmoc deprotection were carried out with the following amino acids:

| # | Materials | Coupling reagents |
|---|---|---|
| 1 | Fmoc-Dab(Boc)-OH (1.0 eq) | DIEA (4.0 eq) |
| 2 | Fmoc-Val-OH (3.0 eq) | HBTU (2.85 eq) and DIEA (6.0 eq) |
| 3 | tetrahydropyran-2,6-dione (3.0 eq) | HBTU (2.85 eq) and DIEA (6.0 eq) |
| 4 | Dimethylamine•HCl (3.0 eq) | HBTU (2.85 eq) and DIEA (6.0 eq) |

After the final coupling, the resin was washed with MeOH 3 times, and then dried under vacuum. Cleavage from the resin was performed by the addition of 20% HFIP/80% DCM to the flask containing the side chain protected peptide at room temperature. The cleavage was then repeated (1 hr each) with continuous N$_2$ bubbling. The resin was filtered and the filtrate collected, then concentrated to remove the solvent. The crude peptide was lyophilized to give compound 2 (2.50 g, 96.6% purity, 54.40% yield). Expected MW=458.56, observed m/z: 459.4 [M+H]$^+$.

Preparation of Compound 3

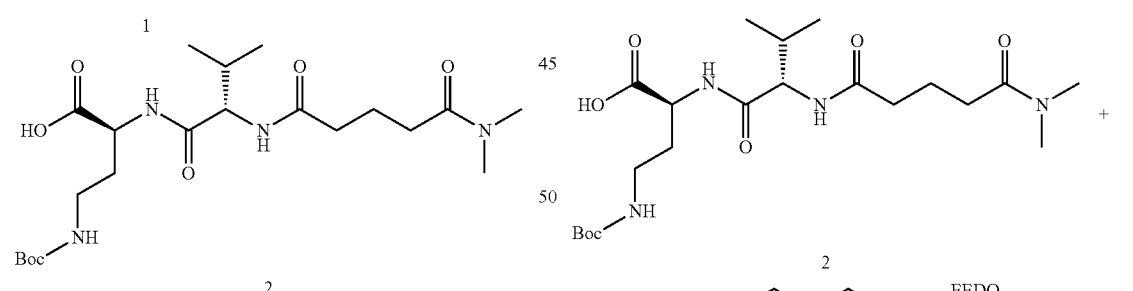

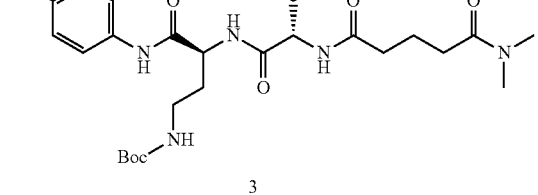

To a solution of compound 2 (2.50 g, 5.45 mmol, 1.0 eq) in DCM (50.0 mL) and MeOH (25.0 mL) was added (4-aminophenyl)methanol (806 mg, 6.54 mmol, 1.2 eq) and EEDQ (2.70 g, 10.9 mmol, 2.0 eq) in the dark. The mixture was stirred at 25° C. for 16 hr in the dark. TLC (DCM: MeOH=10:1, $R_f$=0.35) indicated compound 2 was consumed completely. LC-MS showed majority of compound 2 was consumed and one main peak with desired m/z for compound 3 was detected. The reaction mixture was concentrated under reduced pressure to give a residue. The residue was purified by flash silica gel chromatography (ISCO®; 80 g SepaFlash® Silica Flash Column, Eluent of 0~20% MeOH/DCM@60 mL/min) to give compound 3 (1.65 g, 2.93 mmol, 53.7% yield) as a pale yellow solid. Expected MW=563.69, observed m/z: 464.3 [(M-Boc)+H]$^+$ and 564.3 [M+H]$^+$.

Preparation of Compound 4

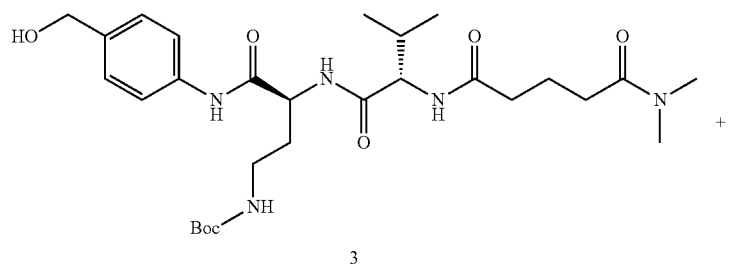

3

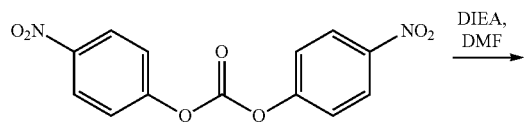

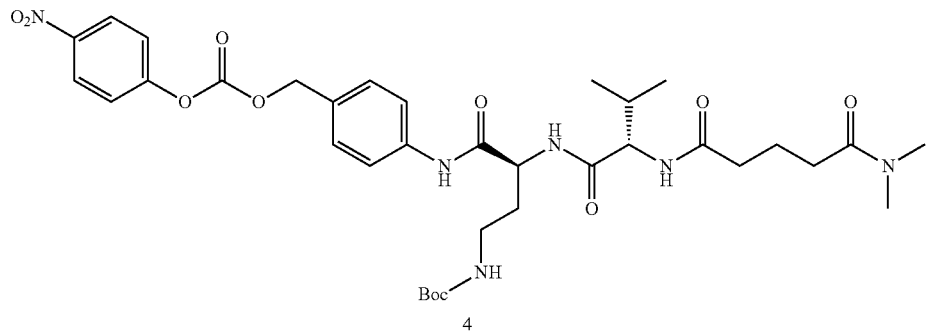

4

To a solution of compound 3 (1.65 g, 2.93 mmol, 1.0 eq) in DMF (10.0 mL) was added bis(4-nitrophenyl)carbonate (2.67 g, 8.78 mmol, 3.0 eq) and DIEA (1.51 g, 11.7 mmol, 2.04 mL, 4.0 eq) under $N_2$ atmosphere. The mixture was stirred at 25° C. for 2 hr. LC-MS showed one main peak with desired m/z for compound 4 was detected. The reaction mixture was purified by preparative HPLC (neutral condition) to give compound 4 (1.56 g, 1.33 mmol, 45.3% yield, 62.0% purity) as a pale yellow solid. Expected MW=728.79, observed m/z: 729.3 $[M+H]^+$.

Preparation of Compound 5

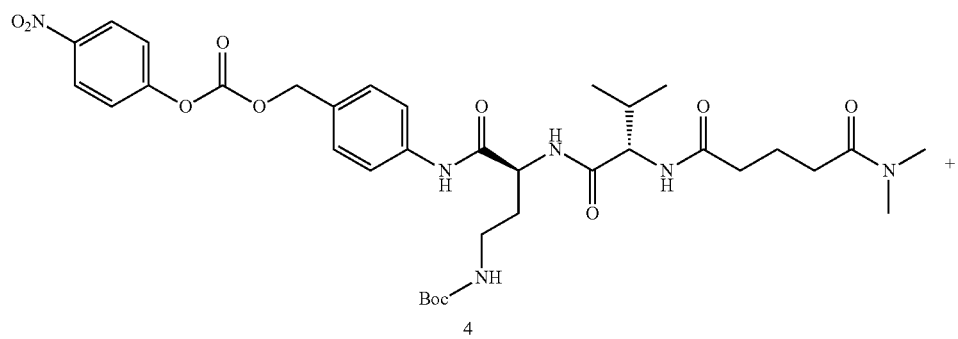

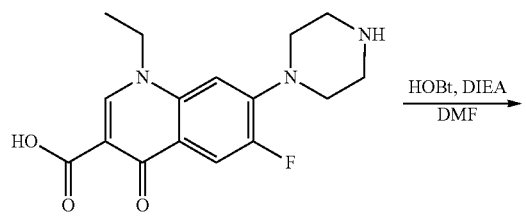

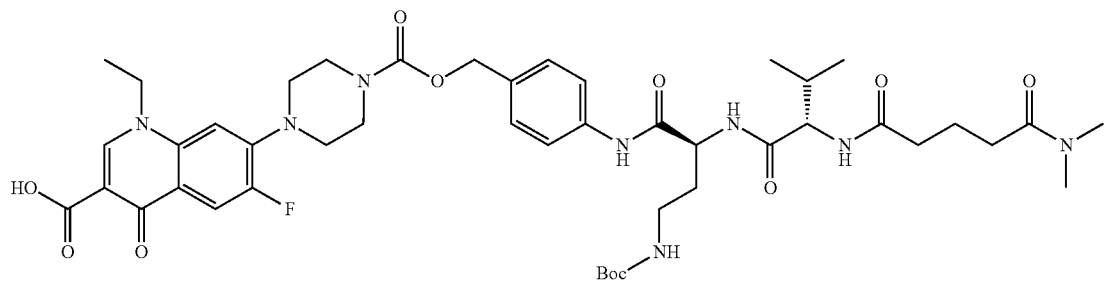

To a solution of compound 4 (1.56 g, 2.14 mmol, 1.0 eq) in DMF (10.0 mL) was added DIEA (1.38 g, 10.7 mmol, 1.86 mL, 5.0 eq) and stirred for 10 min. Then 1-ethyl-6-fluoro-4-oxo-7-piperazin-1-yl-quinoline-3-carboxylic acid (1.37 g, 4.28 mmol, 2.0 eq) and HOBt (578 mg, 4.28 mmol, 2.0 eq) were added to the mixture under $N_2$ atmosphere. The mixture was stirred at 35° C. for 2 hr. LC-MS showed one main peak with desired m/z for compound 5 was detected. The reaction mixture was purified by preparative HPLC (neutral condition) to give compound 5 (1.45 g, 1.60 mmol, 74.5% yield) as a pale yellow solid. Expected MW=909.01, observed m/z: 909.3 [M+H]$^+$.

Preparation of BCY9474

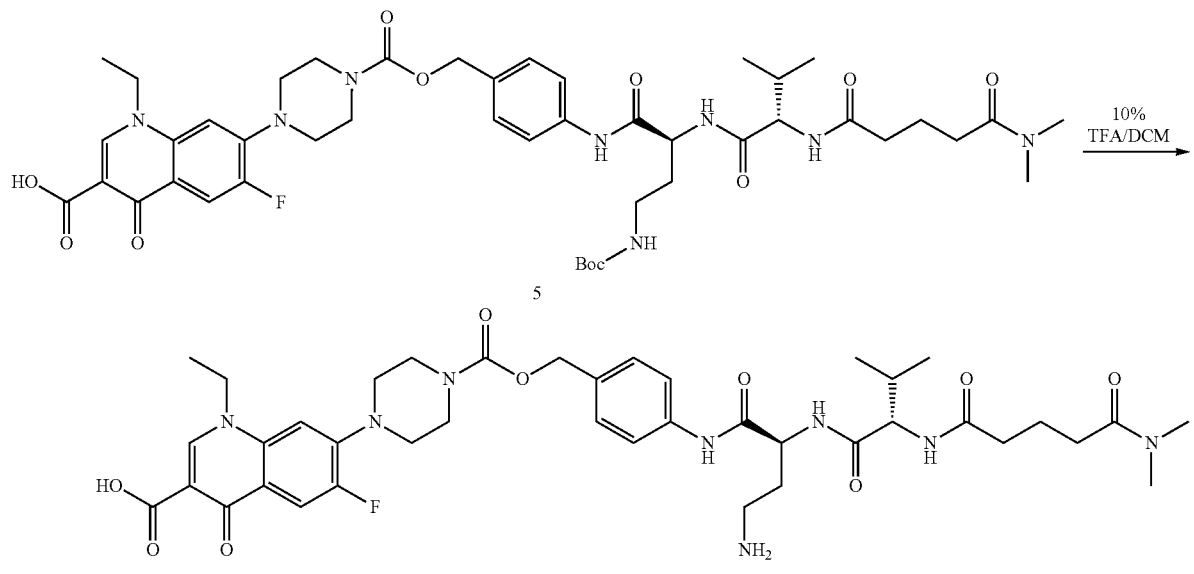

To a solution of compound 5 (1.45 g, 1.60 mmol, 1.0 eq) in DCM (9.00 mL) was added TFA (1.54 g, 13.5 mmol, 1.00 mL, 8.47 eq). The mixture was stirred at 25° C. for 1 hr. LC-MS showed compound 5 was consumed completely and one main peak with desired m/z was detected. The reaction mixture was concentrated under reduced pressure to give a residue. The residue was purified by preparative HPLC (neutral condition) to give BCY9474 (850 mg, 1.05 mmol, 65.9% yield, 98.74% purity) as a pale yellow solid. Expected MW=808.90, observed m/z: 405.3 [M/2+H]$^+$ and 809.3 [M+H]$^+$.

BCY9423—(Agb-Val)

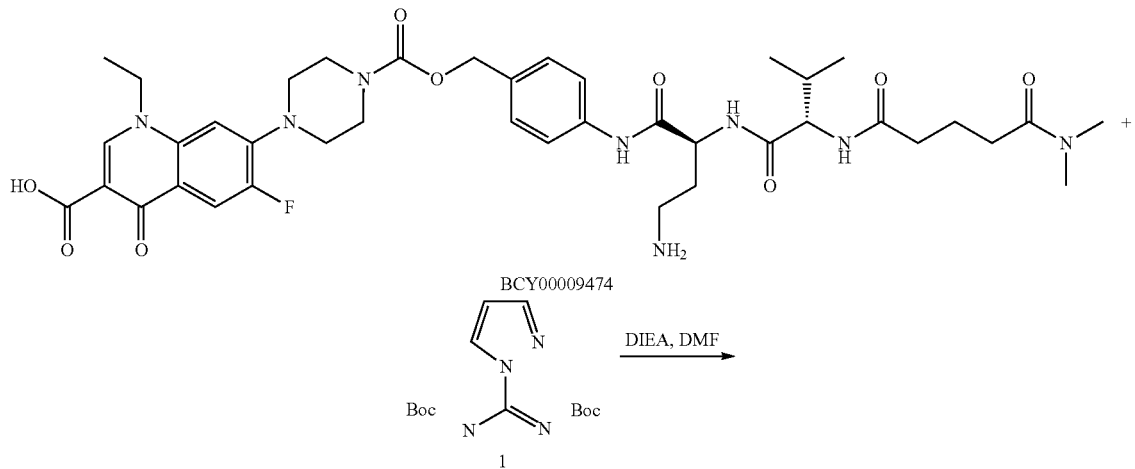

-continued

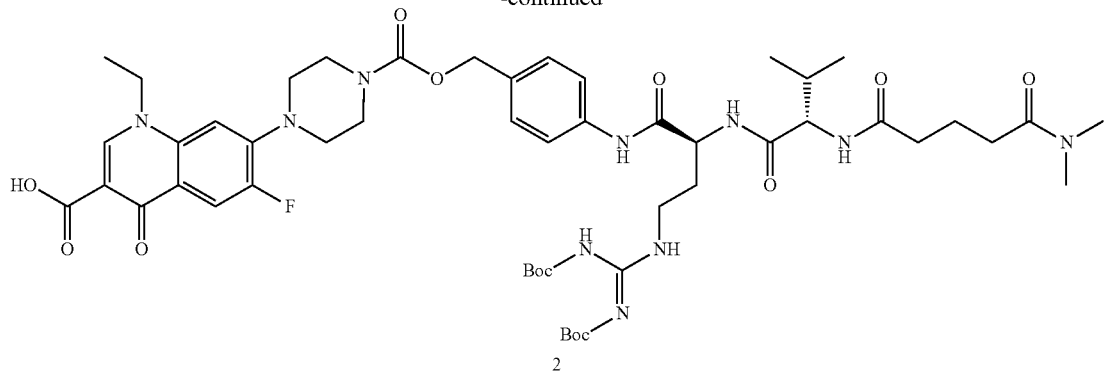

2

To a solution of BCY9474 (150 mg, 185 μmol, 1.0 eq) in DMF (2.00 mL) was added tert-butyl (NZ)—N-[(tert-butoxycarbonylamino)-pyrazol-1-ylmethylene]carbamate (86.3 mg, 278 μmol, 1.5 eq) and DIEA (47.9 mg, 371 μmol, 64.6 μL, 2.0 eq). The mixture was stirred at 25° C. for 16 hr. LC-MS showed majority of BCY9474 was consumed and one main peak with desired m/z for compound 2 was detected. The reaction mixture was purified by preparative HPLC (neutral condition) to give compound 2 (110 mg, 105 μmol, 56.4% yield) as a white solid. Expected MW=1050.52, observed m/z: 525.70 [M/2+H]$^+$ and 1050.82 [M+H]$^+$.

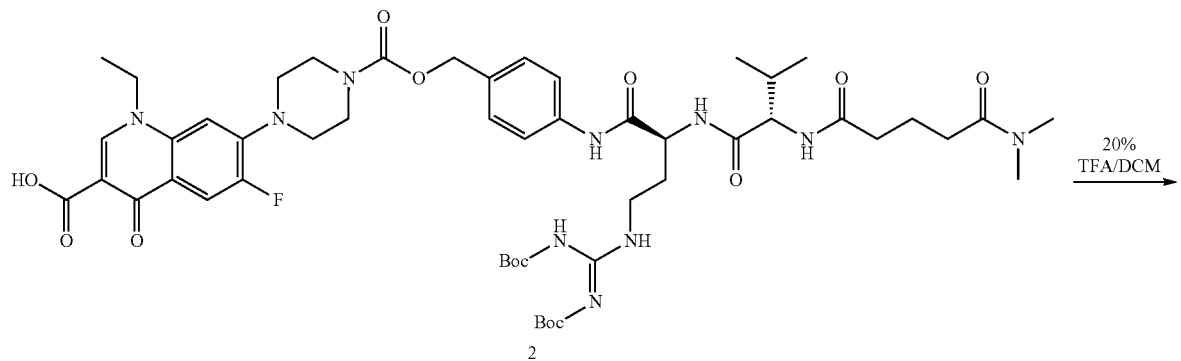

2

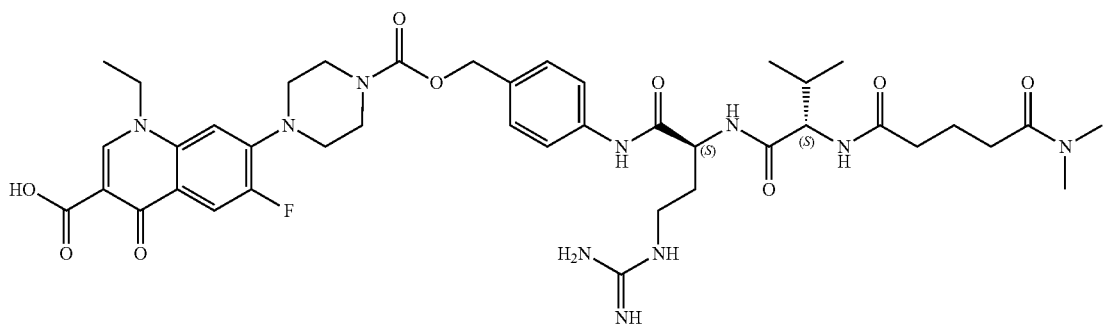

BCY00009423

To a solution of compound 2 (110 mg, 105 μmol, 1.0 eq) in DCM (2.00 mL) was added TFA (770 mg, 6.75 mmol, 500 μL, 64.5 eq). The mixture was stirred at 25° C. for 0.5 hr. LC-MS showed compound 2 was consumed completely and one main peak with desired m/z was detected. The reaction mixture was concentrated under reduced pressure to give a residue. The residue was purified by preparative HPLC (TFA condition) to give BCY9423 (20.8 mg, 24.2 μmol, 23.1% yield, 98.8% purity) as a white solid. Expected MW=850.94, observed m/z: 425.72 [M/2+H]$^+$, 850.67 [M+H]$^+$.

BCY9477—(Agb(Me)-Val)

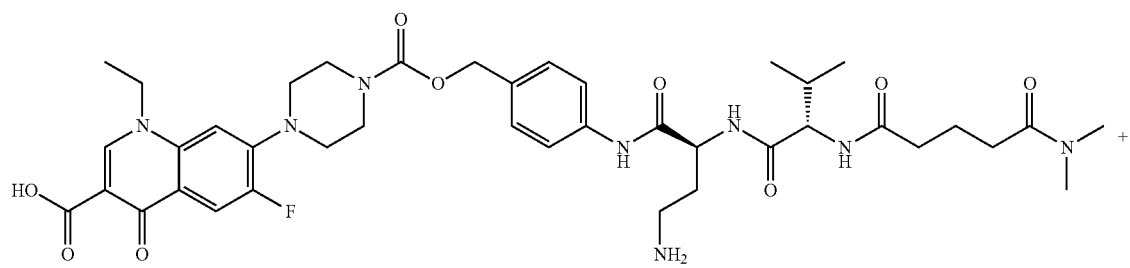

BCY00009474

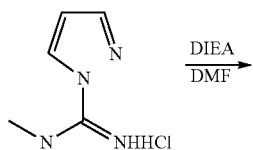

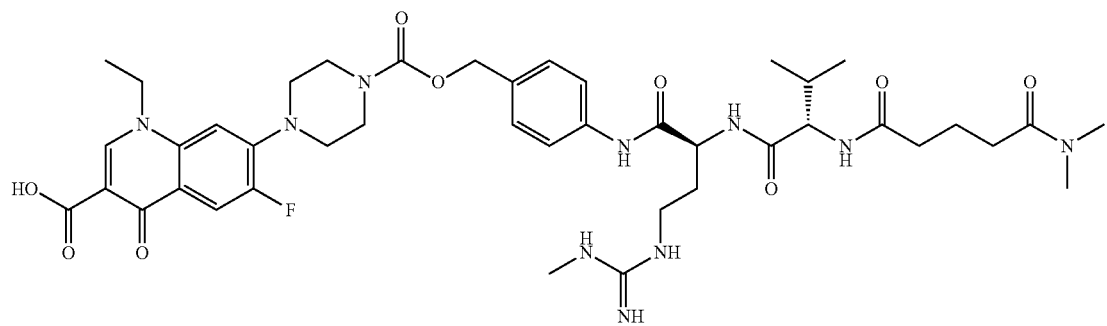

BCY00009477

To a solution of BCY9474 (100 mg, 124 μmol, 1.0 eq) in DMF (3 mL) was added N-methylpyrazole-1-carboxamidine (59.6 mg, 371 μmol, 3.0 eq, HCl salt form) and DIEA (95.9 mg, 742 μmol, 129 μL, 6.0 eq) under $N_2$ atmosphere. The mixture was stirred at 60° C. for 16 hr. LC-MS showed one main peak with desired m/z was detected. The reaction mixture was purified by preparative HPLC (TFA condition) to give BCY9477 (40.9 mg, 46.9 μmol, 37.9% yield, 99.2% purity) as a white solid. Expected MW=864.96, observed m/z: 432.68 $[M/2+H]^+$ and 864.62 $[M+H]^+$.

BCY9696—(Cit-Val-Glu)

Preparation of Compound 2

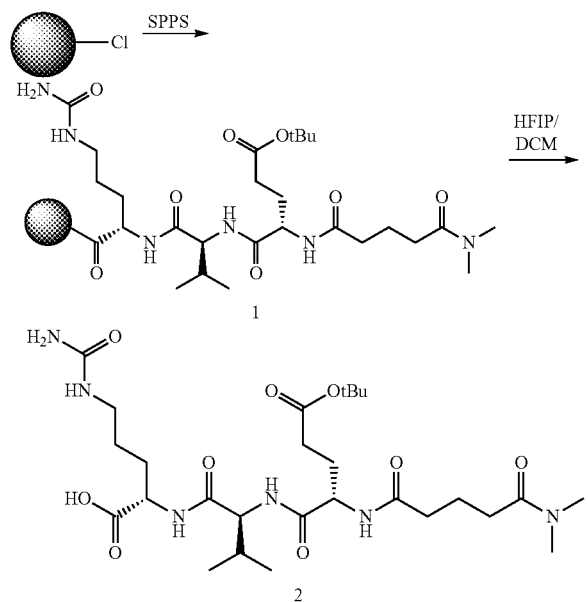

DCM was added to a vessel containing CTC Resin (5 mmol, 4.50 g, 1.10 mmol/g), then Fmoc-Cit-OH (1.98 g, 5 mmol, 1.0 eq) was added with $N_2$ bubbling. DIEA (4.0 eq) was added dropwise and the resin mixed for 2 hr. MeOH (4.5 mL) was added and the resin again mixed for 30 min. The resin was then drained and washed with DMF 5 times.

Fmoc groups were removed by adding 20% piperidine/DMF and leaving to react for 30 min, then the resin was drained and washed with DMF 5 times.

To couple subsequent amino acids, Fmoc-amino acid solution in DMF was added to the resin and mixed for 30 seconds, then activating agent and base were added. The coupling was left to react for 1 hr with continuous $N_2$ bubbling. Rounds of coupling and Fmoc deprotection were carried out with the following amino acids:

| # | Materials | Coupling reagents |
|---|-----------|-------------------|
| 1 | Fmoc-Cit-OH (1.0 eq) | DIEA (4.0 eq) |
| 2 | Fmoc-Val-OH (3.0 eq) | HBTU (2.85 eq) and DIEA (6.0 eq) |
| 3 | Fmoc-Glu(OtBu)-OH (3.0 eq) | HBTU (2.85 eq) and DIEA (6.0 eq) |
| 4 | tetrahydropyran-2,6-dione (3.0 eq) | HBTU (2.85 eq) and DIEA (6.0 eq) |
| 5 | Dimethylamine•HCl (3.0 eq) | HBTU (2.85 eq) and DIEA (6.0 eq) |

After the final coupling, the resin was washed with MeOH 3 times, and then dried under vacuum. Cleavage from the resin was performed by the addition of 20% HFIP/80% DCM to the flask containing the side chain protected peptide at room temperature. The cleavage was then repeated (1 hr each) with continuous $N_2$ bubbling. The resin was filtered and the filtrate collected, then concentrated to remove the solvent. The crude peptide was lyophilized to give compound 2 (1.9 g, 100% purity, 63.3% yield). Expected MW=600.71, observed m/z: 601.3 $[M+H]^+$.

Preparation of Compound 3

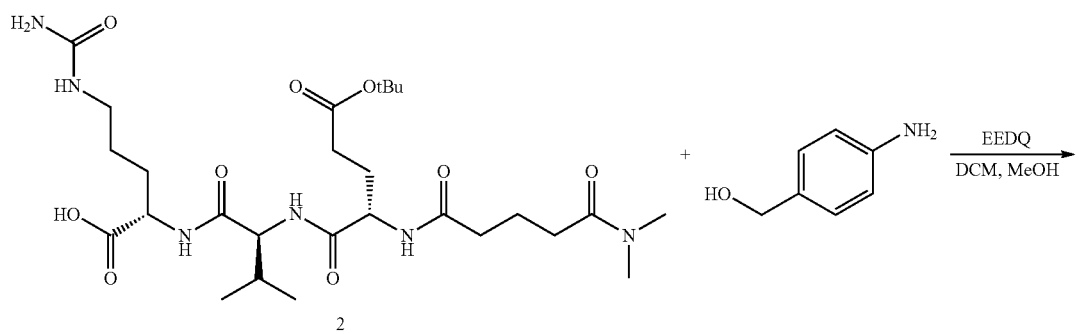

-continued

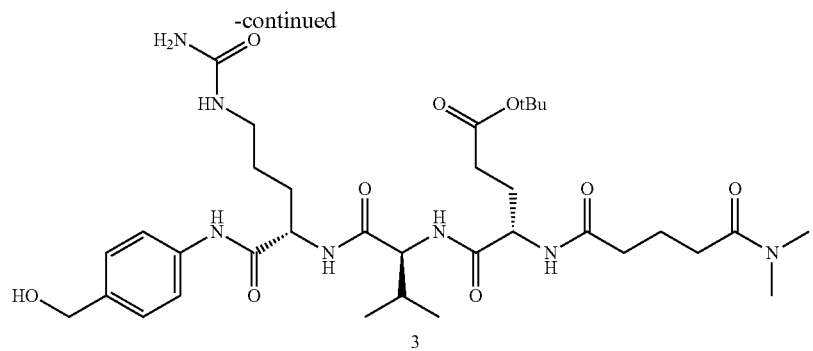

3

To a solution of compound 2 (500 mg, 832 μmol, 1.0 eq) in DCM (10 mL) and MeOH (5 mL) was added (4-aminophenyl)methanol (123 mg, 999 μmol, 1.2 eq) and EEDQ (412 mg, 1.66 mmol, 2.0 eq) in the dark. The mixture was stirred at 25° C. for 12 hr. TLC (DCM:MeOH=10:1, $R_f$=0.23) indicated compound 2 was consumed completely and many new spots formed. LC-MS showed compound 2 was consumed completely and one main peak with desired m/z for compound 3 was detected. The reaction mixture was concentrated under reduced pressure to give a residue. The residue was purified by flash silica gel chromatography (ISCO®; 40 g SepaFlash® Silica Flash Column, Eluent of 0-20% MeOH/DCM@40 mL/min) to give compound 3 (350 mg, 496 μmol, 59.6% yield) as a pale yellow solid. Expected MW=705.84, observed m/z: 706.3 [M+H]$^+$.

Preparation of Compound 4

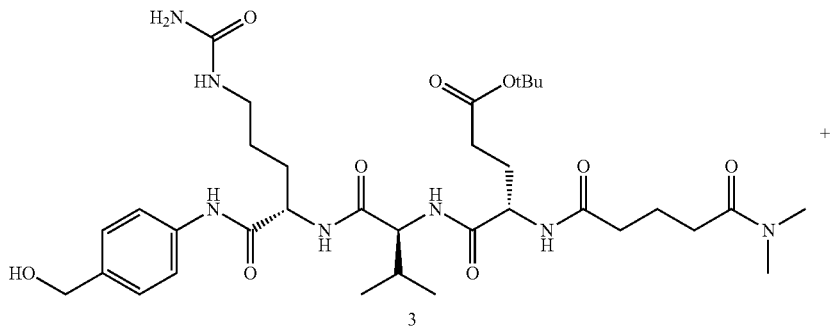

3

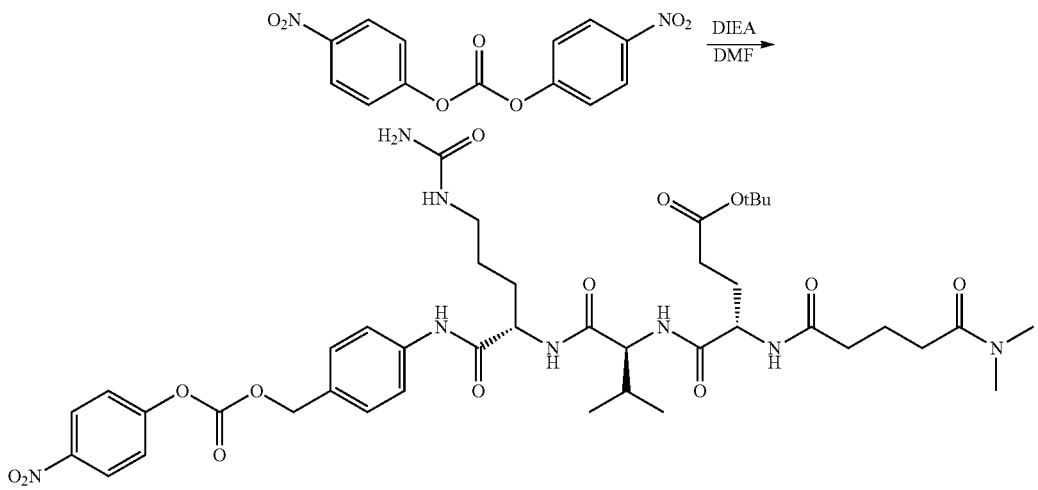

4

To a solution of compound 3 (350 mg, 496 µmol, 1.0 eq) in DMF (4 mL) was added bis(4-nitrophenyl) carbonate (453 mg, 1.49 mmol, 3.0 eq) and DIEA (256 mg, 1.98 mmol, 345 µL, 4.0 eq) under N₂ atmosphere. The mixture was stirred at 25° C. for 2 hr. LC-MS showed compound 3 was consumed completely and one main peak with desired m/z was detected. The reaction mixture was purified by preparative HPLC (neutral condition) to give compound 4 (370 mg, 425 µmol, 85.7% yield) as a white solid. Expected MW=870.41, observed m/z: 870.66 [M+H]⁺.

Preparation of Compound 5

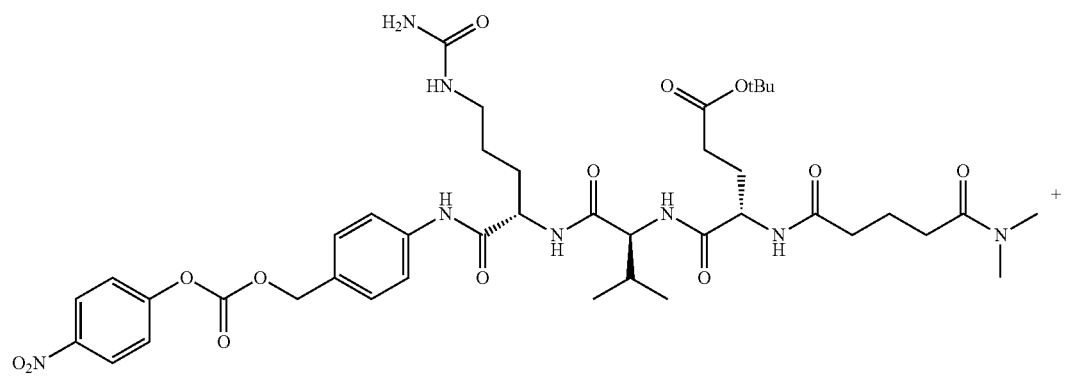

4

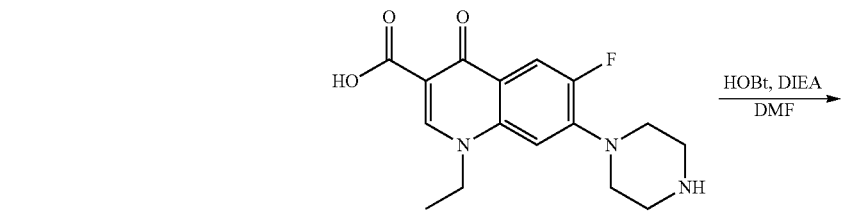

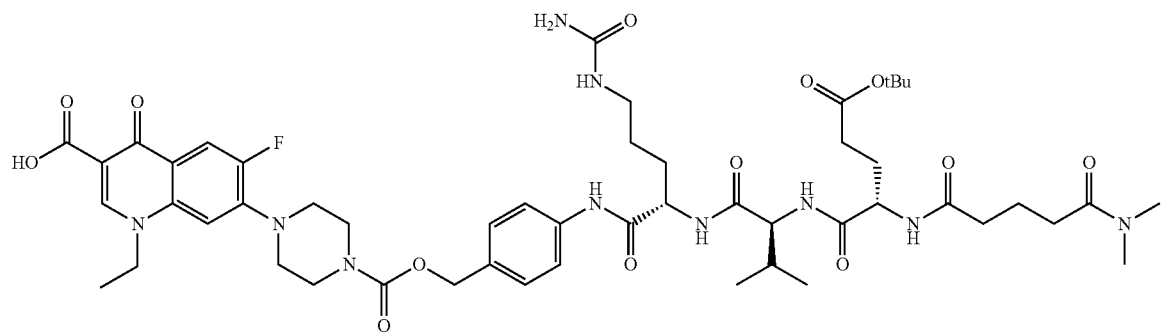

5

To a solution of compound 4 (360 mg, 413 μmol, 1.0 eq) in DMF (4 mL) was added DIEA (267 mg, 2.07 mmol, 360 μL, 5.0 eq) and stirred for 10 min under N₂ atmosphere. Then 1-ethyl-6-fluoro-4-oxo-7-piperazin-1-yl-quinoline-3-carboxylic acid (264 mg, 827 μmol, 2.0 eq) and HOBt (112 mg, 827 μmol, 2.0 eq) were added to the mixture. The mixture was stirred at 35° C. for 2 hr. LC-MS showed compound 4 was consumed completely and one main peak with desired m/z was detected. The reaction mixture was purified by preparative HPLC (neutral condition) to give compound 5 (390 mg, 371 μmol, 89.8% yield) as a white solid.

Preparation of BCY9696

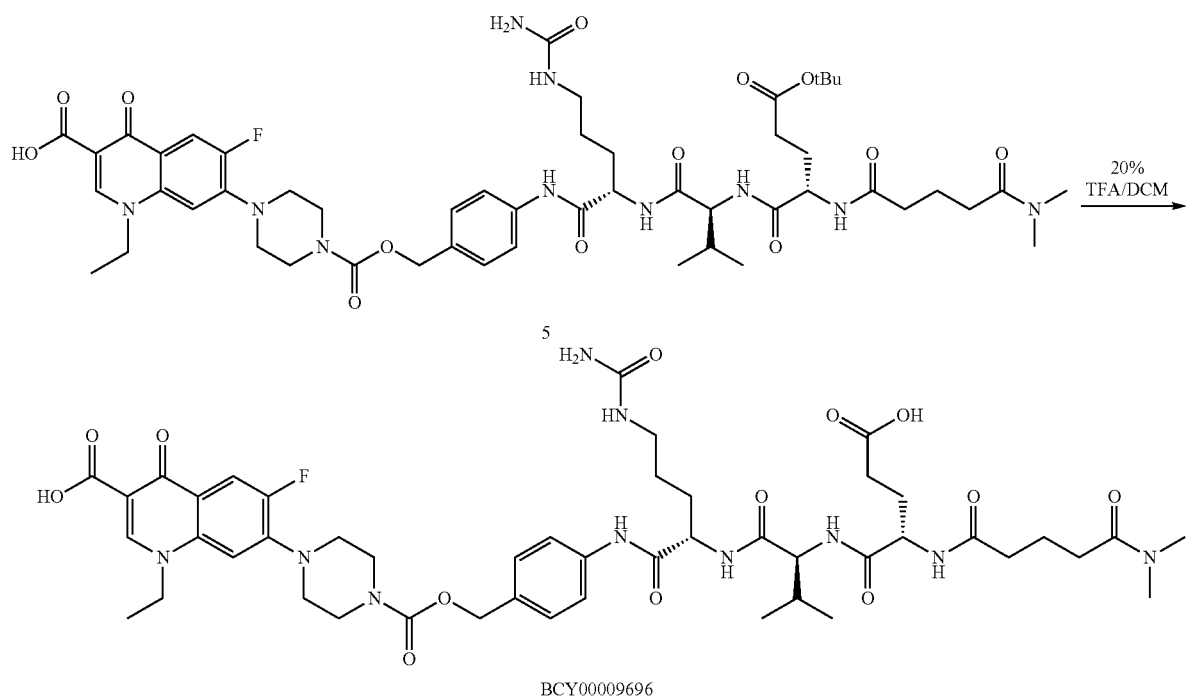

To a solution of compound 5 (150 mg, 143 μmol, 1.0 eq) in DCM (5 mL) was added TFA (1.93 g, 16.9 mmol, 1.25 mL, 118.0 eq). The mixture was stirred at 25° C. for 0.5 hr. LC-MS showed compound 5 was consumed completely and one main peak with desired m/z was detected. The reaction mixture was concentrated under reduced pressure to give a residue. The residue was purified by preparative HPLC (A: 0.075% TFA in H₂O, B: ACN) to give compound BCY9696 (66.5 mg, 65.8 μmol, 46.1% yield, 98.4% purity) as a white solid. Expected MW=994.46, observed m/z: 497.68 [M/2+H]⁺ and 994.64 [M+H]⁺.

BCY10299—(Dap(CNNH₂)-Val-Glu)

Preparation of Compound 5

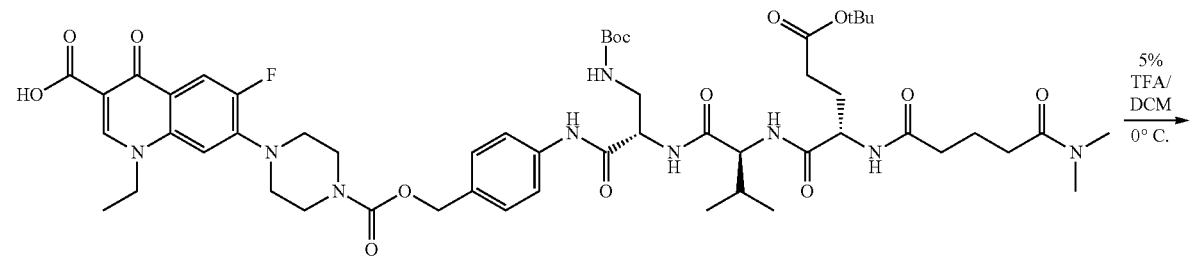

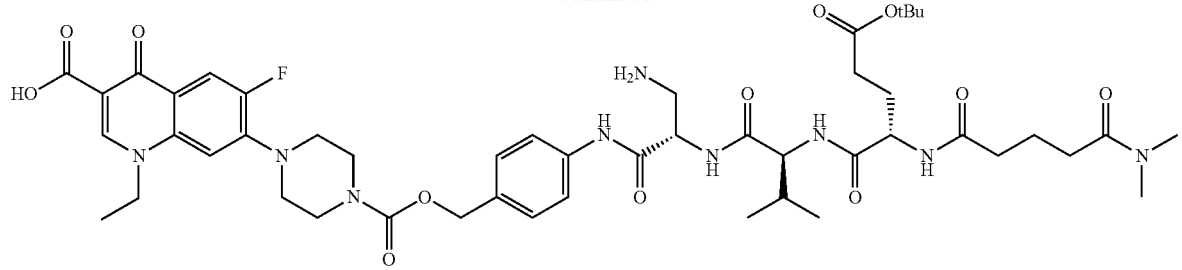

5

To a solution of compound 4 (which may be prepared as described in BCY10297; 150 mg, 139 μmol, 1.0 eq) in DCM (1.9 mL) was added TFA (150 mg, 1.32 mmol, 0.10 mL, 9.5 eq) at 0° C. and stirred for 1 hr. LC-MS (ES10336-123-P1A3) showed compound 4 was consumed completely and two main peaks formed, where one was BCY10297 (fully deprotected material) and the other one was desired compound 5. The reaction mixture was concentrated under reduced pressure to give a residue. The residue was purified by preparative HPLC (neutral condition) to give compound 5 (50.0 mg, 51.0 μmol, 36.7% yield) as a white solid. Expected MW=980.09, observed m/z: 490.67 [M/2+H]$^+$ and 980.07 [M+H]$^+$.

Preparation of Compound 6

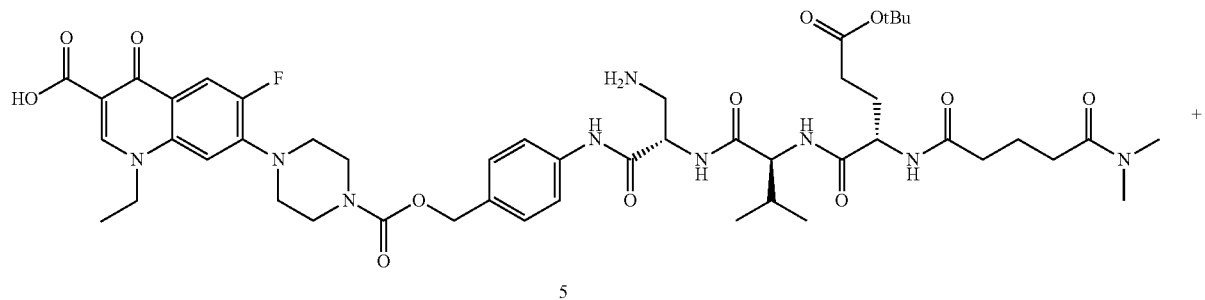

5

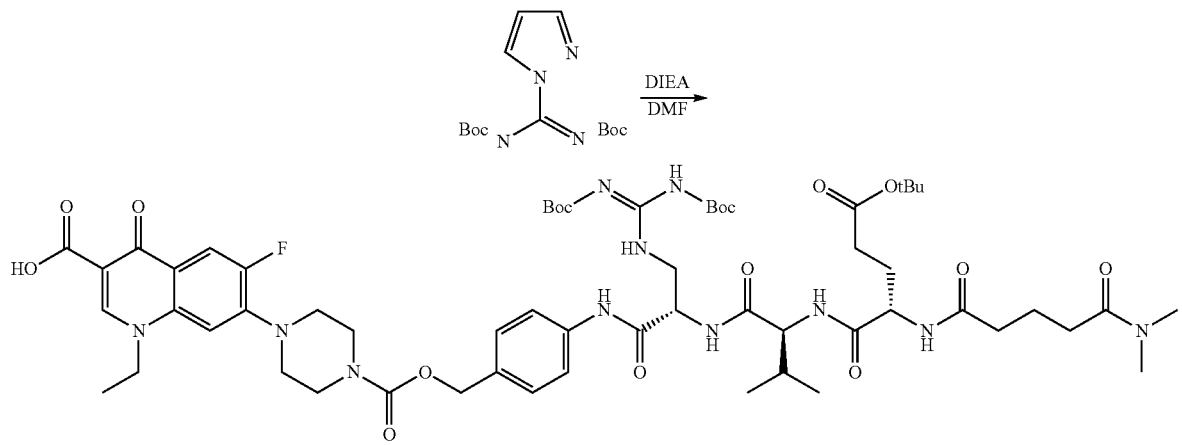

6

To a solution of compound 5 (92.0 mg, 93.9 μmol, 1.0 eq) in DMF (2 mL) was added DIEA (48.5 mg, 375 μmol, 65.4 μL, 4.0 eq) and pyrazole-1-carboxamidine (13.8 mg, 93.9 μmol, 1.0 eq) under $N_2$ atmosphere. The mixture was stirred at 25° C. for 16 hr. LC-MS showed most of compound 5 had been consumed and one main peak with desired m/z for compound 6 was detected. The reaction mixture was purified by preparative HPLC (neutral condition) to give compound 6 (72.0 mg, 70.4 μmol, 75.0% yield) as a white solid. Expected MW=1222.36, observed m/z: 512.1 [(M−2*Boc)/2+H]$^+$, 1022.7 [(M−2*Boc)+H]$^+$.

Preparation of BCY10299

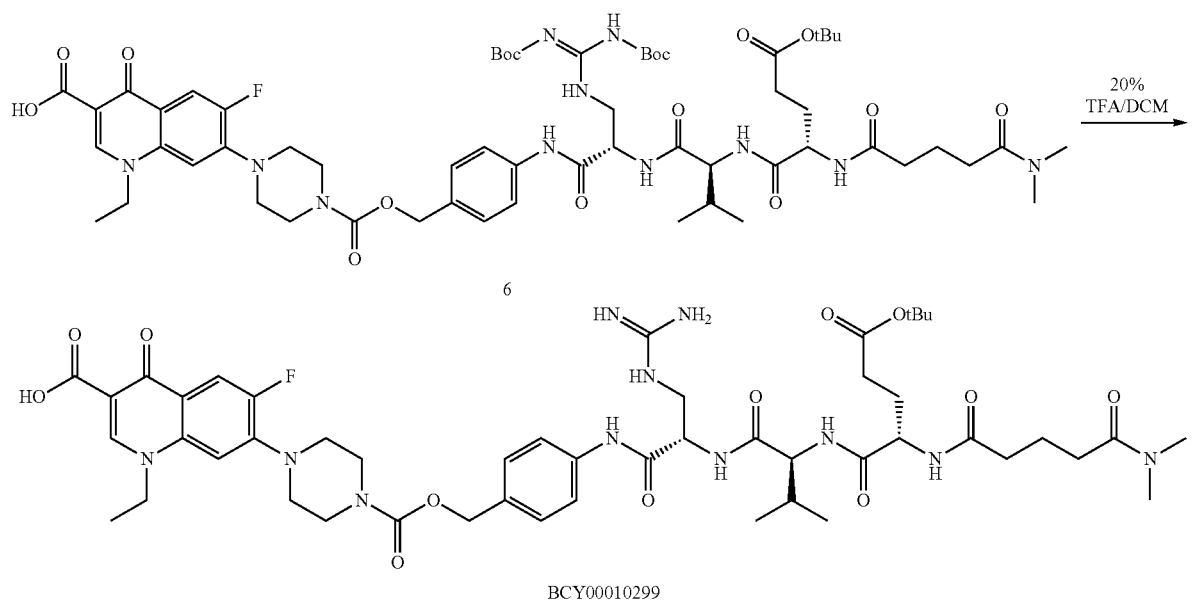

To a solution of compound 6 (72.0 mg, 70.4 μmol, 1.0 eq) in DCM (2.4 mL) was added TFA (900 mg, 8.00 mmol, 0.60 mL, 114.0 eq) and stirred at 25° C. for 2 hr. LC-MS showed compound 6 was consumed completely and one main peak with desired m/z was detected. The reaction mixture was concentrated under reduced pressure to remove solvent. The residue was purified by preparative HPLC (A: 0.075% TFA in H$_2$O, B: ACN) to give BCY10299 (15.2 mg, 14.0 μmol, 96.0% purity and 1.1 mg, 1.09 μmol, 97.1% purity; overall 21.4% yield) as a white solid. Expected MW=966.02, observed m/z: 483.65 [M/2+H]$^+$ and 966.12 [M+H]$^+$.

BCY10297—(Dap-Val-Glu)

Preparation of Compound 1

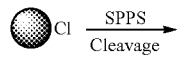

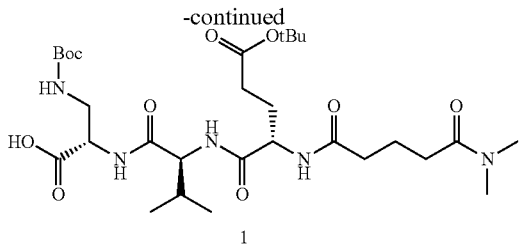

DCM was added to a vessel containing CTC Resin (5 mmol, 4.50 g, 1.10 mmol/g), then Fmoc-Dap(Boc)-OH (2.13 g, 5 mmol, 1.0 eq) was added with N$_2$ bubbling. DIEA (4.0 eq) was added dropwise and the resin mixed for 2 hr. MeOH (4.5 mL) was added and the resin again mixed for 30 min. The resin was then drained and washed with DMF 5 times.

Fmoc groups were removed by adding 20% piperidine/DMF and leaving to react for 30 min, then the resin was drained and washed with DMF 5 times.

To couple subsequent amino acids, Fmoc-amino acid solution in DMF was added to the resin and mixed for 30 seconds, then activating agent and base were added. The coupling was left to react for 1 hr with continuous N$_2$ bubbling. Rounds of coupling and Fmoc deprotection were carried out with the following amino acids:

| # | Materials | Coupling reagents |
|---|---|---|
| 1 | Fmoc-Dap(Boc)-OH (1.0 eq) | DIEA (4.0 eq) |
| 2 | Fmoc-Val-OH (3.0 eq) | HBTU(2.85 eq) and DIEA(6.0 eq) |
| 3 | Fmoc-Glu(OtBu)-OH (3.0 eq) | HBTU(2.85 eq) and DIEA(6.0 eq) |
| 4 | Glutaric Anhydride (3.0 eq) | HBTU(2.85 eq) and DIEA(6.0 eq) |
| 5 | Dimethylamine•HCl (3.0 eq) | HBTU(2.85 eq) and DIEA(6.0 eq) |

After the final coupling, the resin was washed with MeOH 3 times, and then dried under vacuum. Cleavage from the resin was performed by the addition of 20% HFIP/80% DCM to the flask containing the side chain protected peptide at room temperature. The cleavage was then repeated (1 hr each) with continuous N$_2$ bubbling. The resin was filtered and the filtrate collected, then concentrated to remove the solvent. The crude peptide was lyophilized to give compound 2 (2.27 g, 93.4% purity, 69.1% yield). Expected MW=629.75, observed m/z: 630.10 [(M-Boc)+H]$^+$, 630.10 [M+H]$^+$.

Preparation of Compound 2

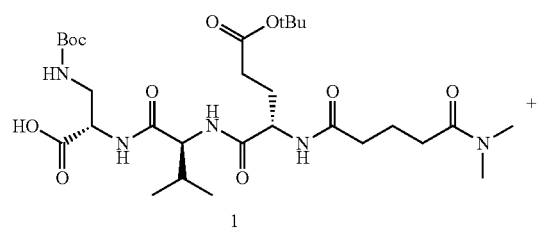

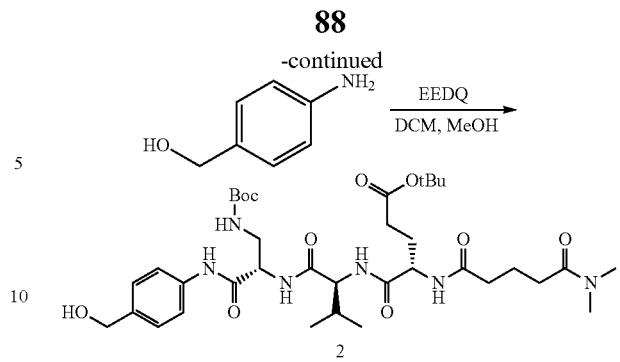

To a solution of compound 1 (800 mg, 1.27 mmol, 1.0 eq) in DCM (16.0 mL) and MeOH (8.00 mL) was added (4-aminophenyl)methanol (188 mg, 1.52 mmol, 1.2 eq) and EEDQ (628 mg, 2.54 mmol, 2.0 eq) in the dark. The mixture was stirred at 25° C. for 16 hr. TLC (DCM:MeOH=10:1, R$_f$=0.46) indicated compound 1 was consumed completely. LC-MS showed compound 1 was consumed completely and one main peak with desired m/z was detected. The reaction mixture was concentrated under reduced pressure to give a residue. The residue was then purified by flash silica gel chromatography (ISCO®; 40 g SepaFlash® Silica Flash Column, Eluent of 0~20% MeOH/DCM@60 mL/min) to give compound 2 (600 mg, 816 μmol, 64.3% yield) as a pale brown solid. Expected MW=734.88, observed m/z: 635.09 [(M-Boc)+H]$^+$ and 735.10 [M+H]$^+$.

Preparation of Compound 3

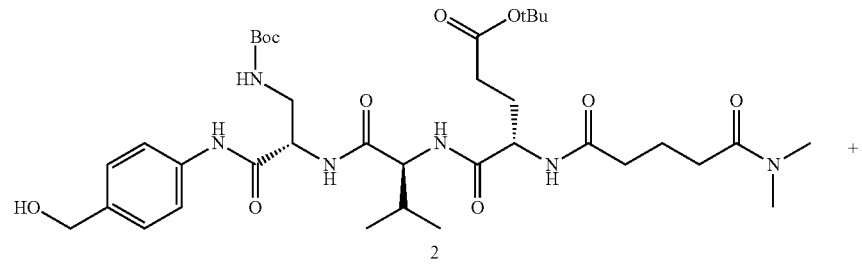

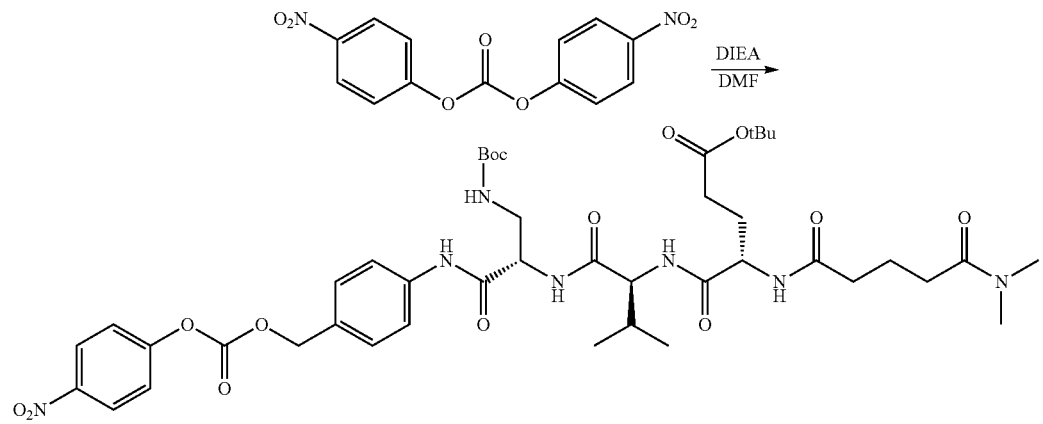

To a solution of compound 2 (600 mg, 816 μmol, 1.0 eq) in DMF (8.00 mL) was added bis(4-nitrophenyl) carbonate (745 mg, 2.45 mmol, 3.0 eq) and DIEA (422 mg, 3.27 mmol, 569 μL, 4.0 eq) under N$_2$ atmosphere. The mixture was stirred at 25° C. for 2 hr. LC-MS showed compound 2 was consumed completely and one main peak with desired m/z was detected. The reaction mixture was purified by preparative HPLC (neutral condition) to give compound 3 (630 mg, 700 μmol, 85.7% yield) as a pale yellow solid. Expected MW=899.98, observed m/z: 799.99 [(M-Boc)+H]$^+$ and 900.02 [M+H]$^+$.

Preparation of Compound 4

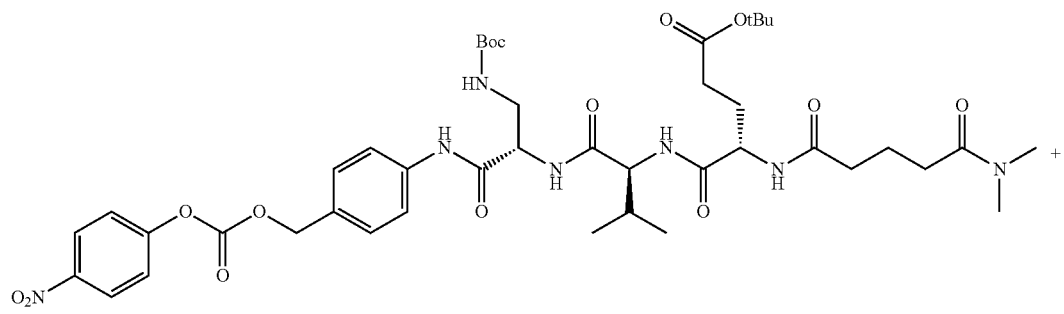

3

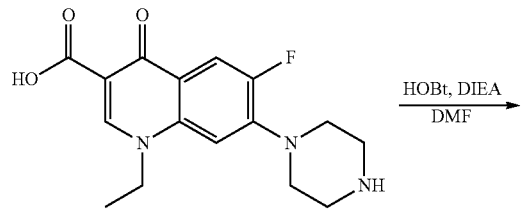

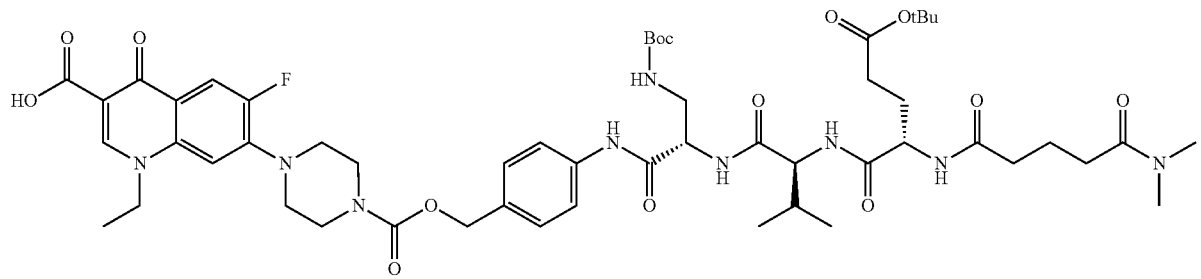

4

To a solution of compound 3 (630 mg, 700 μmol, 1.0 eq) in DMF (8.00 mL) was added DIEA (362 mg, 2.80 mmol, 488 μL, 4.0 eq) and stirred for 10 min under $N_2$ atmosphere. Then 1-ethyl-6-fluoro-4-oxo-7-piperazin-1-yl-quinoline-3-carboxylic acid (447 mg, 1.40 mmol, 2.0 eq) and HOBt (189 mg, 1.40 mmol, 2.0 eq) were added to the mixture. The mixture was stirred at 25° C. for 2 hr. LC-MS showed compound 3 was consumed completely and one main peak with desired m/z was detected. The reaction mixture was washed by addition 250 mL of $H_2O$ at 25° C., filtered and concentrated under reduced pressure to give the crude compound 4 (630 mg, crude) as yellow solid, which was used into the next step without further purification. Expected MW=1080.20, observed m/z: 490.63 [(M-Boc)/2+H]$^+$ and 1080.09 [M+H]$^+$.

Preparation of BCY10297

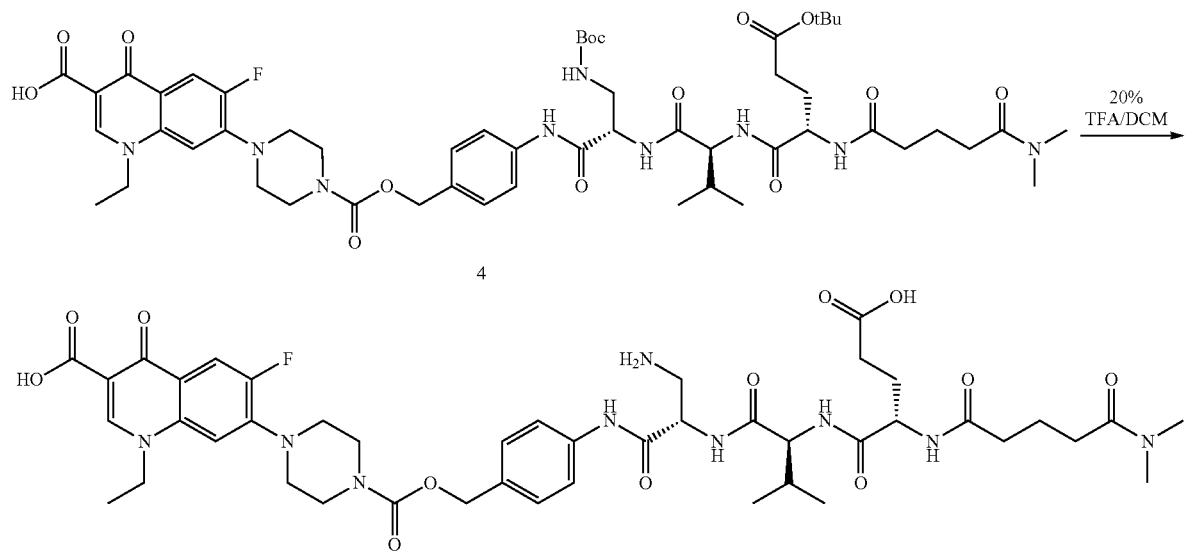

4

BCY00010297

To a solution of compound 4 (130 mg, 120 μmol, 1.0 eq) in DCM (1.60 mL) was added TFA (596 mg, 5.23 mmol, 400 μL, 43.6 eq). The mixture was stirred at 25° C. for 0.5 hr. LC-MS showed compound 4 was consumed completely and one main peak with desired m/z was detected. The reaction mixture was concentrated under reduced pressure to give a residue. The residue was purified by preparative HPLC (A: 0.075% TFA in $H_2O$, B: ACN) to give BCY10297 (45.3 mg, 46.6 μmol, 38.7% yield, 95.0% purity) as a white solid. Expected MW=923.68, observed m/z: 462.58 [M/2+H]$^+$ and 924.07 [M+H]$^+$.

BCY9695—(Agb-Val-Glu)

Preparation of Compound 2

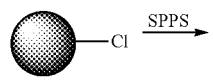

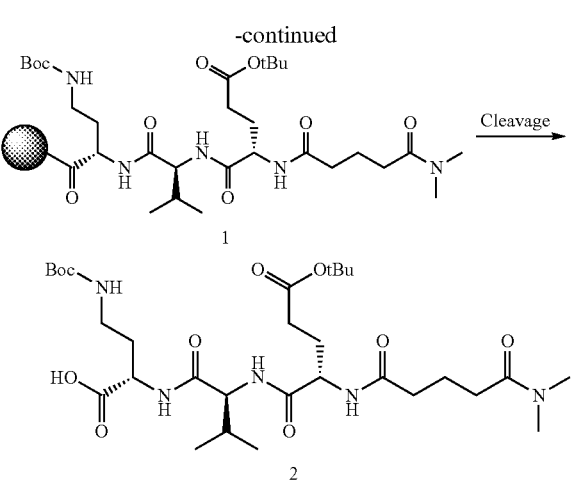

DCM was added to a vessel containing CTC Resin (5 mmol, 4.50 g, 1.10 mmol/g), then Fmoc-Dab(Boc)-OH (2.20 g, 5 mmol, 1.0 eq) was added with $N_2$ bubbling. DIEA (4.0 eq) was added dropwise and the resin mixed for 2 hr.

MeOH (4.5 mL) was added and the resin again mixed for 30 min. The resin was then drained and washed with DMF 5 times.

Fmoc groups were removed by adding 20% piperidine/DMF and leaving to react for 30 min, then the resin was drained and washed with DMF 5 times.

To couple subsequent amino acids, Fmoc-amino acid solution in DMF was added to the resin and mixed for 30 seconds, then activating agent and base were added. The coupling was left to react for 1 hr with continuous $N_2$ bubbling. Rounds of coupling and Fmoc deprotection were carried out with the following amino acids:

| # | Materials | Coupling reagents |
|---|---|---|
| 1 | Fmoc-Dab(Boc)-OH (1.0 eq) | DIEA (4.0 eq) |
| 2 | Fmoc-Val-OH (3.0 eq) | HBTU (2.85 eq) and DIEA (6.0 eq) |
| 3 | Fmoc-Glu(OtBu)-OH (3.0 eq) | HBTU (2.85 eq) and DIEA (6.0 eq) |
| 4 | tetrahydropyran-2,6-dione (3.0 eq) | HBTU (2.85 eq) and DIEA (6.0 eq) |
| 5 | Dimethylamine•HCl (3.0 eq) | HBTU (2.85 eq) and DIEA (6.0 eq) |

After the final coupling, the resin was washed with MeOH 3 times, and then dried under vacuum. Cleavage from the resin was performed by the addition of 20% HFIP/80% DCM to the flask containing the side chain protected peptide at room temperature. The cleavage was then repeated (1 hr each) with continuous $N_2$ bubbling. The resin was filtered and the filtrate collected, then concentrated to remove the solvent. The crude peptide was lyophilized to give compound 2 (2.60 g, 90.0% purity, 72.6% yield). Expected MW=643.78, observed m/z: 644.4 $[M+H]^+$.

Preparation of Compound 3

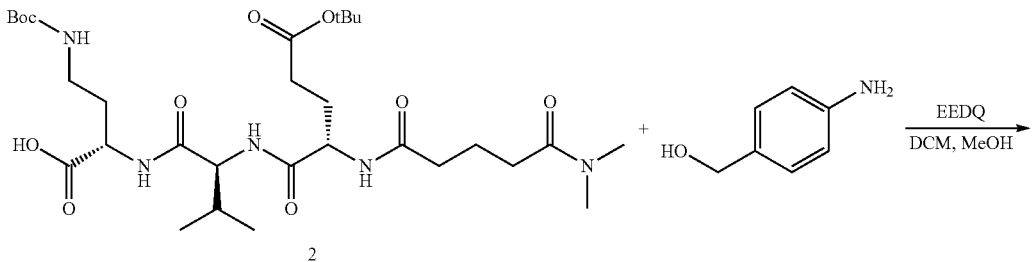

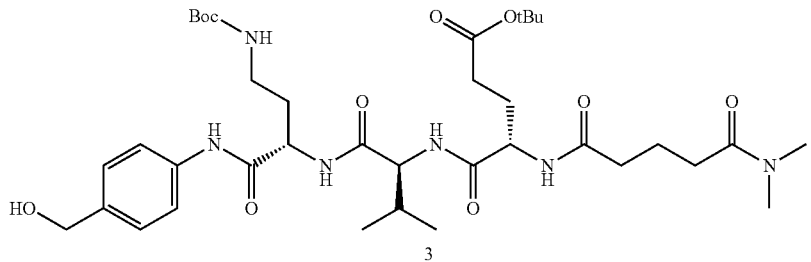

To a solution of compound 2 (500 mg, 777 μmol, 1.0 eq) in DCM (10 mL) and MeOH (5 mL) was added (4-aminophenyl)methanol (115 mg, 932 μmol, 1.2 eq) and EEDQ (384 mg, 1.55 mmol, 2.0 eq) in the dark. The mixture was stirred at 25° C. for 12 hr. TLC (DCM:MeOH=10:1, $R_f$=0.38) indicated compound 2 was consumed completely and several new spots formed. LC-MS showed compound 2 was consumed completely and one main peak with desired m/z was detected. The reaction mixture was concentrated under reduced pressure to give a residue. The residue was then purified by flash silica gel chromatography (ISCO®; 40 g SepaFlash® Silica Flash Column, Eluent of 0-20% MeOH/DCM@40 mL/min) to give compound 3 (390 mg, 521 μmol, 67.1% yield) as a pale yellow solid. Expected MW=748.44, observed m/z: 749.4 [M+H]⁺.

Preparation of Compound 4

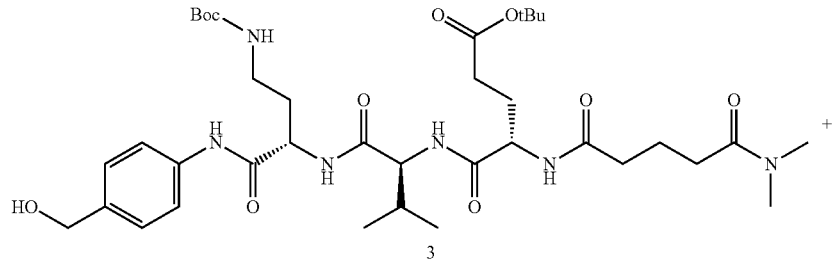

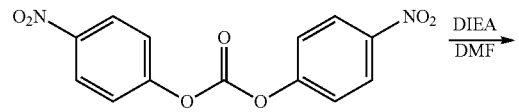

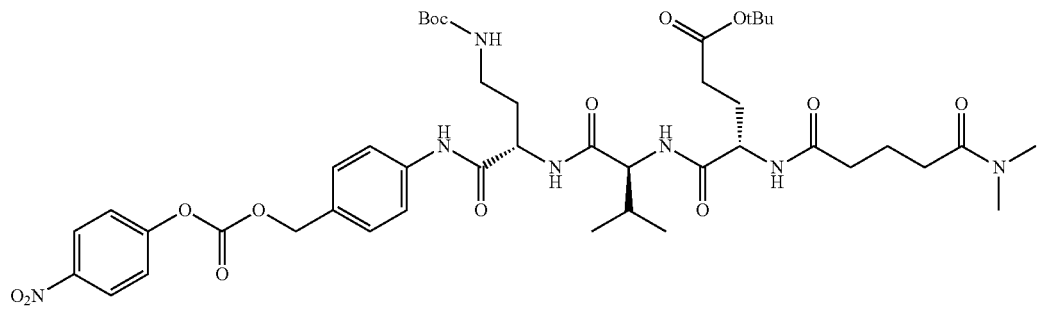

To a solution of compound 3 (390 mg, 521 μmol, 1.0 eq) in DMF (4 mL) was added bis(4-nitrophenyl) carbonate (475 mg, 1.56 mmol, 3.0 eq) and DIEA (269 mg, 2.08 mmol, 363 μL, 4.0 eq) under $N_2$ atmosphere. The mixture was stirred at 25° C. for 2 hr. LC-MS showed compound 3 was consumed completely and one peak with desired m/z for compound 4 was detected. The residue was purified by preparative HPLC (neutral condition) to give compound 4 (400 mg, 438 μmol, 84.0% yield) as a white solid. Expected MW=913.44, observed m/z: 913.60 [M+H]$^+$.

Preparation of Compound 5

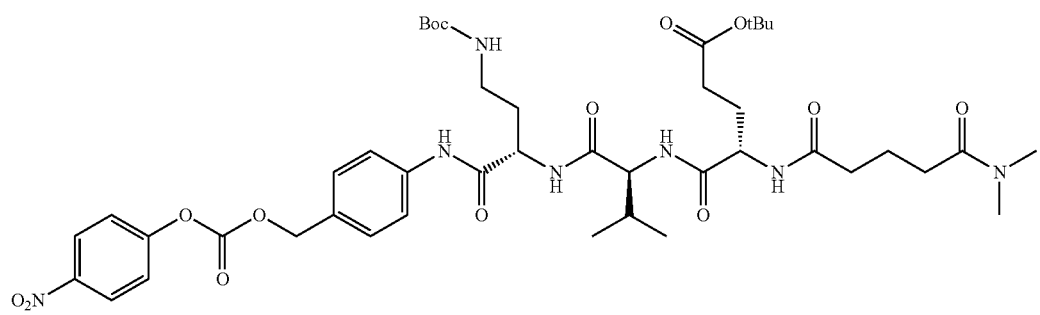

4

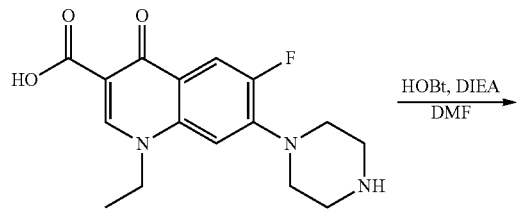

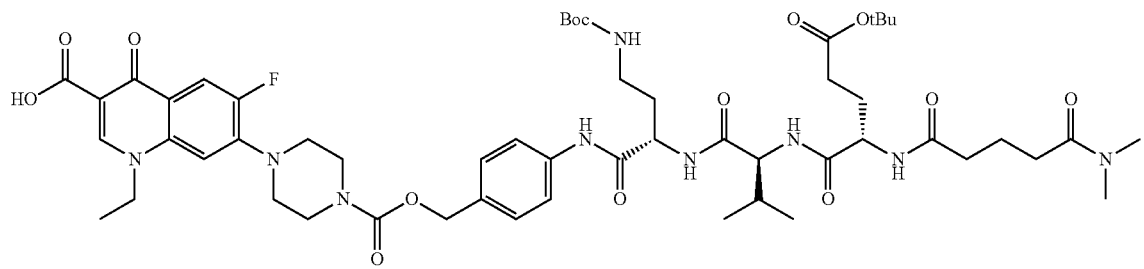

5

To a solution of compound 4 (400 mg, 438 μmol, 1.0 eq) in DMF (5 mL) was added DIEA (283 mg, 2.19 mmol, 381 μL, 5.0 eq) and stirred for 10 min. Then 1-ethyl-6-fluoro-4-oxo-7-piperazin-1-yl-quinoline-3-carboxylic acid (280 mg, 875 μmol, 2.0 eq) and HOBt (118 mg, 875 μmol, 2.0 eq) were added to the mixture under $N_2$ atmosphere. The mixture was stirred at 35° C. for 2 hr. LC-MS showed compound 4 was consumed completely and one main peak with desired m/z for compound 5 was detected. The residue was purified by preparative HPLC (neutral condition) to give compound 5 (310 mg, 283 μmol, 64.7% yield) as a white solid. Expected MW=1093.55, observed m/z: 1093.77 $[M+H]^+$ and 547.18 $[M/2+H]^+$.

Preparation of Compound 6

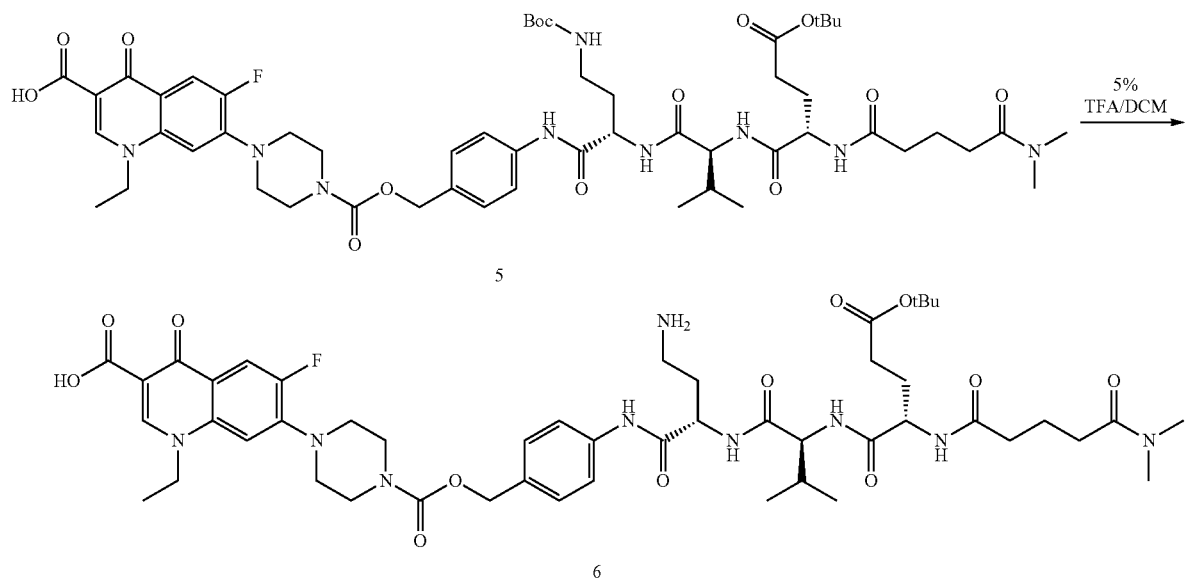

To a solution of compound 5 (305 mg, 279 μmol, 1.0 eq) in DCM (5.70 mL) was added TFA (462 mg, 4.05 mmol, 0.30 mL, 14.5 eq). The mixture was stirred at 0° C. for 1 hr. LC-MS showed compound 5 was consumed completely and two main peaks formed, where one was desired compound 6 and the other one corresponded to the fully deprotected material. The reaction mixture was concentrated under reduced pressure to give a residue. The residue was purified by preparative HPLC (neutral condition) to give compound 6 (205 mg, 206 μmol, 74.0% yield) as a white solid. Expected MW=993.50, observed m/z: 993.72 $[M+H]^+$ and 497.26 $[M/2+H]^+$.

Preparation of Compound 7

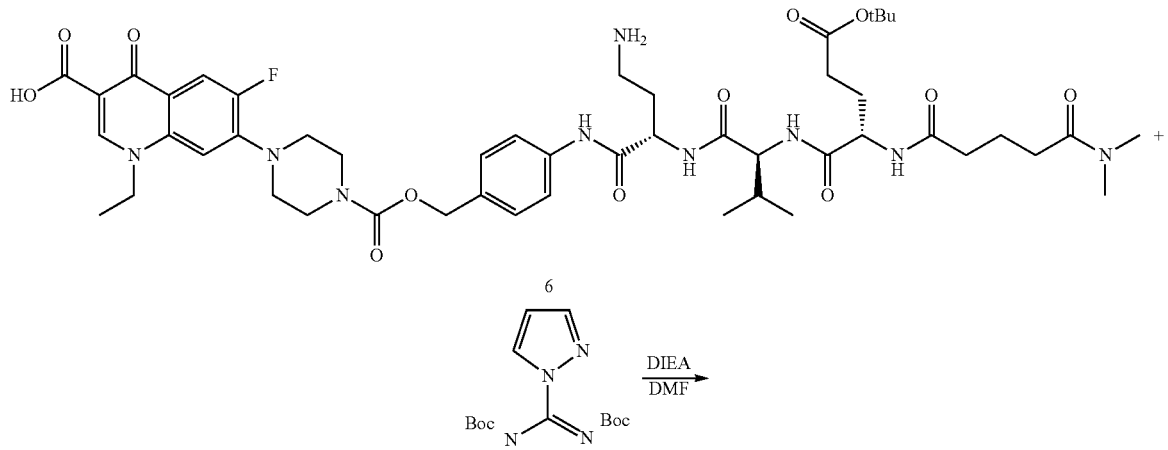

-continued

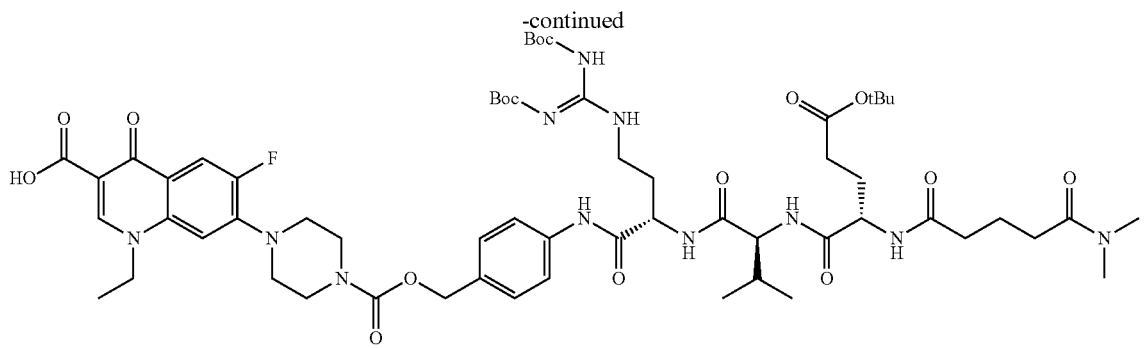

7

To a solution of compound 6 (205 mg, 206 µmol, 1.0 eq) in DMF (3 mL) was added tert-butyl (NZ)—N-[(tert-butoxycarbonylamino)-pyrazol-1-yl-methylene]carbamate (96.0 mg, 309 µmol, 1.5 eq) and DIEA (53.3 mg, 412 µmol, 71.8 µL, 2.0 eq) under $N_2$ atmosphere. The mixture was stirred at 25° C. for 16 hr. LC-MS showed compound 6 was consumed completely and one main peak with desired m/z for compound 7 was detected. The residue was purified by preparative HPLC (neutral condition) to give compound 7 (70.0 mg, 56.6 µmol, 27.5% yield) as a white solid. Expected MW=1235.62, observed m/z: 1257.66 [M+Na]$^+$ and 618.21 [M/2+H]$^+$.

Preparation of BCY9695

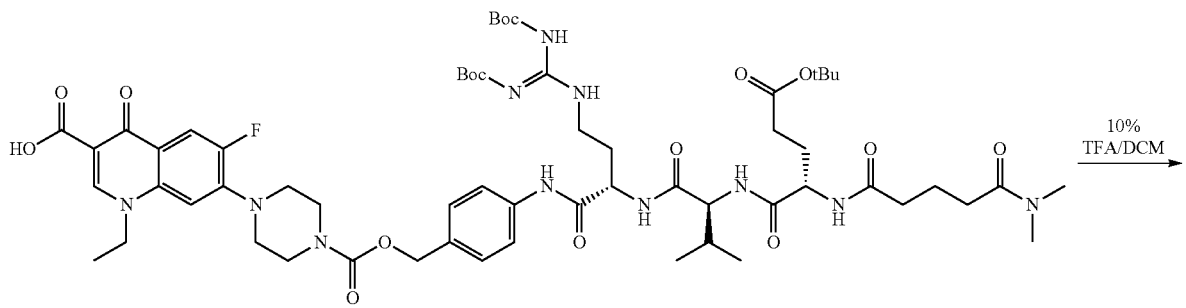

7

10% TFA/DCM →

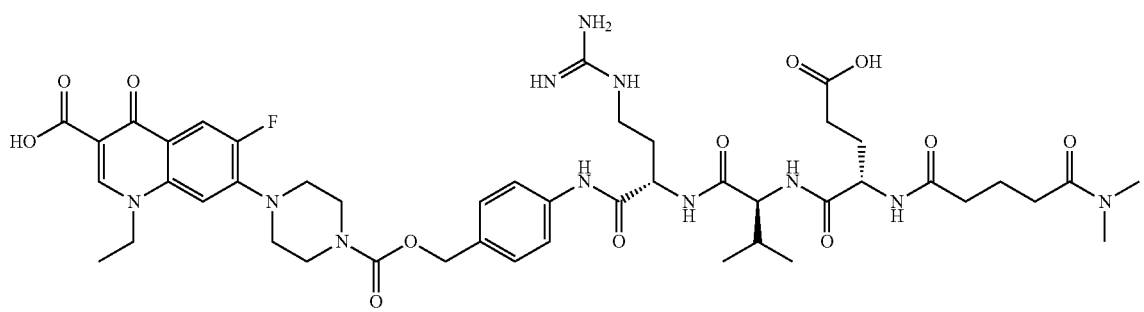

BCY00009695

To a solution of compound 7 (70.0 mg, 56.6 μmol, 1.0 eq) in DCM (0.90 mL) was added TFA (154 mg, 1.35 mmol, 100 μL, 23.8 eq). The mixture was stirred at 25° C. for 0.5 hr. LC-MS showed compound 7 was consumed completely and one main peak with desired m/z was detected. The reaction mixture was concentrated under reduced pressure to give a residue. The residue was then purified by preparative HPLC (A: 0.075% TFA in H$_2$O, B: ACN) to give compound BCY9695 (21.9 mg, 22.1 μmol, 39.0% yield, 98.9% purity) as a white solid. Expected MW=979.46, observed m/z: 979.60 [M+H]$^+$ and 490.18 [M/2+H]$^+$.

BCY10122—(Dab-Val-Glu)

Preparation of BCY10122

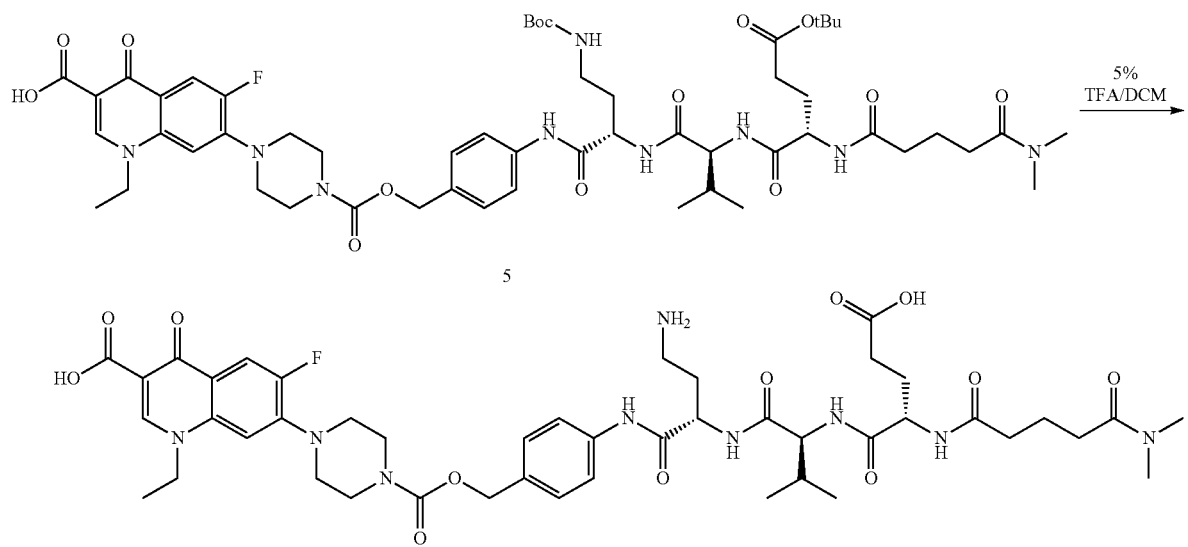

To a solution of compound 5 (305 mg, 279 μmol, 1.0 eq) in DCM (5.70 mL) was added TFA (462 mg, 4.05 mmol, 0.30 mL, 14.5 eq). The mixture was stirred at 0° C. for 1 hr. LC-MS showed compound 5 was consumed completely and one main peak with desired m/z (calculated MW: observed m/z) was detected. The reaction mixture was concentrated under reduced pressure to give a residue. The residue was purified by preparative HPLC (neutral condition) to give BCY10122 (50.2 mg, 52.0 μmol, 18.6% yield, 97.1% purity) as a white solid. Expected MW=937.43, observed m/z: 469.24 [M/2+H]$^+$, 937.65 [M+H]$^+$.

BCY7761—(Cit-Val)

Preparation of Compound 2

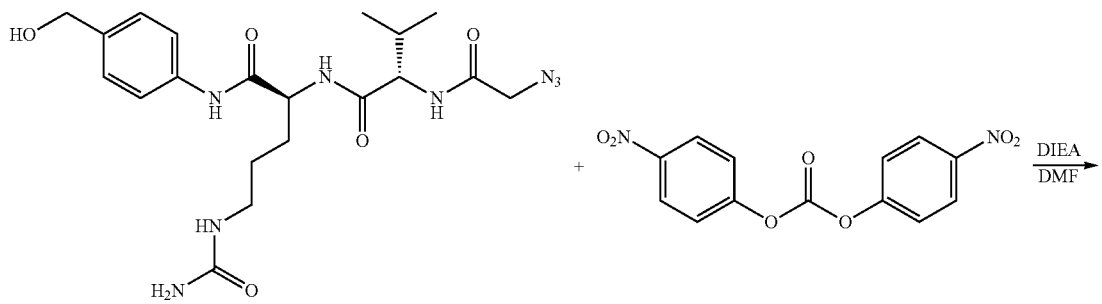

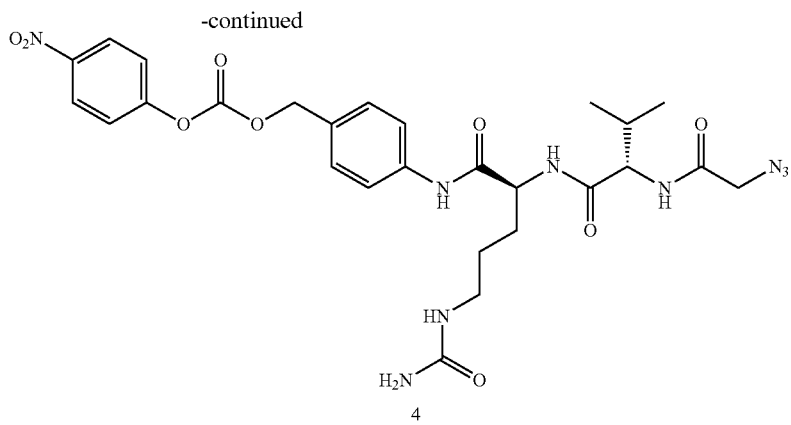

4

To a solution of compound 1 (1.50 g, 3.24 mmol, 1.0 eq) in DMF (20 mL) was added bis(4-nitrophenyl) carbonate (2.96 g, 9.73 mmol, 3.0 eq) and DIEA (1.68 g, 13.0 mmol, 2.26 mL, 4.0 eq) under $N_2$ atmosphere. The mixture was stirred at 15° C. for 2 hr. LC-MS showed compound 1 was consumed completely and one peak with desired m/z was detected. The reaction mixture was purified by preparative HPLC (neutral condition) to give compound 2 (1.20 g, 1.91 mmol, 58.9% yield) as a pale yellow solid. Expected MW=627.61, observed m/z: 627.94 $[M+H]^+$.

Preparation of Compound 3

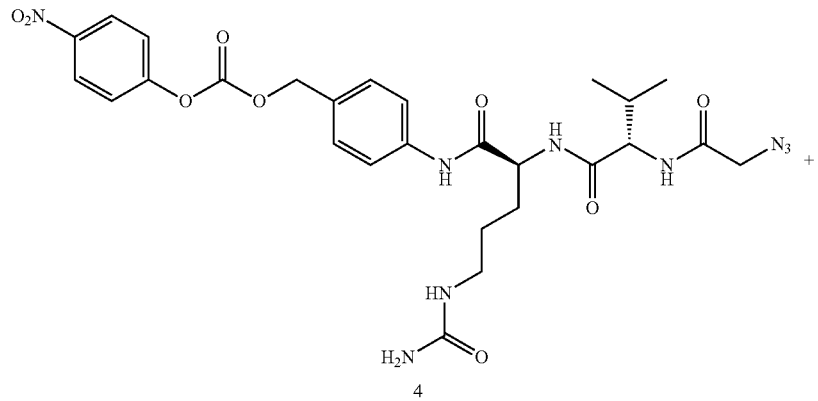

4

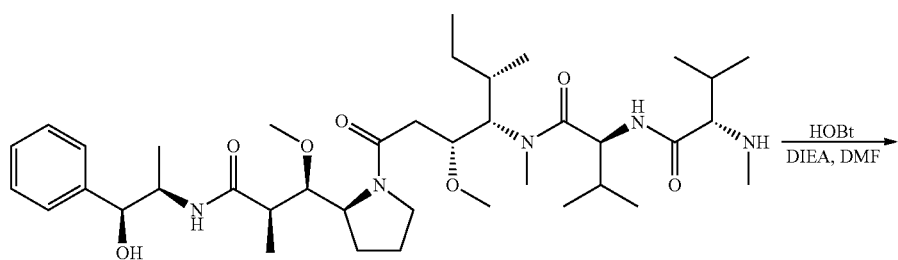

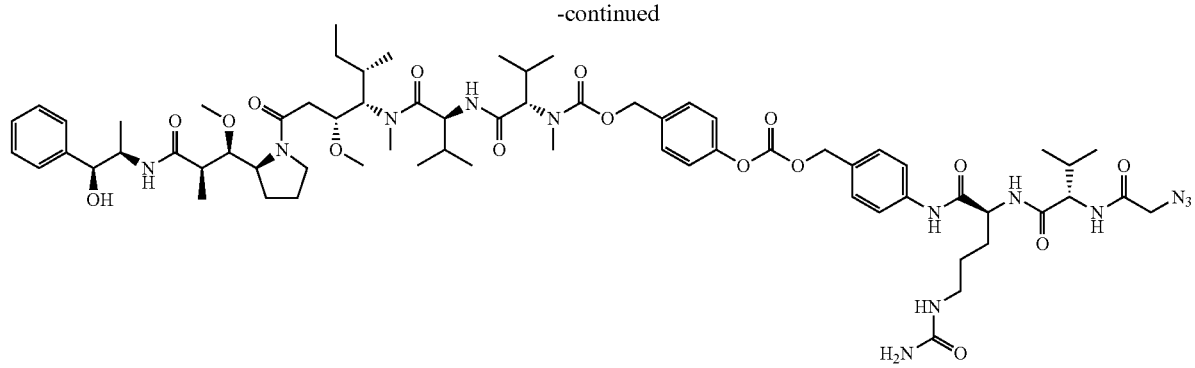

3

To a solution of compound 2 (905 mg, 1.44 mmol, 1.15 eq) in DMF (10 mL) was added DIEA (486 mg, 3.76 mmol, 655 μL, 3.0 eq) and stirred for 10 min. Then HOBt (195 mg, 1.44 mmol, 1.15 eq) and MMAE (900 mg, 1.25 mmol, 1.0 eq) were added to the mixture. The mixture was stirred at 35° C. for 16 hr. LC-MS showed compound 2 was consumed completely and one main peak with desired m/z was detected. The reaction mixture was purified by preparative HPLC (neutral condition) to give compound 3 (1.08 g, 895 μmol, 71.6% yield) as a pale yellow solid. Expected MW=1206.48, observed m/z: 1206.25 [M+H]$^+$.

Preparation of BCY7761

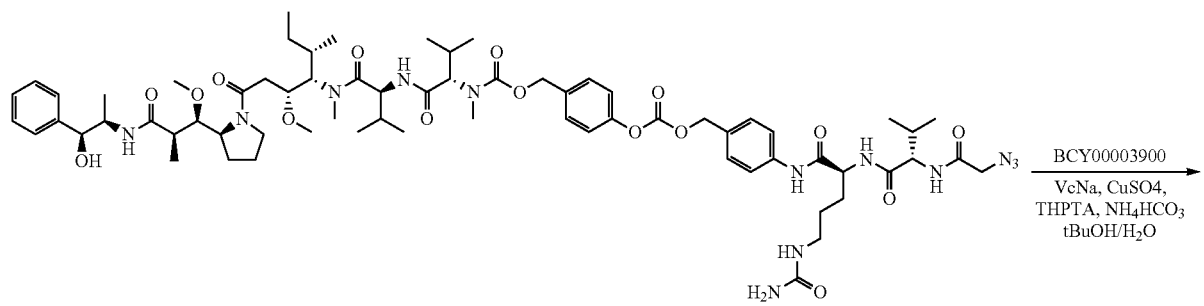

3

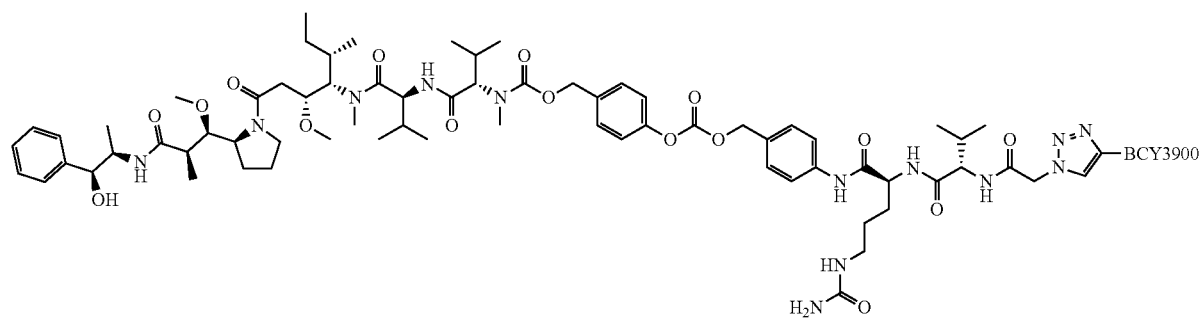

BCY00007761

To a solution of compound 3 (971 mg, 805 µmol, 1.1 eq), BCY3900 (2.00 g, 732 µmol, 1.0 eq) in t-BuOH (10 mL) and H₂O (10 mL) was added CuSO₄ (0.4 M, 1.83 mL, 1.0 eq) and Tris(3-hydroxypropyl-triazolylmethyl)amine (THPTA, 318 mg, 732 µmol, 1.0 eq). Then VcNa (0.4 M, 3.66 mL, 2.0 eq) was added to the mixture under N₂ atmosphere. The mixture was stirred at 15° C. for 2 hr. LC-MS showed compound 3 was consumed completely and one main peak with desired m/z was detected. EDTA (0.5 M, 1.5 mL) was added to the reaction mixture to quench reaction. The reaction mixture was then purified by preparative HPLC (A: 0.075% TFA in H₂O, B: ACN) to give BCY7761 (2.20 g, 539 µmol, 73.4% yield, 96.5% purity) as a white solid. Expected MW=3939.45, observed m/z: 985.47 [M/4+H]⁺ and 1313.56 [M/3+H]⁺.

BCY9422—(Cit-Val)

Preparation of Compound 2

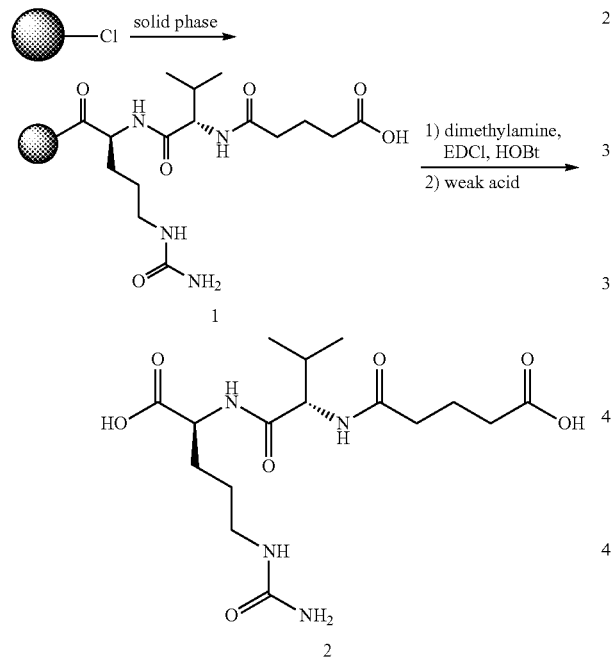

DCM was added to a vessel containing CTC Resin (10 mmol, 9.10 g, 1.10 mmol/g), then Fmoc-Cit-OH (3.98 g, 10 mmol, 1.0 eq) was added with N₂ bubbling. DIEA (4.0 eq) was added dropwise and the resin mixed for 2 hr. MeOH (9.1 mL) was added and the resin again mixed for 30 min. The resin was then drained and washed with DMF 5 times.

Fmoc groups were removed by adding 20% piperidine/DMF and leaving to react for 30 min, then the resin was drained and washed with DMF 5 times.

To couple subsequent amino acids, Fmoc-amino acid solution in DMF was added to the resin and mixed for 30 seconds, then activating agent and base were added. The coupling was left to react for 1 hr with continuous N₂ bubbling. Rounds of coupling and Fmoc deprotection were carried out with the following amino acids:

| # | Materials | Coupling reagents |
|---|---|---|
| 1 | Fmoc-Cit-OH (1.0 eq) | DIEA (4.0 eq) |
| 2 | Fmoc-Val-OH (3.0 eq) | HBTU (2.85 eq) and DIEA (6.0 eq) |
| 3 | tetrahydropyran-2,6-dione (3.0 eq) | HBTU (2.85 eq) and DIEA (6.0 eq) |
| 4 | Dimethylamine•HCl (3.0 eq) | HBTU (2.85 eq) and DIEA (6.0 eq) |

After last amino acid coupling, the resin was washed with MeOH 3 times, and then dried under vacuum. Cleavage from the resin was performed by the addition of 20% HFIP/80% DCM to the flask containing the side chain protected peptide at room temperature. The cleavage was then repeated (1 hr each) with continuous N₂ bubbling. The resin was filtered and the filtrate collected, then concentrated to remove the solvent. The crude peptide was lyophilized to give compound 2 (crude, 1.80 g, 91.82% purity, 39.7% yield). Expected MW=415.49, observed m/z: 416.2 [M+H]⁺.

Preparation of Compound 3

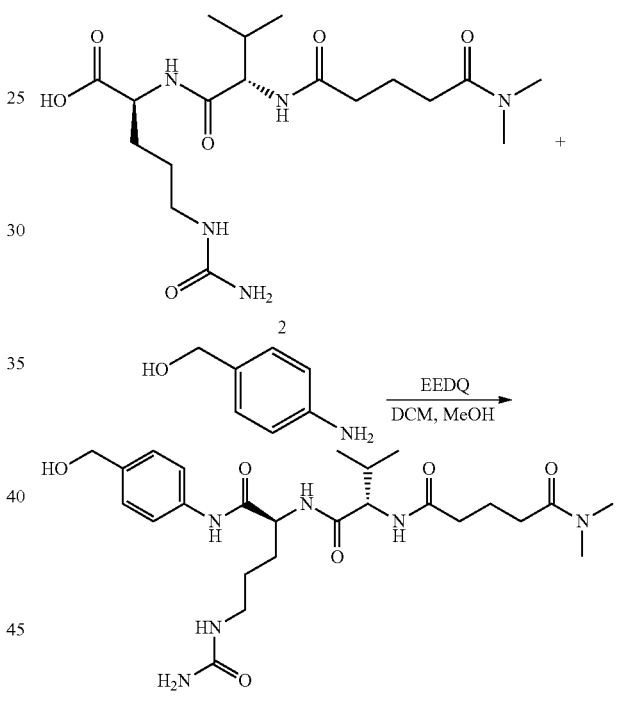

To a solution of compound 2 (500 mg, 1.20 mmol, 1.0 eq) in DCM (10 mL) and MeOH (5 mL) was added (4-aminophenyl)methanol (178 mg, 1.44 mmol, 1.2 eq) and EEDQ (595 mg, 2.41 mmol, 2.0 eq) in the dark. The mixture was stirred at 25° C. for 12 hr. TLC (DCM:MeOH=10:1, $R_f$=0.53) indicated compound 2 was consumed completely. The reaction mixture was concentrated under reduced pressure to give a residue. The residue was purified by flash silica gel chromatography (ISCO®; 40 g SepaFlash® Silica Flash Column, Eluent of 0-25% MeOH/DCM@40 mL/min) to give compound 3 (380 mg, 730 µmol, 60.7% yield) as a pale yellow solid. ¹H NMR: ES8396-320-P1D1 (400 MHz, DMSO-d₆) δ ppm 9.87-9.91 (m, 1H), 8.09 (br d, J=7.53 Hz, 1H), 7.86 (d, J=8.53 Hz, 1H), 7.49-7.57 (m, 2H), 7.18-7.26 (m, 2H), 5.97 (br t, J=5.52 Hz, 1H), 5.41 (s, 2H), 5.06-5.12 (m, 1H), 4.34-4.44 (m, 3H), 4.14-4.22 (m, 1H), 3.33 (s, 6H), 2.91 (s, 3H), 2.79 (s, 2H), 2.16-2.32 (m, 4H), 1.97 (dq, J=13.52, 6.70 Hz, 1H), 1.63-1.76 (m, 3H), 0.85 (dd, J=11.17, 6.90 Hz, 6H).

Preparation of Compound 4

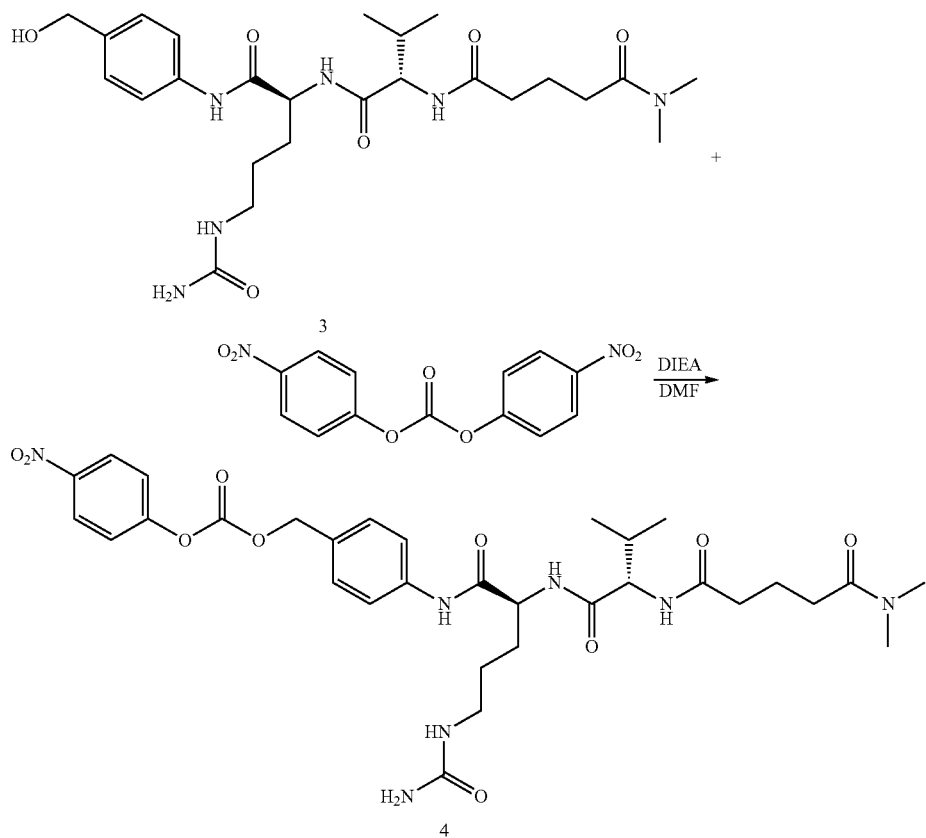

To a solution of compound 3 (380 mg, 730 μmol, 1.0 eq) in DMF (8 mL) was added bis(4-nitrophenyl) carbonate (666 mg, 2.19 mmol, 3.0 eq) and DIEA (377 mg, 2.92 mmol, 509 μL, 4.0 eq). The mixture was stirred at 25° C. for 2 hr. LC-MS showed compound 3 was consumed completely and one main peak with desired m/z for compound 4 was detected. The reaction mixture was purified by preparative HPLC (neutral condition) to give compound 4 (368 mg, 537 μmol, 73.5% yield) as a white solid. Expected MW=685.32, observed m/z: 686.1 [M+H]$^+$.

Preparation of BCY9422

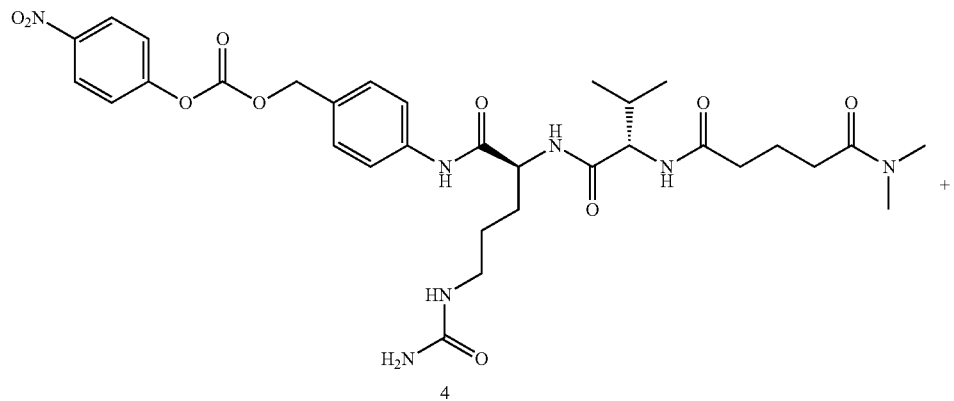

-continued

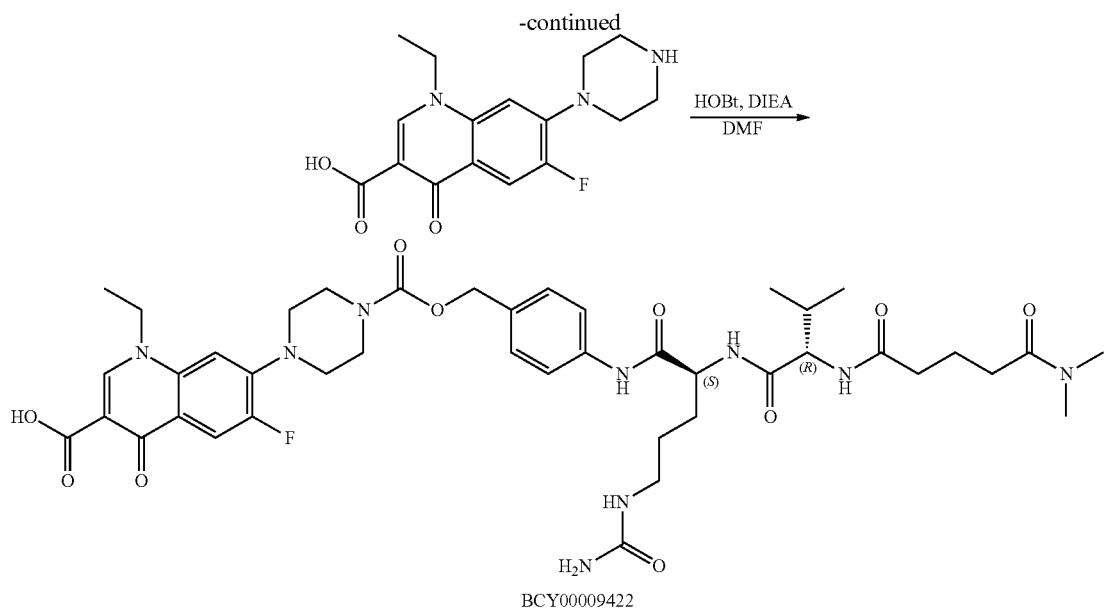

BCY00009422

To a solution of compound 4 (150 mg, 219 μmol, 1.0 eq) in DMF (3 mL) was added DIEA (141 mg, 1.09 mmol, 191 μL, 5.0 eq) and stirred for 10 min at 25° C. Then 1-ethyl-6-fluoro-4-oxo-7-piperazin-1-yl-quinoline-3-carboxylic acid (105 mg, 328 μmol, 1.5 eq) and HOBt (29.6 mg, 219 μmol, 1.0 eq) were added to the mixture. The mixture was stirred at 35° C. for 16 hr. LC-MS showed one main peak with desired m/z was detected. The reaction mixture was purified by preparative HPLC (A: 0.075% TFA in $H_2O$, B: ACN) to give BCY9422 (107.8 mg, 119 μmol, 54.6% yield, 95.9% purity) as a white solid. Expected MW=865.95, observed m/z: 433.7 $[M/2+H]^+$ and 866.2 $[M+H]^+$.

Plasma Stability Analysis

Pooled frozen plasma was thawed in a water bath at 37° C. Plasma was centrifuged at 4000 rpm for 5 min and the clots were removed if any. The pH will be adjusted to 7.4±0.1 if required. 1 mM stock solution was prepared with DMSO. Propantheline (positive control) was prepared by making a 100 μM working solution by diluting 5 μL of the stock solution (10 mM) with 495 μL ultra pure water. 100 μM working solutions of test compounds were made up by diluting 10 μL of the stock solution (1 mM) with 90 μL DMSO. 98 μL of blank plasma was spiked with 2 μL of dosing solution (100 μM) to achieve 2 μM of the final concentration in duplicate and samples were incubated at 37° C. in a water bath. At each time point (0, 1, 2, 4, 6 and 24 hr), 400 μL of 200 ng/mL tolbutamide and labetalol in 100% MeOH was added and mixed thoroughly to precipitate proteins. Sample plates were centrifuged at 4,000 rpm for 15 min. An aliquot of supernatant (150 μL) was transferred from each well before submitting for LC-MS/MS analysis.

The % remaining test compound after incubation in plasma was calculated using following equation:

Remaining=100×(PAR at appointed incubation time/ PAR at T0 time)

where PAR is the peak area ratio of analyte versus internal standard (IS).

The appointed incubation time points are T0 (0 hr), Tn (n=0, 1, 2, 4, 6, 24 hr). The half-life (T½) was calculated from a log linear plot of concentration versus time.

When the % remaining value at the maximal incubation time, which was 24 hr in this study, was higher than 75%, it is considered to be within the acceptable experimental variation. Therefore, a corresponding t½ of >57.8 hr was reported.

Cathepsin B (CatB) Assay

15 μL of test compound solution (2 mM in DMSO) was added to the incubation plate in duplicate. 30 μL of Cathepsin B stock solution (16 μM) was pre-activated with 1500 μL activation buffer for 10 min at room temperature. The Cathepsin B solution was diluted in 13.17 mL water, then 735 μL activatived enzyme mixture was added to the incubation plate. The mixture was incubated at 37° C. in a waterbath. At various time points (e.g. 0 h, 1 h, 2 h, 4 h, 6 h, 24 h) the reaction was terminated by taking 100 μL aliquots and quenching with 400 μL cold IS-fortified quenching solution. The samples were mixed and centrifuged at 4000 rpm for 20 min. 50 μL of supernatant was taken into a new plate containing 150 μL ultra-pure water and the samples mixed thoroughly before submitting to LC-MS/MS analysis.

Xenograft Models

For Cell-Derived Xenograft (CDX) models, mice (balb/c nude, female, 18-23 g at study start) were inoculated with HT1080 cells (5.0×10⁶ cells/mouse in 0.2 ml PBS to the right flank). Animals were randomized when the average tumour volume reached the pre-designated start size. Group size is n=4. All studies included a vehicle-treated control.

Dosing was conducted by intravenous bolus. Tumor volume was measured in two dimensions using a caliper, and the volume was expressed in mm³ using the formula: V=0.5 a×b² where a and b are the long and short diameters of the tumor, respectively. All Xenograft studies were conducted at Wuxi AppTec Co. Ltd. (Shanghai).

Plasma Pharmacokinetics of Bicycle Conjugates and Released Payloads in CD-1 Mice Male CD-1 mice were dosed with each Bicycle Conjugate formulated in 25 mM histidine HCl, 10% sucrose pH 7 via tail vein injection. Serial bleeding (about 80 μL blood/time point) was performed via submadibular or saphenous vein at each time point. All blood samples were immediately transferred into prechilled microcentrifuge tubes containing 2 μL K2-EDTA (0.5M) as anti-coagulant and placed on wet ice. Blood samples were immediately processed for plasma by centrifugation at approximately 4° C., 3000 g. The precipitant including internal standard (350 μL) was immediately added into the 35 μL plasma sample, mixed well and centrifuged at 3220 g, 4° C. for 15 minutes. The supernatant was transferred into pre-labeled polypropylene microcentrifuge tubes, and then quick-frozen over dry ice. The samples were stored at 70° C. or below as needed until analysis. Supernatant samples were mixed with 50 μL water, vortexed well and centrifuged at 3220 g, 4° C. for 15 minutes. A sample of the supernatant was injected for LC-MS/MS analysis using an Acquity UPLC with AB Sciex 6500+ Triple Quad MS in positive ion mode to determine the concentrations of Bicycle Conjugate and released payload.

Plasma concentration versus time data were analyzed by non-compartmental approaches using the Phoenix WinNonlin 6.3 software program. $C_0$, Cl, $Vd_{ss}$, $T_{1/2}$, $AUC_{(0-inf)}$, $MRT_{(0-last)}$, $MRT_{(0-inf)}$ nd graphs of plasma concentration versus time profile were reported.

Measurement of MMAE in Plasma, Muscle and Tumour Samples

Samples of tumour from in vivo xenograft studies were weighed, homogenized (10× dilution in homogenization buffer including protease inhibitors). Tumour homogenates and plasma were then analysed by LC-MS/MS according to standard procedures.

Tested Compounds

The compounds used for the following studies were constructed as described hereinbefore with Norfloxacin used as a surrogate payload, conjugated to the di/tripeptide linkers of the invention via a PAB self-immolating group. The peptidic linkers were capped at the N-terminus with 5-(dimethylamino)-5-oxopentanoic acid as shown schematically below:

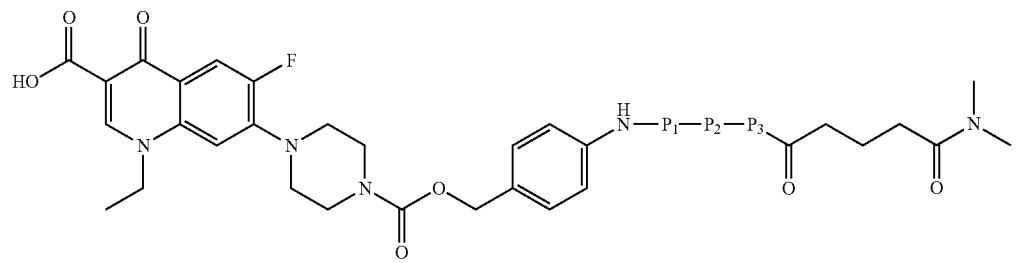

Bicycle Toxin Conjugates (BTCs)

BTCs incorporating the di/tripeptide linkers of the invention were synthesised by preparing azide-bearing toxin/linker sequences. Here, MMAE cytotoxin was linked to the peptidic cleavable linkers via PAB self-immolating group, which were conjugated to a bicyclic peptide MT1-MMP binder (BCY3900; as described in WO 2016/067035 as SEQ ID NO: 5) using copper catalysed azide-alkyne cycloaddition.

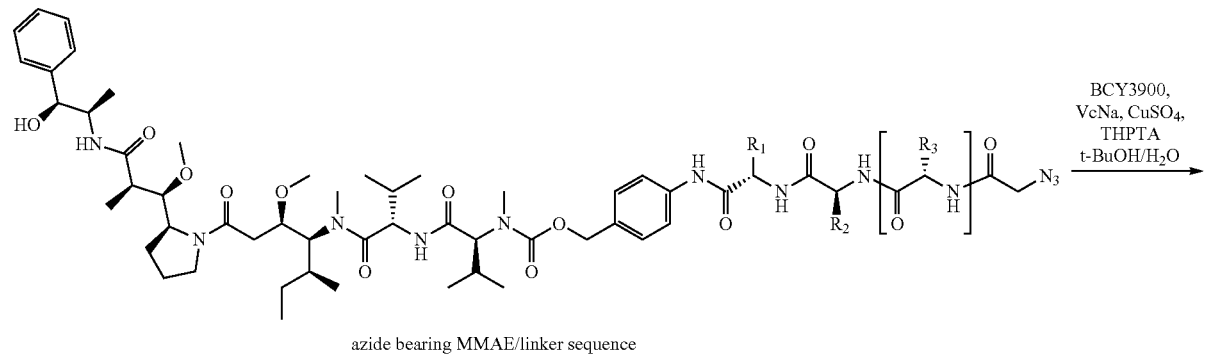

azide bearing MMAE/linker sequence

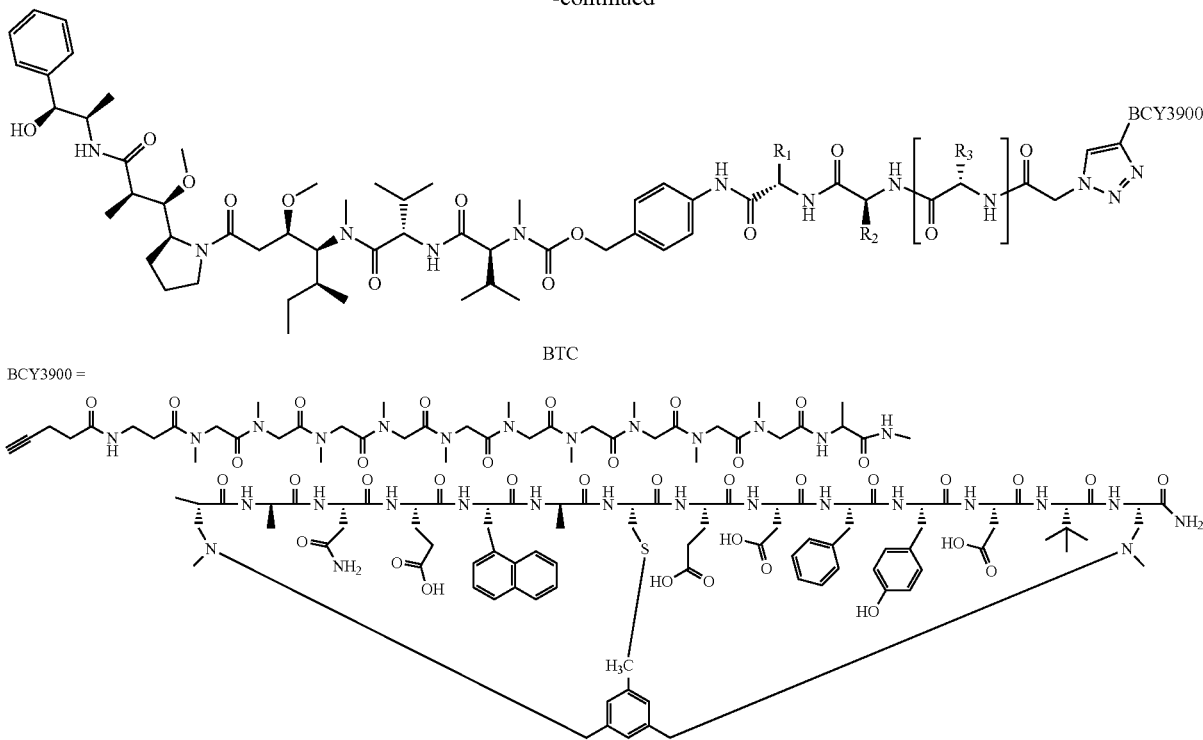

BCY3900 =

Example 1: Plasma Stability Analysis Using Linkers of the Invention

Replacement of the citrulline residue in CatB sensitive dipeptide linker Cit-Val with a basic non-natural amino acid was shown to increase the stability of the linker to non-specific cleavage when incubated with mouse plasma in vitro. This is shown by the extended half-lives in Table 1 for the tested compounds when compared with the Cit-Val linker (BCY9422).

TABLE 1

Replacement of Cit at P1 with Basic Non-Natural Amino Acids in Dipeptide Linkers Cit-Val → BAA-Val (BAA = basic non-natural amino acid)

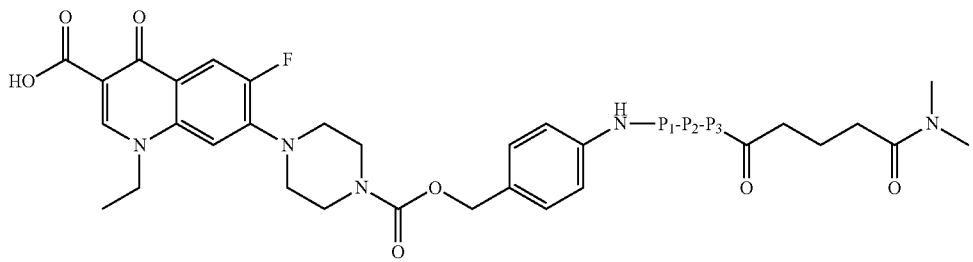

| Cpd No | P1 | P2 | P3 | Mouse plasma $t_{1/2}$ (h) | fold increase in half-life vs Cit-Val |
|---|---|---|---|---|---|
| BCY9422 | Cit | Val | — | 0.4 | 1.0 |
| BCY10300 | Dap(CNNH$_2$) | Val | — | 1.4 | 3.4 |
| BCY9423 | Agb | Val | — | 2.4 | 6.0 |
| BC9477 | Agb(Me) | Val | — | 2.5 | 6.3 |
| BCY10298 | Dap | Val | — | 2.6 | 6.5 |
| BCY00009474 | Dab | Val | — | 4.3 | 10.8 |

In some cases, such as with Agb and Dab, when citrulline is replaced within a linker containing a Cit-Val-Glu motif (reported to have a higher mouse plasma stability than Cit-Val), an additive effect is seen where the analogous linkers incorporating a basic residues exhibit further increased mouse plasma stability over Cit-Val-Glu as shown in Table 2.

TABLE 2

Replacement of Cit at P1 with Basic Non-Natural Amino Acids in Tripeptide Linkers Cit-Val-Glu → BAA-Val-Glu (BAA = basic non-natural amino acid)

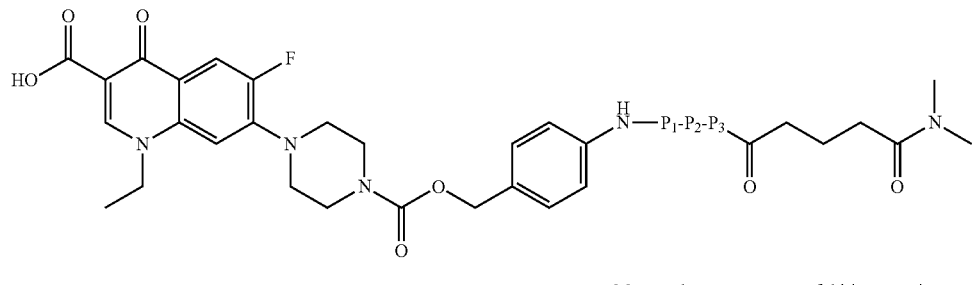

| Cpd No | P1 | P2 | P3 | Mouse plasma $t_{1/2}$ (h) | fold increase in half-life vs Cit-Val |
|---|---|---|---|---|---|
| BCY9422 | Cit | Val | — | 0.4 | 1.0 |
| BCY9696 | Cit | Val | Glu | 10.8 | 25.1 |
| BCY10299 | Dap(CNNH$_2$) | Val | Glu | 9.4 | 11.8 |
| BCY10297 | Dap | Val | Glu | 15.5 | 19.3 |
| BCY9695 | Agb | Val | Glu | 14.3 | 34.1 |
| BCY10122 | Dab | Val | Glu | 39.0 | 107.5 |

BTCs incorporating linkers which have basic non-natural amino acids in the P1 position show increased stability to mouse plasma, e.g. a BTC with a Dab-Val cleavable linker (see BCY10989 in Table 3) has a half-life of 30.8 hours in mouse plasma (EDTA anticoagulant) compared with 6.8 hours for Cit-Val (see BCY7761 in Table 3).

When Glu is incorporated in the P3 position, linkers with Dab in P1 position show enhanced stability in plasma compared to their Cit counterparts (see Cit-Val-Glu compared with Dab-Val-Glu in human plasma, Cit-1Nal-Glu compared with Dab-1Nal-Glu in rat and mouse plasma EDTA anticoagulant).

TABLE 3

Plasma Stability of BTCs

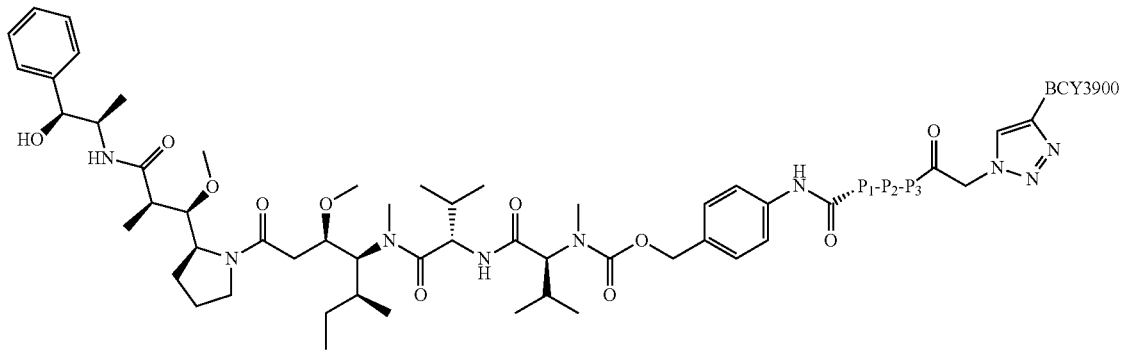

| Cpd No | P1 | P2 | P3 | Human plasma $t_{1/2}$ (Heparin) | Rat plasma $t_{1/2}$ (Heparin) | Mouse plasma $t_{1/2}$ (Herparin) | Mouse plasma $t_{1/2}$ (EDTA) | Mouse plasma $t_{1/2}$ expt 2 (EDTA) |
|---|---|---|---|---|---|---|---|---|
| BCY7761 | Cit | Val | — | >57.8 | 56.8 | 9.2 | 9.1 | 6.8 |
| BCY10989 | Dab | Val | — | NT | NT | NT | NT | 30.8 |
| BCY10980 | Cit | Val | Glu | 40 | >57.8 | >57.8 | >57.8 | NT |
| BCY10981 | Dab | Val | Glu | 73.8 | >57.8 | >57.8 | >57.8 | NT |
| BCY10984 | Cit | 1Nal | Glu | >57.8 | 53.8 | 47.5 | >57.8 | NT |

TABLE 3-continued

Plasma Stability of BTCs

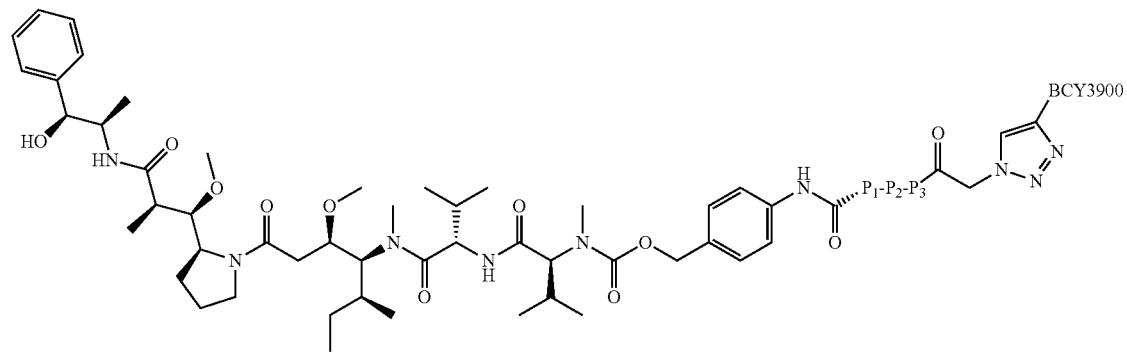

| Cpd No | P1 | P2 | P3 | Human plasma $t_{1/2}$ (Heparin) | Rat plasma $t_{1/2}$ (Heparin) | Mouse plasma $t_{1/2}$ (Herparin) | Mouse plasma $t_{1/2}$ (EDTA) | Mouse plasma $t_{1/2}$ expt 2 (EDTA) |
|---|---|---|---|---|---|---|---|---|
| BCY10985 | Dab | 1Nal | Glu | >57.8 | >57.8 | >57.8 | >57.8 | NT |
| BCY10982 | Dap | Val | Glu | NT | NT | NT | 55.9 | NT |
| BCY10986 | Dab | 2Nal | Glu | NT | NT | NT | 50.1 | NT |
| BCY10987 | Dab | Dpa | Glu | NT | NT | NT | >57.8 | NT |
| BCY10988 | Dab | cBu | Glu | NT | NT | NT | >57.8 | NT |

Example 2: CatB Cleavage Rate Analysis Using Linkers of the Invention

Replacement of the citrulline residue in CatB sensitive dipeptide linker Cit-Val with a basic non-natural amino acid also modulates the Cathepsin B cleavage rate of the linker. For example, Dab, Agb and Agb(Me) each increase the rate of cleavage by cathepsin B in vitro compared with Cit-Val (see Table 4). Dap and Dap(CNNH$_2$) decreases the cleavage rate (see Table 4).

TABLE 4

Replacement of Cit at P1 with Basic Non-Natural Amino Acids in Dipeptide Linkers

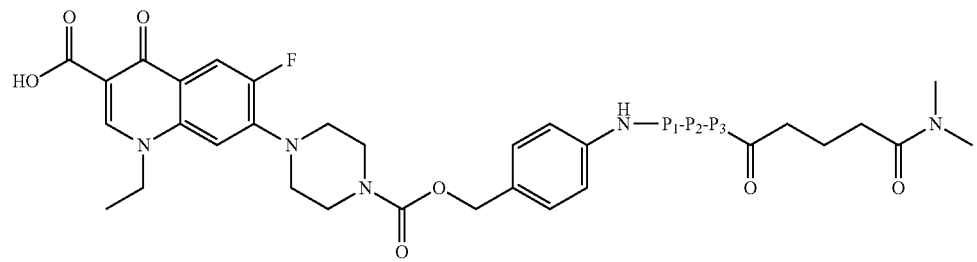

| | | | | % Parent remaining after incubation with CatB | | |
|---|---|---|---|---|---|---|
| | P1 | P2 | P3 | T = 1 h | T = 4 h | T = 24 h |
| BCY9422 | Cit | Val | — | 3 | 0 | 0 |
| BCY10300 | Dap(CNNH$_2$) | Val | — | 72 | 10 | 0 |
| BCY9423 | Agb | Val | — | 0.6 | 0 | 0 |
| BCY9477 | Agb(Me) | Val | — | 0 | 0 | 0 |
| BCY10298 | Dap | Val | — | 92 | 63 | 6 |
| BCY9474 | Dab | Val | — | 0.3 | 0 | 0 |

Replacement of the citrulline residue in CatB sensitive tripeptide linker Cit-Val-Glu with a basic non-natural amino acid modulates the Cathepsin B cleavage rate of the linker. For example, Dab and Agb show a similar rate of cleavage as Cit-Val by cathepsin B in vitro (see Table 5). Substitution with Dap and Dap(CNNH$_2$) decreases the cleavage rate (see Table 5).

TABLE 5

Replacement of Cit at P1 with Basic Non-Natural Amino Acids in Tripeptide Linkers

|  | P1 | P2 | P3 | % Parent remaining after incubation with CatB | | |
|---|---|---|---|---|---|---|
|  |  |  |  | T = 1 h | T = 4 h | T = 24 h |
| BCY9696 | Cit | Val | Glu | 0 | 0 | 0 |
| BCY10299 | Dap(CNNH2) | Val | Glu | 48 | 1 | 0 |
| BCY10297 | Dap | Val | Glu | 75 | 15 | 0 |
| BCY9695 | Agb | Val | Glu | 0 | 0 | 0 |
| BCY10122 | Dab | Val | Glu | 0 | 0 | 0 |

The cathepsin B cleavage rate of linkers can be modulated by introducing different non-natural amino acids at the P1 and P2 position. The results of the CatB cleavage analysis with BTCs can be seen in Table 6 where replacement of Cit with Dab in Cit-Val linker gives a more slowly cleaved linker. When Glu is introduced to these sequences in the P3 position, the cleavage rate between the 2 linkers is comparable. Replacing the P1 position with Dap significantly slows CatB cleavage of the linker. Replacement of Val in the P2 position with 1Nal slows CatB cleavage significantly, whereas its regioisomer 2Nal only slightly reduces cleavage kinetics. Incorporation of Dpa in P2 dramatically reduces CatB cleavage rate and cBu inhibits cleavage altogether.

TABLE 6

CatB Cleavage of BTCs

| Cpd No | P1 | P2 | P3 | % Parent remaining after incubation with CatB | | | | | | CatB $t_{1/2}$ (h) |
|---|---|---|---|---|---|---|---|---|---|---|
|  |  |  |  | 0 h | 1 h | 2 h | 4 h | 6 h | 24 h |  |
| BCY7761 | Cit | Val | — | 100 | 33.687 | 15.1 | 4.93 | 1.01 | 0.462 | 0.9 |
| BCY10989 | Dab | Val | — | 100 | 89.4 | 60.7 | 40.4 | 23.2 | 12.8 | 2.8 |
| BCY10980 | Cit | Val | Glu | 100 | 0 | 0 | 0 | 0 | 0 | <0.2 |
| BCY10981 | Dab | Val | Glu | 100 | 0 | 0 | 0 | 0 | 0 | <0.2 |
| BCY10982 | Dap | Val | Glu | 100 | 85.435 | 82.3 | 73.1 | 72.3 | 73.91 | >57.8 |
| BCY10984 | Cit | 1Nal | Glu | 100 | 94.498 | 83.5 | 39.2 | 33.4 | 32.5 | 3.3 |
| BCY10985 | Dab | 1Nal | Glu | 100 | 103.62 | 94.8 | 107 | 92.2 | 86.82 | >57.8 |

TABLE 6-continued

| BCY10986 | Dab | 2Nal | Glu | 100 | 9.7346 | 0 | 0 | 0 | 0 | 0.3 |
| BCY10987 | Dab | Dpa | Glu | 100 | 104.27 | 90.6 | 90.2 | 94 | 91.48 | >57.8 |
| BCY10988 | Dab | cBu | Glu | 100 | 109.88 | 119 | 110 | 105 | 111 | >57.8 |

Example 3: Plasma Protein Binding Analysis Using Linkers of the Invention

Changing the amino acids in P1 and P2 position can modulate the plasma protein binding of a BTC. Table 7 demonstrates that replacement of Cit in P1 position for Dab increases the percentage unbound. Replacement of Val in the P2 position with 1Nal decreases the unbound

TABLE 7

Plasma Protein Binding of BTCs

[Structure of BCY3900]

|  |  |  |  | Plasma protein binding (% Unbound) | | | |
|---|---|---|---|---|---|---|---|
|  | P1 | P2 | P3 | Mouse | Rat | Cyno | Human |
| BCY7761 | Cit | Val | — | 17.3 | 10.6 | 18.7 | 21.1 |
| BCY10980 | Cit | Val | Glu | 18.7 | NT | NT | NT |
| BCY10981 | Dab | Val | Glu | 28.8 | 41.7 | 45.9 | 65.3 |
| BCY10984 | Cit | 1Nal | Glu | 0.2 | 3.5 | 9.2 | 3.1 |
| BCY10985 | Dab | 1Nal | Glu | 4.8 | NT | NT | 23.4 |
| BCY10986 | Dab | 2Nal | Glu | 7.1 | 11.5 | NT | NT |

Example 4: Pharmacokinetics Analysis Using Linkers of the Invention

Replacement of the dipeptide linker amino acids can alter the pharmacokinetic (PK) profile of a BTC.

Mouse

The results shown in FIGS. 1 to 6 and Table 8 demonstrates that linkers containing 1Nal in the P2 position show extended half-life in mouse PK studies. Linkers with increased mouse plasma stability show lower relative levels of free MMAE in plasma versus Cit-Val (relative to parent compound).

TABLE 8

Summary of Pharmacokinetic Analysis in Mouse

| BCY | Sequence | C0 (ng/mL) | CLp (mL/min/kg) | Vdss (L/kg) | t½ (h) |
|---|---|---|---|---|---|
| BCY7761 | MMAE-PAB-(Cit-Val)-BCY3900 | 24753 | 1.0 | 0.04 | 0.48 |
| BCY10984 | MMAE-PAB-(Cit-1Nal-Glu)-BCY3900 | 111807 | 0.2 | 0.09 | 7.55 |
| BCY10980 | MMAE-PAB-(Cit-Val-Glu)-BCY3900 | 40157 | 4.8 | 0.20 | 0.64 |
| BCY10981 | MMAE-PAB-(Dab-Val-Glu)-BCY3900 | 30674 | 3.9 | 0.15 | 0.60 |
| BCY10985 | MMAE-PAB-(Dab-1Nal-Glu)-BCY3900 | 26393 | 1.0 | 0.18 | 2.48 |

Rat

Figure 7:
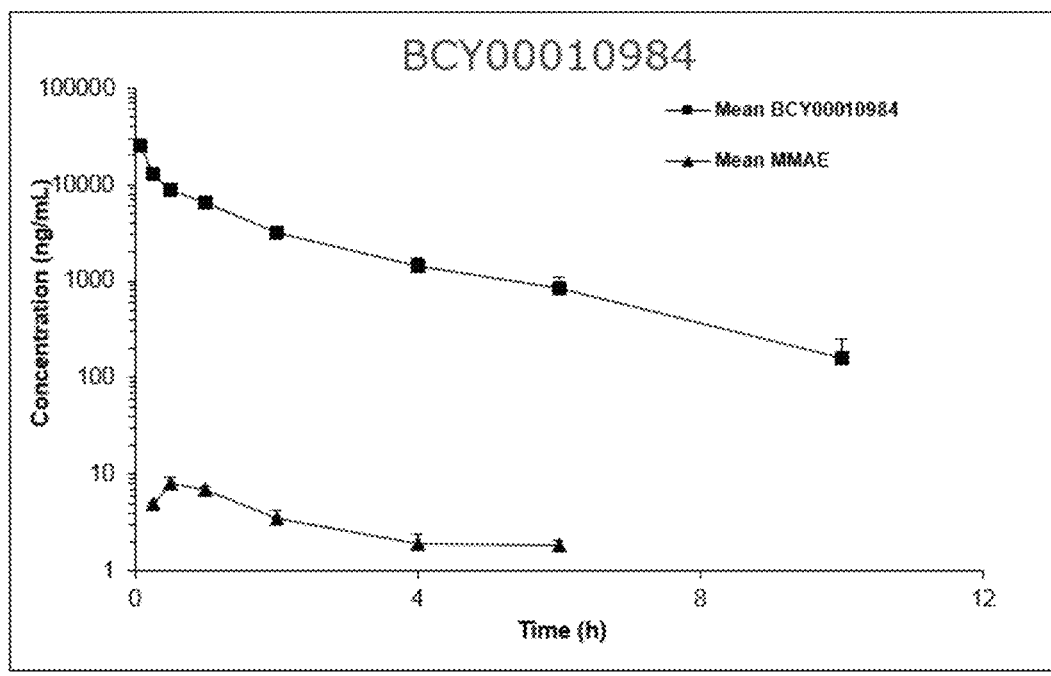
FIG. 7: Pharmacokinetic analysis of BCY10984 in rat plasma.
Figure 8:
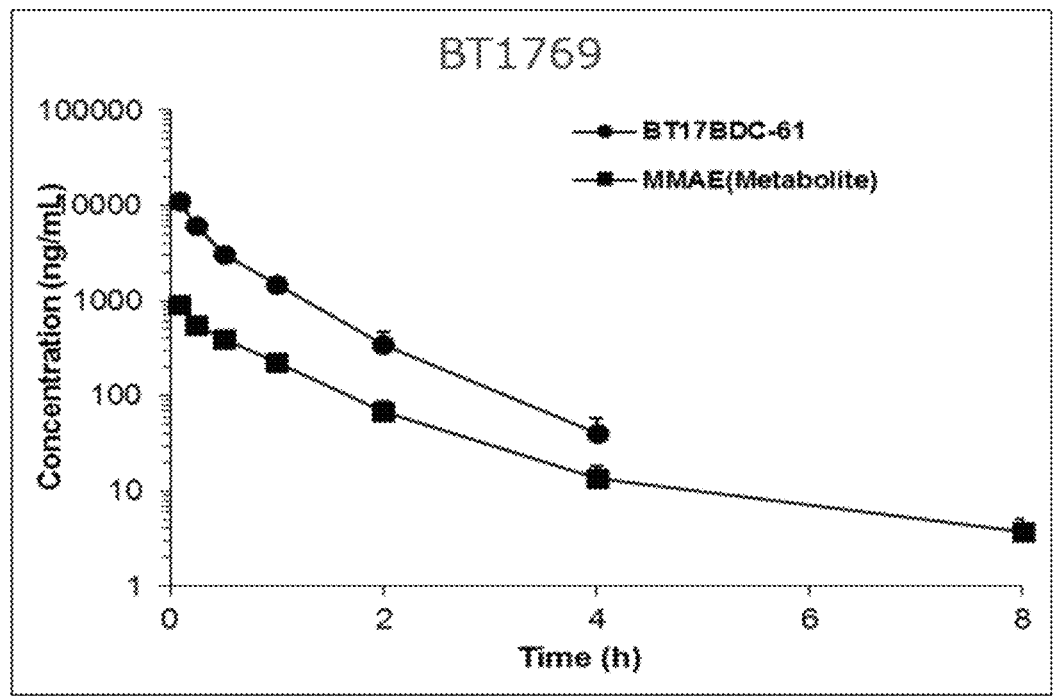
FIG. 8: Pharmacokinetic analysis of BCY7761 in rat plasma.

The results of the rat PK experiments shown in FIGS. 7 and 8 and Table 9 show that BCY10984 has an extended half-life compared to the Cit-Val analogue BCY7761. There is also less free MMAE toxin in plasma (relative to intact parent).

TABLE 9

Summary of Pharmacokinetic Analysis in Rat

| Compound | Linker | PPB (% Unbound) | t½ (h) | AUC ratio |
|---|---|---|---|---|
| BCY7761 | Cit-Val | 11% | 0.49 | 0.00445 |
| BCY10984 | Cit-1Nal-Glu | 4% | 1.83 | 0.0000936 |

Example 5: Tumour Reduction Efficacy and Toxin Levels in Tumour

Figure 9:
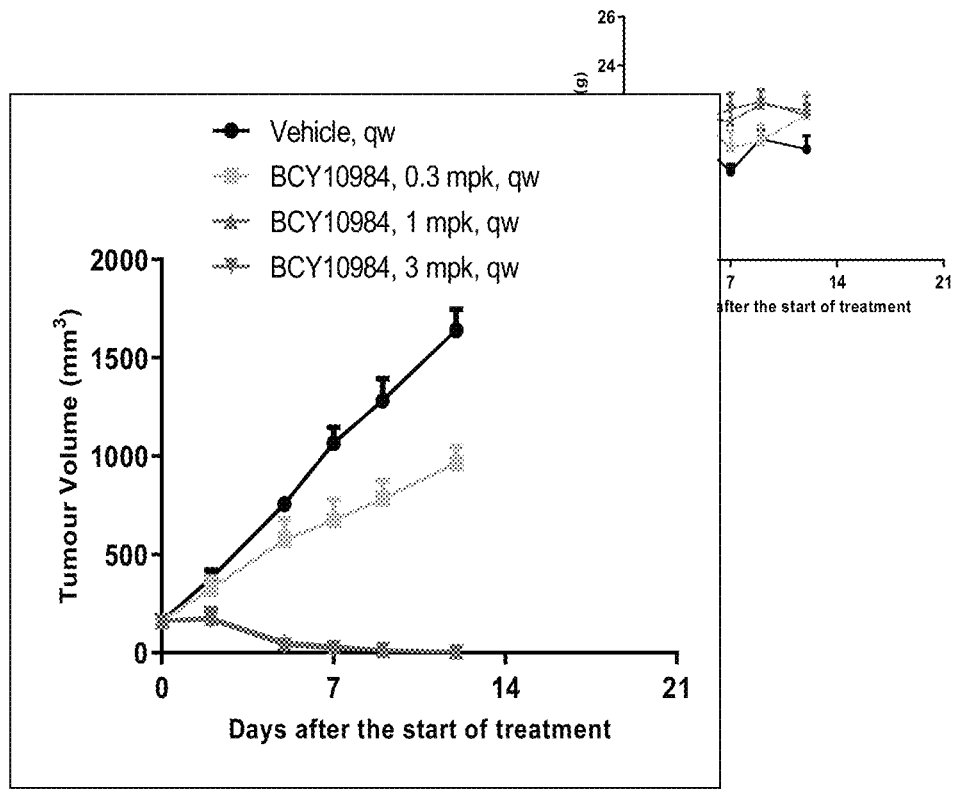
FIG. 9: Tumour reduction efficacy of BCY10984.
Figure 10:
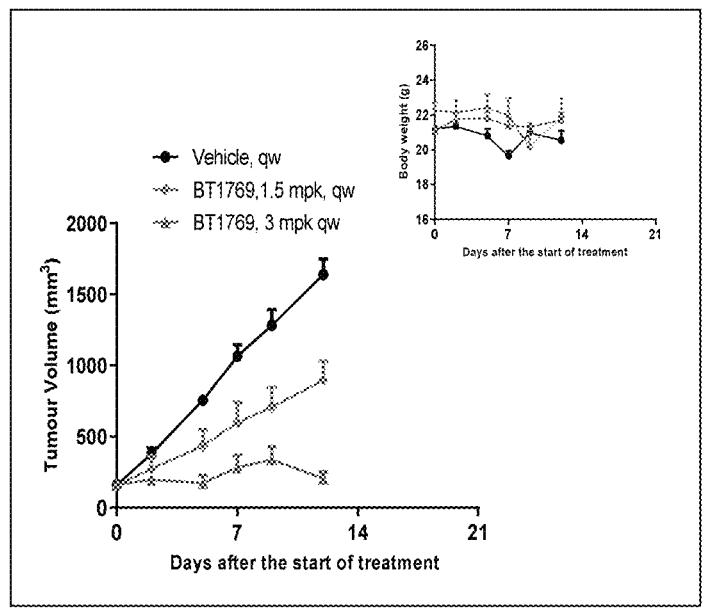
FIG. 10: Tumour reduction efficacy of BCY7761.
Figure 11:
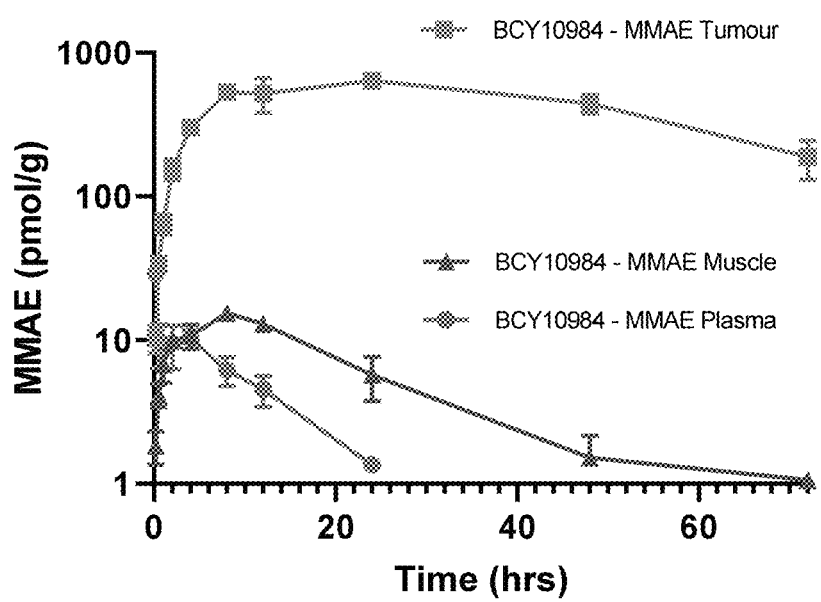
FIGS. 11 to 15: Toxin Level Analysis of BCY10984 and BCY7761.
Figure 12:
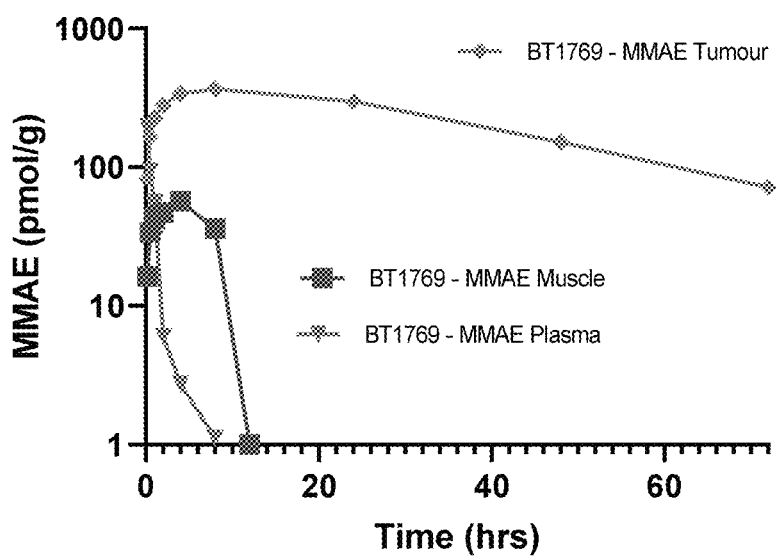
Figure 13:
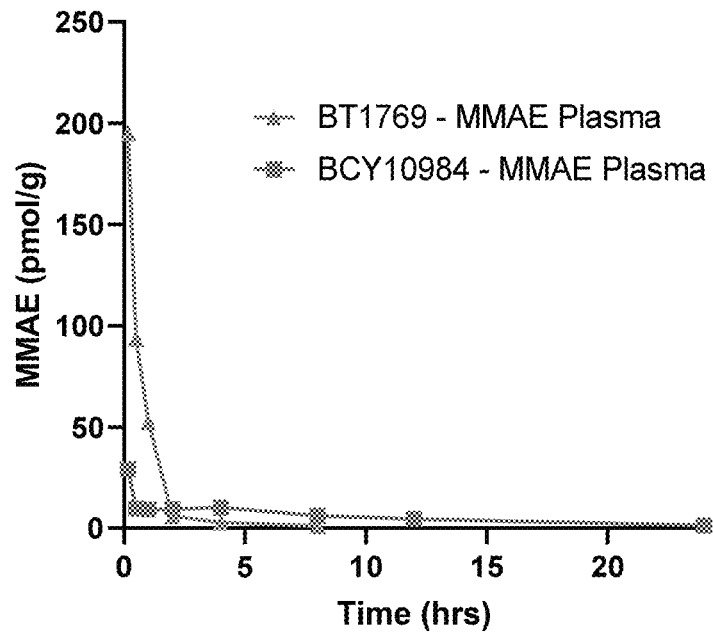
Figure 14:
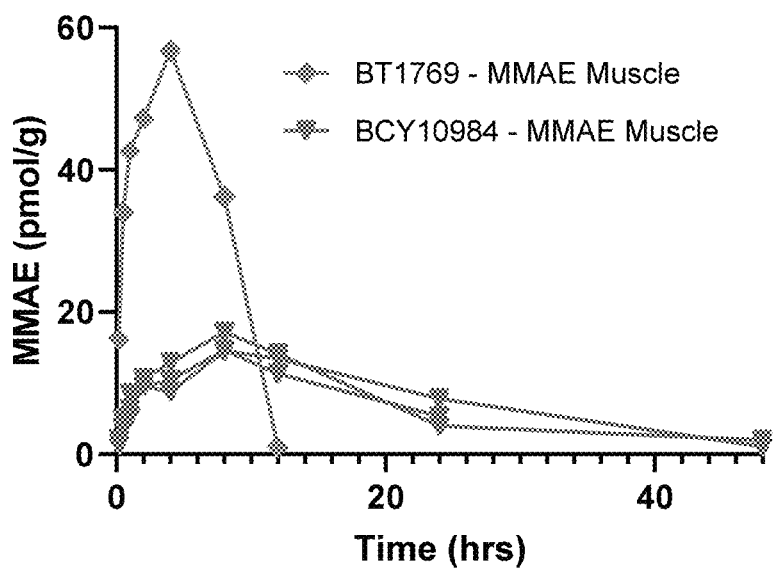
Figure 15:
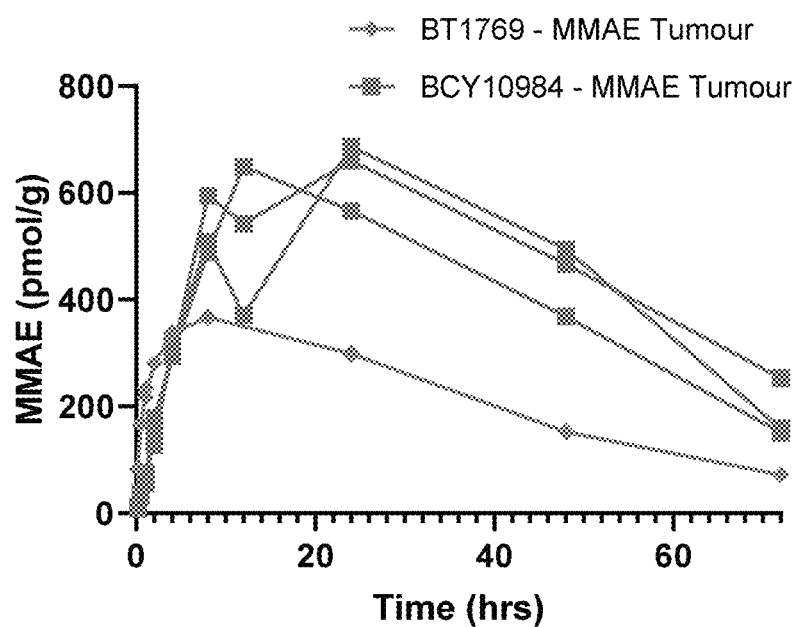

The results shown in FIGS. 9 and 10 demonstrate that BCY10984 (Cit-1Nal-Glu linker) shows higher efficacy than BCY7761 (BT1769—Cit-Val linker) in a mouse CDX model (HT1080 cells) with full tumour clearance demonstrated at 1 mg/kg and 3 mg/kg following one dose. Body weights of the animals are not affected at these doses.

The results shown in FIGS. 11 to 15 demonstrate that higher levels of MMAE toxin are observed in the tumour when BCY10984 is administered to mice bearing HT1080 tumours compared to BT1769 at the same dose. Similar levels of MMAE are present in the plasma and muscle tissue.

Example 6: In Vivo Efficacy Study Using Linkers of the Invention in the HT1080 Xenograft Model in BALB/c Nude Mice (a) Study Objective The objective of this study was to evaluate the in vivo therapeutic efficacy of BCY10984 and BCY12951 (a drug conjugate containing the same linker as BCY10984 but conjugated to a non-binding bicyclic peptide ligand, i.e. having the composition: MMAE-PAB-(Dab-Val-Glu)-Non-Binding Bicyclic Peptide) in the HT1080 xenograft model in BALB/c nude mice.

(b) Experimental Design

| Group | N | Treatment | Dosage | Dosing Volume | Route | Schedule |
|---|---|---|---|---|---|---|
| 1 | 5 | Vehicle | — | 10 mL/kg | iv | qw × 2 |
| 2 | 5 | BCY10984 | 5 µM | 10 mL/kg | iv | qw × 3 |
| 3 | 5 | BCY10984 | 15 µM | 10 mL/kg | iv | qw × 3 |
| 4 | 5 | BCY10984 | 45 µM | 10 mL/kg | iv | qw × 3 |
| 5 | 5 | BCY12951 | 5 µM | 10 mL/kg | iv | qw × 2 |
| 6 | 5 | BCY12951 | 15 µM | 10 mL/kg | iv | qw × 2 |
| 7 | 5 | BCY12951 | 45 µM | 10 mL/kg | iv | qw × 3 |

Note: Mice were monitored to Day 39 after 2-3 dosing cycles.
Mice from Group 5 and 6 were dosed with 45 µM BCY10984 on Day 14 and Day 28.

(c) Materials (i) Animals and Housing Condition

Animals
 Species: *Mus Musculus*
 Strain: BALB/c nude
 Age: 6-8 weeks
 Sex: female Body weight: 18-22 g
Number of animals: 35 mice plus spare
Animal supplier: Shanghai Lingchang Biotechnology Experimental Animal Co., LTD.
Housing Condition
The mice were kept in individual ventilation cages at constant temperature and humidity with 5 animals in each cage.
Temperature: 20~26° C.
Humidity 40-70%.
Cages: Made of polycarbonate. The size is 375 mm×215 mm×180 mm. The bedding material is corn cob, which is changed twice per week.
Diet: Animals had free access to irradiation sterilized dry granule food during the entire study period.
Water: Animals had free access to sterile drinking water.
Cage identification: The identification labels for each cage contained the following information: number of animals, sex, strain, the date received, treatment, study number, group number and the starting date of the treatment.
Animal identification: Animals were marked by ear coding.

(d) Experimental Methods and Procedures (i) Cell Culture

The HT1080 cells were maintained in EMEM medium supplemented with 10% heat inactivated fetal bovine serum at 37° C. in an atmosphere of 5% $CO_2$ in air. The tumor cells were routinely sub-cultured twice weekly. The cells growing in an exponential growth phase were harvested and counted for tumor inoculation.

(ii) Tumor Inoculation

Each mouse was inoculated subcutaneously at the right flank with HT1080 tumor cells ($5 \times 10^6$) in 0.2 ml of PBS for tumor development. Animals were randomized when the average tumor volume reached 320 $mm^3$ for efficacy study. The test article administration and the animal numbers in each group were shown in the experimental design table.

(iii) Testing Article Formulation Preparation

| Treatment | Conc. (mg/mL) | Formulation |
|---|---|---|
| Vehicle | — | 25 mM Histidine 10% Sucrose pH = 7 |
| BCY10984 | 0.4 | Dissolve 2.34 mg BCY10984 in 5.583 mL His-buffer*. |
| | 0.188 | Dilute 0.703 mL 0.4 mg/mL BCY10948 stock with 0.797 mL His-buffer. |
| | 0.063 | Dilute 0.234 mL 0.4 mg/mL BCY10948 stock with 1.266 mL His-buffer. |
| | 0.021 | Dilute 0.078 mL 0.4 mg/mL BCY10948 stock with 1.422 mL His-buffer. |
| BCY12951 | 0.4 | Dissolve 2.5 mg BCY12951 in 5.645 mL His-buffer. |
| | 0.185 | Dilute 0.693 mL 0.4 mg/mL BCY12951 stock with 0.807 mL His-buffer. |
| | 0.062 | Dilute 0.231 mL 0.4 mg/mL BCY12951 stock with 1.438 mL His-buffer. |
| | 0.021 | Dilute 0.077 mL 0.4 mg/mL BCY12951 stock with 1.479 mL His-buffer. |

*His-buffer: 25 mM Histidine 10% Sucrose pH = 7

(iv) Observations

All the procedures related to animal handling, care and the treatment in the study were performed according to the guidelines approved by the Institutional Animal Care and Use Committee (IACUC) of WuXi AppTec, following the guidance of the Association for Assessment and Accreditation of Laboratory Animal Care (AAALAC). At the time of routine monitoring, the animals were checked for any effects of tumor growth and treatments on normal behavior such as mobility, food and water consumption (by observation only), body weight gain/loss, eye/hair matting and any other abnormal effect as stated in the protocol. Death and observed clinical signs were recorded on the basis of the numbers of animals within each subset.

(v) Tumor Measurements and the Endpoints

The major endpoint was to see if the tumor growth could be delayed or mice could be cured. Tumor volume was measured three times weekly in two dimensions using a caliper, and the volume was expressed in mm³ using the formula: $V = 0.5\, a \times b^2$ where a and b are the long and short diameters of the tumor, respectively. The tumor size was then used for calculations of T/C value. The T/C value (in percent) is an indication of antitumor effectiveness; T and C are the mean volumes of the treated and control groups, respectively, on a given day.

TGI was calculated for each group using the formula: TGI (%) = $[1 - (T_i - T_0)/(V_i - V_o)] \times 100$; $T_i$ is the average tumor volume of a treatment group on a given day, $T_0$ is the average tumor volume of the treatment group on the day of treatment start, $V_i$ is the average tumor volume of the vehicle control group on the same day with $T_i$, and $V_0$ is the average tumor volume of the vehicle group on the day of treatment start.

(vi) Statistical Analysis

Summary statistics, including mean and the standard error of the mean (SEM), were provided for the tumor volume of each group at each time point.

Statistical analysis of difference in tumor volume among the groups was conducted on the data obtained at the best therapeutic time point after the final dose.

A one-way ANOVA was performed to compare tumor volume among groups, and when a significant F-statistics (a ratio of treatment variance to the error variance) was obtained, comparisons between groups were carried out with Games-Howell test. A two-tailed T test was performed to compare tumor volume between two groups. All data were analyzed using GraphPad 5.0. $P < 0.05$ was considered to be statistically significant.

(e) Results (i) Tumor Growth Curve

Figure 16:
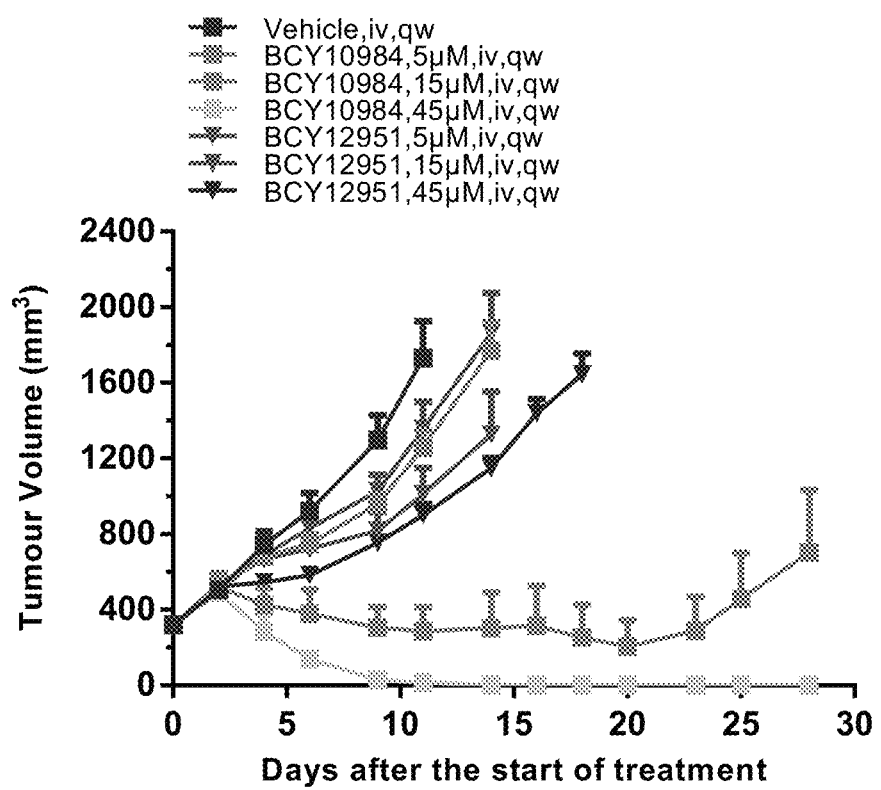
FIG. 16: Tumor volume traces after administering BCY10984 and BCY12951 to female BALB/c nude mice bearing HT1080 tumor. Error bars represent standard error of the mean (SEM).
Figure 17:
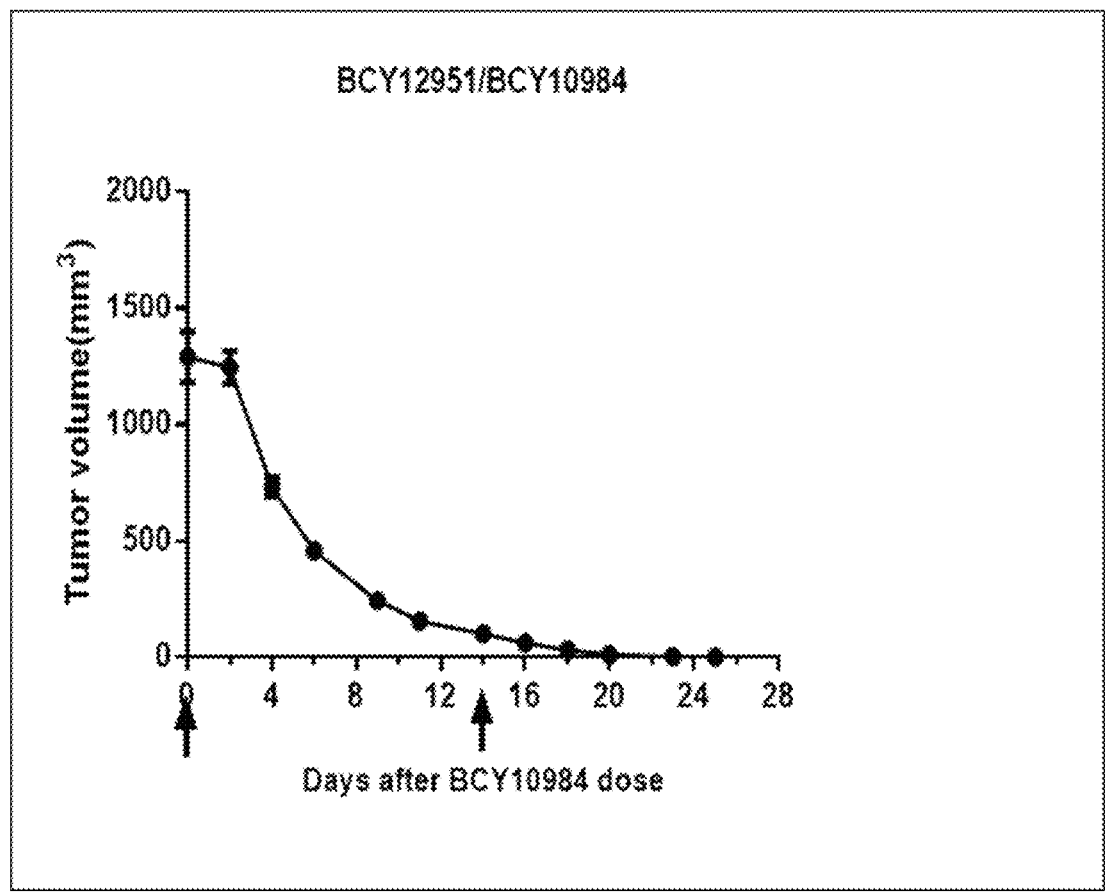
FIG. 17: Results from Example 6 showing mice from Group 5 and 6 (dosed with 45 µM BCY10984) demonstrated potent inhibition of tumor growth.

Tumor growth curves are shown in FIGS. 16 and 17.

(ii) Tumor Volume Trace

Mean tumor volume over time in female BALB/c nude mice bearing HT1080 tumor is shown in Table 10:

TABLE 10

| | | Tumor volume trace over time | | | | | |
|---|---|---|---|---|---|---|---|
| | | Days after the start of treatment | | | | | |
| Group | Treatment | 0 | 2 | 4 | 6 | 9 | 11 |
| 1 | Vehicle, iv, qw | 321 ± 45 | 505 ± 42 | 742 ± 73 | 920 ± 97 | 1297 ± 133 | 1731 ± 194 |
| 2 | BCY10984, 5 μM, iv, qw | 320 ± 48 | 508 ± 49 | 681 ± 64 | 750 ± 50 | 958 ± 53 | 1257 ± 95 |
| 3 | BCY10984, 15 μM, iv, qw | 321 ± 43 | 519 ± 76 | 428 ± 88 | 378 ± 128 | 304 ± 112 | 288 ± 126 |
| 4 | BCY10984, 45 μM, iv, qw | 320 ± 32 | 489 ± 68 | 285 ± 90 | 139 ± 46 | 29 ± 10 | 15 ± 6 |
| 5 | BCY12951, 5 μM, iv, qw | 321 ± 42 | 529 ± 51 | 668 ± 68 | 720 ± 69 | 818 ± 98 | 1011 ± 140 |
| 6 | BCY12951, 15 μM, iv, qw | 321 ± 37 | 528 ± 67 | 687 ± 91 | 830 ± 113 | 1026 ± 88 | 1354 ± 145 |
| 7 | BCY12951, 45 μM, iv, qw | 321 ± 30 | 522 ± 34 | 545 ± 20 | 584 ± 22 | 755 ± 20 | 901 ± 59 |

(iii) Tumor Growth Inhibition Analysis

Tumor growth inhibition rate for BCY10984 and BCY12951 in HT1080 xenograft model was calculated based on tumor volume measurements on day 11 after the start of the treatment.

TABLE 11

Tumor growth inhibition analysis

| Group | Treatment | Tumor Volume (mm$^3$)$^a$ | T/C$^b$ (%) | TGI (%) | p value (vs Vehicle) | p value (BCY10984 vs BCY12951) |
|---|---|---|---|---|---|---|
| 1 | Vehicle, iv, qw | 1731 ± 194 | — | — | — | |
| 2 | BCY10984, 5 μM, iv, qw | 1257 ± 95 | 72.6 | 33.6 | p > 0.05 | p > 0.05 (vs Gr5) |
| 3 | BCY10984, 15 μM, iv, qw | 288 ± 126 | 16.6 | 102.3 | p < 0.001 | p < 0.001(vs Gr6) |
| 4 | BCY10984, 45 μM, iv, qw | 15 ± 6 | 0.9 | 121.6 | p < 0.001 | p < 0.001(vs Gr7) |
| 5 | BCY12951, 5 μM, iv, qw | 1011 ± 140 | 58.4 | 51.1 | p < 0.01 | — |
| 6 | BCY12951, 15 μM, iv, qw | 1354 ± 145 | 78.2 | 26.7 | p > 0.05 | — |
| 7 | BCY12951, 45 μM, iv, qw | 901 ± 59 | 52.0 | 58.9 | p < 0.001 | — |

$^a$Mean ± SEM;
$^b$Tumor Growth Inhibition is calculated by dividing the group average tumor volume for the treated group by the group average tumor volume for the control group (T/C).

(f) Results Summary and Discussion

In this study, the therapeutic efficacy of BCY10984 and BCY12951 in HT1080 xenograft model was evaluated. The measured tumor volume of all treatment groups at various time points are shown in FIGS. 16 and 17 and Tables 10 and 11.

The mean tumor volume of vehicle treated mice reached 1731 mm$^3$ on day 11 after the start of treatment. BCY10984 at 5 μM qw (TV=1257 mm$^3$, TGI=33.6%, p>0.05), 15 μM qw (TV=288 mm$^3$, TGI=102.3%, p<0.001) and 45 μM qw (TV=15 mm$^3$, TGI=121.6%, p<0.001) showed dose-dependent anti-tumor activity. Among them, the BCY10984 at 45 μM qw eradicated the tumors completely on day 16. BCY12951 at 5 μM qw (TV=1011 mm$^3$, TGI=51.1%, p<0.01) and 45 μM qw (TV=901 mm$^3$, TGI=58.9%, p<0.001) showed significant anti-tumor activity.

When comparing the anti-tumor efficacy between the two test articles, the BCY10984 at 5 μM showed comparable anti-tumor efficacy with BCY12951 5 μM (p>0.05), BCY10984 at 15 μM and 45 μM showed more potent efficacy than BCY12951 at the same molar dosage (BCY10984 15 μM vs BCY12951 15 μM, p<0.001; BCY10984 45 μM vs BCY12951 45 μM, p<0.001).

7 animals in group 5 and 6 were treated with BCY10984 45 μM at an average starting tumor size of 1291 mm$^3$. All mice showed sudden tumor regression after the first dosing, and all tumors were eradicated completely after the second dosing.

The invention claimed is:

1. A linker comprising a -P1-P2-P3- moiety, wherein:
P1 represents a basic non-natural amino acid or a derivative thereof;
P2 represents a hydrophobic non-natural amino acid selected from cyclobutyl (cBu), diphenylalanine (Dpa), 1-naphthylalanine (1Nal), and 2-naphthylalanine (2Nal); and
P3 represents an acidic amino acid or an acidic non-natural amino acid.

2. The linker according to claim 1, wherein P1 represents a basic non-natural amino acid selected from: 2-amino-4-guanidinobutanoic acid (Agb); 2-amino-4-(3-methylguanidino) butanoic acid (Agb(Me)); 2,4-diaminobutanoic acid (Dab); 2,3-diaminopropanoic acid (Dap); 2-amino-3-guanidinopropanoic acid (Dap(CNNH$_2$)); and citrulline (Cit).

3. The linker according to claim 1, wherein P2 is 1-naphthylalanine (1Nal).

4. The linker according to claim 1, wherein P3 represents an acidic amino acid selected from Asp and Glu.

5. The linker according to claim 1, wherein the -P1-P2-P3- moiety is one of the following:

| P1 | P2 | P3 |
|---|---|---|
| Cit | 1Nal | Glu |
| Dab | cBu | Glu |
| Dab | Dpa | Glu |
| Dab | 1Nal | Glu |
| Dab | 2Nal | Glu. |

6. A compound comprising a binding agent which binds to a target and a cytotoxic agent, wherein said binding agent is joined to said cytotoxic agent via a linker according to claim 1.

7. The compound according to claim 6, wherein said binding agent is a peptide selected from an antibody or a bicyclic peptide.

8. The compound according to claim 6, wherein said cytotoxic agent is DM1 or MMAE.

9. The compound according to claim 6 which is protease resistant when compared with a conjugate in the absence of said linker.

10. The compound according to claim 6 which is plasma stable when compared with a conjugate in the absence of said linker.

11. The compound according to claim 6 which is selected from: BCY10989, BCY10980, BCY10982, BCY10983, BCY10984, BCY10981, BCY10985, BCY10986, BCY10987, and BCY10988.

12. A pharmaceutical composition comprising the compound according to claim 6 in combination with one or more pharmaceutically acceptable excipients.

13. A method of treating cancer which comprises administering to a patient in need thereof a compound according to claim 6.

14. The compound according to claim 9, wherein the protease is Cathepsin B.

15. The compound according to claim 8, wherein said cytotoxic agent is DM1.

16. The compound according to claim 8, wherein said cytotoxic agent is MMAE.

17. The compound according to claim 7, wherein said binding agent is an antibody.

18. The compound according to claim 7, wherein said binding agent is a bicyclic peptide.

19. The linker according to claim 2, wherein P1 is Cit.

20. The linker according to claim 4, wherein P3 is Glu.

21. The linker according to claim 5, wherein the -P1-P2-P3- moiety is -Cit-1Nal-Glu-.

* * * * *